(12) United States Patent
Vinanica et al.

(10) Patent No.: US 12,486,514 B2
(45) Date of Patent: Dec. 2, 2025

(54) METHOD TO SPECIFICALLY STIMULATE SURVIVAL AND EXPANSION OF GENETICALLY-MODIFIED IMMUNE CELLS

(71) Applicant: National University of Singapore, Singapore (SG)

(72) Inventors: Natasha Vinanica, Singapore (SG); Arthur Yong, Singapore (SG); Dario Campana, Singapore (SG); Masaru Imamura, Niigata (JP)

(73) Assignee: National University of Singapore, Singapore (SG)

(*) Notice: Subject to any disclaimer, the term of this patent is extended or adjusted under 35 U.S.C. 154(b) by 1226 days.

(21) Appl. No.: 17/267,617

(22) PCT Filed: Aug. 27, 2019

(86) PCT No.: PCT/IB2019/057217
§ 371 (c)(1),
(2) Date: Feb. 10, 2021

(87) PCT Pub. No.: WO2020/044239
PCT Pub. Date: Mar. 5, 2020

(65) Prior Publication Data
US 2021/0324388 A1   Oct. 21, 2021

Related U.S. Application Data

(60) Provisional application No. 62/724,488, filed on Aug. 29, 2018.

(51) Int. Cl.
| | | |
|---|---|---|
| *C12N 15/62* | (2006.01) | |
| *A61K 38/00* | (2006.01) | |
| *A61K 40/11* | (2025.01) | |
| *A61K 40/31* | (2025.01) | |
| *A61K 40/42* | (2025.01) | |
| *A61P 35/02* | (2006.01) | |
| *C07K 14/72* | (2006.01) | |
| *C07K 14/725* | (2006.01) | |
| *C07K 16/28* | (2006.01) | |
| *C12N 5/0783* | (2010.01) | |
| *C12N 15/85* | (2006.01) | |

(52) U.S. Cl.
CPC .......... *C12N 15/625* (2013.01); *A61K 40/11* (2025.01); *A61K 40/31* (2025.01); *A61K 40/4201* (2025.01); *A61K 40/4211* (2025.01); *A61P 35/02* (2018.01); *C07K 14/7051* (2013.01); *C07K 14/72* (2013.01); *C07K 16/2803* (2013.01); *C12N 5/0636* (2013.01); *C12N 15/85* (2013.01); *A61K 38/00* (2013.01); *A61K 2239/31* (2023.05); *A61K 2239/38* (2023.05); *A61K 2239/48* (2023.05)

(58) Field of Classification Search
CPC ....... C12N 15/625; C12N 15/85; A61P 35/02; A61K 35/17; C07K 14/7051; C07K 16/2803
See application file for complete search history.

(56) References Cited

U.S. PATENT DOCUMENTS

| | | |
|---|---|---|
| 4,650,764 A | 3/1987 | Temin et al. |
| 4,690,915 A | 9/1987 | Rosenberg |
| 4,844,893 A | 7/1989 | Honsik et al. |
| 4,980,289 A | 12/1990 | Temin et al. |
| 5,124,263 A | 6/1992 | Temin et al. |
| 5,359,046 A | 10/1994 | Capon |
| 5,399,346 A | 3/1995 | Anderson et al. |
| 5,595,756 A | 1/1997 | Bally et al. |
| 5,653,977 A | 8/1997 | Saleh |
| 5,674,704 A | 10/1997 | Goodwin et al. |
| 5,686,281 A | 11/1997 | Roberts |
| 5,712,149 A | 1/1998 | Roberts |
| 6,103,521 A | 8/2000 | Capon et al. |
| 6,303,121 B1 | 10/2001 | Kwon |
| 6,319,494 B1 | 11/2001 | Capon et al. |

(Continued)

FOREIGN PATENT DOCUMENTS

| | | |
|---|---|---|
| CN | 101684456 A | 3/2010 |
| CN | 103113470 A | 5/2013 |

(Continued)

OTHER PUBLICATIONS

Royer, Y., Menu, C., Liu, X., & Constantinescu, S. N. (2004). High-throughput gateway bicistronic retroviral vectors for stable expression in mammalian cells: exploring the biologic effects of STAT5 overexpression. DNA and cell biology, 23(6), 355-365. (Year: 2004).*

Ren, P.-P. et al., Anti-EGFRvIII Chimeric Antigen Receptor-Modified T Cells for Adoptive Cell Therapy of Glioblastoma, Current Pharmaceutical Design, 23(14), 2113-2116 (2017).

Morgan, R.A. et. al., Recognition of Glioma Stem Cells by Genetically Modified T Cells Targeting EGFRvIII and Development of Adoptive Cell Therapy for Glioma, Human Gene Therapy, 23(10), 1043-1053 (2012).

(Continued)

*Primary Examiner* — Kevin K Hill
*Assistant Examiner* — Allison Marie Johnson
(74) *Attorney, Agent, or Firm* — Hamilton, Brook, Smith & Reynolds, P.C.

(57) ABSTRACT

The present invention relates to a vector encoding a wildtype or truncated form of erythropoietin receptor (EpoR) to promote T cell survival and proliferation. Specifically, it exemplifies a bicistronic vector that expresses a truncated EpoR with an anti-CD19-41 BB-003ζ chimeric antigen receptor (CAR) that has a greater ex vivo expansion than CAR-T cells and demonstrates a significantly higher anti-leukemic activity in vivo. It also describes the method of producing cells expressing said vector and the use of these cells to kill CD19+ tumour cells.

12 Claims, 38 Drawing Sheets
Specification includes a Sequence Listing.

(56) References Cited

U.S. PATENT DOCUMENTS

| | | |
|---|---|---|
| 6,355,476 B1 | 3/2002 | Kwon et al. |
| 6,361,998 B1 | 3/2002 | Bell et al. |
| 6,410,319 B1 | 6/2002 | Raubitschek et al. |
| 6,797,514 B2 | 9/2004 | Berenson et al. |
| 7,052,906 B1 | 5/2006 | Lawson et al. |
| 7,070,995 B2 | 7/2006 | Jensen |
| 7,435,596 B2 | 10/2008 | Campana et al. |
| 7,446,179 B2 | 11/2008 | Jensen et al. |
| 7,446,190 B2 | 11/2008 | Sadelain et al. |
| 7,763,243 B2 | 7/2010 | Lum et al. |
| 7,932,055 B2 | 4/2011 | Spee et al. |
| 7,994,298 B2 | 8/2011 | Zhang et al. |
| 8,026,097 B2 | 9/2011 | Campana et al. |
| 8,399,645 B2 | 3/2013 | Campana et al. |
| 9,487,800 B2 | 11/2016 | Schonfeld et al. |
| 9,511,092 B2 | 12/2016 | Campana et al. |
| 9,605,049 B2 | 3/2017 | Campana et al. |
| 9,834,590 B2 | 12/2017 | Campana et al. |
| 9,856,322 B2 | 1/2018 | Campana et al. |
| 10,391,126 B2 | 8/2019 | Cooper et al. |
| 10,428,305 B2 | 10/2019 | Campana et al. |
| 10,538,739 B2 | 1/2020 | Campana et al. |
| 10,774,309 B2 | 9/2020 | Campana et al. |
| 10,774,311 B2 | 9/2020 | Campana et al. |
| 10,801,012 B2 | 10/2020 | Campana et al. |
| 10,829,737 B2 | 11/2020 | Campana et al. |
| 10,836,999 B2 | 11/2020 | Campana et al. |
| 11,141,436 B2 | 10/2021 | Trager et al. |
| 11,154,575 B2 | 10/2021 | Trager et al. |
| 11,253,547 B2 | 2/2022 | Trager et al. |
| 11,365,236 B2 | 6/2022 | Leong et al. |
| 11,560,548 B2 | 1/2023 | Campana et al. |
| 11,673,937 B2 | 6/2023 | Campana et al. |
| 11,873,512 B2 | 1/2024 | Campana et al. |
| 11,896,616 B2 | 2/2024 | Kamiya et al. |
| 12,258,381 B2 | 3/2025 | Seow et al. |
| 12,264,335 B2 | 4/2025 | Campana et al. |
| 2002/0018783 A1 | 2/2002 | Sadelain et al. |
| 2003/0129649 A1 | 7/2003 | Kobilka et al. |
| 2003/0147869 A1 | 8/2003 | Riley |
| 2003/0215427 A1 | 11/2003 | Jensen |
| 2004/0038886 A1 | 2/2004 | Finney et al. |
| 2004/0043401 A1 | 3/2004 | Sadelain et al. |
| 2004/0126363 A1 | 7/2004 | Jensen et al. |
| 2005/0042208 A1 | 2/2005 | Sagawa et al. |
| 2005/0048549 A1 | 3/2005 | Cao et al. |
| 2005/0113564 A1 | 5/2005 | Campana et al. |
| 2006/0093605 A1 | 5/2006 | Campana et al. |
| 2006/0247191 A1 | 11/2006 | Finney et al. |
| 2007/0160578 A1 | 7/2007 | Waldmann et al. |
| 2007/0166327 A1 | 7/2007 | Cooper et al. |
| 2008/0247990 A1 | 10/2008 | Campbell |
| 2008/0299137 A1 | 12/2008 | Svendsen |
| 2009/0281035 A1 | 11/2009 | Spee et al. |
| 2010/0029749 A1 | 2/2010 | Zhang et al. |
| 2012/0015434 A1 | 1/2012 | Campana et al. |
| 2012/0148552 A1 | 6/2012 | Jensen |
| 2012/0282256 A1 | 11/2012 | Campana et al. |
| 2012/0321666 A1 | 12/2012 | Copper et al. |
| 2013/0072401 A1 | 3/2013 | Ye et al. |
| 2013/0266551 A1 | 10/2013 | Campana et al. |
| 2013/0280221 A1 | 10/2013 | Schonfeld et al. |
| 2013/0288368 A1 | 10/2013 | June et al. |
| 2014/0023626 A1 | 1/2014 | Peled et al. |
| 2014/0271635 A1 | 9/2014 | Brogdon et al. |
| 2014/0286973 A1 | 9/2014 | Powell, Jr. |
| 2014/0302608 A1 | 10/2014 | Dominici et al. |
| 2014/0349402 A1* | 11/2014 | Cooper ............... C12N 5/0636 435/325 |
| 2015/0139943 A1 | 5/2015 | Campana et al. |
| 2015/0190471 A1 | 7/2015 | Copik et al. |
| 2015/0218649 A1 | 8/2015 | Saenger et al. |
| 2016/0000828 A1 | 1/2016 | Campana et al. |
| 2016/0152723 A1 | 6/2016 | Chen et al. |
| 2016/0158285 A1 | 6/2016 | Cooper et al. |
| 2017/0044227 A1 | 2/2017 | Schonfeld |
| 2017/0073423 A1 | 3/2017 | Juillerat et al. |
| 2017/0073638 A1 | 3/2017 | Campana et al. |
| 2017/0129967 A1 | 5/2017 | Wels et al. |
| 2017/0283482 A1 | 10/2017 | Campana et al. |
| 2017/0355957 A1 | 12/2017 | Biondi et al. |
| 2018/0002397 A1 | 1/2018 | Shah et al. |
| 2018/0044391 A1 | 2/2018 | Gundram et al. |
| 2018/0046571 A1 | 2/2018 | Magill et al. |
| 2018/0086831 A1 | 3/2018 | Pule et al. |
| 2018/0104278 A1 | 4/2018 | Zhang et al. |
| 2018/0117146 A1 | 5/2018 | Yu et al. |
| 2018/0134765 A1 | 5/2018 | Landgraf et al. |
| 2019/0038733 A1 | 2/2019 | Campana et al. |
| 2019/0046571 A1 | 2/2019 | Campana et al. |
| 2019/0290693 A1 | 9/2019 | Qi et al. |
| 2019/0292533 A1* | 9/2019 | Nager .................. C07K 14/71 |
| 2019/0336533 A1 | 11/2019 | Hwang et al. |
| 2019/0376037 A1 | 12/2019 | Campana et al. |
| 2020/0016208 A1 | 1/2020 | Kamiya et al. |
| 2020/0131244 A1 | 4/2020 | Leong et al. |
| 2020/0255803 A1 | 8/2020 | Zhang et al. |
| 2020/0407686 A1 | 12/2020 | Campana et al. |
| 2021/0009951 A1 | 1/2021 | Hu et al. |
| 2021/0017271 A1 | 1/2021 | Tan et al. |
| 2021/0046115 A1 | 2/2021 | Seow et al. |
| 2021/0054409 A1 | 2/2021 | Zhu et al. |
| 2021/0338727 A1 | 11/2021 | Trager et al. |
| 2021/0363218 A1 | 11/2021 | Fan et al. |
| 2022/0002424 A1 | 1/2022 | Trager et al. |
| 2022/0047635 A1 | 2/2022 | Liu et al. |
| 2022/0233590 A1 | 7/2022 | Trager et al. |
| 2022/0233593 A1 | 7/2022 | Trager et al. |
| 2022/0411754 A1 | 12/2022 | Trager et al. |
| 2023/0002471 A1 | 1/2023 | Leong et al. |
| 2023/0028399 A1 | 1/2023 | Rajangam et al. |
| 2023/0220343 A1 | 7/2023 | Campana et al. |
| 2023/0265390 A1 | 8/2023 | Trager et al. |
| 2023/0390392 A1 | 12/2023 | Trager et al. |
| 2024/0335536 A1 | 10/2024 | Trager et al. |

FOREIGN PATENT DOCUMENTS

| | | |
|---|---|---|
| CN | 105838677 A | 8/2016 |
| CN | 105985931 A | 10/2016 |
| CN | 107109363 A | 8/2017 |
| CN | 107827990 A | 3/2018 |
| EP | 0 952 213 A2 | 3/1999 |
| EP | 0 830 599 A1 | 4/2000 |
| EP | 1 231 262 A1 | 8/2002 |
| EP | 1 306 427 A1 | 5/2003 |
| EP | 1 053 301 B1 | 4/2004 |
| EP | 1 820 017 | 6/2006 |
| EP | 1 233 058 B1 | 12/2006 |
| EP | 1 036 327 B1 | 7/2009 |
| EP | 2 411 507 | 9/2010 |
| EP | 2 493 485 | 5/2011 |
| EP | 2 493 486 | 5/2011 |
| EP | 2 593 542 | 1/2012 |
| EP | 2 141 997 B1 | 10/2012 |
| EP | 2 614 151 | 10/2012 |
| EP | 2 756 521 | 3/2013 |
| EP | 2 866 834 | 1/2014 |
| EP | 2 903 637 | 4/2014 |
| EP | 2 904 106 | 4/2014 |
| EP | 2 948 544 | 7/2014 |
| EP | 2 956 175 | 8/2014 |
| EP | 2 961 831 | 9/2014 |
| EP | 2 964 753 | 9/2014 |
| EP | 2 970 426 | 9/2014 |
| EP | 2 968 601 | 10/2014 |
| EP | 2 986 636 | 10/2014 |
| EP | 2 537 416 B1 | 11/2014 |
| EP | 3 008 173 | 12/2014 |
| EP | 2 856 876 A1 | 4/2015 |
| EP | 3 057 986 | 4/2015 |
| EP | 3 063 175 | 5/2015 |
| EP | 3 071 221 | 5/2015 |
| EP | 3 071 222 | 5/2015 |

(56) References Cited

FOREIGN PATENT DOCUMENTS

| | | |
|---|---|---|
| EP | 3 071 223 | 5/2015 |
| EP | 3 083 671 | 6/2015 |
| EP | 3 083 691 | 6/2015 |
| EP | 3 094 653 | 7/2015 |
| EP | 3 105 318 | 8/2015 |
| EP | 3 105 335 | 8/2015 |
| EP | 2 968 492 | 9/2015 |
| EP | 3 119 425 | 9/2015 |
| EP | 3 126 380 | 10/2015 |
| EP | 3 134 432 | 10/2015 |
| EP | 3 180 359 | 2/2016 |
| EP | 3 189 132 | 3/2016 |
| EP | 3 012 268 A1 | 4/2016 |
| EP | 2 614 077 B1 | 8/2016 |
| EP | 3 115 373 A1 | 1/2017 |
| EP | 3 567 049 A2 | 11/2019 |
| JP | 2017-112982 A | 6/2017 |
| KR | 10-2660336 B1 | 4/2024 |
| WO | WO 92/17198 A1 | 10/1992 |
| WO | WO 95/007358 A1 | 3/1995 |
| WO | WO 96/023814 A1 | 8/1996 |
| WO | WO 96/024671 A1 | 8/1996 |
| WO | WO 96/41163 A1 | 12/1996 |
| WO | WO 97/023613 A2 | 7/1997 |
| WO | WO 98/026061 A2 | 6/1998 |
| WO | WO 99/00494 A2 | 1/1999 |
| WO | WO 99/06557 A2 | 2/1999 |
| WO | WO 99/38954 A1 | 8/1999 |
| WO | WO 99/57268 A1 | 11/1999 |
| WO | WO 00/14257 A1 | 3/2000 |
| WO | WO 00/23573 A2 | 4/2000 |
| WO | WO 01/29191 A1 | 4/2001 |
| WO | WO 01/38494 A1 | 5/2001 |
| WO | WO 02/10350 A1 | 2/2002 |
| WO | WO 02/33101 A1 | 4/2002 |
| WO | WO 02/077029 A2 | 10/2002 |
| WO | WO 03/089616 A2 | 10/2003 |
| WO | WO 2004/027036 A2 | 4/2004 |
| WO | WO 2004/039840 A1 | 5/2004 |
| WO | 2005/000890 A1 † | 1/2005 |
| WO | WO 2005/044996 A2 | 5/2005 |
| WO | WO 2005/118788 A2 | 12/2005 |
| WO | WO 2006/036445 A2 | 4/2006 |
| WO | WO 2006/052534 A2 | 5/2006 |
| WO | WO 2006/061626 A2 | 6/2006 |
| WO | 2006119115 A2 | 11/2006 |
| WO | WO 2007/046006 A2 | 4/2007 |
| WO | WO 2008/121420 A1 | 10/2008 |
| WO | WO 2009/117566 A1 | 9/2009 |
| WO | WO 2010/071836 A | 6/2010 |
| WO | WO 2010/110734 A1 | 9/2010 |
| WO | WO 2011/020047 A1 | 2/2011 |
| WO | WO 2011/053321 A1 | 5/2011 |
| WO | WO 2011/053322 A1 | 5/2011 |
| WO | WO 2011/069019 A2 | 6/2011 |
| WO | WO 2011/080740 A1 | 7/2011 |
| WO | WO 2011/150976 A1 | 12/2011 |
| WO | WO 2012/009422 A1 | 1/2012 |
| WO | WO 2012/031744 A1 | 3/2012 |
| WO | WO 2012/040323 A2 | 3/2012 |
| WO | WO 2012/071411 A2 | 5/2012 |
| WO | WO 2012/079000 A1 | 6/2012 |
| WO | WO 2012/136231 A1 | 10/2012 |
| WO | WO 2013/040371 A2 | 3/2013 |
| WO | WO 2013/040557 A2 | 3/2013 |
| WO | WO-2013043196 A1 * | 3/2013 | ............. A61K 35/18 |
| WO | WO 2013/123720 A2 | 8/2013 |
| WO | WO 2013/123726 A1 | 8/2013 |
| WO | WO 2014/005072 A1 | 1/2014 |
| WO | WO 2014/011993 A2 | 1/2014 |
| WO | WO 2014/055413 A2 | 4/2014 |
| WO | WO 2014/055442 A2 | 4/2014 |
| WO | WO 2014/055657 A1 | 4/2014 |
| WO | WO 2014/055668 A1 | 4/2014 |
| WO | WO 2014/099671 A1 | 6/2014 |
| WO | WO 2014/117121 A1 | 7/2014 |
| WO | WO 2014/127261 A1 | 8/2014 |
| WO | WO 2014/134165 A1 | 9/2014 |
| WO | WO 2014/138704 A1 | 9/2014 |
| WO | WO 2014/145252 A2 | 9/2014 |
| WO | WO 2014/164554 A1 | 10/2014 |
| WO | WO 2014/172584 A1 | 10/2014 |
| WO | WO 2014/186469 A2 | 11/2014 |
| WO | WO 2014/201021 A2 | 12/2014 |
| WO | WO 2015/058018 A1 | 4/2015 |
| WO | WO 2015/066551 A2 | 5/2015 |
| WO | WO 2015/075468 A1 | 5/2015 |
| WO | WO 2015/075469 A1 | 5/2015 |
| WO | WO 2015/075470 A1 | 5/2015 |
| WO | WO 2015/092024 A2 | 6/2015 |
| WO | WO 2015/095895 A1 | 6/2015 |
| WO | WO 2015/105522 A1 | 7/2015 |
| WO | WO 2015/120421 A1 | 8/2015 |
| WO | WO 2015/123642 A1 | 8/2015 |
| WO | WO 2015/142314 A1 | 9/2015 |
| WO | WO 2015/142661 A1 | 9/2015 |
| WO | 2015/157391 A1 | 10/2015 |
| WO | WO 2015/150771 A1 | 10/2015 |
| WO | WO 2015/154012 A1 | 10/2015 |
| WO | WO 2015/154012 A8 | 10/2015 |
| WO | WO 2015/164759 A2 | 10/2015 |
| WO | WO 2015/174928 A1 | 11/2015 |
| WO | 2015/188119 A1 | 12/2015 |
| WO | WO 2015/193411 A1 | 12/2015 |
| WO | WO 2016/011210 A2 | 1/2016 |
| WO | WO 2016/030691 A1 | 3/2016 |
| WO | WO 2016/033331 A1 | 3/2016 |
| WO | WO 2016/040441 A1 | 3/2016 |
| WO | WO 2016/042041 A1 | 3/2016 |
| WO | WO 2016/042461 A1 | 3/2016 |
| WO | WO 2016/061574 A1 | 4/2016 |
| WO | WO 2016/069607 A1 | 5/2016 |
| WO | WO 2016/073602 A2 | 5/2016 |
| WO | WO 2016/073629 A1 | 5/2016 |
| WO | WO 2016/073755 A2 | 5/2016 |
| WO | WO 2016/075612 A1 | 5/2016 |
| WO | WO 2016/100985 A2 | 6/2016 |
| WO | 2016/118857 A1 † | 7/2016 |
| WO | WO 2016/109661 A1 | 7/2016 |
| WO | WO 2016/109668 A1 | 7/2016 |
| WO | WO 2016/115482 A1 | 7/2016 |
| WO | WO 2016/123122 A1 | 8/2016 |
| WO | WO 2016/123333 A1 | 8/2016 |
| WO | WO 2016/124765 A1 | 8/2016 |
| WO | WO 2016/124930 A1 | 8/2016 |
| WO | WO 2016/126213 A1 | 8/2016 |
| WO | WO 2016/126608 A1 | 8/2016 |
| WO | 2016/139487 A1 | 9/2016 |
| WO | WO 2016/141357 A1 | 9/2016 |
| WO | WO 2016/142314 A1 | 9/2016 |
| WO | WO 2016/149254 A1 | 9/2016 |
| WO | WO 2016/151315 A1 | 9/2016 |
| WO | WO 2016/154055 A1 | 9/2016 |
| WO | WO 2016/154585 A1 | 9/2016 |
| WO | WO 2016/172537 A1 | 10/2016 |
| WO | WO 2016/172583 A1 | 10/2016 |
| WO | WO-2016168773 A2 * | 10/2016 | ............. A61K 35/17 |
| WO | WO 2016/174405 A1 | 11/2016 |
| WO | WO 2016/174406 A1 | 11/2016 |
| WO | WO 2016/174407 A1 | 11/2016 |
| WO | WO 2016/174408 A1 | 11/2016 |
| WO | WO 2016/174409 A1 | 11/2016 |
| WO | WO 2016/174461 A1 | 11/2016 |
| WO | WO 2016/174652 A1 | 11/2016 |
| WO | WO 2016/179684 A1 | 11/2016 |
| WO | WO 2016/191587 A1 | 12/2016 |
| WO | WO 2016/191755 A1 | 12/2016 |
| WO | WO 2016/196388 A1 | 12/2016 |
| WO | WO 2016/197108 A1 | 12/2016 |
| WO | WO 2016/201304 A1 | 12/2016 |
| WO | WO 2016/210293 A1 | 12/2016 |
| WO | WO 2017/004150 A1 | 1/2017 |
| WO | WO 2017/011804 A1 | 1/2017 |
| WO | WO 2017/021701 A1 | 2/2017 |

(56) References Cited

FOREIGN PATENT DOCUMENTS

| | | |
|---|---|---|
| WO | WO 2017/023859 A1 | 2/2017 |
| WO | WO 2017/024131 A1 | 2/2017 |
| WO | WO 2017/027325 A1 | 2/2017 |
| WO | WO 2017/029511 A1 | 2/2017 |
| WO | WO-2017029512 A1 * | 2/2017 ............ A61K 35/17 |
| WO | WO 2017/032777 A1 | 3/2017 |
| WO | WO 2017/034615 A1 | 3/2017 |
| WO | WO 2017/037083 A1 | 3/2017 |
| WO | WO 2017/058752 A1 | 4/2017 |
| WO | WO 2017/058753 A1 | 4/2017 |
| WO | WO 2017/079694 A2 | 5/2017 |
| WO | WO 2017/079705 A1 | 5/2017 |
| WO | WO 2017/079881 A1 | 5/2017 |
| WO | WO 2017/096329 A1 | 6/2017 |
| WO | WO 2017/127729 A1 | 7/2017 |
| WO | WO 2017/172981 A2 | 10/2017 |
| WO | 2017186928 A1 | 11/2017 |
| WO | WO 2018/022646 A1 | 2/2018 |
| WO | 2018106732 A1 | 6/2018 |
| WO | WO 2018/103503 A1 | 6/2018 |
| WO | 2018124766 A2 | 7/2018 |
| WO | WO 2018/182511 A1 | 10/2018 |
| WO | WO 2018/183385 A1 | 10/2018 |
| WO | WO 2019/062817 A1 | 4/2019 |
| WO | WO 2019/077037 A1 | 4/2019 |
| WO | 2019/091478 A1 † | 5/2019 |
| WO | 2019129220 A1 | 7/2019 |
| WO | WO 2019/129002 A1 | 7/2019 |
| WO | WO 2019/155286 A1 | 8/2019 |
| WO | WO 2019/155288 A1 | 8/2019 |
| WO | 2019/169290 A1 † | 9/2019 |
| WO | WO 2019/193476 A1 | 10/2019 |
| WO | WO 2020/044239 A1 | 3/2020 |
| WO | WO 2020/083282 A1 | 4/2020 |
| WO | WO 2021/009694 A1 | 1/2021 |

OTHER PUBLICATIONS

Dalal, A.-R. et al., Third Generation Human Epidermal Growth Factor Receptor 2 Chimeric Antigen Receptor Expression on Human T Cells Improves with Two-Signal Activation, Human Gene Therapy, vol. 29, No. 8, 845-852 (2018) (Abstract).

Choi, B. D. et al., Chimeric antigen receptor T-cell immunotherapy for glioblastoma: practical insights for neurosurgeons, Neurosurg Focus, 44(6):E13, 1-6 (2018).

Vinanica, N., et al., "Specific stimulation of T lymphocytes with erythropoietin for adoptive immunotherapy", Blood, 135(9): 668-679 (Feb. 27, 2020).

Calabrese, et al., "IL-6 biology: implications for clinical targeting in rheumatic disease," S. Nat. Rev. Rheumatol, 10, 720-727 (2014); published online Aug. 19, 2014 (corrected online Sep. 19, 2014).

Cordoba, S.P. et al., "The large ectodomains of CD45 and CD148 regulate their segregation from and inhibition of ligated T-cell receptor," Blood, The Journal of the American Society of Hematology, V. 121, N. 21, p. 4295-4302, c. 4301 (2013).

Culpepper, D.J. et al., "Systematic mutation and thermodynamic analysis of central tyrosine pairs in polyspecific NKG2D receptor interactions," Molecular Immunology, V. 48, N. 4, p. 516-523, c. 521-522 (2011).

De Felipe, P., "Polycistronic Viral Vectors," Current Gene Therapy, V. 2, N. 3, p. 355-378, c. 360 (2002).

Lanier, Lewis L., "NK Cell Recognition," Annual Review of Immunology, vol. 23, No. 1, pp. 225-274 (2005).

Lima, et al., "Interleukin-6 Neutralization by Antibodies Immobilized at the Surface of Polymeric Nanoparticles as a Therapeutic Strategy for Arthritic Diseases," ACS Appl. Mater. Interfaces 2018, 10, 13839-13850.

Zhao, Y et al., "A Herceptin-Based Chimeric Antigen Receptor with Modified Signaling Domains Leads to Enhanced Survival of Transduced T Lymphocytes and Antitumor Activity," The Journal of Immunology, V. 183, N. 9, p. 5563-5574, c. 5568, 5571 (2009).

Abakushina, E.V., "Immunotherapy With Natural Killer Cells In The Treatment Of Cancer," Russian Journal of Immunology, vol. 10, No. 2, pp. 131-142 (2016) (Abstract only).

Denman et al., "Membrane-Bound IL-21 Promotes Sustained Ex Vivo Proliferation of Human Natural Killer Cells," PLoS ONE, vol. 7, Issue 1, Jan. 2012.

Dowell, A. C. , "Studies of Human T cell Costimulation:Potential for the Immunotherapy of Cancer," A thesis submitted to The University of Birmingham for the degree of Doctor of Philosophy, CRUK Institute for Cancer Studies, 2010.

GenBank Accession No. NM_172175.2, Homo sapiens interleukin 15 (IL15), transcript variant 2, mRNA, dated Feb. 12, 2011, 4 pages.

Hasan, A.N., "Soluble and membrane-bound interleukin (IL)-15 Ra/IL-15 complexesmediate proliferation of high-avidity central memory CD8IT cells foradoptive immunotherapy of cancer and infections," Clinical and Experimental Immunology, 186: 249-265, 2016.

Leitner et al., "T cell stimulator cellsm an efficient and versatile cellular system to assess the role of costimulatory ligands in the activation of human T cells," Journal of Immunological Methods, 362, 131-141, 2010.

Oyer et al., "Natural killer cells stimulated with PM21 particles expand and biodistribute in vivo: Clinical implications for cancer treatment," Cytotherapy, 18: 653-663, 2016.

Wang et al., "Human NK cells maintain licensing status and are subject to killer immunoglobulin-like receptor (KIR) and KIR-ligand inhibition following ex vivo expansion," Cancer Immunol Immunother, 65:1047-1059, 2016.

Zhang et al., "Improving Adoptive T Cell Therapy by Targeting and Controlling IL-12 Expression to the Tumor Environment," The American Society of Gene & Cell Therapy Molecular Therapy, vol. 19, No. 4, 751-759, 2011.

EPO Communication pursuant to Rule 114(2) EPC, Third Party Observations, for EP Application No. 19856119.3 entitled "A Method to Specifically Stimulate Survival and Expansion of Genetically-Modified Immune Cells," dated May 12, 2022.

AASEQ1_05172022_135256_pep_vs_AASEQ2_05172022_135256_pep_align_4-1 BBL, May 17, 2022.

Atreya, et al., "Blockade of interleukin 6 trans signaling suppresses T-cell resistance against apoptosis in chronic intestinal inflammation: Evidence in Crohn disease and experimental colitis in vivo" Nature Medicine, vol. 6, No. 5, May 2000; pp. 583-588.

Barrett, et al., "Interleukin 6 Is Not Made By Chimeric Antigen Receptor T Cells and Does Not Impact Their Function" Blood (2016) 128(22):654.

Bedouelle, et al., "Diversity and junction residues as hotspots of binding energy in an antibody neutralizing the dengue virus" FEBS Journal 273 (2006) 34-46.

Berger, C. et al., "CD28 costimulation and immunoaffinity-based selection efficiently gernate primary gene-modified T cells for adoptive immunotherapy," Blood, 101:: 476-484 (2003).

Brown, et al., "Tolerance to Single, but Not Multiple, Amino Acid Replacements in Antibody VH CDR2" J. Immunol. May 1, 1996;156(9):3285-91.

Call et al., "The structural basis for intramembrane assembly of an activating immunoreceptor complex" Nat Immunol Nov. 2010; 11(11): 1023-1029.

Colman, "Effects of amino acid sequence changes on antibody-antigen interactions" Research in Immunology 145:33-36 (1994).

Figueiredo et al., "Permanent silencing of NKG2A expression for cell-based therapeutics" J. Mol. Med. (2009) 87:199-210.

Frankel et al., "Characterization of diphtheria fusion proteins targeted to the human interleukin-3 receptor" Protein Eng., 2000, v.13, n.8, p. 575-581.

Gillet et al., "Selectable markers for gene therapy," Chapter 27 of Gene and Cell Therapy:Therapeutic Mechanisms and Strategies, 3rd Ed. N .S. Templeton Ed, (CRC Press:Boca Raton, FL), pp. 701-738 (2009).

Hong, et al., "Interleukin-6 expands homeostatic space for peripheral T cells" Cytokine 64 (2013) pp. 532-540.

Iacobucci et al., Truncating Erythropoietin Receptor Rearrangements in Acute Lymphoblastic Leukemia, Cancer Cell, vol. 29, No. 2, pp. 186-200, published on Feb. 8, 2016.

(56) References Cited

OTHER PUBLICATIONS

Jiang, Z., et al., "IL-6 trans-signaling promotes the expansion and anti-tumor activity of CAR T cells" Leukemia (2021) 35; pp. 1380-1391.
Kontermann, et al., "Bispecific antibodies," Drug Discovery Today, 2015, v. 7, n. 20, p. 838-847, Fig. 1.
Lee, et al., "Current concepts in the diagnosis and management of cytokine release syndrome" Blood, Jul. 10, 2014, vol. 124, No. 2, 188-195.
Li, et al., "IL-6 Promotes T Cell Proliferation and Expansion under Inflammatory Conditions in Association with Low-Level ROR-γt Expression;" J. Immunol (2018) 201(10) pp. 2934-2946.
Morgan, et al., "Case Report of a Serious Adverse Event Following the Administration of T Cells Transduced With a Chimeric Antigen Receptor Recognizing ERBB2" Molecular Therapy, vol. 18, No. 4, 843-851, Apr. 2010.
Nish, et al., "T cell-intrinsic role of IL-6 signaling in primary and memory responses" eLife 2014;3:e01949.
Pelechas et al., "Sirukumab: a promising therapy for rheumatoid arthritis" Expert Opinion On Biological Therapy, 2017, vol. 17, No. 6, 755-763.
Qin et al., "Incorporation of a hinge domain improves the expansion of chimeric antigen receptor T cells" J. Hematol. Oneal. Mar. 13, 2017; 10(1):68.
Rochman, et al., "IL-6 Increases Primed Cell Expansion and Survival" The Journal of Immunology (2005) 174(8); pp. 4761-4767.
Rudikoff, et al., "Single amino acid substitution altering antigen-binding specificity" Proc. Natl Acad. Sci. USA, vol. 79, pp. 1979-1983, Mar. 1982.
Teachey, et al., "Identification of Predictive Biomarkers for Cytokine Release Syndrome after Chimeric Antigen Receptor T-cell Therapy for Acute Lymphoblastic Leukemia" Cancer Discovery, Jun. 2016, pp. 664-679.
Vajdos, et al., "Comprehensive Functional Maps of the Antige**binding Site of an Anti-Erb82 Antibody Obtained with Shotgun Scanning Mutagenesis" J. Mol. Biol. (2002) 320, 415-428.
Gillet et al., Selectable Markers for Gene Therapy. Chapter 26 of Gene and Cell Therapy:Therapeutic Mechanisms and Strategies, 3rd Ed. N .S. Templeton Ed, (CRC Press:Bpca Ratpm. FL), pp. 555 and 558, 2009.
Suerth et al., "Efficient Generation of Gene-Modified Human Natural Killer Cells via Alpharetroviral Vectors," J. Mol. Med. 94:83-93, 2016, published online Aug. 25, 2015.
Sokolic et al., "A Selectable Bicistronic Retroviral Vector Corrects the Molecular Defect in a Cell Line Derived from a Patient with Leukocyte Adhesion Deficiency," Biol. Blood Marrow Transpl. 12(2) Suppl 1: Feb. 20-21, 2006.
Pakula, A.A. et al., "Genetic analysis of protein stability and function," Annual Review of Genetics, V. 23, N. 1, p. 289-310, c. 305-306 (1989).
Eyquem et al., "Targeting a CAR to the TRAC locus with CRISPR/Cas9 enchances tumour rejction" Nature, 2017, 543(7643): 113-117.
Seif et al., "The role of JAK-STAT signaling pathway and its regulators in the fate of T helper cells" Cell Communication and Signaling (2017) 15:23.
Themeli et al., "Generation of tumor-targeted human T lympocytes from Induced pluripotent stem cells for cancer therapy", Nat Biotechnol., 2013; 31(10): 028-933.
Watowich et al., "The Erythropoietin Receptor: Molecular Structure and Hematopoietic Signaling Pathways," J. Investig Med. 2011, 59(7): 1067-1072.
Aagaard et al., "RNAi therapeutics: Principles, prospects and challenges," Advanced Drug Delivery Reviews, 59 (2007) 75-86 (Year: 2007).
Arnau et al., "Current strategies for the use of affinity tags and tag removal for the purification of recombinant proteins" Protein expression and purification, 2006, v. 48, n. 1, p. 1-13.
Auerbach et al, "Angiogenesis assays: Problems and pitfalls," Cancer and Metastasis Reviews, 2000, 19: 167-172 (Year: 2000).

Beans, "Targeting metastasis to halt cancer's spread," PNAS 2018; 115(50): 12539-12543 (Year: 2018).
Blumberg et al., "Unraveling the autoimmune translational research process layer by layer," (Nat Med.; 18(1): 35-41) (Year: 2015).
Bork, "Powers and Pitfalls in Sequence Analysis: The 70% Hurdle," Genome Research, 2000, 10:398-400 (Year: 2000).
Burgess et al., "Possible Dissociation of the Heparin-binding and Mitogenic Activities of Heparin-binding (Acidic Fibroblast) Growth Factor-1 from Its Receptor-binding Activities by Site-directed Mutagenesis of a Single Lysine Residue" J. Cell Biol. 111 :2129-2138, 1990 (Year: 1990).
Childs, et al., "Bringing natural killer cells to the clinic: ex vivo manipulation," Hematology Am Soc Hematol Educ Program. Dec. 6, 2013(1):234-246.
De Sousa Abreu et al., "Global signatures of protein and mRNA expression levels" Mol. BioSys. 5:1512-1526, 2009.
Grabstein et al., "Cloning of a T cell growth factor that interacts with the β chain of the interleukin-2 receptor," Comparitive Study, Science, May 13, 1994;264(5161):965-8.
Gravanis et al., "The changing world of cancer drug development: the regulatory bodies' perspective," Chin Clin Oneal, 2014, 3, pp. 1-5 (Year: 2014).
Greenspan et al., "Defining epitopes: It's not as easy as it seems" Nature Biotechnology, 17:936-937 (Year: 1999).
Gura T, "Systems for Identifying New Drugs are Often Faulty," Science 1997, 278(5340): 1041-1042 (Year: 1997).
Hait., "Anticancer drug development: the grand challenges," Nature Reviews/Drug Discovery, 2010, 9, pp. 253-254 (Year: 2010).
Heberlein, C. et al., "The Gene for Erythropoietin Receptor Is Expressed in Multipotential Hematopoietic and Embryonal Stem Cells: Evidence for Differentiation Stage-Specific Regulation," Molecular and Cellular Biology 1992 1815-1826.
Heppner et al., "Tumor heterogeneity: biological implications and therapeutic consequences," 1983, Cancer Metastasis Reviews 2:5-23 (Year: 1983).
Hoshino S. et al., "Expression and Characterimtion of Erythropoietin Receptors on Normal Human Bone Marrow Cells," International Journal of Cell Cloning 1989, 7:156-167.
Hurton, L.V. et al., "Improved Costimulation of CD19-Specific T Cells Transpresenting a Membrane-Bound IL-15," Molecular Therapy vol. 19, Supplement 1, May 2011, S138.
Jain RK, "Barriers to Drug Delivery in Solid Tumors," 1994, Scientific American, pp. 58-645 (Year: 1994).
Kulmanov et al., "DeepGO: predicting protein functions from sequence and interactions using a deep ontology-aware classifier," Bioinformatics, 34(4), 2018, 660-668 (Year: 2018).
Lanier LL., "DAP10- and DAP12-associated receptors in innate immunity," Immunol Rev. Jan. 2009;227(1):150-60. doi: 10.1111/j.1600-065X.2008.00720.x. PMID: 19120482; PMCID: PMC2794881. (Year: 2009).
Lazar et al., "Transforming Growth Factor • : Mutation of Aspartic Acid 47 and Leucine 48 Results in Different Biological Activities" Mol. Cell. Biol., vol. 8, No. 3, 1247-1252, 1988 (Year: 1988).
LeBien et al., "B lymphocytes: how they develop and function" Blood, vol. 112, No. 5, Sep. 1, 2008. pp. 1570-1580.
Lisowska, K.A. et al., "Erythropoietin receptor is expressed on human peripheral blood T and B lymphocytes and monocytes and is modulated by recombinant human erythropoietin treatment," Artif Organs. Aug. 2010;34(8):654-62.
Lu, et al., "Genetic engineering of dendritic cells to express immunosuppressive molecules (viral IL-10, TGF-• , and CTLA4lg)," J. Leukocyte Biol., Aug. 1999, 66:293-96.
McKeague, et al., "Challenges and Opportunities for Small Molecule Aptamer Development," Review Article, Journal of Nucleic Acids, vol. 2012, Article ID 748913.
Miosge, "Comparison of predicted and actual consequences of missense mutations," Proc Natl Acad Sci USA Sep. 15, 2015;112(37):E5189-98 (Year: 2015).
Neely, et al., "Monocyte Surface-Bound IL-15 Can Function as an Activating Receptor and Participate in Reverse Signaling," The Journal of Immunology, 2004, 172(7): 4225-4234.
NIH National Cancer Institute, NCI Dictionary of Cancer Terms, Antigen-Presenting Cell, Retrieved online from: <URL: https://

(56) References Cited

OTHER PUBLICATIONS www.cancer.gov/publications/dictionaries/cancer-terms/def/antigen-presenting-cell > [retrieved on May 8, 2024], 2024.

Park et al., "Follicular Dendritic Cells Produce IL-15 That Enhances Germinal Center B Cell Proliferation in Membrane-Bound Forn" J. Immunol. 173(11), 2004, pp. 6676-6683.

Peng, et al., Erythropoietin and its derivatives: from tissue protection to immune regulation Cell Death & Disease 11, 79 (2020).

Saikh, et al., "IL-15 induced conversion of monocytes to mature dendritic cells," Clin Exp Immunol 2001; 126(3):447-455.

Sarkis, et al., "Long term survival and limited migration of genetically modified monocytes/macrophages grafted into the mouse brain," J. Biomed. Sci. Engineer. (2013) 6(5): 561-71.

Shinjo K., et al., "Erythropoietin receptor expression on human bone marrow erythroid precursor cells by a newly-devised quantitative flow-cytometric assay," British Journal of Haematology, 1997, 551-558.

Skolnick et al., "From genes to protein structure and function: novel applications of computational approaches in the genomic era," Trends Biotechnol. Jan. 2000; 18(1 ):34-9 (Year: 2000).

Sporn et al., "Chemoprevention of Cancer," Carcinogenesis, vol. 21, No. 3 (2000), 525-530 (Year: 2000).

Torok et al., "Pharmacogenetics of Crohn's disease," Pharmacogenomics (2008) 9(7), 881-893 (Year: 2008).

UniProt P26717 NKG2C_HUMAN. Integrated into UniProtKB/Swiss-Prot Aug. 1, 1992. https://www.uniprot.org/uniprotkb/P26717/ entry. Accessed Jul. 17, 2024 (Year: 1992).

Warzocha et al., "Antisense Strategy: Biological Utility and Prospects in the Treatment of Hematological Malignancies," Leukemia and Lymphoma (1997) vol. 24. pp. 267-281 (Year: 1997).

Yan et al., "HER2 expression status in diverse cancers: review of results from 37,992 patients," Cancer Metastasis Rev (2015) 34:157-164 (Year: 2015).

Barrett, D., "IL-6 Blockade in Cytokine Storm Syndromes," Ch. 37 in Cytokine Storm Syndrome, Second Edition, Advances in Experimental Medicine and Biology 1448 (Cron and Behrens, Eds. 2024).

Behrens, et al., "Anti-Interferon-y Therapy for Cytokine Storm Syndromes," Ch. 28 in Cytokine Storm Syndrome, Second Edition, Advances in Experimental Medicine and Biology 1448 (Cron and Behrens, Eds. 2024).

Gardner, et al., "Preemptive mitigation of CD19 CAR T-cell cytokine release syndrome without attenuation of antileukemic efficacy," blood, Dec. 12, 2019, vol. 134, No. 24, pp. 2149-2158.

Kadauke, et al., "Risk-Adapted Preemptive Tocilizumab to Prevent Severe Cytokine Release Syndrome After CTL019 for Pediatric B-Cell Acute Lymphoblastic Leukemia: A Prospective Clinical Trial," ASCO, Journal of Clinical Oncology, vol. 39, Issue 8, pp. 920-931, 2021.

Locke, et al., "Preliminary Results of Prophylactic Tocilizumab after Axicabtageneciloleucel (axi-cel; KTE-C19) Treatment for Patients with Refractory, Aggressive Non-Hodgkin Lymphoma (NHL)," Blood blood (2017) 130 (Suppl_1): 1547.

Miyake, et al., "IL-6 receptor antibody treatment improves muscle weakness in experimental autoimmune myasthenia gravis mouse model," Frontiers in Neurology, May 1, 2024.

Murthy et al., "Cytokine Release Syndrome: Current Perspectives," Immuno Targets and Therapy, 2019:8, 43-52.

Neelapu, et al., "Chimeric antigen receptor T-cell therapy—assessment and management of toxicities," Nature Reviews, Clinical Oncology, vol. 15, Jan. 2018.

Speake, et al., "IL-6-targeted therapies to block the cytokine or its receptor drive distinct alterations in T cell function," JCI Insight 2022;7(22):e159436.

Ueda, et al., "Novel genetically-humanized mouse model established to evaluate efficacy of therapeutic agents to human interleukin-6 receptor," Scientific Reports, 3:1196, Feb. 1, 2013.

U.S. Appl. No. 60/383,872, filed May 28, 2002 by Saidelain, et al.

Abken et al., "Chimeric T-cell receptors: highly specific tools to target cytotoxic T-lymphocytes to tumour cells," Cancer Treat Rev., 23(2):97-112, Mar. 1997.

Abken, H., et al., "Tuning tumor-specific T-cell activation: a matter of costimulation?" Trends in Immunol. 23: 240-245 (2002).

Aguera-Gonzalez et al., "Palmitoylation of MICA, a ligand for NKG2D, mediates its recruitment to membrane microdomains and promotes its shedding," Eur. J. Immunol. vol. 41, pp. 3667-3676 (2011).

Alderson et al., "Molecular and Biological Characterization of Human 4-1BB and its Ligand," Eur. J. Immunol., 1994, 24: 2219-2227.

Allison et al., "Structure, function, and serology of the T-cell antigen receptor complex," Ann. Rev. Immunol., 1987, 5:503-540.

Alvarez-Vallina, L. and Hawkins, R.E., "Antigen-specific targeting of CD28-mediated T cell co-stimulation using chimeric single-chain antibody variable fragment-CD28 receptors," Eur. J. Immunol., 26: 2304-2309 (1996).

Ang, S.O. et al, "Avoiding the need for clinical-grade OKT3: ex vivo expansion of T cells using artificial antigen presenting cells genetically modified to crosslink CD3" Biology of Blood and Marrow Transplantation, Jan. 9, 2012, vol. 8, No. 2, pp. S258.

Annenkov, A., et al., "Engineering mouse T lymphocytes specific to type II collagen by transduction with a chimeric receptor consisting of a single chain Fv and TCR zeta," Gene Therapy, 7: 714-722 (2000).

Antony, G.K., et al., "Interleukin 2 in cancer therapy," Current Medicinal Chemistry, 17(29): 3297-3302 (2010).

Aoudjit and Vuori., "Integrin Signaling in Cancer Cell Survival and Chemoresistance," Chemotherapy Research and Practice., 2012(Article ID 283181), 1-16, 2012.

Appelbaum, "Haematopoietic cell transplantation as immunotherapy," Nature, 2001, 411(6835): 385-389.

Aruffo, A., et al., "Molecular cloning of a CD28 cDNA by a high-efficiency COS cell expression system," Proc. Natl. Acad. Sci., 1987, 84:8573-8577.

ATCC No. CCL-243, 1975, 19 pages.

Azuma, M, et al., "Functional Expression of B7/BB1 on Activated T Lymphocytes," J. Exp. Med. 177: 845-850 (1993).

Baek, H.J. et al., "Ex vivo expansion of natural killer cells using cryopreserved irradiated feeder cells," *Anticancer Research*, 33: 2011-2020 (2013).

Barber et al., "Chimeric NKG2D Expressing T Cells Eliminate Immunosuppression and Activate Immunity within the Ovarian Tumor Microenvironment," J. Immunol, vol. 183, pp. 6939-6947 (2009).

Barber et al., "Chimeric NKG2D Receptor-Bearing T Cells as Immunotherapy for Ovarian Cancer," American Association for Cancer, vol. 67, No. 10, pp. 5003-5008, (May 15, 2007).

Barber et al., "Chimeric NKG2D receptor-expressing T cells as an immunotherapy for multiple myeloma," Experimental Hematology, vol. 36, pp. 1318-1328, (2008).

Barber et al., "Chimeric NKG2D T Cells Require Both T Cell- and Host-Derived Cytokine Secretion and Perforin Expression to Increase Tumor Antigen Presentation and Systemic Immunity," J. Immunol, vol. 183, pp. 2365-2372 (2009).

Barber et al., "Immunotherapy with Chimeric NKG2D Receptors Leads to Long-Term Tumor-Free Survival and Development of Host Antitumor Immunity in Murine Ovarian Cancer," J. Immunol., vol. 180, pp. 72-78, (2008).

Barber et al., "Treatment of multiple myeloma with adoptively transferred chimeric NKG2D receptor-expressing T cells," Gene Therapy, vol. 18, pp. 509-516, (2011).

Barrett, D.M., et al., "Chimeric Antigen Receptor Therapy for Cancer," Annu Rev. Med. 65: 333-347 (2014).

Bartholomew et al., "Mesenchymal stem cells suppress lymphocyte proliferation in vitro and prolong skin graft survival in vivo," Exp Hematol, Jan. 2002, 30(1): 42-48.

Batlevi, C.L., et al. "Novel immunotherapies in lymphoid malignancies," Nature Rev. Clin. Oncol. 13:25-40 (2016).

Baum et al., "Side effects of retroviral gene transfer into hematopoietic stem cells," Blood, Mar. 2003, 101(6): 2099-2114.

Bejcek et al., "Development and Characterization of Three Recombinant Single Chain Antibody Fragments (scFvs) Directed against the CD19 Antigen," Cancer Res., 1995, 55:2346-2351.

(56) References Cited

OTHER PUBLICATIONS

Berger, C. et al., "Safety and immunologic effects of IL-15 administration in nonhuman primates," *Blood*, 114(12): 2417-2426 (2009).
Besser, M.J., et al., "Adoptive Transfer of Tumor-Infiltrating Lymphocytes in Patients with Metastatic Melanoma: Intent-to-Treat Analysis and Efficacy after Failure to Prior Immunotherapies," Clin. Cancer Res. 19: 4792-4800 (2013).
Better et al., "Manufacturing and Characterization of KTE-C19 in a Multicenter Trial of Subjects with Refractory Aggressive Non-Hodgkin Lymphoma (NHL) (ZUMA-1)," Poster session presented at the American Association for Cancer Research Annual Meeting, New Orleans, Louisiana (2016).
Billadeau et al., "NKG2D-DAP10 triggers human NK cell-mediated killing via a Syk-independent regulatory pathway," Nat Immunol, Jun. 2003, 4(6): 557-564.
Bischof et al., "Autonomous induction of proliferation, JNK and NF-xB activation in primary resting T cells by mobilized CD28," Eur J Immunol., 30(3):876-882, Mar. 2000.
Bork et al., "The immunoglobulin fold. Structural classification, sequence patterns and common core," J Mol Biol., 242(4):309-320, Sep. 30, 1994.
Boyman, O., et al., "The role of interleukin-2 during homeostasis and activation of the immune system," *Nat Rev Immunol.*, 12: 180-190 (2012).
Brand, L.J. et al., "Abstract LB-185: A PSMA-directed natural killer cell approach for prostate cancer immunotherapy," Cancer Rescarch, 77(13 Supplement): Abstract No. LB-185, 1-4 (Jul. 2017).
Brentjens et al., "Eradication of Systemic B-Cell Tumors by Genetically Targeted Human T Lymphocytes Co-Stimulated By CD80 and Interleukin-15," Nature Medicine, 2003, 9: 279-286.
Brentjens, R.J., et al., "CD19-Targeted T Cells Rapidly Induce Molecular Remissions in Adults with Chemotherapy-Refractory Acute Lymphoblastic Leukemia," Sci. Trans. Med. 5: 1-9 (2013).
Brentjens, R.J., et al., "Safety and persistence of adoptively transferred autologous CD19-targeted T cells in patients with relapsed or chemotherapy refractory B-cell leukemias," Blood 119(18): 4817-4828 (2011).
Bridgeman, J.S., et al., "Building Better Chimeric Antigen Receptors for Adoptive T Cell Therapy," Current Gene Therapy 10: 77-90 (2010).
Bridgeman, J.S et al., "The Optimal Antigen Response of Chimeric Antigen Receptors Harboring the CD3ζ Transmembrane Domain is Dependent upon Incorporation of the Receptor into the Endogenous TCR/CD3 Complex," J Immunol, 184(12): 6938-6949 (May 2010).
Brocker et al., "New simplified molecular design for functional T cell receptor," Eur J Immunol., 23(7):1435-1439, Jul. 1993.
Bromley et al., "The immunological synapse and CD28-CD80 interactions," Nat Immunol., 2(12):1159-1166, Dec. 2001.
Bronte, V., and Mocellin, S., "Suppressive Influences in the Immune Response to Cancer," J. Immunother . 32: 1-11 (2009).
Budagian, V. et al., "IL-15/IL-15 receptor biology: A guided tour through an expanding universe," *Cytokine & Growth Factor Reviews*, 17: 259-280 (2006).
Bukczynski et al., "Costimulation of Human CD28-T Cells by 4-1BB Ligand," Eur. J. Immunol., 2003, 33: 446-454.
Burkett, P.R. et al., "Coordinate expression and trans presentation of interleukin (IL)-15Ralpha and IL-15 supports natural killer cell and memory CD8+ T cell homeostasis," *J Exp Med.*, 200(7): 825-834 (2004).
Caligiuri et al., "Immunotherapeutic approaches for hematologic malignancies," Hematology Am Soc Hematol Educ Program, 2004, 37-53.
Campana et al., "Immunophenotyping of Leukemia," Journal of Immunol Methods, 2000, 243: 59-75.
Caratelli et al., "FCγ Chimeric Receptor-Engineered T Cells: Methodology, Advantages, Limitations, and Clinical Relevance," Front Immunol., vol. 8, Article 457 , 8 pages (Apr. 27, 2017).
Cardoso AA, et al. Pre-B acute lymphoblastic leukemia cells may induce T-cell anergy to alloantigen. Blood 88:41-48 (1996).

Carson, W.E. et al., "A potential role for interleukin-15 in the regulation of human natural killer cell survival," J Clin Invest., 99(5): 937-943 (1997).
Carter, P., et al., "Identification and validation of cell surface antigens for antibody targeting in oncology," Endocrine-Related Cancer 11: 659-687 (2004).
Cesano, A., et al. "Reversal of Acute Myelogenous Leukemia in Humanized SCID Mice Using a Novel Adoptive Transfer Approach," J. Clin. Invest. 94: 1076-1084 (1994).
Chambers, C.A., "The expanding world of co-stimulation: the two-signal model revisited," Trends in Immunol., 2001, 22(4):217-223.
Champlin R. "T-cell depletion to prevent graft-versus-host disease after bone marrow transplantation," Hematol Oncol Clin North Am. Jun. 1990;4(3):687-98.
Chang et al., "Five Different Anti-Prostate-specific Membrane Antigen (PSMA) Antibodies Confirm PSMA Expression in Tumor-associated Ncovasculaturc," Cancer Res., 59: 3192-3198 (1999).
Chang, Y.H. et al., "A chimeric receptor with NKG2D specificity enhances natural killer cell activation and killing of tumor cells," Cancer Res., 73(6): 1777-1786 (2013).
Chao, D.T. ct al., "BCL-2 family: regulators of cell death," Annu Rev Immunol., 16: 395-419 (1998).
Cheresh et al., "Disialogangliosides GD2 and GD3 Are Involved in the Attachment of Human Melanoma and Neuroblastoma Cells to Extracellular Matrix Proteins," J Cell Biol. 1986, 102(3):688-696.
Chertova, E. et al., "Characterization and favorable in vivo properties of heterodimeric soluble IL-15.IL-15Ralpha cytokinc compared to IL-15 monomer," J Biol Chem., 288(25): 18093-18103 (2013).
Cheung et al., "Anti-Idiotypic Antibody Facilitates scFv Chimeric Immune Receptor-Gene Transduction and Clonal Expansion of Human Lymphocytes for Tumor Therapy," Hybridoma and Hybridomics, 2003, 24(4): 209-218.
Chiorean and Miller, "The biology of natural killer cells and implications for therapy of human discasc," J Hematother Stem Cell Res, Aug. 2001, 10(4): 451-463.
Cho, D., and D. Campana, "Expansion and activation of natural killer cells for cancer immunotherapy," The Korean Journal of Laboratory Medicine, 29(2): 89-96 (2009).
Clarke et al., "Folding studies of immunoglobulin-like beta-sandwich proteins suggest that they share a common folding pathway," Structure, 7(9):1145-1153, Sep. 15, 1999.
ClinicalTrials.gov, "A Multi-Center Study Evaluating KTE-C19 in Pediatric and Adolescent Subjects With Relapsed/Refractory B-precursor Acute Lymphoblastic Leukemia (ZUMA-4)," available at https://clinicaltrials.gov/show/NCT02625480, NCT02625480 (Retrieved from the Internet on Jun. 21, 2016).
ClinicalTrials.gov, "A Phase 1-2 Multi-Center Study Evaluating KTE-C19 in Subjects With Refractory Aggressive Non-Hodgkin Lymphoma (ZUMA-1) (ZUMA-1)," available at https://clinicaltrials.gov/show/NCT02348216, NCT02348216 (Retrieved from the Internet on Jun. 21, 2016).
ClinicalTrials.gov, "A Phase 2 Multicenter Study Evaluating Subjects With Relapsed/Refractory Mantle Cell Lymphoma (ZUMA-2)," available at https://clinicaltrials.gov/show/NCT02601313, NCT02601313 (Retrieved from the Internet on Jun. 21, 2016).
ClinicalTrials.gov, "A Study Evaluating KTE-C19 in Adult Subjects With Relapsed/Refractory B-precursor Acute Lymphoblastic Leukemia (r/r All) (ZUMA-3) (ZUMA-3)," available at https://clinicaltrials.gov/show/NCT02614066, NCT02614066 (Retrieved from the Internet on Jun. 21, 2016).
ClinicalTrials.gov, "Administration of Anti-CD19-chimeric-antigen-receptor-transduced T Cells From the Original Transplant Donor to Patients With Recurrent or Persistent B-cell Malignancies After Allogeneic Stem Cell Transplantation," available at https://clinicaltrials.gov/show/NCT01087294, NCT01087294 (Retrieved from the Internet on Jun. 21, 2016).
ClinicalTrials.gov, "Anti-CD19 White Blood Cells for Children and Young Adults With B Cell Leukemia or Lymphoma," available at https://clinicaltrials.gov/show/NCT01593696, NCT01593696 (Retrieved from the Internet on Jun. 21, 2016).

(56) References Cited

OTHER PUBLICATIONS

ClinicalTrials.gov, "CAR T Cell Receptor Immunotherapy for Patients With B-cell Lymphoma," available at https://clinicaltrials.gov/show/NCT00924326, NCT00924326 (Retrieved from the Internet on Jun. 21, 2016).
ClinicalTrials.gov, "CD19 CAR T Cells for B Cell Malignancies After Allogeneic Transplant," available at https://clinicaltrials.gov/show/NCT01475058, NCT01475058 (Retrieved from the Internet on Jun. 21, 2016).
ClinicalTrials.gov, "CD19 Chimeric Receptor Expressing T Lymphocytes In B-Cell Non Hodgkin's Lymphoma, ALL & CLL (CRETI-NH)," available at https://clinicaltrials.gov/show/NCT00586391, NCT00586391 (Retrieved from the Internet on Jun. 21, 2016).
ClinicalTrials.gov, "CD19+ CAR T Cells for Lymphoid Malignancies," available at https://clinicaltrials.gov/show/NCT02529813, NCT02529813 (Retrieved from the Internet on Jun. 21, 2016).
ClinicalTrials.gov, "Consolidation Therapy With Autologous T Cells Genetically Targeted to the B Cell Specific Antigen CD19 in Patients With Chronic Lymphocytic Leukemia Following Upfront Chemotherapy With Pontostatin, Cyclophosphamide and Rituximab," available at https://clinicaltrials.gov/show/NCT01416974, NCT01416974 (Retrieved from the Internet on Jun. 21, 2016).
ClinicalTrials.gov, "Genetically Engineered Lymphocyte Therapy in Treating Patients With B-Cell Leukemia or Lymphoma That is Resistant or Refractory to Chemotherapy," available at https://clinicaltrials.gov/show/NCT01029366, NCT01029366 (Retrieved from the Internet on Jun. 21, 2016).
ClinicalTrials.gov, "High Dose Therapy and Autologous Stem Cell Transplantation Followed by Infusion of Chimeric Antigen Receptor (CAR) Modified T-Cells Directed Against CD19+ B-Cells for Relapsed and Refractory Aggressive B Cell Non-Hodgkin Lymphoma," available at https://clinicaltrials.gov/show/NCT01840566, NCT01840566 (Retrieved from the Internet on Jun. 21, 2016).
ClinicalTrials.gov, "In Vitro Expanded Allogeneic Epstein-Barr Virus Specific Cytotoxic T-Lymphocytes (EBV-CTLs) Genetically Targeted to the CD19 Antigen in B-cell Malignancies," available at https://clinicaltrials.gov/show/NCT01430390, NCT01430390 (Retrieved from the Internet on Jun. 21, 2016).
ClinicalTrials.gov, "Precursor B Cell Acute Lymphoblastic Leukemia (B-ALL) Treated With Autologous T Cells Genetically Targeted to the B Cell Specific Antigen CD19," available at https://clinicaltrials.gov/show/NCT01044069, NCT01044069 (Retrieved from the Internet on Jun. 21, 2016).
ClinicalTrials.gov, "Study Evaluating the Efficacy and Safety of JCAR015 in Adult B-cell Acute Lymphoblastic Leukemia (B-All) (Rocket)," available at https://clinicaltrials.gov/show/NCT02535364, NCT02535364 (Retrieved from the Internet on Jun. 21, 2016).
ClinicalTrials.gov, "T Cells Expressing a Fully-human AntiCD19 Chimeric Antigen Receptor for Treating B-cell Malignancies," available at https://clinicaltrials.gov/show/NCT02659943, NCT02659943(Retrieved from the Internet on Jun. 21, 2016).
ClinicalTrials.gov, "T-Lymphocytes Genetically Targeted to the B-Cell Specific Antigen CD19 in Pediatric and Young Adult Patients With Relapsed B-Cell Acute Lymphoblastic Leukemia," available at https://clinicaltrials.gov/show/NCT01860937, NCT01860937(Retrieved from the Internet on Jun. 21, 2016).
ClinicalTrials.gov, "Treatment of Relapsed or Chemotherapy Refractory Chronic Lymphocytic Leukemia or Indolent B Cell Lymphoma Using Autologous T Cells Genetically Targeted to the B Cell Specific Antigen CD19", Available at: https://clinicaltrials.gov/show/NCT00466531, NCT00466531(Retrieved from the Internet on Jun. 21, 2016).
Cochran et al., "Receptor clustering and transmembrane signaling in T cells," Trends Biochem Sci., 26(5):304-310, May 2001.
Collins et al., "Donor leukocyte infusions in 140 patients with relapsed malignancy after allogeneic bone marrow transplantation," J Clin Oncol, Feb. 1997, 15(2): 433-444.
Collins et al., "Donor leukocyte infusions in acute lymphocytic leukemia," Bone Marrow Transplantation, 2000, 26: 511-516.
Cooley, S. et al., "Donor selection for natural killer cell receptor genes leads to superior survival after unrelated transplantation for acute myelogenous leukemia," Blood, 116(14): 2411-2419 (2010).
Cooper, M.A et al., "In vivo evidence for a dependence on interleukin 15 for survival of natural killer cells," *Blood*, 100(10): 3633-3638 (2002).
Cooper et al., "T-Cell Clones can be Rendered Specific for CD 19: Toward the Selective Augmentation Of the Graft-Versus-B Lincage Leukemia Effect," Blood, 2003, pp. 1637-1644, vol. 101.
Cruz et al., "Infusion of donor-derived CD19-redirected virus-specific T cells for B-cell malignancies relapsed after allogeneic stem cell transplant: a phase 1 study," Blood 122(17):2965-2973 (2013).
Curti, A. et al., "Successful transfer of alloreactive haploidentical KIR ligand-mismatched natural killer cells after infusion in elderly high risk acute myeloid leukemia patients," Blood, 118(12):3273-3279 (2011).
Damle et al., "Differential regulatory signals delivered by antibody binding to the CD28 (Tp44) molecule during the activation of human T lymphocytes," J Immunol., 140(6):1753-1761, Mar. 15, 1988.
Darcy, P.K., et al., "Expression in cytotoxic T lymphocytes of a single-chain anti-carcinoembryonic antigen antibody. Redirected Fas ligand-mediated lysis of colon carcinoma," Eur. J. Immunol. 28: 1663-1672 (1998).
Davila, M.L., et al., "Efficacy and Toxicity Management of 19-28z CAR T Cell Therapy in B Cell Acute Lymphoblastic Leukemia," Science Translat. Med. 6(24) (2014).
DeBenedette et al., "Role of 4-1BB ligand in costimulation of T lymphocyte growth and its upregulation on M12 B lymphomas by cAMP," J Exp Med, Mar. 1995, 181(3): 985-992.
DeBenedette, MA, et al.. "Costimulation of CD28-T Lymphocytes by 4-1 BB Ligand," J. Immunol., 1997, pp. 551-559, vol. 158.
Delahaye, N.F. et al., "Alternatively spliced NKp30 isoforms affect the prognosis of gastrointestinal stromal tumors," *Nat Med.,* 17(6): 700-707 (2011).
Diefenbach et al., "Selective associations with signaling proteins determine stimulatory versus costimulatory activity of NKG2D," Nature Publishing Group, vol. 3, No. 12, pp. 1142-1149, (Dec. 2002).
Dotti et al., "Design and Development of Therapies using Chimeric Antigen Receptor-Expressing T cells," Immunol Rev., 257(1), 35 pages, Jan. 2014.
Doubrovina, et al., "Evasion from NK Cell Immunity by MHC Class I Chain-Related Molecules Expressing Colon Adenocarcinoma," Journal of Immunology, vol. 171, pp. 6889-6899, (2003).
Dubois et al., "IL-15Rα recycles and presents IL-15 In trans to neighboring cells," Immunity, Nov. 2002, 17(5): 537-547.
Dubois, S., et al., "Preassociation of IL-15 with IL-15R alpha-IgG1-Fc enhances its activity on proliferation of NK and CD8+/CD44high T cells and its antitumor action," Journal of Immunology, 180(4):2099-2106 (2008).
Dudley, M.E., et al., "Adoptive Transfer of Cloned Melanoma-Reactive T Lymphocytes for the Treatment of Patients with Metastatic Melanoma," J. Immunother. 24: 363-373 (2001).
Ellis et al., "Interactions of CD80 and CD86 with CD28 and CTLA4," J Immunol., 156(8):2700-2709, Apr. 15, 1996.
Eshhar et al., "Specific activation and targeting of cytotoxic lymphocytes through chimeric single chains consisting of antibody-binding domains and the γ or ζ subunits of the immunoglobulin and T-cell receptors," Proc. Natl. Acad. Sci. USA, 1993, 90:720-724.
Eshhar, Z, et al . "Functional Expression of Chimeric Receptor Genes in Human T Cells," J. Immunol. Methods, 2001, 248(1-2):67-76.
Eshhar, Z., "Tumor-specific T-bodies: towards clinical application," Cancer Immunol. Immunother. 45: 131-136 (1997).
Fagan, E.A., and Eddleston, A.L.W.F., "Immunotherapy for cancer: the use of lymphokine activated killer (LAK) cells," Gut 28: 113-116 (1987).
Farag et al., "Natural killer cell receptors: new biology and insights into the Graft-versus-leukemia effect," Blood, 2002, 100(6):1935-1947.

(56) References Cited

OTHER PUBLICATIONS

Fehniger TA, et al.; "Ontogeny and expansion of human natural killer cells: clinical implications", Int Rev Immunol. Jun. 2001; 20(3-4):503-534.
Fehniger, T.A., et al., "Interleukin 15: biology and relevance to human disease," Blood, 97(1): 14-32 (2001).
Ferlazzo, G. et al., "Distinct roles of IL-12 and IL-15 in human natural killer cell activation by dendritic cells from secondary lymphoid organs," PNAS, 101(47): 16606-16611 (2004).
Fernandez-Messina et al., "Human NKG2D-ligands: cell biology strategies ensure immune recognition," Frontiers in Immunology, vol. 3, Article 299, 9 Pages, (Sep. 2012).
Ferris, R.L. et al., "Tumor antigen-targeted, monoclonal antibody-based immunotherapy: clinical response, cellular immunity, and immunoescape," J Clin Oncol, 28(28): 4390-4399 (2010).
Finney et al., "Activation of resting human primary T cells with chimeric receptors: costimulation from CD28, inducible costimulator, CD134, and CD137 in series with signals from the TCR zeta chain", J Immunol. Jan. 1, 2004; 172(1):104-113.
Finney et al., "Chimeric receptors providing both primary and costimulatory signaling in T cells from a single gene product," J Immunol. Sep. 15, 1998;161(6):2791-2797.
Foon et al., "Clinical and immune responses in advanced melanoma patients immunized with an anti-idiotype antibody mimicking disialoganglioside GD2," J Clin Oncol., 18(2):376-384, Jan. 2000.
Freshney, Animal Cell Culture, Cancer Research Campaign, IRL Press, 1986, 248 pages [Table of Contents Only].
Fujisaki, H. et al., "Expansion of highly cytotoxic human natural killer cells for cancer cell therapy," Cancer Res., 69(9): 4010-4017 (2009).
Fujisaki, H. et al., "Replicative potential of human natural killer cells," Br J Haematol, 145: 606-613 (2009).
Gacerez, A, et al., "How Chimeric Antigen Receptor Design Affects Adoptive T Cell Therapy," Journal of Cellular Physiology, vol. 231, No. 12, pp. 2590-2598; Jun. 2, 2016.
Galustian, C. et al., "MP84-07A Tale of Tails—A Novel Approach to Immunotherapy of Prostate Cancer," J Urol, 195(4S): e1092 (May 2016).
Gardner, R., et al., "Acquisition of a CD19 negative myeloid phenotype allows immune escape of MLL-rearranged B-ALL from CD19 CAR-T cell therapy," Blood, vol. 127, No. 20 (May 2016), 2406-2410.
Garrity et al., "The activating NKG2D receptor assembles in the membrane with two signaling dimers into a hexameric structure," PNAS, vol. 102, No. 21, pp. 7641-7646, May 24, 2005.
Geiger and Jyothi, "Development and application for receptor-modified T lymphocytes for adoptive immunotherapy," Transfus Med Rev, Jan. 2001, 15(1):21-34.
Geiger et al., "Integrated src kinase and costimulatory activity enhances signal transduction through single-chain chimeric receptors in T lymphocytes", Blood. Oct. 15, 2001; 98(8):2364-2371.
GenBank Accession No. NM 007360 GI:315221123, Homo sapiens killer cell lectin like receptor K1 (KLRK1), mRNA, dated May 29, 2017, 4 pages.
GenBank Accession No. NM_000734 GI: 37595563, Homo sapiens CD3Z antigen, zeta polypeptide (TiT3 complex) (CD3Z), transcript variant 2, mRNA, dated Oct. 27, 2004, 6 pages.
GenBank Accession No. NM_001768 GI: 27886640, Homo sapiens CD8 antigen, alpha polypeptide (p32) (CD8A), transcript variant 1, mRNA, dated Oct. 27, 2004, 5 pages.
GenBank Accession No. NM 011612 GI: 6755830, Mus musculus tumor necrosis factor receptor superfamily, member 9 (Tnfrsf9), mRNA, dated Oct. 26, 2004, 8 pages.
Germain et al., "T-cell signaling: the importance of receptor clustering," Curr Biol., 7(10):R640-R644, Oct. 1, 1997.
Ghobadi, et al., "Updated Phase 1 Results from ZUMA-1: A Phase 1-2 Multicenter StudyEvaluating the Safety and Efficacy of KTE-C19 (Anti-CD19 CAR T Cells) in Subjects With Refractory Aggressive Non-Hodgkin Lymphoma," Slides accompanying oral presentation at the American Association for Cancer Research Annual Meeting, New Orleans, Louisiana (2016).
Ghorashian, S., et al., "CD19 chimeric antigen receptor T cell therapy for haematological malignancies," Br. J. Haematol. 169:463-478 (2015).
Giebel, S. et al., "Survival advantage with KIR ligand incompatibility in hematopoietic stem cell transplantation from unrelated donors," Blood, 102(3): 814-819 (2003).
Gilfillan et al., "NKG2D recruits two distinct adapters to trigger NK cell activation and costimulation," Nature Publishing Group, Nature Immunology, vol. 3, No. 12, pp. 1150-1155, Dec. 2002.
Gill, S., et al., "Chimeric antigen receptor T cell therapy: 25 years in the making," Blood Rev., 11 pages (2015).
Ginaldi, L., et al., "Levels of expression of CD19 and CD20 in chronic B cell leukaemias," J. Clin. Pathol. 51: 364-369 (1998).
Giuliani, M. et al., "Generation of a novel regulatory NK cell subset from peripheral blood CD34+ progenitors promoted by membrane-bound IL-15," PLos One, 3(5): e2241 (2008).
Gong et al., "Cancer Patient T Cells Genetically Targeted to Prostate-Specific Membrane Antigen Specifically Lyse Prostate Cancer Cells and Release Cytokines in Response to Prostate-Specific Membrane Antigen," Neoplasia, 1999, 1(2): 123-127.
Goodier and Londei, "CD28 is not directly involved in the response of human CD3-CD56+ natural killer cells to lipopolysaccharide: a role for T cells," Immunology, Apr. 2004, 111(4): 384-390.
Goodwin et al., "Molecular cloning of a ligand for the inducible T cell gene 4-1 BB: a member of an emerging family of cytokines with homology to tumor necrosis factor", Eur J Immunol. Oct. 1993; 23(10):2631-2641.
Grauer et al., "Identification, Purification, and Subcellular Localization of Prostate-specific Membrane Antigen PSM' Protein in the LNCaP Prostatic Carcinoma Cell Line," Cancer Res., 58: 4787-4789 (1998).
Greene et al., "Covalent dimerization of CD28/CTLA-4 and oligomerization of CD80/CD86 regulate T cell costimulatory interactions," J Biol Chem., 271(43):26762-26771, Oct. 25, 1996.
Greenfield, E.A., et al., "CD28/B7 Costimulation: A Review," Crit. Rev. Immunol. 18: 389-418 (1998).
Greenwald et al., "The B7 Family Revisited," Annu. Rev. Immunol., 2005, 23: 515-548.
Grillo-López, A., "Rituximab: An Insider's Historical Perspective," Seminars in Oncology 27(6 Suppl 12): 9-16 (2012).
Gross et al., "Endowing T cells with antibody specificity using chimeric T cell receptors," FASEB J. Dec. 1992;6(15):3370-3378.
Grupp et al., "Chimeric antigen receptor-modified T cells for acute lymphoid leukemia," N Engl J Med. Apr. 18, 2013; 368 (16):1509-1518.
Handgretinger, R., et al., "A phase I study of neuroblastoma with the anti-ganglioside GD2 antibody 14.G2a," Cancer Immunol. Immunother. 35: 199-204 (1992).
Hara et al., "NKG2D gene polymorphisms are associated with disease control of chronic myeloid leukemia by dasatinib," Int. J. Hematol., 9 pages, Aug. 9, 2017.
Harada H, et al., "Selective expansion of human natural killer cells from peripheral blood mononuclear cells by the cell line, HFWT", Jpn J Cancer Res. Mar. 2002; 93(3):313-319.
Harada H, et al.; "A Wilms tumor cell line, HFWT, can greatly stimulate proliferation of CD56+ human natural killer cells and their novel precursors in blood mononuclear cells", Exp Hematol. Jul. 2004; 32(7):614-621.
Harding, et al., "CD28-mediated signalling co-stimulates murine T cells and prevents induction of anergy in T-cell clones," Nature, 356(6370):607-609, Apr. 16, 1992.
Harmon, et al., "Dexamethasone induces irreversible G1 arrest and death of a human lymphoid cell line," J Cell Physiol, Feb. 1979, 98(2): 267-278.
Haynes, NM, et al., "Rejection of syngeneic colon carcinoma by CTLs expressing single-chain antibody receptors codelivering CD28 costimulation", J Immunol., Nov. 15, 2002; 169(10):5780-5786.
Haynes, NM, et al., "Single-chain antigen recognition receptors that costimulate potent rejection of established experimental tumors", Blood, Nov. 1, 2002; 100(9):3155-3163.

(56) References Cited

OTHER PUBLICATIONS

Haynes, N.M., et al., "Redirecting Mouse CTL Against Colon Carcinoma: Superior Signaling Efficacy of Single-Chain Variable Domain Chimeras Containing TCR-ζ vs FcεRI-γ," J. Immunol. 166: 182-187 (2001).

Heuser, C., et al., "T-cell activation by recombinant immunoreceptors: Impact of the intracellular signalling domain on the stability of receptor expression and antigen-specific activation of grafted T cells," Gene Therapy 10: 1408-1419 (2003).

Hoffmann, S.C. et al. "2B4 Engagement Mediates Rapid LFA-1 and Actin-Dependent NK Cell Adhesion to Tumor Cells as Measured by Single Cell Force Spectroscopy," J. Immunol, 186(5): 2757-2764 (Jan. 2011).

Hollyman, D., et al., "Manufacturing Validation of Biologically Functional T Cells Targeted to CD19 Antigen for Autologous Adoptive T cell Therapy," J. Immunother. 32: 169-180 (2009).

Hombach, et al., "Tumor-specific T cell activation by recombinant immunoreceptors: CD3 zeta signaling and CD28 costimulation are simultaneously required for efficient IL-2 secretion and can be integrated into one combined CD28/CD3 zeta signaling receptor molecule", J Immunol., Dec. 1, 2001; 167(11):6123-6131.

Hombach et al., "T-Cell Activation by Recombinant Receptors: CD28 Costimulation Is Required for Interleukin 2 Secretion and Receptor-mediated T-Cell Proliferation but Does Not Affect Receptor-mediated Target Cell Lysis," Cancer Res., Mar. 1, 2001, 61:1976-1982.

Hombach et al., "The recombinant T cell receptor strategy: insights into structure and function of recombinant immunoreceptors on the way towards an optimal receptor design for cellular immunotherapy," Curr Gene Ther. 2002 2(2):211-226.

Hombach, A., et al., "Adoptive immunotherapy with genetically engineered T cells: modification of the IgG1 Fc 'spacer' domain in the extracellular moiety of chimeric antigen receptors avoids 'off-target' activation and unintended initiation of an innate immune response," Gene Therapy 17: 1206-1213 (2010).

Hombach, A., et al., "T cell activation by recombinant FcεRI γ-chain immune receptors: an extracellular spacer domain impairs antigendependent T cell activation but not antigen recognition," Gene Therapy 7: 1067-1075 (2000).

Hombach, A.A., et al., "Costimulation by chimeric antigen receptors revisited: the T cell antitumor response benefits from combined CD28-OX40 signalling", Int. J. Cancer, 129, 2935-2944 (2011).

Horng et al., "NKG2D signaling is coupled to the interleukin 15 receptor signaling pathway," Nature Immunology, vol. 8, No. 12, pp. 1345-1352, Dec. 2007.

Hsu, C. et al., "Cytokine-independent growth and clonal expansion of a primary human CD8+ T-cell clone following retroviral transduction with the IL-15 gene," *Blood*, 109(12): 5168-5177 (2007).

Hsu, K.C. et al., "Improved outcome in HLA-identical sibling hematopoietic stem-cell transplantation for acute myelogenous leukemia predicted by KIR and HLA genotypes," Blood, 105(12): 4878-4884 (2005).

Huang Q.S. et al, "Expansion of human natural killer cells ex vivo," Chine J Cell Mol Immunol, Dec. 31, 2008, vol. 24, No. 12, pp. 1167-1170.

Hurtado et al., "Potential role of 4-1BB in T cell activation. Comparison with the costimulatory molecule CD28," J Immunol, Oct. 1995, 155(7): 3360-3367.

Hurton, L.V. et al., "Tethered IL-15 augments antitumor activity and promotes a stem-cell memory subset in tumor-specific T cells," PCNAS, USA, 113(48): E7788-E7797 (Nov. 2016).

Imai, C, et al., "Chimeric receptors with 4-1BB signaling capacity provoke potent cytotoxicity against acute lymphoblastic leukemia", Leukemia., Feb. 12, 2004; 18(4):676-684.

Imai, C, et al., "T-cell immunotherapy for B-lineage acute lymphoblastic leukemia using chimeric antigen receptors that deliver 4-1 BB-mediated costimulatory signals", Blood. Nov. 16, 2003; 102(11 ):66a-67a. (Abstract #223).

Imai, C et al. "Genetic modification of primary natural killer cells overcomes inhibitory signals and induces specific killing of leukemic cells," Blood. 2005;106:376-383.

Imai et al. "Genetic Modification of T cells for cancer therapy," Journal of Biological Regulators and Homeostatic Agents, 18 (1): p. 62-71; Jan. 2004.

Imai, C., et al; "A novel method for propagating primary natural killer (NK) cells allows highly Efficient expression of anti-CD19 chimeric receptors and generation of powerful cytotoxicity Against NK-resistent acute lymphoblastic leukemia cells." Abstract# 306 Blood 104 (Nov. 16, 2004).

Imamura, M. et al., "Autonomous growth and increased cytotoxicity of natural killer cells expressing membrane-bound interleukin-15," *Blood*, 124(7): 1081-1088 (Jul. 8, 2014).

Inaguma et al., "Expression of neural cell adhesion molecule L1 (CD171) in neuroectodermal and other tumors. An immunohistochemical study of 5155 tumors and critical evaluation of CD171 prognostic value in gastrointestinal stromal tumors," Oncotarge., 7(34):55276-55289, Jul. 11, 2016.

Ishii, H. et al., "Monocytes enhance cell proliferation and LMP1 expression of nasal natural killer/T-cell lymphoma cells by cell contact-dependent interaction through membrane-bound IL-15," International Journal of Cancer, 130: 48-58 (2012).

Ishiwata, et al., "Carcinoembryonic proteins produced by Wilms' tumor cells in vitro and in vivo", Exp Pathol. 1991; 41(1):1-9.

Israeli, R.S., et al., "Expression of the Prostate-specific Membrane Antigen," Cancer Res., 1994, 54:1807-1811.

Ito et al., "Hyperdiploid acute lymphoblastic leukemia with 51 to 65 chromosomes: a distinct biological entity with a marked propensity to undergo apoptosis," Blood, Jan. 1999, 93(1): 315-320.

Jena et al., "Redirecting T-cell specificity by introducing a tumor-specific chimeric antigen receptor," Blood, 2010, 116(7):1035-1044.

Jenkins et al., "Inhibition of antigen-specific proliferation of type 1 murine T cell clones after stimulation with immobilized anti-CD3 monoclonal antibody," J Immunol., 144(1):16-22, Jan. 1, 1990.

Jensen, M., et al., "CD20 is a molecular target for scFvFc:ζ receptor redirected T cells: implications for cellular immunotherapy of CD20+ malignancy," Biol. Blood and Marrow Transplantation 4: 75-83 (1998).

Jensen, M.C., et al., "Anti-transgene Rejection Responses Contribute to Attenuated Persistence of Adoptively Transferred CD20/CD19-Specific Chimeric Antigen Receptor Redirected T Cells in Humans," Biol. Blood Marrow Transplant 16: 1245-1256 (2010).

Jiang et al., "Functional characterization of interleukin-15 gene transduction into the human natural killer cell line N KL," Cytother. 10(3):265-274, 2008.

Jiang, W. et al., "hIL-15 gene-modified human natural killer cells (NKL-IL15) augments the anti-human hepatocellular carcinoma effect in vivo," Immunobiology, 219: 547-553 (Mar. 12, 2014).

Johnson and Jenkins, "The role of anergy in peripheral T cell unresponsiveness," Life Sci, 1994, 55(23): 1767-1780.

June et al., "The B7 and CD28 receptor families," Immunol Today, Jul. 1994, 15(7): 321-331.

Kabalak et al., "Association of an NKG2D gene variant with systemic lupus erythematosus in two populations," Human Immunology, vol. 71, pp. 74-78, 2010.

Kaiser, B.K. et al., "Structural basis for NKG2A/CD94 Recognition of HLA-E," Proc Nat'l Acad Sci USA, 105(18): 6696-6701 (Apr. 2008).

Kalos et al., "T Cells with Chimeric Antigen Receptors Have Potent Antitumor Effects and Can Establish Memory in Patients with Advanced Leukemia," Sci Transl Med. Aug. 10, 2011;3(95):95ra73.

Kariv, I., et al., "Analysis of the Site of Interaction of CD28 with Its Counter-Receptors CD80 and CD86 and Correlation with Function," J. of Immunol. 157: 29-38 (1996).

Kershaw, M.H., et al., "A Phase I Study on Adoptive Immunotherapy Using Gene-Modified T Cells for Ovarian Cancer," Clin. Cancer Res. 12: 6106-6115 (2006).

Khammari, A., et al., "Long-term follow-up of patients treated by adoptive transfer of melanoma tumor-infiltrating lymphocytes as adjuvant therapy for stage III melanoma," Cancer Immunol. Immunother. 56: 1853-1860 (2007).

(56) References Cited

OTHER PUBLICATIONS

Kim Y J, et al., "Human 4-1 BB regulates CD28 co-stimulation to promote Th1 cell responses. Eur J. Immunol", Mar. 1998; 28(3): 881-890.

Kim Y J, et al., "Novel T cell antigen 4-1 BB associates with the protein tyrosine kinase p56lck1", J Immunol. Aug. 1, 1993; 151(3): 1255-1262.

Kitaya, K. et al., "IL-15 expression at human endometrium and decidua," Biology of Reproduction, 63(3): 683-687 (2000).

Kitaya, K., et al., "Regulatory role of membrane-bound form interleukin-15 on human uterine microvascular endothelial cells in circulating CD16(−) natural killer cell extravasation into human endometrium," Biology of Reproduction, 89(3): 70, 1-7, (2013).

Klein E, et al., "Properties of the K562 cell line, derived from a patient with chronic myeloid leukemia", Int J Cancer. Oct. 15, 1976; 18(4 ):421-431.

Klingemann HG, et al., "Ex vivo expansion of natural killer cells for clinical applications", Cytotherapy. 2004; 6(1 ):15-22.

Kobayashi et al., "Role of trans-cellular IL-15 presentation in the activation of NK cell-mediated killing, which leads to enhanced tumor immunosurveillance," Blood, Jan. 2005, 105(2): 721-727.

Kober, J., et al. "The capacity of the TNF family members 4-1BBL, OX40L, CD70, GITRL, CD30L and LIGHT to costimulate human T cells," Eur J Immuno, vol. 38, No. 10, pp. 2678-2688 (Oct. 28, 2008).

Kochenderfer, J.N. et al. "Construction and Pre-clinical Evaluation of an Anti-CD19 Chimeric Antigen Receptor," J. Immunother. 32(7):689-702 (2009).

Kochenderfor, J.N., et al. "Chemotherapy-Refractory Diffuse Large B-Cell Lymphoma and Indolent B-Cell Malignancies Can be Effectively Treated With Autologous T Cells Expressing an Anti-CD19 Chimeric Antigen Receptor," J. Clin. Oncol. 33:540-549 (2014).

Kochenderfer, J.N., et al. "Donor-derived CD19-targeted T cells cause regression of malignancy persisting after allogeneic hematopoietic stem cell transplantation," Blood 122(25): 4129-4139 (2013).

Kochenderfer, J.N., et al., "Eradication of B-lineage cells and regression of lymphoma in a patient treated with autologous T cells genetically-engineered to recognize CD19," Blood 116(20):4099-4102 (2010).

Koeffler and Golde, "Acute myelogenous leukemia: a human cell linc responsive to colony-stimulating activity," Science, Jun. 1978, 200(4337): 1153-1154.

Koehler et al. "Engineered T Cells for the Adoptive Therapy of B-Cell Chronic Lymphocytic Leukaemia," Advances in Hematology, vol. 2012, Article ID 595060, 13 pages; doi:10.1155/2012/595060 (2012).

Kohn et al., "CARs on track in the clinic," Mol Ther. Mar. 2011; 19(3):432-438.

Koka, R. et al., "Cutting edge: murine dendritic cells require IL-15R alpha to prime NK cells," J Immunol., 173(6): 3594-3598 (2004).

Kolb HJ, et al., "Graft-Versus-Leukemia Effect of Donor Lymphocyte Transfusions in Marrow Grafted Patients," Blood, 1995, 86(5):2041-2050.

Kowolik, C.M., "CD28 Costimulation Provided through a CD19-Specific Chimeric Antigen Receptor Enhances In vivo Persistence and Antitumor Efficacy of Adoptively Transferred T Cells," Cancer Research 66(22): 10995-11004 (2006).

Krampera et al., "Bone marrow mesenchymal stem cells inhibit the respnose of naïve and memory antigen-specific T cells to their cognate peptide," Blood, May 2003, 101(9): 3722-3729.

Krause et al., "Antigen-dependent CD28 Signaling Selectively Enhances Survival and Proliferation in Genetically Modified Activated Human Primary T Lymphocytes," J. Exp. Med., 1998, 188(4): 619-626.

Krug, C., et al., "Stability and activity of MCSP-specific chimeric antigen receptors (CARs) depend on the scFv antigen-binding domain and the protein backbone," Cancer Immunol. Immunother. 64:1623-1635 (2015).

Kuo et al., "Efficient gene transfer into primary murine lymphocytes obviating the need for drug selection," Blood, Aug. 1993, 82(3): 845-852.

Kurokawa, M. and S. Kornbluth, "Caspases and kinases in a death grip," Cell, 138(5): 838-854 (2009).

Kwon, BS, et al., "cDNA sequences of two inducible T-cell genes", Proc Natl Acad Sci U S A. Mar. 1989;86(6): 1963-1967.

LaBonte, M.L. et al., "Molecular Determinants Regulating the Pairing of NKG2 Molecules with CD94 for Cell Surface Heterodimer Expression," J Immunol, 172(11): 6902-6912 (May 2004).

Lafreniere, R., et al., "Successful Immunotherapy of Murine Experimental Hepatic Metastases with Lymphokine-activated Killer Cells and Recombinant Interleukin 2," Cancer Res. 45: 3735-3741 (1985).

Lamers, C.H.J., et al., "Treatment of Metastatic Renal Cell Carcinoma With Autologous T-Lymphocytes Genetically Retargeted Against Carbonic Anhydrase IX: First Clinical Experience," J. Clin. Oncol. vol. 24, No. 13: e20-e22 (May 1, 2006).

Lang et al., "Absence of B7.1-CD28/CTLA-4-mediated co-stimulation in human NK cells," Eur. J. Immunol, Mar. 1998, 28: 780-786.

Langer et al., "Comparative Evaluation of Peripheral Blood T Cells and Resultant Engineered Anti-CD19 CAR T-Cell Products From Patients With Relapsed/Refractory Non-Hodgkin Lymphoma (NHL)," Abstract 2305, Proceedings: AACR 107th Annual Meeting 2016; Apr. 16-20, 2016, New Orleans, Louisiana.

Lanzavecchia et al., "Antigen decoding by T lymphocytes: from synapses to fate determination," Nat Immunol., vol. 2, No. 6: 487-492, Jun. 2001.

Lapteva, N. et al., "Large-scale ex vivo expansion and characterization of natural killer cells for clinical applications," Cytotherapy, 14(9): 1131-1143 (2012).

Le Blanc et al., "Mesenchymal stem cells inhibit and stimulate mixed lymphocyte cultures and mitogenic responses independently of the major histocompatability complex," Scand J Immunol, Jan. 2003, 57(1): 11-20.

Lee, D.W., et al., "T cells expressing CD19 chimeric antigen receptors for acute lymphoblastic leukaemia in children and young adults: a phase 1 dose-escalation trial," Lancet 385:517-528 (2015).

Lehner et al., "Redirecting T Cells to Ewing's Sarcoma Family of Tumors by a Chimeric NKG2D Receptor Expressed by Lentiviral Transduction of MRNA Transfection," PLoS One, vol. 7, Issue 2, e31210, Feb. 2012.

Leung, W. et al., "Determinants of antileukemia effects of allogeneic NK cells," J Immunol., 172(1): 644-650 (2004).

Li, Q., et al., "Bifacial effects of engineering tumour cell-derived exosomes on human natural killer cells" Experimental Cell Research, Dec. 19, 2017, vol. 363, No. 2, pp. 141-150.

Li et al., "Costimulation by CD48 and B7-1 induces immunity against poorly immunogenic tumors," J Exp Med, Feb. 1996, 183(2): 639-644.

Li et al., "Polarization Effects of 4-1BB during CD28 Costimulation in Generating Tumor-reactive T Cells for Cancer Immunotherapy," Cancer Research, vol. 63, pp. 2546-2552, May 15, 2003.

Liao, W. et al., "Interleukin-2 at the crossroads of effector responses, tolerance, and immunotherapy," Immunity, 38(1): 13-25 (2013).

Liebowitz et al., "Costimulatory approaches to adoptive immunotherapy," Curr Opin Oncol, Nov. 1998, 10(6): 533-541.

Linsley et al., "The role of the CD28 receptor during T cell responses to antigen," Annu. Rev. Immunol., 1993, 191-212.

Liu, H., et al., "Monoclonal Antibodies to the Extracellular Domain of Prostate-specific Membrane Antigen Also React with Tumor Vascular Endothelium," Cancer Res. 57: 3629-3634 (1997).

Liu, L, et al. "Novel CD4-Based Bispecific Chimeric Antigen Receptor Designed for Enhanced Anti-HIV Potency and Absence of HIV Entry Receptor Activity," J. Virol. 89(13):6685-6694 (2015).

Lozzio et al., "Properties and Usefulness of the Original K-562 Human Myelogenous Leukemia Cell Line," Leukemia Research, vol. 3, No. 6, pp. 363-370, 1979.

Lode et al., "Targeted cytokines for cancer immunotherapy," Immunol Res., 21(2-3):279-288, (2000).

López-Requena et al., "Gangliosides, Ab1 and Ab2 antibodies III. The idiotype of anti-ganglioside mAb P3 is immunogenic in a T cell-dependent manner," Mol Immunol., 2007, 44(11):2915-2922.

(56) References Cited

OTHER PUBLICATIONS

López-Requena et al., "Gangliosides, Ab1 and Ab2 antibodies IV. Dominance of VH domain in the induction of anti-idiotypic antibodies by Jene gun immunization," Mol Immunol. Apr. 2007;44(11):3070-3075. Epub Mar. 2, 2007.

Lozzio CB, et al., "Human chronic myelogenous leukemia cell-line with positive Philadelphia chromosome", Blood. Mar. 1975; 45(3):321-334.

Lugli, E. et al., "Transient and persistent effects of IL-15 on lymphocyte homeostasis in nonhuman primates," Blood, 116(17): 3238-3248 (2010).

Ma et al., "Chapter 15: Genetically engineered T cells as adoptive immunotherapy of cancer," Cancer Chemotherapy and Biological Response Modifiers Annual 20, Ch. 15; 315-341, Giaccone et al. (Eds.), Elsevier, 2002.

Maher J., et al., "Human T-lymphocyte cytotoxicity and proliferation directed by a single chimeric TCRzeta /CD28 receptor", Nat Biotechnol. Jan. 2002; 20(1):70-75.

Maloney, D.G., "Newer Treatments for Non-Hodgkin's Lymphoma: Monoclonal Antibodies," Oncology 12(10): 63-76 (1998).

Manabe et al., "Interleukin-4 induces programmed cell death (apoptosis) in cases of high-risk acute lymphoblastic leukemia," Blood, Apr. 1994, 83(7): 1731-1737.

Mann et al., "Construction of a retrovirus packaging mutant and its use to produce helper-free defective retrovirus," Cell, May 1983, 33(1): 153-159.

Manzke et al., "Immunotherapeutic strategies in neuroblastoma: antitumoral activity of deglycosylated Ricin A conjugated anti-GD2 antibodies and anti-CD3xanti-GD2 bispecific antibodies," Med Pediatr Oncol., 36(1):185-189, Jan. 2001.

Manzke et al., "Locoregional treatment of low-grade B-cell lymphoma with CD3xCD19 bispecific antibodies and CD28 costimulation. I. Clinical phase I evaluation," Int J Cancer., 91(4):508-515, Feb. 15, 2001.

Manzke et al., "Locoregional treatment of low-grade B-cell lymphoma with CD3xCD19 bispecific antibodies and CD28 costimulation. II. Assessment of cellular immune responses," Int J Cancer., 91(4):516-522, Feb. 15, 2001.

Marincola, F.M., et al., "Escape of Human Solid Tumors from T-Cell Recognition: Molecular Mechanisms and Functional Significance," Adv. Immunol. 74: 181-273 (2000).

Markowitz et al., "A safe packaging linc for gene transfer: separating viral genes on two different plasmids," J Virol, Apr. 1988, 62(4): 1120-1124.

Marktel et al., "Immunologic potential of donor lymphocytes expressing a suicide gene for early immune reconstitution after hematopoietic T-cell-depleted stem cell transplantation," Blood, Feb. 2003, 101(4): 1290-1298.

Martinet O., et al., T cell activation with systemic agonistic antibody versus local 4-1 BB ligand gene delivery combined with interleukin-12 eradicate liver metastases of breast cancer, Gene Ther. Jun. 2002; 9(12):786-792.

Martinez, E., et al., "Cutting Edge: NKG2D-Dependent Cytotoxicity Is Controlled by Ligand Distribution in the Target Cell Membrane", The Journal of Immunology, 2011, 186:5538-5542.

Maude et al., "Chimeric antigen receptor T cells for sustained remissions in leukemia," N Engl J Med., 371(16):1507-1517, Oct. 16, 2014.

Maus MV, et al., "Ex vivo expansion of polyclonal and antigen-specific cytotoxic T lymphocytes by artificial APCs expressing ligands for the T-cell receptor, CD28 and 4-1BB", Nat Biotechnol. Feb. 2002; 20(2): 143-148.

May KF, JR, et al., "Anti-4-1 BB monoclonal antibody enhances rejection of large tumor burden by promoting survival but not clonal expansion of tumor-specific CDS+ T cells," Cancer Res. 2002, 62(12):3459-3465.

McLaughlin et al., "Adoptive T-cell therapies for refractory/relapsed leukemia and lymphoma: current strategies and recent advances," Ther Adv Hematol., 6(6):295-307, Dec. 2015.

Melero, I. et al, "Monoclonal antibodies against the 4-1BB T-cell activation molecule eradicate established tumors," Nature Med., 1997, 3:682-685.

Melero, I, et al., "Amplification of tumor immunity by gene transfer of the co-stimulatory 4-1 BB ligand: synergy with the CD2S co-stimulatory pathway," Eur J Immunol., 1998. 28(3): 1116-1121.

Melero, I, et al., "NK1.1 cells express 4-1BB (CDw137) costimulatory molecule and are required for tumor immunity elicited by anti-4-1 BB monoclonal antibodies," Cell Immunol., 1998, 190(2): 167-172.

Mihara et al., "Development and functional characterization of human bone marrow mesenchymal cells immortalized by enforced expression of telomerase," Br J Haematol, Mar. 2003, 120(5): 846-849.

Miller et al., "Role of monocytes in the expansion of human activated natural killer cells," Blood, Nov. 1992, 80(9): 2221-2229.

Miller et al., "Successful adoptive transfer and in vivo expansion of human haploidentical NK cells in patients with cancer," Blood, Apr. 2005, 105(8): 3051-3057.

Miller, J.S., "Therapeutic applications: natural killer cells in the clinic," *Hematology Am Soc Hematol Educ Program* 2013: 247-253 (2013).

Milone MC, et al., "Chimeric receptors containing CD137 signal transduction domains mediate enhanced survival of T cells and increased anti leukemic efficacy in vivo", Mol Ther. Apr. 21, 2009; 17(8):1453-1464.

Mishra, A. et al., "Aberrant overexpression of IL-15 initiates large granular lymphocyte leukemia through chromosomal instability and DNA hypermethylation," *Cancer Cell,* 22(5): 645-655 (2012).

Mogi et al., "Tumour rejection by gene transfer of 4-1BB ligand and into a CD80(+) murine squamous cell carcinoma and the requirements of co-stimulatory molecules on tumour and host cells," Immunology, Dec. 2000, 101(4): 541-547.

Mondino et al., "Surface proteins involved in T cell costimulation," J Leukoc Biol, Jun. 1994, 55(6): 805-815.

Mora, "Dinutuximab for the treatment of pediatric patients with high-risk neuroblastoma," Expert Rev Clin Pharmacol., 9(5):647-653, Epub Mar. 21, 2016.

Morandi, B. et al., "NK cells provide helper signal for CD8+ T cells by inducing the expression of membrane-bound IL-15 on DCs," International Immunology, 21(5): 599-606 (2009).

Moretta L, et al., "Unravelling natural killer cell function: triggering and inhibitory human NK receptors," EMBO J., 2004, 23(2):255-259.

Moritz et al., "A spacer region between the single chain antibody- and the CD3 ζ-chain domain of chimeric T cell receptor components is required for efficient ligand binding and signaling activity," Gene Ther. Oct. 1995; 2(8):539-546.

Moritz, D., et al., "Cytotoxic T lymphocytes with a grafted recognition specificity for ERBB2-expressing tumor cells," Proc. Natl. Acad. Sci. USA 91:4318-4322 (1994).

Mortier, E., et al., "IL-15Ralpha chaperones IL-15 to stable dendritic cell membrane complexes that activate NK cells via trans presentation," *The Journal of Experimental Medicine,* 205(5): 1213-1225 (2008).

Musso, T. et al., "Human monocytes constitutively express membrane-bound, biologically active, and interferon-gamma-upregulated interleukin-15," *Blood,* 93(10): 3531-3539 (1999).

Nadler et al., "B4, a human B lymphocyte-associated antigen expressed on normal, mitogen-activated, and malignant B lymphocytes," J Immunol, Jul. 1983, 131(1): 244-250.

Nagashima et al., "Stable transduction of the interleukin-2 gene into human natural killer cell lines and their phenotypic and functional characterization in vitro and in vivo," Blood, May 1998, 91(10): 3850-3861.

Nakamura et al., "Chimeric anti-ganglioside GM2 antibody with antitumor activity," Cancer Res. Mar. 15, 1994; 54(6):1511-6.

Naume et al., "A comparative study of IL-12 (cytotoxic lymphocyte maturation factor)-, IL-2-, and IL-7-induced effects on immunomagnetically purified CD56+ NK cells," J Immunol, Apr. 1992, 148(8): 2429-2436.

(56) References Cited

OTHER PUBLICATIONS

NCIthesaurus, Bicistronic chimeric antigen reeptor vector, retrieved online from: https://ncit.nci.nih.gov/ncitbrowser/pages/home.jsf.jsessionid=12B0F7AF71E9A4035C38B5E4F6C055B0, retrieved on: Jan. 21, 2021.
Neepalu et al., "Phase 1 Biomarker Analysis of the ZUMA-1 Study: A Phase 1-2 Multi-Center Study Evaluating the Safety and Efficacy of Anti-CD19 CAR T Cells (KTE-C19) in Subjects with Refractory Aggressive Non-Hodgkin Lymphoma," Poster session presented at the American Society of Hematology Annual Meeting, Orlando, Florida (Dec. 5-8, 2015).
Negrini, S. et al., "Membrane-bound IL-15 stimulation of peripheral blood natural killer progenitors leads to the generation of an adherent subset co-expressing dendritic cells and natural killer functional markers," *Haematologica, 96*(5): 762-766 (2011).
Nicholson et al., "Construction and characterisation of a functional CD19 specific single chain Fv fragment for immunotherapy of B lineage leukaemia and lymphoma," Mol Immunol., 34(16-17):1157-1165, Nov.-Dec. 1997.
Nishigaki et al., "Prevalence and growth characteristics of malignant stem cells in B-lineage acute lymphoblastic leukemia," Blood, May 1997, 89(10): 3735-3744.
Nunès et al., "The role of p21ras in CD28 signal transduction: triggering of CD28 with antibodies, but not the ligand B7-1, activates p21ras," J Exp Med., 180(3):1067-1076, Sep. 1, 1994.
Oelke, M. et al., "Ex vivo induction and expansion of antigen-specific cytotoxic T cells by HLA-Ig-coated artificial antigen-presenting cells," Nat Med., 2003, 9(5):619-624.
Olsen, S.K. et al., "Crystal structure of the interleukin-15 interleukin-15 receptor α complex Insights into trans and cis presentation," The Journal of Biological Chemistry, 282(51): 37191-37204 (2007).
Ozkaynak, M.F. et al., "Phase I Study of Chimeric Human/Murine Anti-Ganglioside GD2 Monoclonal Antibody (ch14.18) With Granulocyte-Macrophage Colony-Stimulating Factor in Children With Nueroblastoma Immediately After Hematopoietic Stem-Cell Transplantation: A Children's Cancer Group Study," J. Clinical Oncol. 18: 4077-4085 (2000).
Pan et al., "Regulation of dendritic cell function by NK cells: mechanisms underlying the synergism in the combination therapy of IL-12 and 4-1BB activation," J Immunol, Apr. 2004, 172(8): 4779-4789.
Park, J.H., et al.., "Are All Chimeric Antigen Receptors Created Equal?" J. Clin. Oncol. 33: 651-653 (2015).
Park, J.H., et al., "CD19-Targeted 19-28z CAR Modified Autologous T Cells Induce High Rates of Complete Remission and Durable Responses in Adult Patients with Relapsed, Refractory B-Cell ALL," Abstract presented at the American Society of Hematology Annual Meeting, San Francisco, California, available at https://ash.confex.com/ash/2014/webprogram/Paper76573.html (Dec. 6-9, 2014).
Park, J.H., et al., Abstract, "682 Implications of Minimal Residual Disease Negative Complete Remission (MRD-CR) and Allogeneic Stem Cell Transplant on Safety and Clinical Outcome of CD19-Targeted 19-28z CAR Modified T cells in Adult Patients with Relapsed, Refractory B-Cell ALL," Am. Soc'y Hematol., available at https://ash.confex.com/ash/2015/webprogram/Paper86688.html (Dec. 5-8, 2015).
Park, Y.P., et al., "Complex Regulation of Human NKG2D-DAP10 Cell Surface Expression: Opposing Roles of the γc Cytokines and TGF-β1", Blood, Sep. 15, 2011, vol. 118, No. 11, pp. 3019-3027.
Parkhurst, M.R. et al., "Adoptive transfer of autologous natural killer cells leads to high levels of circulating natural killer cells but does not mediate tumor regression," Clin Cancer Res., 17(19): 6287-6297 (2011).
Patel, S.D., et al., "Impact of chimeric immune receptor extracellular protein domains on T cell function," Gene Therapy 6: 412-419 (1999).
Paul, W.E., Fundamental Immunology, Third Edition, Chs. 1, 13 and 32 (pp. 1-20, 467-504, and 1143-1178), Raven Press, New York (1993).

Peach, R.J., et al., "Complementarity Determining Region 1 (CDR1)- and CDR3-analogous Regions in CTLA-4 and CD28 Determine the Binding to B7-1," J. Exp. Med. 180: 2049-2058 (1994).
Perussia et al., "Preferential proliferation of natural killer cells among peripheral blood mononuclear cells cocultured with B lymphoblastoid cell lines," Nat Immun Cell Growth Regul, 1987, 6(4): 171-188.
Pollok et al., "Regulation of 4-1BB expression by cell-cell interactions and the cytokines, interleukin-2 and interleukin-4," Eur J Immunol, Feb. 1995, 25(2): 488-494.
Pollok KE, et al., "Inducible T cell antigen 4-1 BB Analysis of expression and function," J Immunol., 1993, 150(3):771-781.
Porter et al., "The graft-versus-leukemia of allogeneic cell therapy," Annu Rev Med, 1999, 50: 369-386.
Porter DL et al., "Chimeric Antigen Receptor-Modified T Cells in Chronic Lymphoid Leukemia", N. Eng. J. Med. Aug. 25, 2011; 365(8):725-733.
Porter et al., "Induction of graft-versus-host disease as immunotherapy for relapsed chronic myeloid leukemia," N Engl J Med, Jan. 1994, 330(2): 100-106.
Pui et al., "Childhood acute lymphoblastic leukaemia—current status and future perspectives," Lancet Oncol, Oct. 2001, 2(10): 597-607.
Pule et al. "Virus-specific T cells engineered to coexpress tumor-specific receptors: persistence and antitumor activity in individuals with neuroblastoma," Nature Med., 2008, 14(11):1264-1270.
Qi L. et al., "Multiple effects of IL-21 on the ex vivo expansion of human primary NK cells," Immunology, Nov. 28, 2014, vol. 143, No. S2, p. 62-176, Poster Abstract 708.
Qian, L. et al., "Construction of a plasmid for co-expression of mouse membrane-bound form of IL-15 and RAE-1ε and its biological activity," *Plasmid, 65*(3): 239-245 (2011).
Rajagopalan et al., Found: a cellular activating ligand for N Kp44, Blood, 122(17):2921-2922, Oct. 2013.
Ramos, C.A., et al., "CD19-CAR Trials," The Cancer J. 20: 112-118 (2014).
Ramos et al., "Chimeric antigen receptor (CAR)-engineered lymphocytes for cancer therapy," Expert Opin Biol Ther., 2011, 11(7):855-873.
Riddell, S.R., et al., "T-Cell Therapy of Leukemia," Cancer Control 9: 114-122 (2002).
Riley et al., "The CD28 family: a T-cell rheostat for therapeutic control of T-cell activation," Blood, 2005, 105:13-21.
Roberts et al., "Antigen-specific cytolysis by neutrophils and NK cells expressing chimeric immune receptors bearing zeta or gamma signaling domains," J Immunol, Jul. 1998, 161(1): 375-384.
Robertson MJ, et al.; "Costimulation of human natural killer cell proliferation: role of accessory cytokines and cell contact-dependent signals", Nat Immun. 1996-1997; 15(5):213-226.
Rooney et al., "Use of gene-modified virus-specific T lymphocytes to control Epstein-Barr-virus-related lymphoproliferation," Lancet, Jan. 1995, 345(8941): 9-13.
Rosenberg et al., "Special Report: Use of tumor-infiltrating lymphocytes and interleukin-2 in the immunotherapy of patients with metastatic melanoma," N. Engl. J. Med., 1988, 319:1676-1680.
Rosenberg, S.A., et al., "Adoptive cell therapy for the treatment of patients with metastatic melanoma," Curr. Opin. Immunol. 21: 233-240 (2009).
Rosenfeld et al., "Phenotypic characterization of a unique non-T, non-B acute lymphoblastic leukaemia cell line," Nature, Jun. 1977, 267(5614): 841-843.
Rosenstein, M. et al., "Extravasation of intravascular fluid mediated by the systemic administration of recombinant interleukin 2," *J Immunol, 137*(5): 1735-1742 (1986).
Ross et al., "Classification of pediatric acute lymphoblastic leukemia by gene expression profiling," Blood, Oct. 2003, 102(8): 2951-2959.
Rossi, J.M., et al., "Phase 1 Biomarker Analysis of ZUMA-1 (KTEC19-101) Study: A Phase 1-2 Multi-Center Study Evaluating the Safety and Efficacy of Anti-CD19 CAR T cells (KTE-C19) in Subjects with Refractory Aggressive Non-Hodgkin Lymphoma (NHL)," Abstracted presented at the American Society of Hematology Annual

(56) References Cited

OTHER PUBLICATIONS

Meeting, Orlando, Florida, available at https://ash.confex.com/ash/2015/webprogram/Paper80339.html. (Dec. 5-8, 2015).
Rossig C, et al., "Epstein-Barr virus-specific human T lymphocytes expressing antitumor chimeric T-cell receptors: potential for improved immunotherapy," Blood, 2002, 99:2009-2016.
Rossig et al., "Targeting of G(D2)-positive tumor cells by human T lymphocytes engineered to express chimeric T-cell receptor genes," Int J Cancer, Oct. 2001, 94(2): 228-236.
Rowley, J. et al., "Expression of IL-15RA or an IL-15/IL-15RA fusion on CD8+ T cells modifies adoptively transferred T-cell function in cis," *European Journal of Immunology*, 39: 491-506 (2009).
Rubnitz, J.E. et al., "NKAML: a pilot study to determine the safety and feasibility of haploidentical natural killer cell transplantation in childhood acute myeloid leukemia," J Clin Oncol, 28(6): 955-959 (2010).
Ruggeri, L. et al., "Effectiveness of donor natural killer cell allorcactivity in mismatched hematopoietic transplants," Science, 295(5562): 2097-2100 (2002).
Sadelain, M. et al., "The Basic Principles of Chimeric Antigen Receptor Design," Cancer Discovery, vol. 3, No. 4, pp. 388-398 (Apr. 1, 2013).
Sadelain et al., "The promise and potential pitfalls of chimeric antigen receptors," Curr Opin Immunol., 2009, 21(2):215-223.
Sadelain et al., "Targeting tumours with genetically enhanced T lymphocytes," Nat Rev Cancer. Jan. 2003;3(1):35-45.
Sadelain, M., "CAR Therapy: the CD19 Paradigm," J. Clin. Investigation 125: 3392-3400 (2015).
Sahm et al., "Expression of IL-15 in N K cells results in rapid enrichment and selective cytotoxicity of gene-modified effectors that carry a tumor-specific antigen receptor," Cancer Immunol. Immunother., 61 (9): 1451-1461, Feb. 2012.
Salih, H.R., et al., "Cutting Edge: Down-Regulation of MICA on Human Tumors by Proteolytic Shedding", The Journal of Immunology, 2002, 169:4098-4102.
Salomon and Bluestone, "Complexities of CD28/B7: CTLA-4 costimulatory pathways in autoimmunity and transplantation," Annu Rev Immunol, 2001, 19: 225-252.
Sambrook et al, "Molecular Cloning: A Laboratory Manual," (1989) [Table of Contents and Preface Only].
Sankhla, S.K., et al., "Adoptive immunotherapy using lymphokincactivated killer (LAK) cells and interleukin-2 for recurrent malignant primary brain tumors," J Neurooncol. 27: 133-140 (1995).
Santegoets, S.J. et al, "IL-21 promotes the expansion of CD27+ CD28+ tumor infiltrating lymphocytes with high cytotoxic potential and low collateral expansion of regulatory T cells," Journal of Translational Medicine, Feb. 12, 2013, vol. 11, No. 37, pp. e1-e10.
Savoldo, B., et al., "CD28 costimulation improves expansion and persistence of chimeric antigen receptor modified T cells in lymphoma patients," J. Clin. Invest. 121(5):1822-1826 (2011).
Schmaltz et al., "T cells require TRAIL for optimal graft-versus-tumor activity," Nat Med, Dec. 2002, 8(12): 1433-7.
Schneider et al., "Characterization of EBV-genome negative "null" and "T" cell lines derived from children with acute lymphoblastic leukemia and leukemic transformed non-Hodgkin lymphoma," Int J Cancer, May 1977, 19(5): 621-626.
Schroers et al., "Gene transfer into human T lymphocytes and natural killer cells by Ad5/F35 chimeric adenoviral vectors," Exp Hematol, Jun. 2004, 32(6): 536-546.
Schulz, G., et al., "Detection of Ganglioside GD2 in Tumor Tissues and Sera of Neuroblastoma Patients," Cancer Research 44: 5914-5920 (1984).
Schumacher, "T-cell-receptor gene therapy," Nat Rev Immunol, Jul. 2002, 2(7): 512-519.
Schwartz et al., "Structural basis for co-stimulation by the human CTLA-4/B7-2 complex," Nature, 410(6828):604-608, Mar. 29, 2001.

Schwarz et al., "ILA, the human 4-1BB homologue, is inducible in lymphoid and other cell lineages," Blood, Feb. 1995, 85(4): 1043-1052.
Scott, A.M. et al., "Antibody therapy of cancer," *Nat Rev Cancer*, 12(4): 278-287 (2012).
Sentman, C.L., et al., "NK Cell Receptors as Tools in Cancer Immunotherapy", Advances in Cancer Research, 2006, pp. 249-292.
Sentman, C.L., et al., "NKG2D CARs as Cell Therapy for Cancer", The Cancer Journal, vol. 20, No. 2, Mar./Apr. 2014, pp. 156-159.
Sheard, M.A. et al., "Membrane-bound TRAIL supplements natural killer cell cytotoxicity against neuroblastoma cells," Journal of Immunotherapy, 36(5): 319-329 (2013).
Shimasaki, N. et al., "A clinically adaptable method to enhance the cytotoxicity of natural killer cells against B-cell malignancies," Cytotherapy, 14(7): 830-840 (2012).
Shook et al., "Natural Killer Cell Engineering for Cellular Therapy of Cancer," National Institutes of Health, Tissue Antigens, vol. 78, No. 6, pp. 409-415, Dec. 2011.
Shuford, WW, et al., "4-1 BB costimulatory signals preferentially induce CDS+ T cell proliferation and lead to the amplification in vivo of cytotoxic T cell responses", J Exp Med. Jul. 7, 1997; 186(1):47-55.
Shum et al., "Conservation and Variation in Human and Common Chimpanzee CD($ and NKG2 Genes," The American Association of Immunologists, The Journal of Immunology, pp. 240-252, Downloaded on Jun. 18, 2017.
Sica et al., "Modulation of the immune response through 4-1BB." In: Habib N, ed. Cancer gene therapy: past achievements and future challenges. New York: Kluwer Academic/Plenum Publishers; 355-362 (2000) [Book].
Slavik et al., "CD28/CTLA-4 and CD80/CD86 families: signaling and function," Immunol Res., 19(1):1-24, 1999.
Slavin et al., "Allogeneic cell therapy with donor peripheral blood cells and recombinant human interleukin-2 to treat leukemia relapse after allogeneic bone marrow transplantation," Blood, Mar. 1996, 87(6): 2195-2204.
Sneller, M.C. et al., "IL-15 administered by continuous infusion to rhesus macaques induces massive expansion of CD8+ T effector memory population in peripheral blood," Blood, 118(26):6845-6848 (2011).
Somanchi, S.S. et al., "Expansion, purification, and functional assessment of human peripheral blood NK cells," Journal of Visualized Experiments, 48A: 2540 (2011).
Song et al., "Chimeric NKG2D CAR-Expressing T Cell-Mediated Attack of Human Ovarian Cancer is Enhanced by Histone Deacetylase Inhibition," Human Gene Therapy, vol. 24, pp. 295-305, Mar. 2013.
Spear et al., "Chimeric Antigen Receptor T Cells Shape Myeloid Cell Function within the Tumor Microenvironment through IFN-γ and GM-CSF," The Journal of Immunology, pp. 6389-6399, 2014.
Spear et al., "Collaboration of chimeric antigen receptor (CAR)-expressing T cells and host T cells for optimal elimination of established ovarian tumors," OncoImmunology, vol. 2, No. 2, 12 pages, Apr. 2013.
Spear et al., "NKG2D CAR T-cell therapy inhibits the growth of NKG2D ligand heterogeneous tumors," Immunology and Cell Biology, vol. 91, pp. 435-440, 2013.
Srinivasan et al., "A retro-inverso peptide mimic of CD28 encompassing the MYPPPY motif adopts a polyproline type II helix and inhibits encephalitogenic T cells in vitro," J Immunol., 167(1):578-585, Jul. 1, 2001.
Srivannaboon et al., "Interleukin-4 variant (BAY 36-1677) selectively induces apoptosis in acute lymphoblastic leukemia cells," Blood, Feb. 2001, 97(3): 752-758.
Stamper et al., "Crystal structure of the B7-1/CTLA-4 complex that inhibits human immune responses," Nature, 410(6828):608-611, Mar. 29, 2001.
Steel et al., "Interleukin-15 biology and its therapeutic implications in cancer," Trends Pharmacol. Sci. 33(1) :35-41, Jan. 2012.
Stein, P.H., et al., "The Cytoplasmic Domain of CD28 is both Necessary and Sufficient for Costimulation of Interleukin-2 Secretion and Association with Phosphatidylinositol 3'-Kinase," Mol. Cell. Biol. 14: 3392-3402 (1994).

(56) References Cited

OTHER PUBLICATIONS

Stong RC, et al., "Human acute leukemia cell line with the t(4;11) chromosomal rearrangement exhibits B lineage and monocytic characteristics," Blood, 1985,65:21-31.
Sullivan, L.C. et al., "The Heterodimeric Assembly of the CD94-NKG2 Receptor Family and Implications for Human Leukocyte Antigen-E Recognition," Immunity, 27(6): 900-911 (Dec. 2007).
Sun, J., et al., "Early transduction produces highly functional chimeric antigen receptor-modified virus-specific T-cells with central memory markers: a Production Assistant for Cell Therapy (PACT) translational application," J. Immunother. Cancer (2015).
Sundstrom and Nilsson, "Establishment and characterization of a human histiocytic lymphoma cell line (U-937)," Int J Cancer, May 1976, 17(5): 565-577.
Sussman et al., "Protein Data Bank (PDB): database of three-dimensional structural information of biological macromolecules," Acta Crystallogr D Biol Crystallogr., 54(Pt 6 Pt 1):1078-1084, Nov. 1, 1998.
Tagaya, Y. et al., "IL-15: a pleiotropic cytokine with diverse receptor/signaling pathways whose expression is controlled at multiple levels," Immunity, 4(4): 329-336 (1996).
Takahashi, C, et al., "Cutting edge: 4-1 BB is a bona fide CD8 T cell survival signal", J Immunol. May 1, 1999; 162(9):5037-5040.
Thomas et al., "Monoclonal antibody therapy with rituximab for acute lymphoblastic leukemia," Hematol Oncol Clin North Am., 23(5):949-971, Oct. 2009.
Topp, M.S., et al., "Universal chimeric immunoreceptors for targeting B-cell malignancies with engineered CTL: combining CD19-specific TCR zeta signaling with engineered CD28-mediated co-stimulation," Mol. Ther. 3(5)(part 2 of 2): S21 (2001).
Tsukamoto, K. et al., "Juxtacrine function of interleukin-15/interleukin-15 receptor system in tumour derived human B-cell lines," Clinical and Experimental Immunology, 146(3): 559-566 (2006).
Trinchieri et al., "Response of resting human peripheral blood natural killer cells to interleukin 2," J Exp Med, Oct. 1984, 160(4): 1147-1169.
Trompeter et al., "Rapid and highly efficient gene transfer into natural killer cells by nucelofection," J Immunol Methods, Mar. 2003, 274(1-2): 245-256.
Turtle, "Therapy of B Cell Malignancies with CD19-Specific Chimeric Antigen Receptor Modified T Cells of Defined Subset Composition," Blood 124(21): 384, 6 pages, 2014.
Turtle, C.J., et al., Abstract, "A Phase I/II Clinical Trial of Immunotherapy for CD19+ B Cell Malignancies With Defined Composition of CD4+ and CD8+ Central Memory T Cells Lentivirally Engineered To Express a CD19-Specific Chimeric Antigen Receptor" Mol. Ther., 2014, 22(Supp.1):296.
Upshaw et al., "NKG2D-mediated signaling requires a DAP10-bound Grb2-Vav! intermediate and hosphatidylinositol-3-kinase in human natural killer cells," Nature Immunology, vol. 7, No. 5, pp. 524-532, May 2006.
Verdonck et al., "Donor leukocyte infusions for recurrent hematologic malignancies after allogeneic bone marrow transplantation: impact of infused and residual donor T cells," Bone Marrow Transplant, Dec. 1998, 22(11): 1057-1063.
Verma and Stock, "Management of adult acute lymphoblastic leukemia: moving toward a risk-adapted approach," Curr Opin Oncol, Jan. 2001, 13(1): 14-20.
Vinay, DS et al., "Role of 4-1 BB in immune responses", Seminars in Immunol. Dec. 1998; 10(6):481-489.
Viola, "The amplification of TCR signaling by dynamic membranc microdomains," Trends Immunol., 22(6):322-327, Jun. 2001.
Vivier, E. et al., "Innate or adaptive immunity? The example of natural killer cells," Science, 331(6013): 44-49 (2011).
Voss et al., "Targeting p53, hdm2, and CD19: vaccination and immunologic strategies," Bone Marrow Transplant., 25 Suppl 2:S43-S45, May 2000.
Vujanovic, L. et al., "Virally infected and matured human dendritic cells activate natural killer cells via cooperative activity of plasma membrane-bound TNF and IL-15," Blood, 116(4): 575-583 (2010).
Waldmann, T.A. et al., "Safety (toxicity), pharmacokinetics, immunogenicity, and impact on elements of the normal immune system of recombinant human IL-15 in rhesus macaques," Blood, 117(18): 4787-4795 (2011).
Walter et al., "Reconstitution of cellular immunity against cytomegalovirus in recipients of allogeneic bone marrow by transfer of T-cell clones from the donor," N Engl J Med, Oct. 1995, 333(16): 1038-1044.
Wang, et al., "Phase I Studies of central-memory-derived CD19 CAR T cell therapy following autologous HSCT in patients with B-Cell NHL," Blood (forthcoming 2016).
Warrens AN, et al., "Splicing by overlap extension by PCR using asymmetric amplification: an improved technique for the generation of hybrid proteins of immunological interest," Gene 20;186: 29-35 (1997).
Watzl, C., et al., "Signal Transduction During Activation and Inhibition of Natural Killer Cells", Curr Protoc Immunol., Aug. 2010, pp. 1-19.
Weijtens, M.E.M., et al., "Functional balance between T cell chimeric receptor density and tumor associated antigen density: CTL mediated cytolysis and lymphokinc production," Gene Ther. 7: 35-42 (2000).
Weissman et al., "Molecular cloning and chromosomal localization of the human T-cell receptor ~ chain: Distinction from the molecular CD3 complex," PNAS USA, 1988, 85:9709-9713.
Westwood, J.A., et al., "Adoptive transfer of T cells modified with a humanized chimeric receptor gene inhibits growth of Lewis-Y expressing tumors in mice," PNAS 102(52): 19051-19056 (2005).
WHO, "WHO Classification of Tumours of Haematopoietic and Lymphoid Tissues," International Agency for Research on Cancer (IARC), 4th Edition, 40 pages, 2008.
Willimsky, G. and Blankenstein, T., "Sporadic immunogenic tumours avoid destruction by inducing T-cell tolerance," Nature 437: 141-146 (2005).
Wittnebel, S. et al., "Membrane-bound interleukin (IL)-15 on renal tumor cells rescues natural killer cells from IL-2 starvation-induced apoptosis," Cancer Research, 67(12): 5594-5599 (2007).
Wu and Lanier, "Natural killer cells and cancer," Adv Cancer Res, 2003, 90: 127-156.
Wu, et al. "An Activating Immunoreceptor Complex Formed by NKG2D and DAP10," Science, vol. 285, pp. 730-732, Jul. 30, 1999.
Wyss-Coray, T., et al., "The B7 adhesion molecule is expressed on activated human T cells: functional involvement in T-T cell interactions," Eur. J. Immunol., 23: 2175-2180 (1993).
Xu, Y., et al., "Closely related T-memory stem cells correlate with in vivo expansion of CAR.CD19-T cells and are preserved by IL-7 and IL-15," Blood 123(24): 3750-3759 (2014).
Yan et al., "Murine COB lymphocyte expansion in vitro by artificial antigen-presenting cells expressing CD137L (4-1 BBL) is superior to CD28, and CD137L expressed on neuroblastoma expands COB tumour-reactive effector cells in vivo," Immunology, 2004, 112(1):105-116.
Ye et al. "Effects of target cell overexpression of IL-15, 4-1 BBL and IL-18 1-102 combine with IL-2 on NK cell activation and cytotoxicity during ex vivo expansion" Chin J Cancer Biother, Oct. 31, 2014, vol. 21, No. 5, pp. 537-542 (Search Report for PCT/SG2018/050138 attached).
Yeoh et al., "Classification, subtype discovery, and prediction of outcome in pediatric acute lymphoblastic leukemia by gene expression profiling," Cancer Cell, Mar. 2002, 1(2): 133-143.
Yoshida et al., "A novel adenovirus expressing human 4-1BB ligand enhances antitumor immunity," Cancer Immunol Immunother, Feb. 2003, 52(2): 97-106.
Zah, E. et al., "T Cells Expressing CD19/CD20 Bispecific Chimeric Antigen Receptors Prevent Antigen Escape by Malignant B Cells," Cancer Immunol Res, 4(6): 498-508 (Apr. 2016).
Zanoni, I. et al., "IL-15 cis presentation is required for optimal NK cell activation in lipopolysaccharide-mediated inflammatory conditions," Cell Reports, 4: 1235-1249 (2013).
Zeis, M. et al., "Allogeneic MHC-Mismatched Activated Natural Killer Cells Administered After Bone Marrow Transplantation Provide a Strong Graft-Versus-Leukemia Effect in Mice," BrJ Haematol, 1997, pp. 757-761, vol. 96.

(56) References Cited

OTHER PUBLICATIONS

Zhang et al., "Chimeric NKG2D-Modified T Cells Inhibit Systemic T-Cell Lymphoma Growth in a Manner Involving Multiple Cytokines and Cytotoxic Pathways," Cancer Research, vol. 67, No. 22, pp. 11029-11036, Nov. 15, 2007.

Zhang et al., "Chimeric NK-receptor-bearing T cells mediate anti-tumor immunotherapy," Gene Therapy, Blood, vol. 106, No. 5, pp. 1544-1551, Sep. 2005.

Zhang, J. et al., "Characterization of interleukin-15-gene-modified human natural killer cells: implications for adoptive cellular immunotherapy," Haematologica, 89(3): 338-347 (2004).

Zhang et al., "Generation of Antitumor Responses by Genetic Modification of Primary Human T Cells with a Chimeric NKG2D Receptor," Cancer Research, vol. 66, No. 11, pp. 5927-5933, Jun. 1, 2006.

Zhang et al., "Mouse Tumor Vasculature Expresses NKG2D Ligands and Can Be Targeted by Chimeric NKG2D-Modified T Cells," The Journal of Immunology, pp. 2455-2463, (2013) Downloaded Feb. 20, 2018.

Minamoto, S. et al., "Acquired Erythopoietin Responsiveness of Interleukin-2-dependent T lymphocytes Retrovirally Transduced with Genes Encoding Chimeric Erythropoietin/Interleukin-2 Receptors," Blood, vol. 86, No. 6, pp. 2281-2287 (1995).

Mohammed, S. et al., "Improving Chimeric Antigen Receptor-Modified T Cell Function by Reversing the Immunosuppressive Tumor Microenvironment of Pancreatic Cancer," Mol. Ther. 4, vol. 25, No. 1, pp. 249-258 (2017).

Wilkie, S. et al., "Selective Expansion of Chimeric Antigen Receptor-targeted T-cells with Potent Effector Function Using Interleukin-4," J Biol Chem., vol. 285, No. 33, pp. 25538-25544 (2010).

De La Chapelle, A. et al., "Truncated erythropoietin receptor causes dominantly inherited benign human erythrocytosis," Proc Natl Acad Sci USA., vol. 90, No. 10, pp. 4495-4499 (1993).

International Search Report and Written Opinion for Int'l Application No. PCT/IB2019/057217, titled, "A Method to Specifically Stimulate Survival and Expansion of Genetically-Modified Immune Cells," Date Mailed: Nov. 22, 2019.

International Preliminary Report on Patentability for Int'l Application No. PCT/IB2019/057217, titled, "A Method to Specifically Stimulate Survival and Expansion of Genetically-Modified Immune Cells," Date Issued: Mar. 2, 2021.

Hopp T.P. et al., A Short Polypeptide Marker Sequence Useful for Recombinant Protein Identification and Purification. Bio/Technology, vol. 6, pp. 1204-1210 (Oct. 1988).†

\* cited by examiner
† cited by third party

METHOD TO SPECIFICALLY STIMULATE SURVIVAL AND EXPANSION OF GENETICALLY-MODIFIED IMMUNE CELLS

RELATED APPLICATION

This application is the U.S. National Stage of International Application No. PCT/IB2019/057217, filed Aug. 27, 2019, which designates the U.S., published in English, and claims the benefit of U.S. Provisional Application No. 62/724,488, filed on Aug. 29, 2018. The entire teachings of the above applications are incorporated herein by reference.

INCORPORATION BY REFERENCE OF MATERIAL IN ASCII TEXT FILE

This application incorporates by reference the Sequence Listing contained in the following ASCII text file being submitted concurrently herewith:
 a) File name: 44591151002_SEQUENCE_LISTING.txt; created Feb. 1, 2021, 54 KB in size.

BACKGROUND

For patients with cancer, adoptive transfer of immune cells is a promising and increasingly available treatment option, one that can lead to clinical responses even when all standard treatment has failed. Clinical studies with tumor-infiltrating lymphocytes, and T lymphocytes redirected towards tumor-associated molecules with T-cell receptors (TCRs) or chimeric antigen receptors (CARs) have provided compelling evidence of the potential of these approaches in patients with leukemia and solid tumors.[1] For example, treatment of B-cell leukemia and lymphoma with anti-CD19 CAR-T cells has led to durable remissions in patients with disease resistant to conventional therapy.[2-10]

Several factors collectively influence proliferation and life-span of infused T lymphocytes, including the intensity of lymphodepleting therapy prior to infusion, and the proliferative potential and exhaustion propensity of the T cell infused.[1-9] In the case of CAR-engineered T cells, the quality of the CAR is an important feature and the type of costimulation that the CAR can deliver appears to play an important role.[11-13]

Interleukin-2 (IL-2) promotes expansion and persistence of T cells in vivo and it is used in some cell therapy trials for this purpose.[14,15] However, administration of IL-2 can have considerable toxicities.[16,17] Moreover, it lacks specificity as it reacts with all T cells expressing IL-2 receptors, regardless of their anti-tumor capacity. To this end, IL-2 stimulates regulatory T cells, which dampen immune responses.[18]

SUMMARY

Described herein are vectors, nucleic acids, and transgenic cells that can be used to improve the clinical efficacy of adoptive cell therapy by improving expansion and/or persistence of the infused cells.

Described herein is a vector that includes a nucleic acid. The nucleic acid encodes an erythropoietin (Epo) receptor; a self-cleaving peptide or internal ribosome entry site; and a cell surface protein.

The Epo receptor can have at least 90% sequence identity to any of SEQ ID NOS: 2, 4, 6, and 8. In some embodiments, the Epo receptor can have at least 90% sequence identity to SEQ ID NOS: 2. In some embodiments, the Epo receptor can have at least 90% sequence identity to SEQ ID NO: 4. In some embodiments, the Epo receptor can have at least 90% sequence identity to SEQ ID NO: 6. In some embodiments, the Epo receptor can have at least 90% sequence identity to SEQ ID NO: 8. In some embodiments, the Epo receptor is a mutant Epo receptor. In some embodiments, the nucleic acid has a mutation that encodes a stop codon within exon 8 of the Epo receptor.

The nucleotide can further encode a Flag tag (DYKDDDDK (SEQ ID NO: 23)) that is C terminal to the Epo receptor. The nucleic acid can include a self-cleaving peptide, such as a 2A peptide (e.g., T2A, P2A, E2A, F2A). In some instances, the 2A peptide can be a T2A peptide.

The signal peptide can be a signal peptide of a surface protein, such as CD8α signal peptide.

The cell surface receptor can include an extracellular receptor domain that binds a target cell antigen.

The cell surface receptor can be a chimeric antigen receptor (CAR). The CAR can include a signal peptide; an extracellular receptor domain that binds a target cell antigen; a hinge and transmembrane domain that anchors the extracellular receptor domain on the surface of a cell; and an effector domain. Where the cell surface receptor is a chimeric antigen receptor, the extracellular domain is typically a single-chain variable fragment (scFv).

The extracellular receptor domain can include a variable immunoglobulin light chain domain and a variable immunoglobulin heavy chain domain joined by a linker domain. The linker domain can be $(G4S)_x$ (SEQ ID NO: 24), wherein x is an integer from 1 to 100. The linker domain can be $(G4S)_3$ (SEQ ID NO: 25).

The cell surface receptor can be a T-cell receptor.

The extracellular domain can include a monoclonal antibody, a recombinant antibody, a human antibody, a humanized antibody, a Fab, a Fab', a F(ab')$_2$, an Fv, a single-chain variable fragment (scFv), a minibody, a diabody, a single-domain antibody, or a functional derivative or variant or fragment thereof.

The extracellular receptor domain can include an immunoglobulin Fc receptor, such as CD16, CD32 or CD64. The extracellular receptor domain can include a cytokine, such as IL-13, IL-4, IL-7, or IL-3.

The cell surface receptor can activate immune cells. For example, the cell surface receptor can include NKG2D, NKG2C, NCR1, NCR2, NCR3, CD137, CD28, or ICOS. The cell surface receptor can include a fragment of NKG2D, NKG2C, NCR1, NCR2, NCR3, CD137, CD28, or ICOS. The cell surface receptor can include a ligand of NKG2D, NKG2C, NCR1, NCR2, NCR3, CD137, CD28, or ICOS.

The cell surface receptor can inhibit immune cells. For example, the cell surface receptor can include NKG2A, PD-1, or CTLA-4. The cell surface receptor can include a fragment of NKG2A, PD-1, or CTLA-4. The cell surface receptor can include a ligand of NKG2A, PD-1, or CTLA-4.

The cell surface receptor can be a receptor for a cytokine. For example, the cell surface receptor can be a receptor for IL-6, IL-1, or TNFalpha.

The target cell antigen can be a tumor associated antigen or a tumor specific antigen. The target cell antigen can be a viral, bacterial, fungal, or parasite associated antigen.

The target cell antigen is CD19, CD20, CD22, CD123, CD33, B-cell maturation antigen (BCMA), mesothelin, human epidermal growth factor receptor 2 (Her2), prostate-specific membrane antigen (PSMA), or disialoganglioside (GD)-2.

The target cell antigen can be CD19.

The extracellular domain can be an anti-CD19 single-chain variable fragment (scFv). The hinge and transmembrane domain can be a CD8α hinge and transmembrane domain. The hinge can include a plurality of amino acid residues. The transmembrane domain can be a transmembrane domain from CD4, CD8β, CD16, CD28, CD32, CD34, CD64, CD137, FcεRIγ, OX40, CD3ζ, CD3ε, CD3γ, CD3δ, TCRα, VEGFR2, FAS, or FGFR2B.

The effector domain can include 4-1BB and CD3. The CAR can be anti-CD19-41BB-CD3.

The vector can be a retrovirus, such as a murine stem cell virus (MSCV) retroviral vector. The vector can further encode a fluorescent protein. The vector can encode an internal ribosomal entry site (IRES). The vector can further encode at least one regulatory element for expression of the nucleic acid.

Described herein is a method of making a transgenic mammalian host cell. The method can include introducing into a mammalian host cell any of the vectors described herein. The mammalian host cell can be an immune cell, such as a natural killer (NK) cell, a monocyte/macrophage cell, a dendritic cell, or a T cell. The T cell can be a human peripheral blood T lymphocyte. The T cell can be a CD4+ T cell. The T cell can be a CD8+ T cell. The T cell can further expresses a T-cell receptor (TCR) that binds a tumor antigen or a viral antigen. The TCR is endogenous. For example, the T cell can be a tumor-infiltrating lymphocyte (TIL), and the method can further include extracting the tumor-infiltrating lymphocyte from a tumor and expanding the TIL ex vivo. The TCR can be exogenous. For example, the method can further include introducing into the T cell a vector that expresses the exogenous TCR.

Described herein is a mammalian immune cell comprising any of the vectors described herein. The mammalian immune cell can be a natural killer (NK) cell, a monocyte/macrophage cell, a dendritic cell, or a T cell. The T cell can be a human T cell. The T cell can be a human peripheral blood T lymphocyte. The T cell can be as described in the preceding paragraph or as otherwise described herein.

Described herein is a method of reducing the number of CD19+ cells in a mammal. The method can include introducing mammalian T cells into the subject. The mammalian T cells can include any of the vectors described herein. The mammal can be a human. The mammalian T cells can be autologous cells isolated from the mammal. The mammalian T cells can be allogenic cells isolated from a donor. The method can further include administering Epo to the subject. The method can further include administering IL-2 to the subject. Reducing the number of CD19+ cells in the mammal can treat acute lymphoblastic leukemia (ALL).

Described herein is use of any of the vectors described herein in the manufacture of a medicament for treating or preventing cancer, a viral infection, a bacterial infection, a fungal infection, or a parasite in a mammal in need thereof.

Described herein is use of any of the mammalian immune cells described herein for reducing the number of CD19+ cells in a mammal.

Described herein is a vector for use in a method for reducing the number of CD19+ cells in a mammal. The vector can be any of the vectors described herein.

Described herein is a mammalian immune cell for use in a method for reducing the number of CD19+ cells in a mammal. The mammalian immune cell can be any of the mammalian immune cells described herein.

Described herein is a vector that includes a nucleic acid encoding a mutant erythropoietin (Epo) receptor. For example, the mutant Epo receptor can have at least 90% sequence identity to SEQ ID NO: 6. Also described herein is a method of making a transgenic mammalian host cell by introducing into a mammalian host cell the vector that includes a nucleic acid encoding a mutant erythropoietin (Epo) receptor. Also described herein is a mammalian immune cell that includes the vector that includes a nucleic acid encoding a mutant erythropoietin (Epo) receptor. The mammalian immune cell can be a T cell, natural killer (NK) cell, a monocyte/macrophage cell, or a dendritic cell.

Epo receptor can be expressed in T cells and delivers signals.

EpoRm is expressed at higher levels than EpoR.

EpoRm induces stronger and more durable signals.

Epo can support the proliferation of EpoRm-CAR-T cells.

Expression of EpoRm and exposure to Epo do not interfere with cytotoxicity of CAR-T cells.

EpoRm-CAR-T cells can expand and exert cytotoxicity in vivo.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1A is flow cytometric dot-plots that illustrate surface EpoR expression in Jurkat cells, as detected by a PE-conjugated anti-EpoR antibody (R&D Systems); cells transduced with GFP only are shown as control. Percentage of cells in each quadrant is shown. FIG. 1B is flow cytometric histograms that illustrate Epo binding to Jurkat cells. Cells were labelled with biotin-conjugated Epo (R&D Systems) and streptavidin-PE (Jackson ImmunoResearch). FIG. 1C is flow cytometric dot-plots that illustrate surface EpoR expression in T lymphocytes transduced with GFP only or GFP plus EpoR. FIG. 1D is representative flow cytometric dot-plots that illustrate phosphorylation of STAT5 Y647, detected with an AF647-conjugated antibody (BD Biosciences), after stimulation with 10 IU/mL Epo for 15 minutes; results with cells treated with 10 μM ruxolitinib for 1 hour prior to Epo stimulation are also shown. FIG. 1E is graphs showing survival of EpoR-transduced T cells and of T cells transduced with GFP only cultured in absence of exogenous cytokines (no Epo) or in presence of Epo (4 IU/mL). Symbols indicate percentage of cell recovery relative to the number of input cells.

FIG. 2A is a western blot analysis of EpoR expression in 293T cells. Cell lysates of 293T cells transduced with EpoR, EpoRm or GFP only were separated on a 10% polyacrylamide gel under reducing condition. The blotted membrane was probed with mouse anti-Flag antibody (9A3; Cell Signaling Technology) followed by goat anti-mouse IgG conjugated to horseradish peroxidase (HRP, R&D Systems); rabbit anti-human GAPDH (EPR16891; Abcam) followed by goat anti-rabbit IgG conjugated to HRP (Abcam) was used to detect GAPDH (loading control). Antibody binding was revealed by Clarity Western ECL substrate (Bio-Rad) and visualized by ChemiDoc Touch Imager (Bio-Rad). FIG. 2B is flow cytometric analysis of T lymphocytes transduced with EpoR, EpoRm or GFP only. Flow cytometric dot-plots illustrate EpoR expression as detected by a PE-conjugated anti-EpoR antibody (R&D Systems). Percentage of cells in each quadrant is shown. FIG. 2C is charts showing the percentage of GFP+ T cells expressing EpoR (left) or mean fluorescent intensity (MFI)

of EpoR (right) of T cells transduced with EpoR or EpoRm. **, P<0.0001. FIG. 2D is charts showing the percentage of CD4+(left) or CD8+(right) T cells from 6 donors expressing EpoR. , P<0.0001. FIG. 2E is graphs showing the relation between MFI of GFP and MFI of EpoR in T cells from 3 donors transduced with either EpoR or EpoRm. Each panel shows results with T cells of 1 donor. **, P<0.0001. FIG. 2F is graph showing T lymphocytes from 3 donors that were transduced with EpoR or EpoRm and then stimulated with 10 IU/mL Epo. Expression of surface EpoR was assessed by flow cytometry at the indicated time points after stimulation. Each panel shows results with T cells of 1 donor.

FIG. 3A is representative flow cytometric contour plots that illustrate phosphorylation of STAT5 in T cells transduced with EpoR, EpoRm or GFP only after stimulation with Epo (10 IU/mL) for 15 minutes. FIG. 3B is graphs showing the relation between MFI of GFP and MFI of pSTAT5 in T cells from 3 donors transduced with either EpoR or EpoRm. Each panel shows results with T cells of 1 donor. **, P<0.0001. FIG. 3C is plots showing percentage of GFP+ cells expressing pSTAT5 in T cells transduced with EpoR, EpoRm or GFP only after stimulation with 10 IU/mL Epo or treated with 10 μM ruxolitinib prior to Epo stimulation. Each symbol represents results of one experiment. , P<0.0001; , P<0.01. FIG. 3D is a graph showing percentage of GFP+ cells expressing pSTAT5 following stimulation with different concentration of Epo for 15 minutes. Each symbol indicates the average value of 2 experiments. FIG. 3E is a graph showing T cells transduced with EpoR, EpoRm or GFP only stimulated with 10 IU/mL Epo, and pSTAT5 was assessed by flow cytometry at the indicated time points. Each symbol indicates the average value of 2 experiments.

FIG. 4A are flow cytometry dot-plots illustrate cell cycle analysis of T lymphocytes transduced with EpoR, EpoRm or GFP only, unstimulated (top row) or stimulated with 10 IU/mL Epo (bottom row) after 3 days of culture in cytokine-free medium. DNA content, detected by FxCycle staining, is shown in the x axes; DNA synthesis, shown by Edu incorporation, is shown on the y axes. Edu+ cells are shown in box, with their percentage.

FIG. 4B is graphs showing survival of T lymphocytes transduced with EpoR, EpoRm or GFP-only cultured in absence of exogenous cytokines (no Epo) or in presence of Epo (10 IU/mL) for 3 weeks. Symbols indicate mean (±SD) percentage of cell recovery relative to the number of input cells in triplicate measurements. **P<0.0001; P<0.01. FIG. 4C is graphs showing percentage of T cell recovery relative to input cells after 6-8 days culture with or without 100 IU/mL IL-2 and/or 10 IU/mL Epo. Each symbol indicates measurements with T cells of 1 of 4 donors (mean of 3 measurements for 3 donors, and 1 measurement for 1 donor). *P=0.02. FIG. 4D is graphs showing survival of T lymphocytes transduced with EpoR, EpoRm or GFP only cultured with 100 IU/mL IL-2 in the absence or presence of Epo (10 IU/mL). Percentage of T cell recovery relative to input cells at the indicated days is shown.

FIG. 5A is a schematic representation of the EpoRm-CAR construct. FIG. 5B is flow cytometric dot-plots illustrate surface expression of CAR and EpoR in T cells transduced with EpoRm-CAR; cells transduced with GFP only were used as control. Percentage of cells in each quadrant is shown. Cells were stained with EpoR-PE antibody to detect EpoR expression; CAR expression was detected with goat anti-mouse F(ab')$_2$ antibody and streptavidin-APC (Jackson ImmunoResearch). FIG. 5C are plots showing percentage of GFP+ cells expressing CAR (left) and EpoR (right) among T lymphocytes transduced with CAR, EpoRm-CAR or GFP only. Each symbol corresponds to a measurement for one transduction. Horizontal bars indicate median value. FIG. 5D are plots showing percentage of GFP+ cells expressing pSTAT5 in T lymphocytes transduced with CAR, EpoRm-CAR or GFP only after 15 minutes stimulation with 10 IU/mL Epo, or 1 hour pre-treatment with 10 μM ruxolitinib prior to Epo stimulation. Each symbol corresponds to a measurement for one transduction. Horizontal bars indicate median value. FIG. 5E is charts showing cytotoxicity of T lymphocytes transduced with CAR, EpoRm-CAR or GFP only against the CD19+ cell lines OP-1, RS4; 11 and Nalm6. Bars represent mean (±SD) of triplicate experiments in a 4-hour cytotoxicity assay at a 1:1 E:T ratio. FIG. 5F is graphs showing long-term cytotoxicity of T lymphocytes transduced with CAR, EpoRm-CAR or GFP only to OP-1 mCherry cells at the indicated E:T ratios in presence of 10 IU/mL Epo. Symbols represent the mean (±SD) percentage cytotoxicity measured at the indicated time points. * P=0.03; ** P<0.01.

FIG. 6A is charts that show survival and expansion of T lymphocytes from 3 donors transduced with CAR, EpoRm-CAR or GFP only co-cultured with Streck-treated or irradiated OP-1 cells at 1:1 ratio, in the absence or presence of 10 IU/mL Epo. Each symbol indicates percentage of cell recovery as compared with the number of input cells. Mean (±SD) of triplicate cultures is shown, except for the day 14 measurement for 1 donor, where only the mean of 2 measurements is shown. FIG. 6B is a plot showing recovery of EpoRm-CAR-transduced T cells relative to input cells after 7 days of culture with or without 1 μM ruxolitinib in the presence of 10 IU/mL Epo. ***P<0.001. FIG. 6C is charts showing percentage of T lymphocytes transduced with CAR, EpoRm-CAR or GFP only recovered 7 days after co-culture with irradiated CD19+OP-1 at 1:1 ratio in the presence of 10 IU/mL Epo with 10 IU/mL or 100 IU/mL of IL-2. Each symbol indicates the mean of triplicate cultures. FIG. 6D is plots showing MFI of pSTAT5 in EpoRm-CAR-transduced T cells after stimulation with 10 IU/mL Epo and/or 100 IU/mL IL-2 at the indicated time points. FIG. 6E is plots showing percentage of GFP+ EpoRm-CAR-transduced T cells expressing pSTAT5 stimulated with the indicated concentrations of Epo and IL-2. *P=0.045; **P<0.01. FIG. 6F is charts showing EpoRm-CAR-transduced T cells were treated with either tofacitinib (n=2) or ruxolitinib (n=1) for 1 hour at the indicated doses prior to stimulation with either 10 IU/mL Epo or 100 IU/mL IL-2. Bars represent mean of two measurements for tofacitinib and a single measurement for ruxolitinib.

FIG. 7A are representative images of NSG mice infused i.v. with 5×10$^5$ Nalm6-luciferase cells. Two days later, 4 mice were injected i.v. with 2×10$^7$ EpoRm-CAR T cells; 2 of them received i.p. injections of 100 IU Epo 3 times a week for 2 weeks; 1 mouse received no T cells. Bioluminescence ventral images on day 2 are shown with enhanced sensitivity to document Nalm6 engraftment. FIG. 7B is plots showing leukemia cell growth expressed as photons per second in mice shown in Panel 7A. Symbols corresponds to total bioluminescence by ventral and dorsal imaging. Mice were euthanized when the aggregate ventral and dorsal bioluminescence signal reached $1\times10^{10}$ photons per second.

FIG. 7C is a plot showing absolute number of human CD45+ cells in peripheral blood of mice injected i.v. with T cells transduced with CAR, EpoRm-CAR, or GFP only; some mice received 100 IU Epo i.p. 3 times a week for 2 weeks, as indicated. Blood was obtained via cheek bleed 13 days after T-cell infusion. *P=0.02; **P<0.01. FIG. 7D is representative flow cytometric contour plots that illustrate the presence of human CD45+ GFP+(top) and human CD45+(bottom) T cells in mouse peripheral blood. FIG. 7E is a chart showing pSTAT5 MFI in T cells transduced with CAR, EpoRm-CAR, or GFP only following stimulation with 80 ng/mL of either mouse or human Epo for 15 minutes.

FIG. 8A is a chart showing percentage of GFP+ cells expressing CD107a in T cells transduced with CAR, EpoRm-CAR, or GFP only, after co-culture with OP-1 cells at 1:1 E:T ratio for 4 hours. Bars represent mean (±SD) triplicate measurements with cells from 3 donors. FIG. 8B is graphs showing percentage of GFP+ cells expressing IFNγ (left) and TNFα (right) in T cells transduced as in FIG. 8A after 6 hours of co-culture with OP-1 cells at 1:1 E:T ratio. Mean (±SD) of triplicate measurement with cells from 3 donors for IFNγ and 1 donor for TNFα are shown. ***P<0.001. FIG. 8C is plots of Luminex analysis of cytokines production by EpoRm-CAR-transduced T cells after co-culture with OP-1 cells at 1:4 E:T ratio for 24 hours in absence or presence of 10 IU/mL Epo.

FIG. 9A is images of NOD/scid IL2RGnull mice injected i.v. with $1\times10^7$ T cells transduced with CAR, EpoRm-CAR or GFP only; one group of mice received no T cells. Two weeks later, mice were injected i.v. with $2.5\times10^5$ Nalm6 cells expressing luciferase. Ventral images illustrate Nalm6 cell engraftment as measured by luminescence after i.p. injection of aqueous D-luciferin potassium salt (150 μg/g body weight). FIG. 9B is charts showing luminescence measurements in the groups of mice shown in FIG. 9A. Shown is the number of mice in each group with signals below $10^8$ photons/second on day 59. FIG. 9C is a chart showing persistence of infused T cells in the mice shown in FIG. 9A. Mouse blood was collected by cheek prick and cells were stained with APC (2D1; Biolegend) or PE/Cy7-conjugated anti-human CD45 (HI30; BD Pharmingen), and PE-conjugated anti-mouse CD45 (30-F11; BD Pharmingen). Percentage of hCD45+ GFP+ cells among all CD45+(human and mouse) lymphoid cells is shown. FIG. 9D is images where Nalm6 cells transduced with luciferase were injected i.v. in NOD/scid IL2RGnull mice ($5\times10^5$ cells per mouse). Four days later, tumor engraftment was assessed and $1$-$2\times10^7$ T cells were injected i.v. Ventral images illustrate Nalm6 cell engraftment as measured by luminescence after i.p. injection of aqueous D-luciferin potassium salt (150 μg/g body weight). FIG. 9E is charts showing luminescence measurements in the groups of mice shown in FIG. 9D. The number of mice in each group with signals below $10^8$ photons/second on day 55 is shown. FIG. 9F is a chart showing aggregate long-term survival of mice included in the two sets of experiments.

DETAILED DESCRIPTION

Figure 1A:
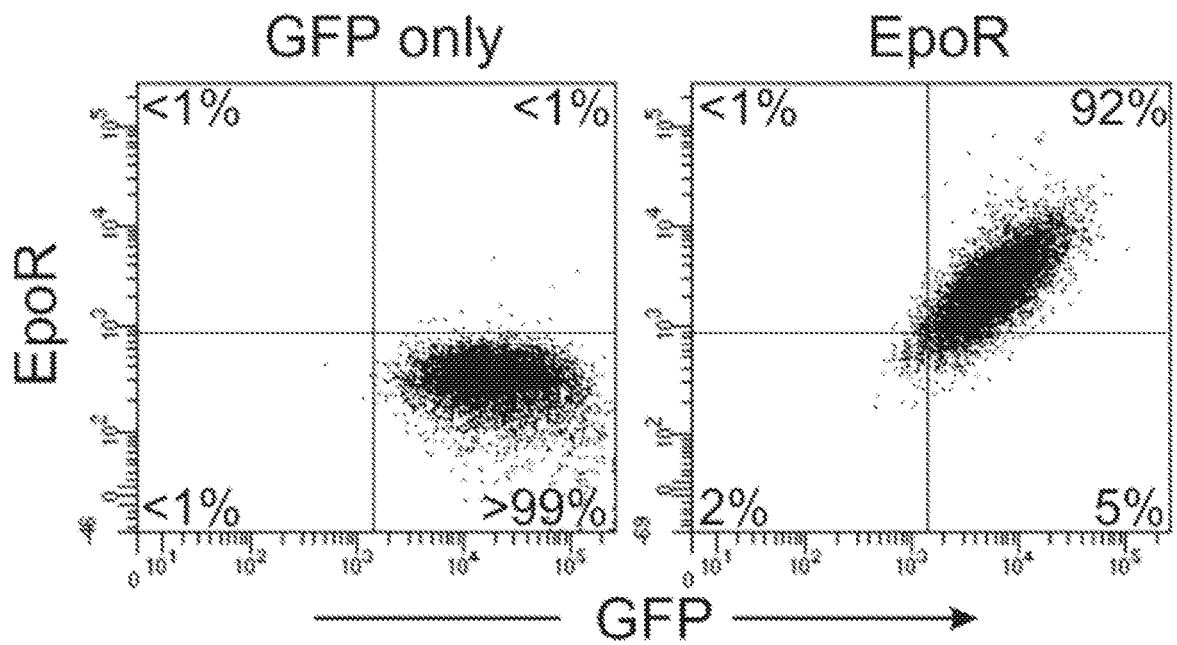
FIGS. 1A-E show expression of EpoR in human peripheral blood T cells confers survival signal.

A description of example embodiments follows.

Described herein is experiments pertinent to whether ectopic expression of the wild-type erythropoietin (Epo) receptor and of a naturally occurring truncated form associated with erythrocytosis could confer Epo responsiveness to human peripheral blood lymphocytes. Using T cells transduced with a single construct encoding for the receptor and a CAR, the potential of Epo to specifically expand CAR-T cells in vitro and in vivo was assessed.

Epo receptors can be expressed in immune cells (e.g., T cells) and are functional. Compared to normal Epo receptor, a mutant Epo receptor exhibited higher and more durable expression, higher signal intensity, and greater stimulation of T cell activity. Expression and function of Epo receptor in T cells are unexpected, as is the superiority of the mutant EpoR.

Acute Lymphoblastic Leukemia and CD19

Acute lymphoblastic leukemia (ALL) is a cancer of lymphoid blood cells. ALL progresses rapidly and is fatal if untreated. Standard treatment includes chemotherapy and hematopoietic stem cell transplant. CD19 is a B-cell-specific antigen that is expressed on all leukemic cells in the majority of cases of ALL.

The vectors described herein can be used to generate modified T cells, which, in turn, can be used for targeted treatment of ALL. The processes described herein can be used to create transgenic T cells that can target CD19+ B-cells for destruction, thereby decreasing the risk and/or severity of ALL.

While the particular examples described herein target CD19+ B-cells as a paradigm, the approach is applicable to the targeting other antigens that are markers of cells in the pathogenesis of cancer and other diseases.

Nucleic Acids

As used herein, the term "nucleic acid" refers to a polymer comprising multiple nucleotide monomers (e.g., ribonucleotide monomers or deoxyribonucleotide monomers). "Nucleic acid" includes, for example, DNA (e.g., genomic DNA and cDNA), RNA, and DNA-RNA hybrid molecules. Nucleic acid molecules can be naturally occurring, recombinant, or synthetic. In addition, nucleic acid molecules can be single-stranded, double-stranded or triple-stranded. In certain embodiments, nucleic acid molecules can be modified. In the case of a double-stranded polymer, "nucleic acid" can refer to either or both strands of the molecule.

The terms "nucleotide" and "nucleotide monomer" refer to naturally occurring ribonucleotide or deoxyribonucleotide monomers, as well as non-naturally occurring derivatives and analogs thereof. Accordingly, nucleotides can include, for example, nucleotides comprising naturally occurring bases (e.g., adenosine, thymidine, guanosine, cytidine, uridine, inosine, deoxyadenosine, deoxythymidine, deoxyguanosine, or deoxycytidine) and nucleotides comprising modified bases known in the art.

As used herein, the term "sequence identity," refers to the extent to which two nucleotide sequences, or two amino acid sequences, have the same residues at the same positions when the sequences are aligned to achieve a maximal level of identity, expressed as a percentage. For sequence alignment and comparison, typically one sequence is designated as a reference sequence, to which a test sequences are compared. The sequence identity between reference and test sequences is expressed as the percentage of positions across the entire length of the reference sequence where the reference and test sequences share the same nucleotide or amino acid upon alignment of the reference and test sequences to achieve a maximal level of identity. As an example, two sequences are considered to have 70% sequence identity when, upon alignment to achieve a maximal level of identity, the test sequence has the same nucleotide or amino acid residue at 70% of the same positions over the entire length of the reference sequence.

Alignment of sequences for comparison to achieve maximal levels of identity can be readily performed by a person of ordinary skill in the art using an appropriate alignment method or algorithm. In some instances, the alignment can include introduced gaps to provide for the maximal level of identity. Examples include the local homology algorithm of Smith & Waterman, *Adv. Appl. Math.* 2:482 (1981), the homology alignment algorithm of Needleman & Wunsch, *J. Mol. Biol.* 48:443 (1970), the search for similarity method of Pearson & Lipman, *Proc. Natl. Acad Sci. USA* 85:2444 (1988), computerized implementations of these algorithms (GAP, BESTFIT, FASTA, and TFASTA in the Wisconsin Genetics Software Package, Genetics Computer Group, 575 Science Dr., Madison, Wis.), and visual inspection (see generally Ausubel et al., *Current Protocols in Molecular Biology*).

When using a sequence comparison algorithm, test and reference sequences are input into a computer, subsequent coordinates are designated, if necessary, and sequence algorithm program parameters are designated. The sequence comparison algorithm then calculates the percent sequence identity for the test sequence(s) relative to the reference sequence, based on the designated program parameters. A commonly used tool for determining percent sequence identity is Protein Basic Local Alignment Search Tool (BLASTP) available through National Center for Biotechnology Information, National Library of Medicine, of the United States National Institutes of Health. (Altschul et al., *J Mol Biol.* 215(3):403-10 (1990)).

In various embodiments, two nucleotide sequences, or two amino acid sequences, can have at least, e.g., 70%, 75%, 80%, 85%, 86%, 87%, 88%, 89%, 90%, 91%, 92%, 93%, 94%, 95%, 96%, 97%, 98%, 99%, or more, sequence identity. When ascertaining percent sequence identity to one or more sequences described herein, the sequences described herein are the reference sequences.

Vectors

The terms "vector", "vector construct" and "expression vector" mean the vehicle by which a DNA or RNA sequence (e.g. a foreign gene) can be introduced into a host cell, so as to transform the host and promote expression (e.g. transcription and translation) of the introduced sequence. Vectors typically comprise the DNA of a transmissible agent, into which foreign DNA encoding a protein is inserted by restriction enzyme technology. A common type of vector is a "plasmid", which generally is a self-contained molecule of double-stranded DNA that can readily accept additional (foreign) DNA and which can readily introduced into a suitable host cell. A large number of vectors, including plasmid and fungal vectors, have been described for replication and/or expression in a variety of eukaryotic and prokaryotic hosts.

The terms "express" and "expression" mean allowing or causing the information in a gene or DNA sequence to become manifest, for example producing a protein by activating the cellular functions involved in transcription and translation of a corresponding gene or DNA sequence. A DNA sequence is expressed in or by a cell to form an "expression product" such as a protein. The expression product itself, e.g. the resulting protein, may also be said to be "expressed" by the cell. A polynucleotide or polypeptide is expressed recombinantly, for example, when it is expressed or produced in a foreign host cell under the control of a foreign or native promoter, or in a native host cell under the control of a foreign promoter. Gene delivery vectors generally include a transgene (e.g., nucleic acid encoding an enzyme) operably linked to a promoter and other nucleic acid elements required for expression of the transgene in the host cells into which the vector is introduced. Suitable promoters for gene expression and delivery constructs are known in the art. Recombinant plasmids can also comprise inducible, or regulatable, promoters for expression of an enzyme in cells.

Various gene delivery vehicles are known in the art and include both viral and non-viral (e.g., naked DNA, plasmid) vectors. Viral vectors suitable for gene delivery are known to those skilled in the art. Such viral vectors include, e.g., vector derived from the herpes virus, baculovirus vector, lentiviral vector, retroviral vector, adenoviral vector, adeno-associated viral vector (AAV), and murine stem cell virus (MSCV). The viral vector can be replicating or non-replicating. Such vectors may be introduced into many appropriate host cells, using methods disclosed or cited herein or otherwise known to those skilled in the relevant art.

Non-viral vectors for gene delivery include naked DNA, plasmids, transposons, and mRNA, among others. Non-limiting examples include pKK plasmids (Clonetech), pUC plasmids, pET plasmids (Novagen, Inc., Madison, Wis.), pRSET or pREP plasmids (Invitrogen, San Diego, Calif.), pMAL plasmids (New England Biolabs, Beverly, Mass.). Such vectors may be introduced into many appropriate host cells, using methods disclosed or cited herein or otherwise known to those skilled in the relevant art.

In certain embodiments, the vector comprises an internal ribosome entry site (IRES). In some embodiments, the vector includes a selection marker, such as an ampicillin resistance gene (Amp). In some embodiments, the nucleic acid encodes a fluorescent protein, such as green fluorescent protein (GFP) or mCherry. In some embodiments, the nucleic acid is suitable for subcloning into pMSCV-IRES-GFP between EcoRI and XhoI. In some embodiments, the vector contains a multiple cloning site (MCS) for the insertion of the desired gene.

Although the genetic code is degenerate in that most amino acids are represented by multiple codons (called "synonyms" or "synonymous" codons), it is understood in the art that codon usage by particular organisms is nonrandom and biased towards particular codon triplets. Accordingly, in some embodiments, the vector includes a nucleotide sequence that has been optimized for expression in a particular type of host cell (e.g., through codon optimization). Codon optimization refers to a process in which a polynucleotide encoding a protein of interest is modified to replace particular codons in that polynucleotide with codons that encode the same amino acid(s), but are more commonly used/recognized in the host cell in which the nucleic acid is being expressed. In some aspects, the polynucleotides described herein are codon optimized for expression in T cells.

Erythropoietin (Epo) Receptors and Mutants Thereof

As used herein, the term "Epo receptor" refers to a protein that binds erythropoietin, which is a glycoprotein cytokine. Particular Epo receptors and mutants thereof are described in the Exemplification.

Examples of mutant Epo receptors include truncated Epo receptors, which can be formed by several different types of mutations, including frameshifts, insertions, and deletions. Those lacking the C-terminal negative regulatory domain exhibit hypersensitivity to Epo stimulation in red cells. One example is represented by a nucleic acid encoding an Epo receptor that has nonsense mutations within exon 8 of the Epo receptor gene that encode premature stop codons. Such mutants can produce a truncated form of EpoR with augmented Epo signaling in erythrocyte progenitors. One particular example of an EpoR mutant has a mutation at nucleotide 6002 so that codon 439 encodes a stop codon (TAG) instead of tryptophan (TGG).

Chimeric Antigen Receptor (CAR) Constructs

Figure 5A:
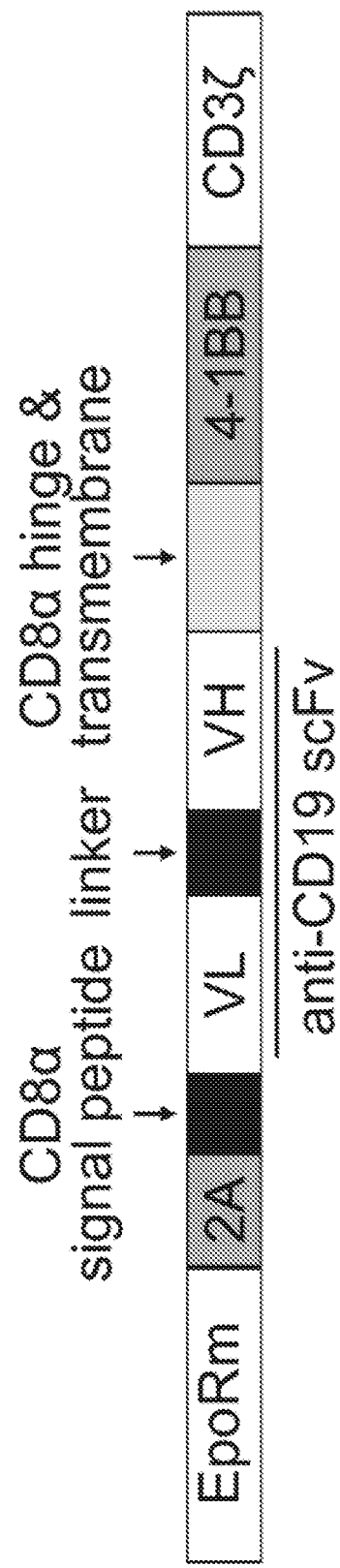
FIGS. 5A-F show expression and function of EpoRm-CAR T cells.

FIG. 5A illustrates a particular construct that is an anti-CD19 single-chain variable fragment (anti-CD19 scFv) coupled to a hinge and transmembrane domain. In the particular example of FIG. 5A, the hinge and transmembrane domain are a CD8α hinge and transmembrane domain. The anti-CD19 scFv includes an anti-CD19 variable light chain domain, an anti-CD19 variable heavy chain domain, and a linker domain joining the variable light chain domain and the variable heavy chain domain. The relative positions of the variable light and variable heavy chain domain can be reversed, but they are both N' terminal to a transmembrane domain, illustrated in FIG. 5A as a CD8α hinge and transmembrane domain. The construct can also include an N-terminal signal peptide, such as a CD8α signal peptide (see SEQ ID NOS: 21 and 22). Signal peptides of surface proteins are generally suitable.

A variety of linker domains are suitable. In some embodiments, the linker domain can be $(G4S)_x$ (SEQ ID NO: 24), wherein x is an integer from 1 to 100; preferably, x is an integer from 1 to 10; even more preferably, x is an integer from 2 to 5. In some embodiments, the linker domain can be $(G4S)_3$ (SEQ ID NO: 25). In other embodiments, the linker domain can be one or more glycine residues (e.g., $(G)_y$ (SEQ ID NO: 26), where y is an integer from 2 to 100. In other embodiments, the linker domain can be $(EAAAK)_3$ (SEQ ID NO: 27). $(G4S)_x$ (SEQ ID NO: 24), $(G4S)_3$ (SEQ ID NO: 25), and $(G)_y$ (SEQ ID NO: 26) are examples of flexible linkers, while $(EAAAK)_3$ (SEQ ID NO: 27) is an example of a more rigid linker.

A variety of hinge and transmembrane domains are suitable. In some embodiments, the hinge domain can be a CD8α hinge domain. In some embodiments, the transmembrane domain can be a CD8α transmembrane domain. In some embodiments, the hinge and transmembrane domain can be a CD8α hinge and transmembrane domain. In some embodiments, the hinge can be a plurality of amino acid residues. In some embodiments, the transmembrane domain can be a transmembrane domain from CD4, CD8β, CD16, CD28, CD32, CD34, CD64, CD137, FcεRIγ, OX40, CD3ζ, CD3ε, CD3γ, CD3δ, TCRα, VEGFR2, FAS, or FGFR2B.

While the embodiment of FIG. 5A is an anti-CD19 construct, a similar approach can be applied to generate constructs for other target antigens, such as CD20, CD22, CD123, CD33, B-cell maturation antigen (BCMA), mesothelin, human epidermal growth factor receptor 2 (Her2), prostate-specific membrane antigen (PSMA), or disialoganglioside (GD)-2. For example, based on the schema in FIG. 5A, the anti-CD19 scFv portion can be replaced with a different scFv that specifically binds to a different target antigen.

The constructs also encode an Epo receptor. In the construct of FIG. 5A, the Epo receptor is a mutant (EpoRm) that was generated using site-directed mutagenesis polymerase chain reaction (PCR) to alter the codon for amino acid 439 from TGG (Trp) to TAG (stop). Other mutants of Epo receptor are known in the art, and other Epo receptors variants not existing in nature can be created. One example is an Epo receptor lacking the immunoreceptor tyrosine-based inhibition motif (ITIM) present in the intracellular portion of the receptor, which may have enhanced signaling properties and are likely to be suitable. Another example is an Epo receptor with multiple JAK2-binding domains in the intracellular portion.

In the construct, the Epo receptor is joined with the chimeric antigen receptor (CAR) by a 2A peptide, which is a self-cleaving peptide. By joining the Epo receptor with the CAR, coexpression of both proteins can be achieved from a single vector. Examples of 2A peptides are P2A (SEQ ID NOS: 13 and 14), T2A (SEQ ID NOS: 15 and 16), E2A (SEQ ID NOS: 17 and 18), and F2A (SEQ ID NOS: 19 and 20), though other 2A peptides are known in the art.

Methods of Making Transgenic Host Cells

Described herein are methods of making a transgenic host cell, such as transgenic T cells. The transgenic host cells can be made, for example, by introducing one or more of the vector embodiments described herein into the host cell.

In one embodiment, the method comprises introducing into a host cell a vector that includes a nucleic acid that encodes an Epo receptor and a chimeric antigen receptor (CAR), such as an anti-CD19-41BB-CD3ζ. In some embodiments, a nucleic acid, such as a bicistronic vector, expresses Epo receptor and the CAR. In some embodiments, two separate vectors can be used to create a transgenic cell, such as a transgenic T cell, that expresses Epo receptor and the CAR.

In some embodiments, one or more of the nucleic acids are integrated into the genome of the host cell. In some embodiments, the nucleic acids to be integrated into a host genome can be introduced into the host cell using any of a variety of suitable methodologies known in the art, including, for example, homologous recombination, CRISPR-based systems (e.g., CRISPR/Cas9; CRISPR/Cpf1) and TALEN systems.

A variety of host cells are suitable, most typically immune cells. In addition to T cells (T lymphocytes), expression of EpoR is expected to activate natural killer (NK) cells, monocytes/macrophages, dendritic cells, and other immune cells. In some instances, the T cell can be a human peripheral blood T lymphocyte. In some instances, the T cell can be a CD4+ T cell. In some instances, the T cell can be a CD8+ T cell.

In some instances, the T cell can also expresses a T-cell receptor (TCR) that binds a tumor antigen or a viral antigen. In some instances, the TCR can be endogenous. For example, the T cell can be a tumor-infiltrating lymphocyte (TIL) that is extracted from a tumor and expanded ex vivo. In some instances, the TCR can be exogenous. For example, the TCR can be expressed in the T cell by viral transduction or other means. The TCR can be specific for a viral peptide, such as a peptide derived from hepatitis B virus, hepatitis C virus, Epstein-Barr virus, cytomegalovirus, or from a tumor cell, such as melanoma-associated antigen (MAGE), NY-ESO-1, telomerase reverse transcriptase (TERT).

Values and Ranges

Unless otherwise indicated or otherwise evident from the context and understanding of one of ordinary skill in the art, values that are expressed as ranges can assume any specific value or subrange within the stated ranges in various embodiments, unless the context clearly dictates otherwise. "About" in reference to a numerical value generally refers to a range of values that fall within ±8%, in some embodiments ±6%, in some embodiments ±4%, in some embodiments ±2%, in some embodiments ±1%, in some embodiments ±0.5% of the value unless otherwise stated or otherwise evident from the context.

EXEMPLIFICATION

Materials and Methods

Cells

The leukemia cell lines Jurkat, Nalm6, and RS4; 11 were obtained from the American Type Culture Collection (ATCC; Rockville, MD). The CD19+ B-lineage ALL cell line OP-1 was developed in our laboratory.[19] A murine stem cell virus (MSCV) retroviral vector, containing green fluorescent protein (GFP) or mCherry and an internal ribosomal entry site (IRES) was used to express the firefly luciferase gene in Nalm6, and mCherry in OP-1, respectively. Cell lines were maintained in RPMI-1640 (Thermo Fisher Scientific, Waltham, MA) supplemented with 10% fetal bovine serum (FBS) and 1% penicillin-streptomycin. Human embryonic kidney fibroblast 293T (HEK 293T) cells were cultured in DMEM (HyClone, GE Life Sciences, Logan, Utah) supplemented with 10% FBS and 1% penicillin-streptomycin.

Peripheral blood samples were obtained from discarded anonymized by-products of platelet donations from healthy adult donors at the National University Hospital Blood Bank or the Health Science Authority Blood Bank, Singapore. Mononucleated cells were separated by centrifugation on a Lymphoprep density step (Nycomed, Oslo, Norway) and washed twice in RPMI-1640. T cells were enriched with Dynabeads Human T-Activator CD3/CD28 (Invitrogen, Carlsbad, CA) and cultured in RPMI-1640, 10% FBS, 1% penicillin-streptomycin, and interleukin-2 (IL-2; 120 IU/mL; Proleukin, Novartis, Basel, Switzerland).

Gene Cloning and Retroviral Transduction

The Epo receptor (EpoR) cDNA was obtained from GeneCopoeia (Rockville, MD). The mutant EpoR (EpoRm) was generated using site-directed mutagenesis polymerase chain reaction (PCR) to alter the codon for amino acid 439 from TGG (Trp) to TAG (stop).[20] In some experiments, a Flag tag (DYKDDDDK (SEQ ID NO: 23)) was added to C-terminal of EpoR and EpoRm. The anti-CD19-41BB-CD3ζ CAR was previously made in our laboratory.[21] The EpoRm-2A-CAR was generated by fusion PCR, combining EpoRm and anti-CD19-41BB-CD3ζ through 2A peptide sequence.[22] The constructs and expression cassette were subcloned into EcoRI and XhoI sites of the pMSCV-IRES-GFP vector.

Preparation of retroviral supernatant and transduction were performed as previously described.[23] Briefly, pMSCV retroviral vector-conditioned medium was added to RetroNectin (Takara, Otsu, Japan)-coated polypropylene tubes; after centrifugation and removal of the supernatant, T cells ($5\times10^5$) were added to the tubes and left at 37° C. for 12 hours; fresh viral supernatant was added on two other successive days. T lymphocytes were then maintained in RPMI-1640 with FBS, antibiotics and 200 IU/mL IL-2 until the time of the experiments, 7-21 days after transduction.

Detection of EpoR and CAR Expression

Surface expression of EpoR was detected with phycoerythrin (PE)-conjugated anti-human EpoR antibody (38409; R&D Systems, Minneapolis, MN). In some experiments, surface staining of EpoR was done on cells that had been cultured in cytokine-free media for 2 hours followed by incubation with 10 IU/mL of recombinant human Epo (Thermo Fisher Scientific) at 37° C. for 15-60 minutes. Expression of CAR was detected using a biotin-conjugated goat anti-mouse F(ab')2 antibody (Jackson ImmunoResearch, West Grove, PA) followed by streptavidin conjugated to allophycocyanin (APC; Jackson ImmunoResearch). PE/Cy7-conjugated anti-CD4 (SK3) antibody was from BD Biosciences (San Jose, CA); APC-conjugated anti-CD8 (BW135/80) antibody was from Miltenyi Biotec (Bergisch Gladbach, Germany). In all tests, non-reactive isotype-matched antibodies were used as controls. Cell staining was analysed using Accuri C6 or Fortessa flow cytometers (BD Bioscience), with Diva (BD Biosciences) or FlowJo software (FlowJo, Ashland, OR).

Western blot analysis of EpoR expression in 293T cells was performed as previously described.[24] Briefly, cell lysates were extracted using CelLytic M cell lysis reagent (Sigma-Aldrich, Saint Louis, MO) prior to protein quantification with Pierce BCA protein assay kit (ThermoFisher Scientific). Cell lysates were diluted with 4× Laemmli sample buffer (Bio-rad, Hercules, CA) prior to separation on 10% polyacrylamide gel by electrophoresis under reducing condition. Blotted membrane was probed with mouse anti-Flag (9A3; Cell Signaling Technology, Danvers, MA) followed by goat anti-mouse IgG conjugated to horseradish peroxidase (HRP) (R&D Systems); rabbit anti-human glyceraldehyde 3-phosphate dehydrogenase (GAPDH) (EPR16891; Abcam, Cambridge, UK) followed by HRP-conjugated goat anti-rabbit IgG antibody (Abcam) was used as a loading control. Antibody binding was revealed by Clarity Western ECL substrate (Bio-Rad) and visualized by ChemiDoc Touch Imager (Bio-Rad).

Detection of Epo Binding and Signaling

To determine binding of Epo to EpoR, cells were incubated with biotinylated Epo (R&D Systems) for 2 hours at room temperature. Biotinylated Epo was visualized with streptavidin-PE (Jackson ImmunoResearch).

To detect Epo signaling, cells were incubated in cytokine-free media for 2 hours before stimulated with Epo (0.01-10 IU/mL) at 37° C. for 15 minutes to 24 hours. In some experiments, cells were treated with 0.1-10 μM of ruxolitinib (Selleckchem) or 0.5-5 nM tofacitinib (Santa Cruz Biotechnology, Santa Cruz, CA) for 1 hour prior to Epo stimulation. Cells were then fixed with 1× lyse/fix buffer (BD Biosciences), permeabilized with Perm Buffer III (BD Biosciences), and stained with anti-STAT5 (pY694) conjugated to Alexa Fluor 647 (AF647) (47; BD Biosciences). In some experiments, the effects of human Epo were compared to those of murine Epo (Biolegend, San Diego, CA).

Cell Proliferation Assay

To determine the effect of Epo on cell cycle, cells were cultured in cytokine-free media for 3 days followed by stimulation with 10 IU/mL of Epo for 1 day. DNA synthesis was measured by Click-iT EdU AF647 Flow Cytometry Assay Kit (Thermo Fisher Scientific), and DNA content was measured with FxCycle Violet Stain (Thermo Fisher Scientific).

To assess cell survival, T cells were cultured in absence of exogenous cytokines, with or without Epo (4-10 IU/mL) in a flat bottom 96-well or 24-well plate (Cellstar). For cell proliferation, T cells were co-cultured with target cells (OP-1 cells) at 1:1 effector-to-target (E:T) ratio in a flat bottom 96-well plate; Epo (10 IU/mL) was added every two days. Target cells, irradiated (100 Gy) or treated with Streck cell preservative (Streck Laboratories, Omaha, NE) to inhibit growth, were added at the beginning of the cultures, and every 7 days thereafter. In some experiments, low dose (10 IU/mL) or high dose (100 IU/mL) IL-2 was added to the culture as well. The number of GFP+ T cells was measured by flow cytometry.

Cytotoxicity and Cytokine Production

To test cytotoxicity, CD19+ target cells (OP-1, RS4; 11, and Nalm6) were labelled with calcein red-orange AM (Thermo Fisher Scientific) and placed into a 96-well round bottom plate (Corning Costar, Corning, NY). T cells were added at E:T ratio of 1:1 and co-cultured with target cells for 4 hours at 37° C. and 5% CO2 incubator. Viable target cells were counted by flow cytometry.[25] For long-term cytotoxicity, OP-1 mCherry cells were placed into a 96-well flat bottom plate, T cells were added at different E:T ratios and cultured for 3 days with 10 IU/mL of Epo. Plates were placed in IncuCyte Zoom System (Essen BioScience) set to collect data collection (whole-well imaging) every 4 hours.

To measure exocytosis of lytic granules, T cells were co-cultured with OP-1 cells at 1:1 E:T ratio for 4 hours in a 96-well round bottom plate. PE-conjugated anti-human CD107a antibody (H4A3; BD Biosciences) was added at the beginning of the cultures and monensin (BD GolgiStop) 1 hour later.

To measure interferon-γ (IFN-γ) and tumor necrosis factor-α (TNF-α) production, target and effector cells at a 1:1 E:T ratio were plated as above. After 1 hour, brefeldin A (BD GolgiPlug) was added to the culture and incubated for another 5 hours. Subsequently, intracellular staining with PE-conjugated anti-IFN-γ (clone 25723.11; BD Biosciences) or anti-TNF-α (clone 6401.1111; BD Biosciences) was done prior to analysis by flow cytometry. To assess cytokine profile, target and effector cells were co-cultured at 1:4 E:T ratio in absence or presence of 10 IU/mL Epo for 24 hours. Culture supernatant was collected to be analysed by Luminex Multiplex Assay (Bio-Rad).

Xenograft Experiments

To determine survival of T cells in vivo, NOD.Cg-Prkdcscid IL2rgtm1Wjl/SzJ (NOD/scid IL2RGnull) mice (The Jackson Laboratory, Bar Harbor, ME) were injected intravenously (i.v.) with $1\times10^7$ T cells transduced with GFP alone, CAR, or EpoRm-CAR. In some mice, 100 IU of Epo were injected intraperitoneally (i.p) every two days for two weeks. On day 13, blood cells were counted with a cell counter (Beckman Coulter, Miami, FL). After treatment with red blood cell lysis solution (Sigma-Aldrich), cells were stained with APC-conjugated anti-human CD45 (2D1; Biolegend) and PE-conjugated anti-mouse CD45 (30-F11; BD Pharmingen).

To assess anti-leukemic activity, NOD-scid-IL2RGnull mice were injected with $1\times10^7$ T cells i.v., followed 2 weeks later by $2.5\times10^5$ Nalm6 cells expressing luciferase i.v. ALL cell engraftment was determined by measuring luminescence signal with the Xenogen IVIS-200 System (Perkin Elmer, Waltham, MA), after i.p. injection of aqueous D-luciferin potassium salt (150 μg/g body weight; Perkin Elmer); signals were analyzed with Living Image 3.0 software. In another model, $5\times10^5$ Nalm6-luciferase cells were injected i.v. followed 4 days later by $1-2\times10^7$ T cells i.v. Mice were euthanized when the luminescence reached $1\times10^{10}$ photons per second, or earlier if there were physical signs warranting euthanasia.

In another model to test anti-leukemic activity of T cells, Nalm6 cells transduced with luciferase were injected i.v. ($5\times10^5$ cells per mouse), followed 2 days later by T cells expressing EpoRm-CAR ($2\times10^7$ cells per mouse, i.v.), while control mice received no T cells; some mice received Epo (100 IU) 3 times per week i.p. Tumor cell load was determined with the Xenogen IVIS-200 System (Perkin Elmer, Waltham, MA) after injecting aqueous D-luciferin potassium salt (150 μg/g body weight; Perkin Elmer) i.p. Luminescence was analyzed with Living Image 3.0 software. Mice were euthanized when the luminescence reached $1\times10^{10}$ photons per second, or earlier if there were physical signs warranting euthanasia.

Jurkat Cell Growth Curves

To determine the effect of EpoR and EpoRm expression on cell growth, numbers of Jurkat cells transduced with GFP only, EpoR and EpoRm and maintained under the same culture conditions were counted periodically.

RESULTS

EpoR can be Expressed in T Cells and Mediates Epo Survival Signals

Figure 1B:
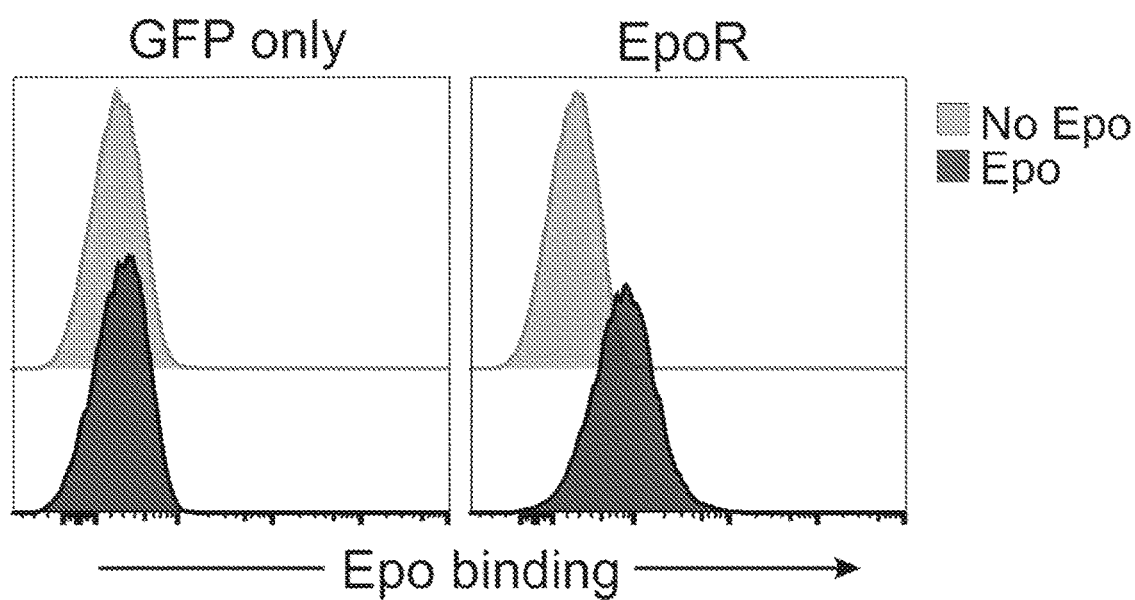
Figure 1C:
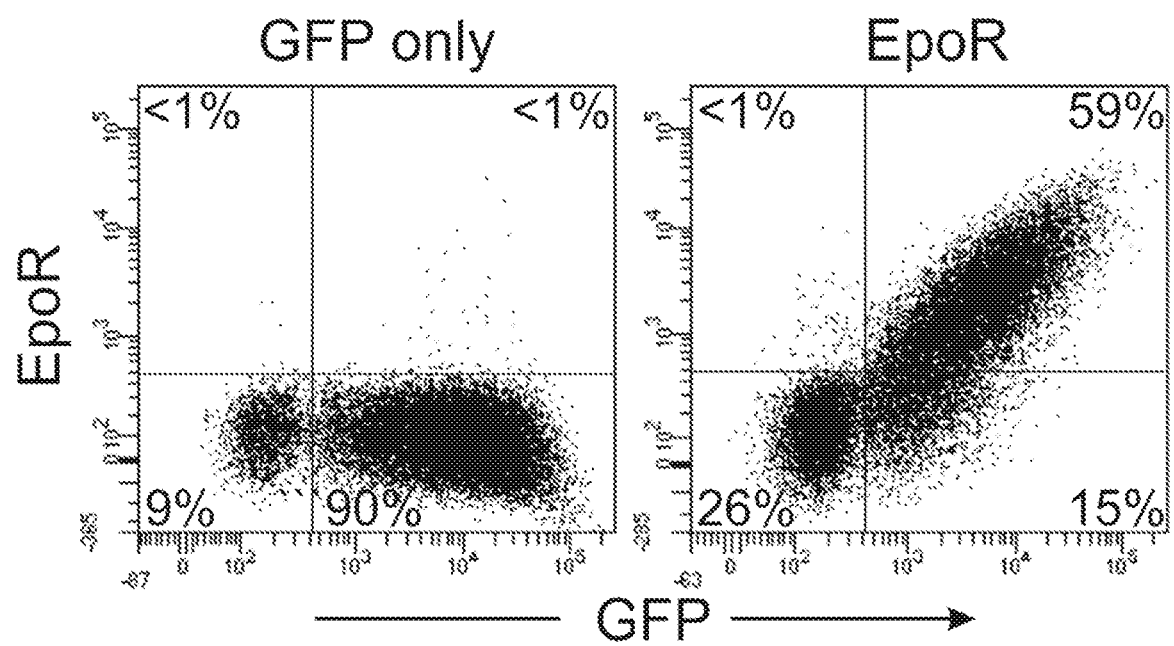

Retroviral transduction of Jurkat cells with the EpoR gene resulted in high expression of the receptor (FIG. 1A). Cells expressing EpoR could bind Epo, while there was no detectable binding in cells transduced with GFP alone (FIG. 1B). Next, we determined whether EpoR could also be expressed in peripheral blood T lymphocytes. For this purpose, we stimulated peripheral blood mononucleated cells with anti-CD3 and CD28 antibodies and IL-2, and transduced them with the EpoR gene or GFP alone. In 5 experiments with T cells from 4 donors, the percentage of transduced T lymphocytes (GFP+) expressing EpoR was 74.9%±4.8%; EpoR was undetectable in cells transduced with GFP only (FIG. 1C).

Figure 1D:
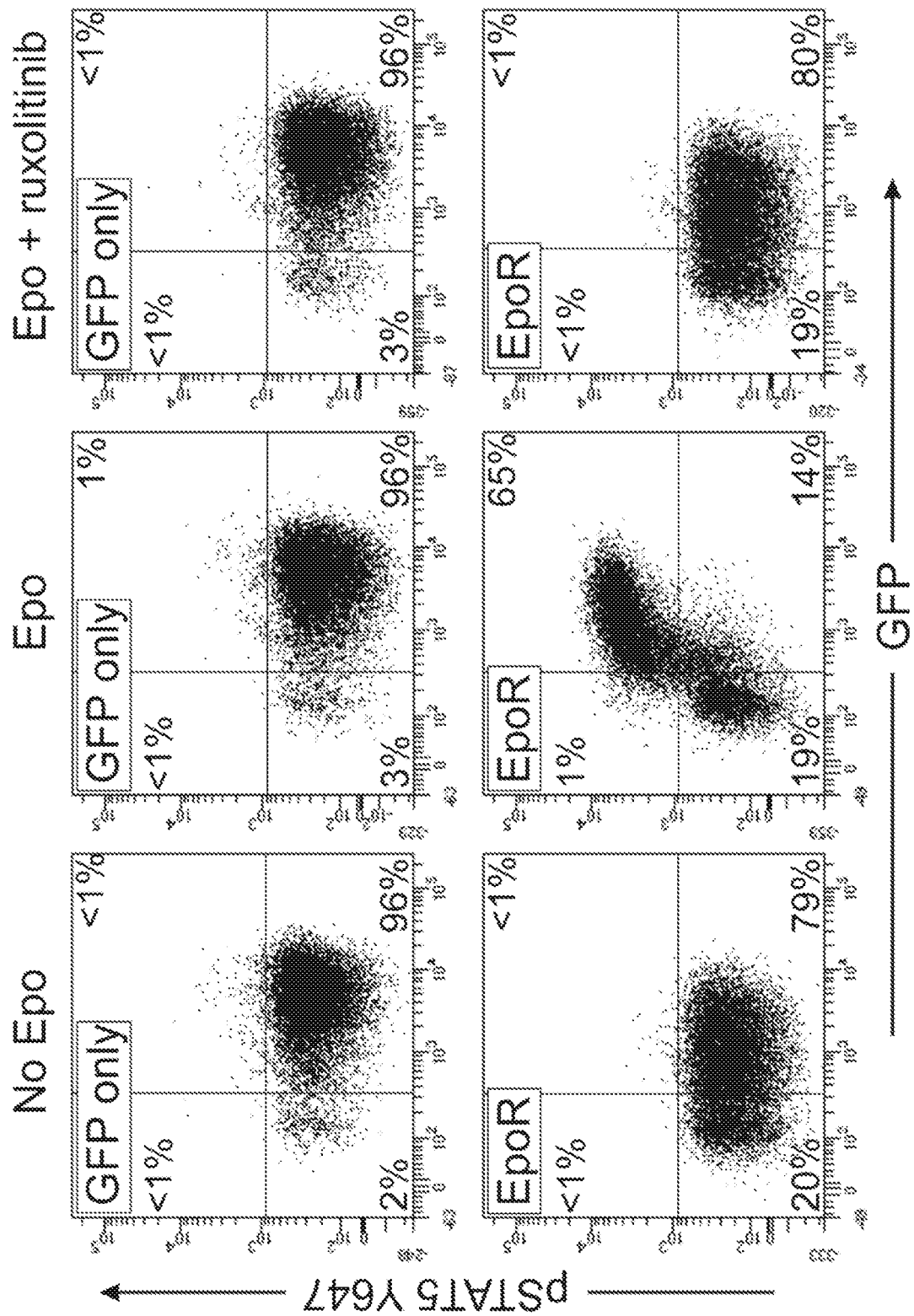
Figure 1E:
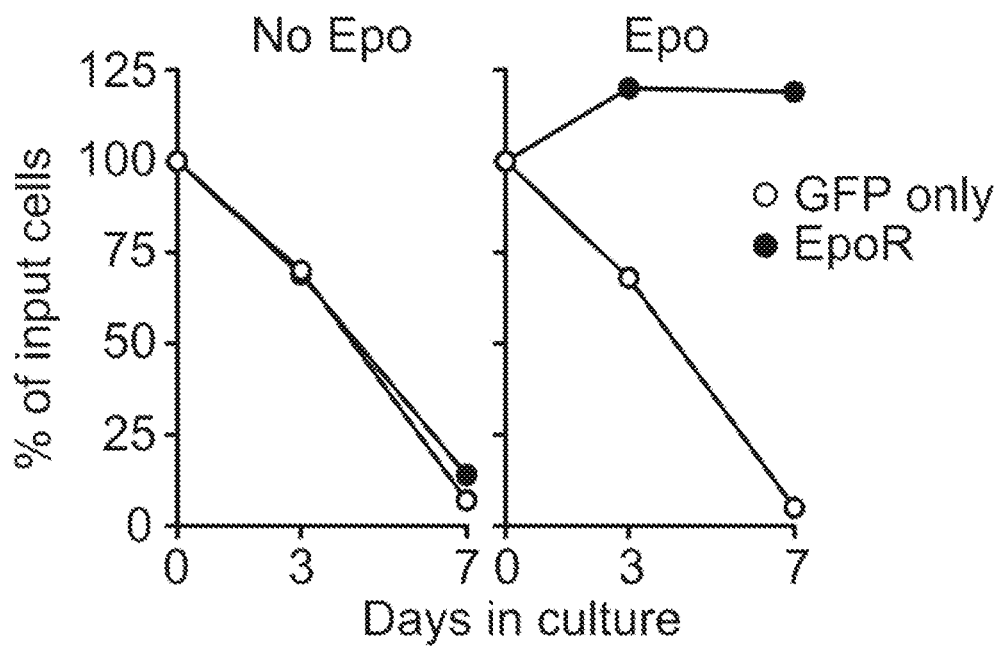

To test whether EpoR was functional, we exposed EpoR-transduced T lymphocytes to Epo (10 IU/mL) for 15 minutes, and measured phosphorylation of STAT5 Y647, one of the downstream activation signals triggered by EpoR ligation in erythroid cells.[26,27] In experiments with T cells from 3 donors, percentage of pSTAT5-positive cells among GFP+ EpoR-transduced T lymphocytes increased from 1.0%±0.9% to 85.9%±5.1% after Epo exposure; it remained essentially unchanged in T lymphocytes transduced with GFP only (1.3%±0.4% to 1.5%±0.7%) (FIG. 1D). After EpoR ligation in erythroid cells, JAK2 kinase phosphorylates STAT5.[28] After exposing EpoR T lymphocytes to the JAK1/2 inhibitor ruxolitinib,[29] STAT5 phosphorylation induced by Epo was abrogated (FIG. 1D). Finally, addition of Epo (4 IU/mL) to EpoR-transduced T cells supported their survival in culture, in the absence of exogenous IL-2 (FIG. 1E). Together, these results show that EpoR can be expressed in T lymphocytes, and that exposure to Epo can transduce survival signals in EpoR-expressing T lymphocytes.

An EpoR Mutant Enhances EpoR Expression in T Cells

Figure 2A:
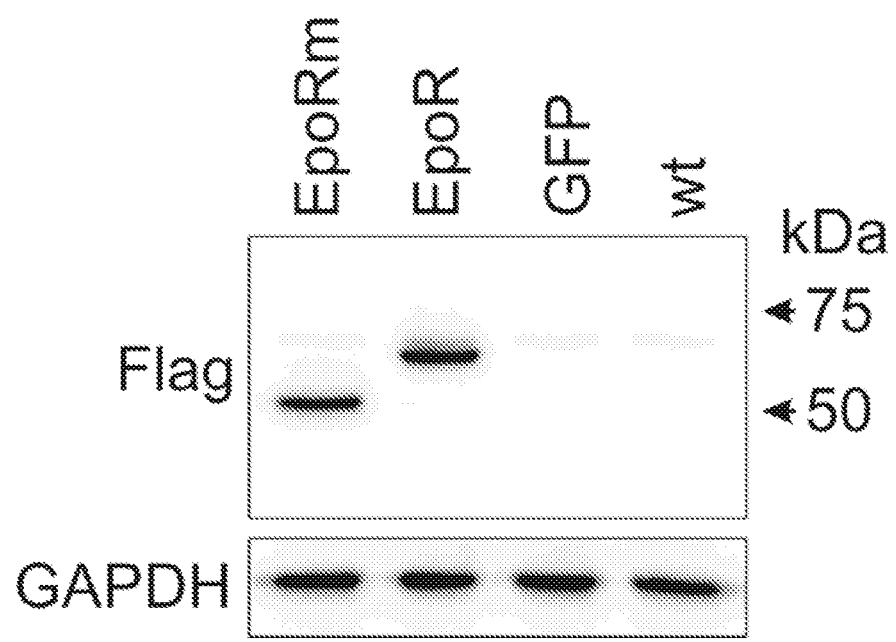
FIGS. 2A-F show that EpoRm has higher and more stable expression than EpoR.
Figure 2B:
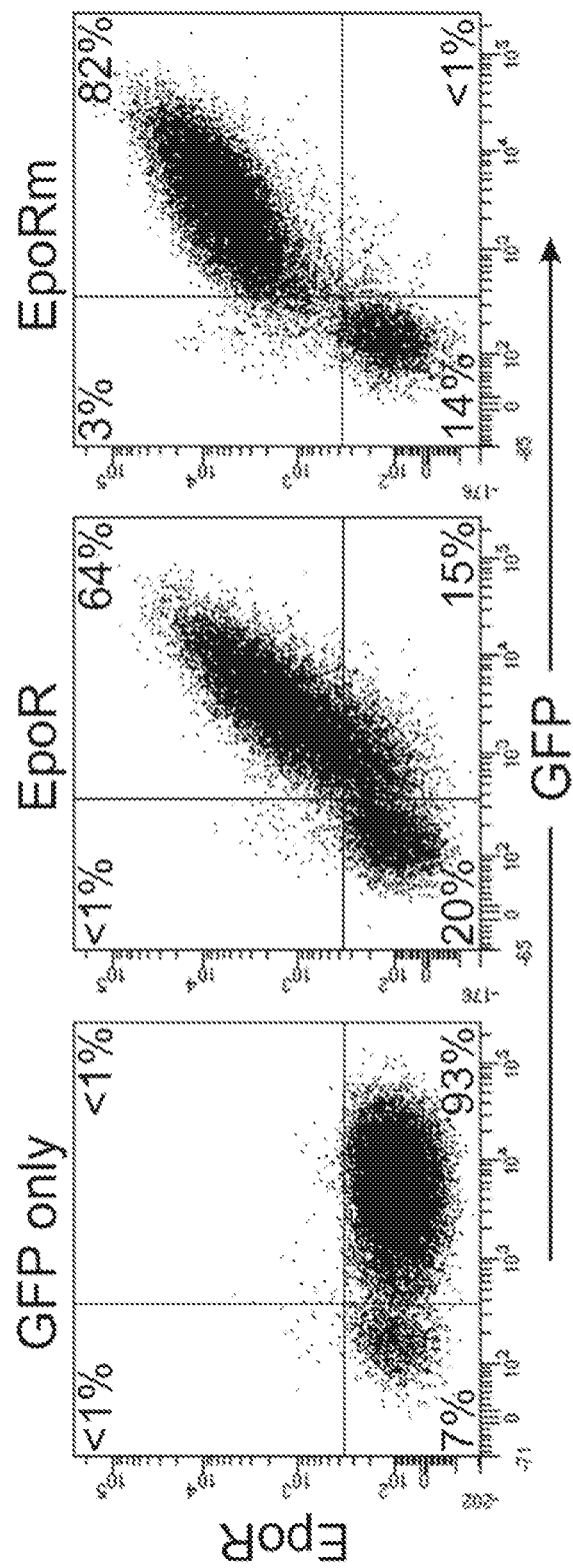
Figure 2C:
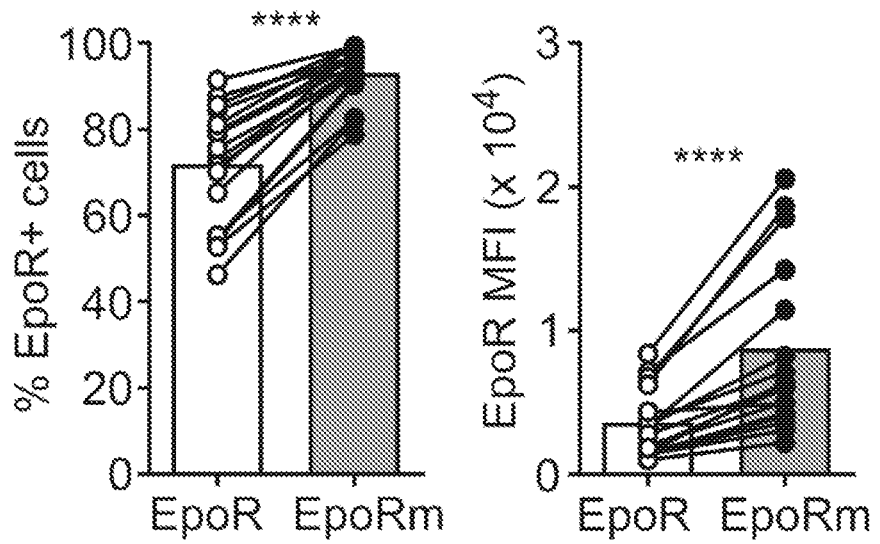
Figure 2D:
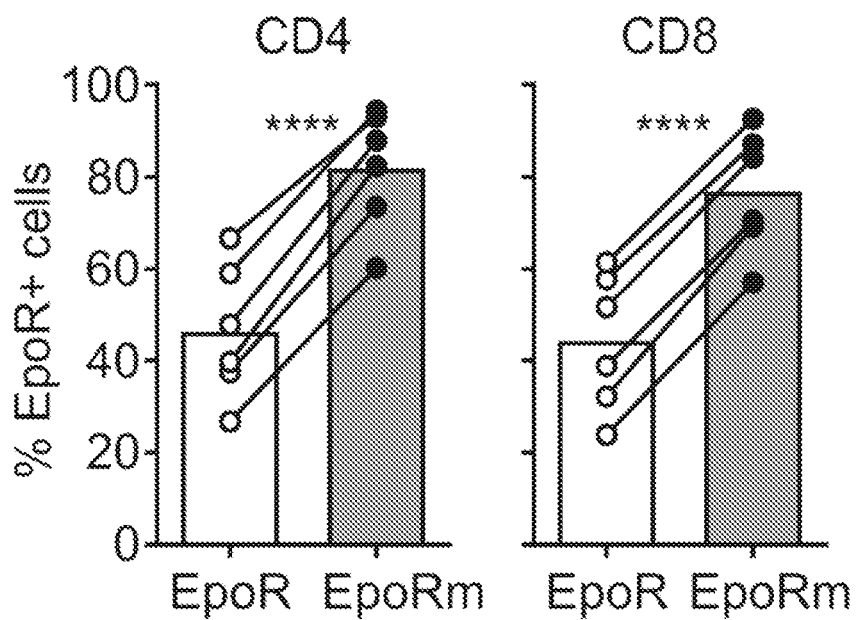

It has been previously reported that nonsense mutations in the EpoR exon 8 produced a truncated form of EpoR with augmented Epo signaling in erythrocyte progenitors, resulting in an increased erythrocyte output.[20,30] We generated a cDNA encoding an EpoR mutant in which a mutation of the codon 439 (TGG) encoding for tryptophan was inserted to change it to the stop codon TAG ("EpoRm"). After expressing the cDNA in 293T cells, we found that the encoded protein had the predicted size of 54 kDa by western blotting, as compared to 62 kDa for EpoR (FIG. 2A). We expressed EpoR and EpoRm in activated peripheral blood T lymphocytes, and observed that levels of expression of EpoRm were consistently higher than those measured for the wild-type EpoR construct in the same T cells (FIG. 2B). Thus, in 18 experiments with T lymphocytes from 7 donors, the percentage of GFP+ T cells expressing EpoR was 71.9%±14.1% as compared to 93.1%±6.1% for EpoRm (P<0.0001 by paired t test); mean fluorescence intensity (MFI) was 3,620±2,449 and 8,773±5,851, respectively (P<0.0001) (FIG. 2C). EpoRm expression was higher regardless of whether cells were CD4+ or CD8+ (FIG. 2D).

Figure 2E:
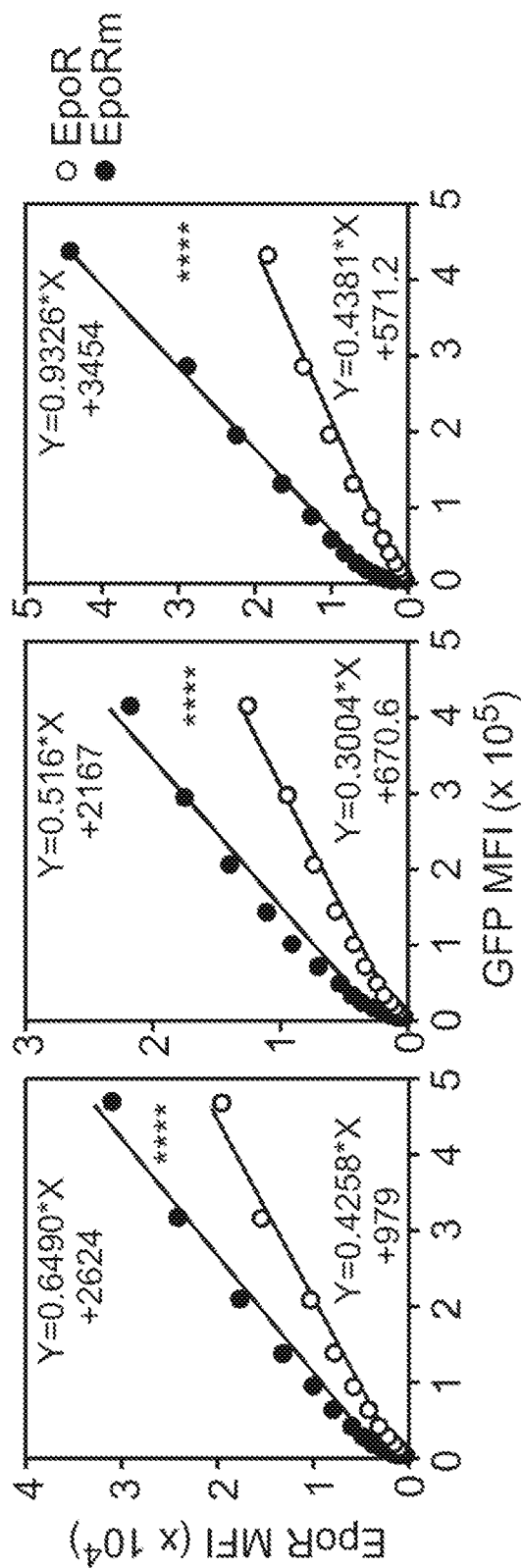

Overall GFP expression in T cells transduced with either EpoR or EpoRm was not significantly different: percentage of GFP+ T cells was 75.2%±8.4% with EpoR and 80.4%±7.5% with EpoRm; MFI was 7,003±2,820 and 8,331±3,343, respectively (P>0.05 for either comparison). Therefore, it is unlikely that differences in expression between the 2 receptors was simply due to different transduction efficiency. Nevertheless, we addressed this possibility and performed a detailed analysis of the levels of receptor expression in relation to a given level of GFP expression in 3 experiments. By these measurements, EpoRm expression was higher than that of EpoR (FIG. 2E; P<0.0001 for all 3 comparisons).

Figure 2F:
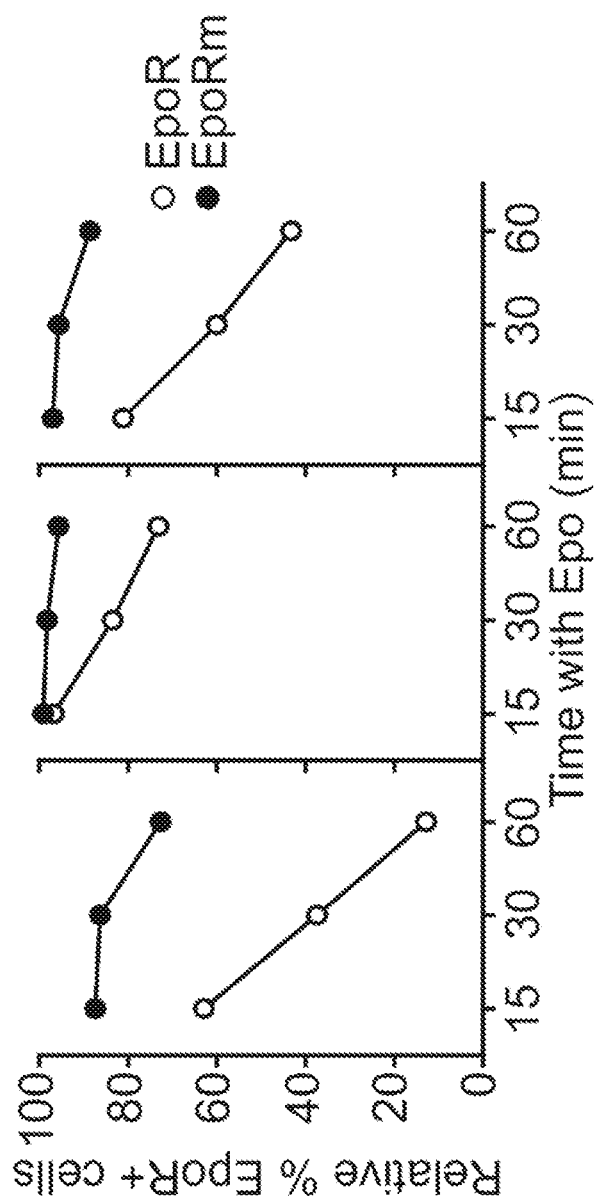

Higher expression of EpoRm was associated with a longer persistence after exposure to Epo. In experiments with T cells from 3 donors, reduction in percentage of EpoR-positive cells was clearly higher in cells transduced with EpoR than in those transduced with EpoRm (FIG. 2F).

Signaling Properties of EpoRm

Figure 3A:
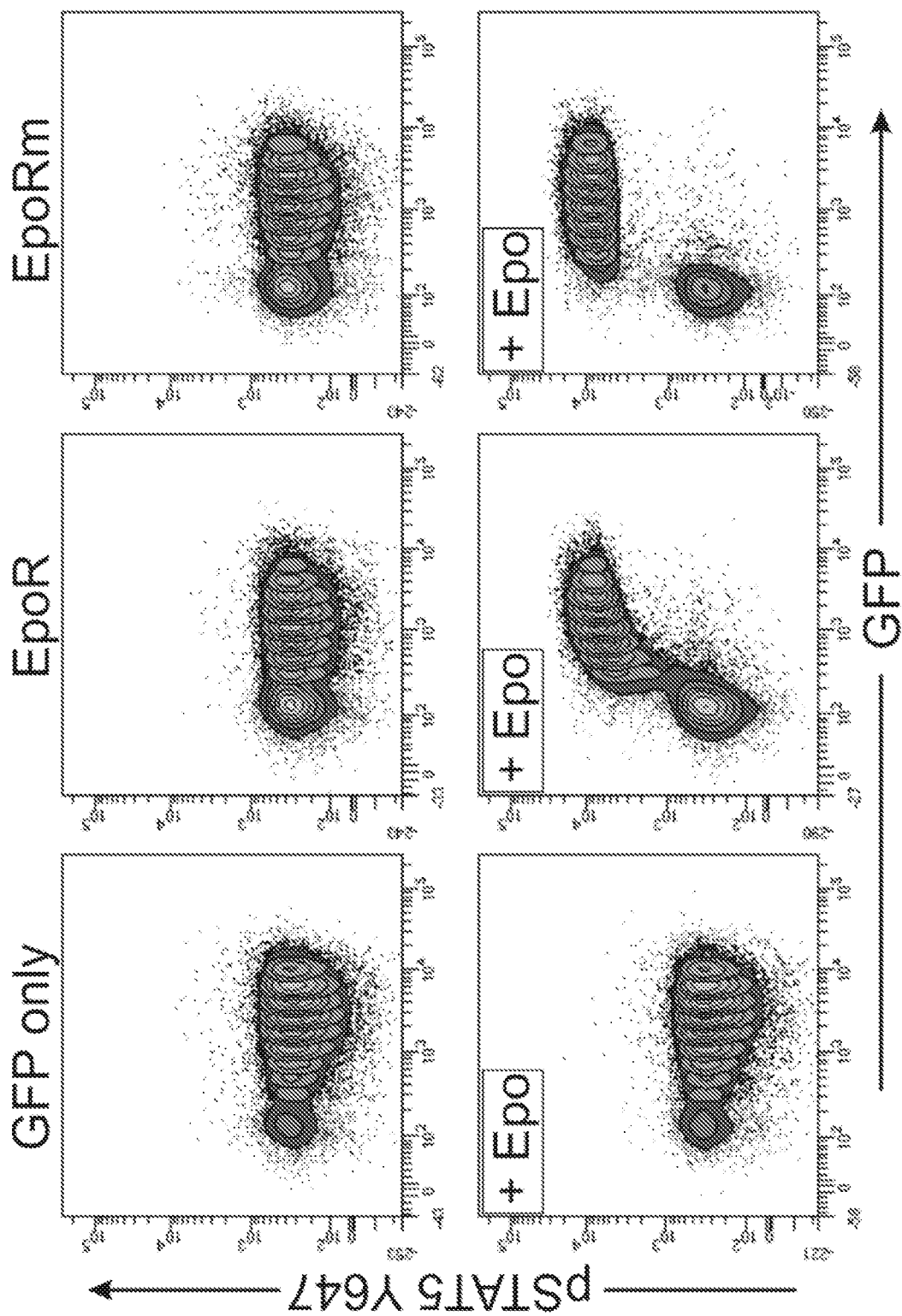
FIGS. 3A-E show that EpoRm enhances Epo signaling.
Figure 3B:
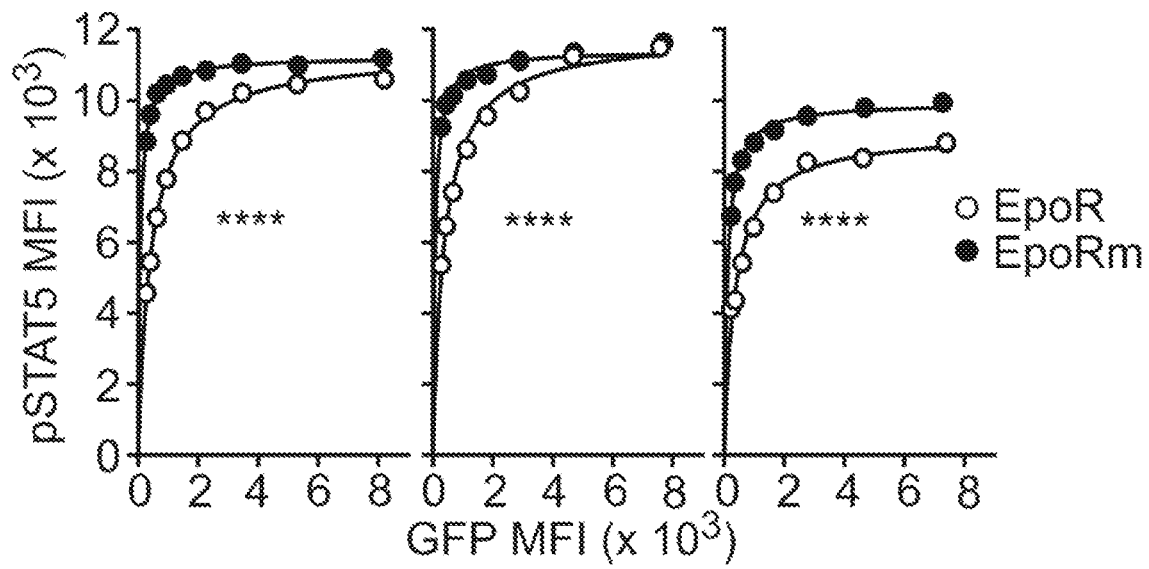
Figure 3C:
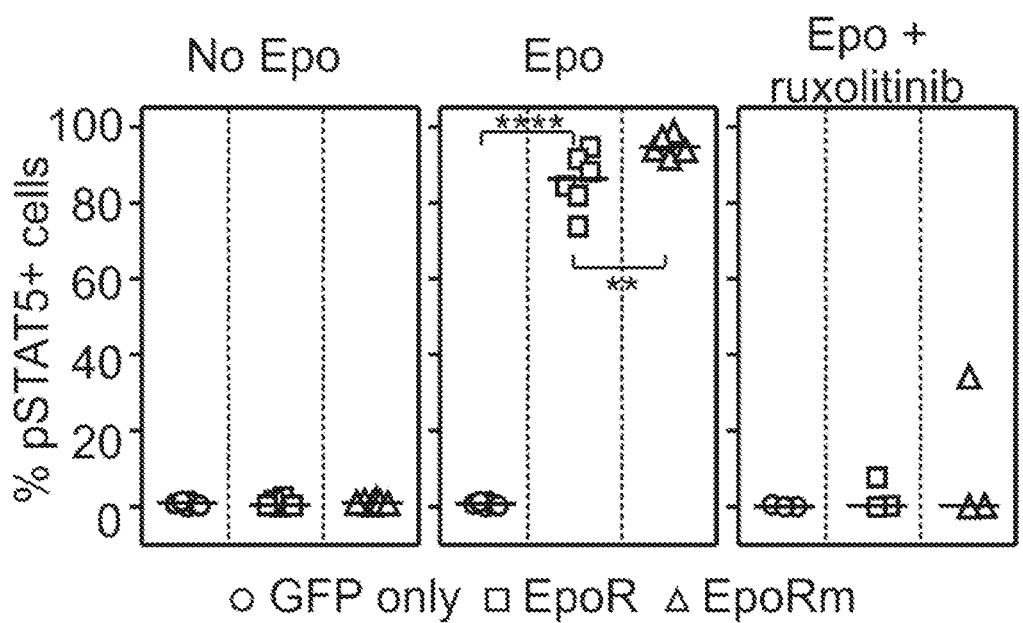
Figure 3D:
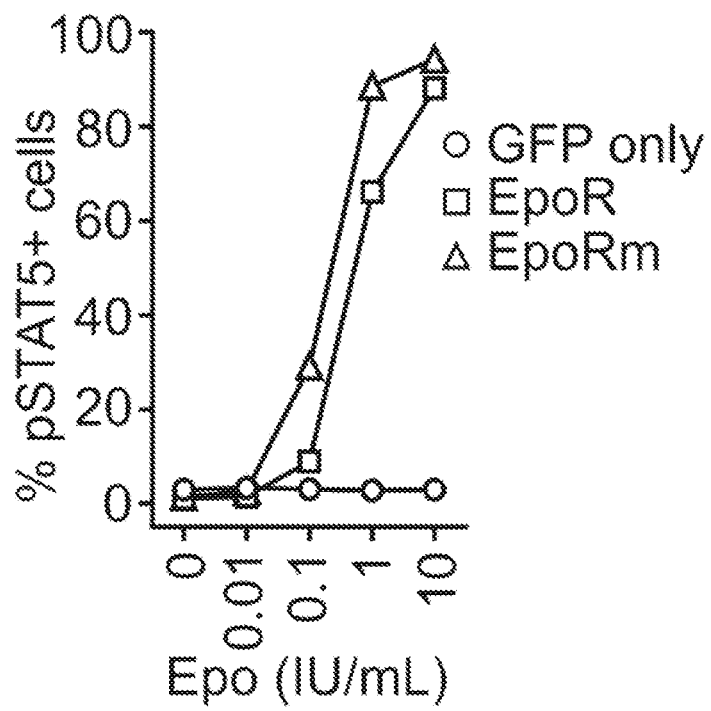
Figure 3E:
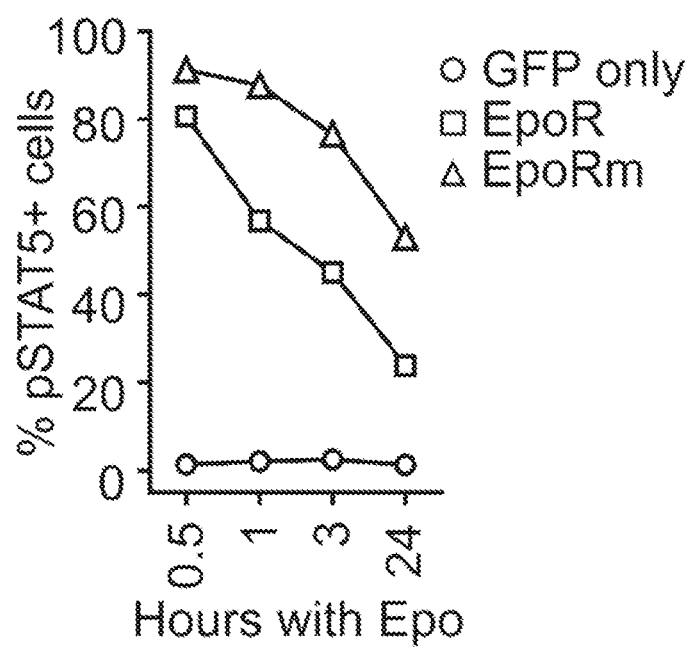

In line with the higher and more sustained expression of EpoRm, exposure of T cells to Epo resulted in more vigorous activation if these cells expressed EpoRm. EpoRm T cells had higher pSTAT5 Y647 phosphorylation than EpoR T cells, which was suppressed by exposure to the JAK1/2 inhibitor ruxolitinib (10 µM) (FIG. 3A, B, C). The higher STAT5 phosphorylation caused by EpoRm was corroborated by an analysis of pSTAT5 Y647 MFI according to levels of GFP. At any given level of retroviral transduction measured by GFP, pSTAT5 MFI was higher with EpoRm, which approached a plateau in pSTAT5 signaling at lower levels of transduction (FIG. 3B). STAT5 phosphorylation triggered by Epo was dose-dependent, and EpoRm required lower Epo levels to induce STAT5 phosphorylation. Thus, in 2 experiments, the average pSTAT5 Y647 with a dose of 0.1 IU/mL was 8.9% for EpoR versus 29.1% with EpoRm; it was 66.1% versus 88.6% with 1 IU/mL of Epo (FIG. 3D). STAT5 phosphorylation was also more durable in cells expressing EpoRm than in those expressing EpoR (FIG. 3E).

Figure 4A:
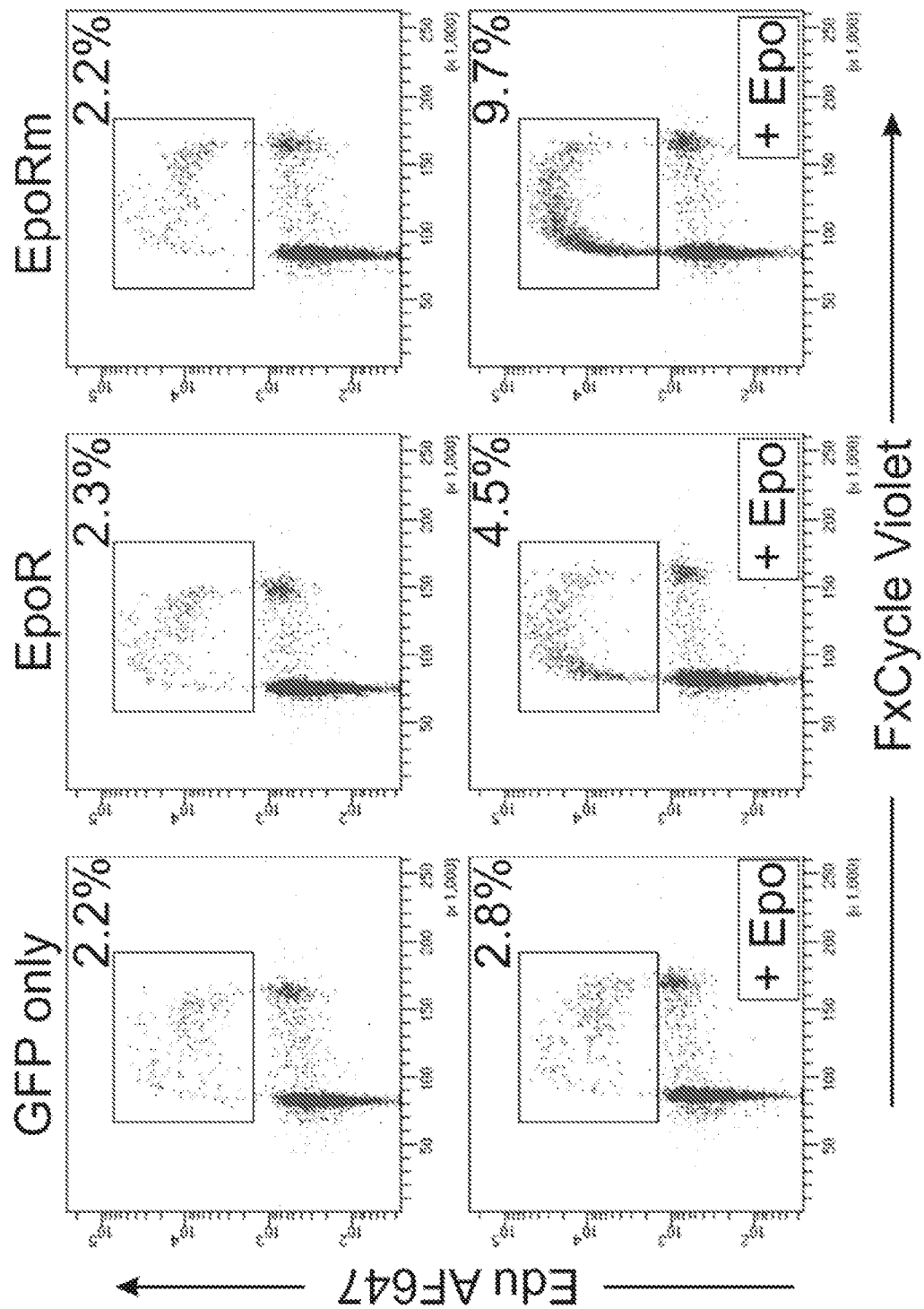
FIGS. 4A-D show proliferation and survival signals induced by EpoRm in T cells.
Figure 4B:
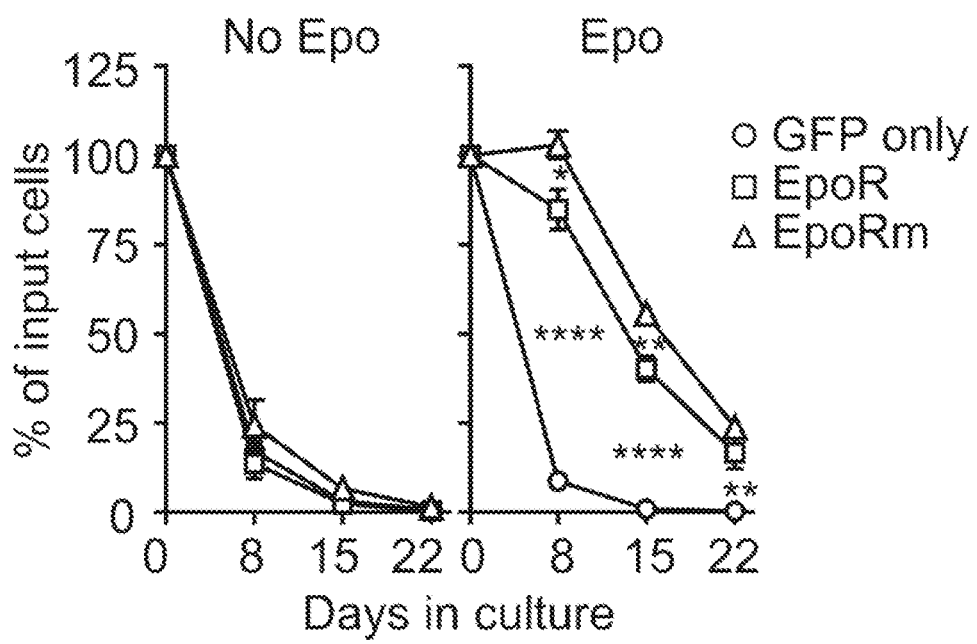

Exposure to Epo for 24 hours elicited DNA synthesis in T cells bearing Epo receptors, and stimulation was higher in those expressing EpoRm (FIG. 4A). In the absence of IL-2, T cells rapidly died regardless of Epo receptor expression. However, when Epo was added to the culture, those expressing Epo receptors persisted for at least 2 weeks, with cultures of T cells expressing EpoRm yielding higher cell numbers (FIG. 4B).

Figure 4C:
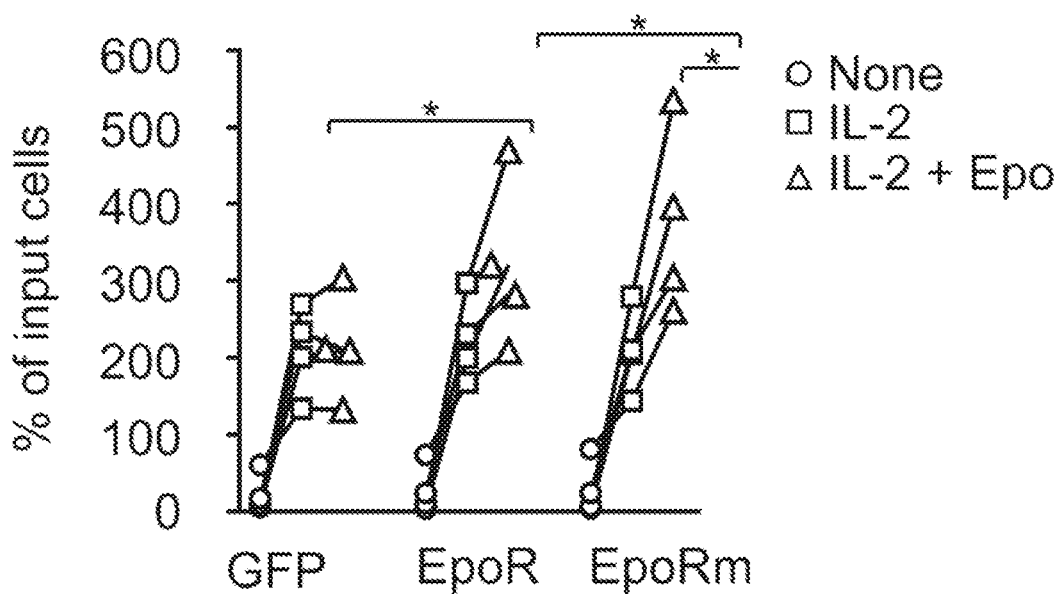
Figure 4D:
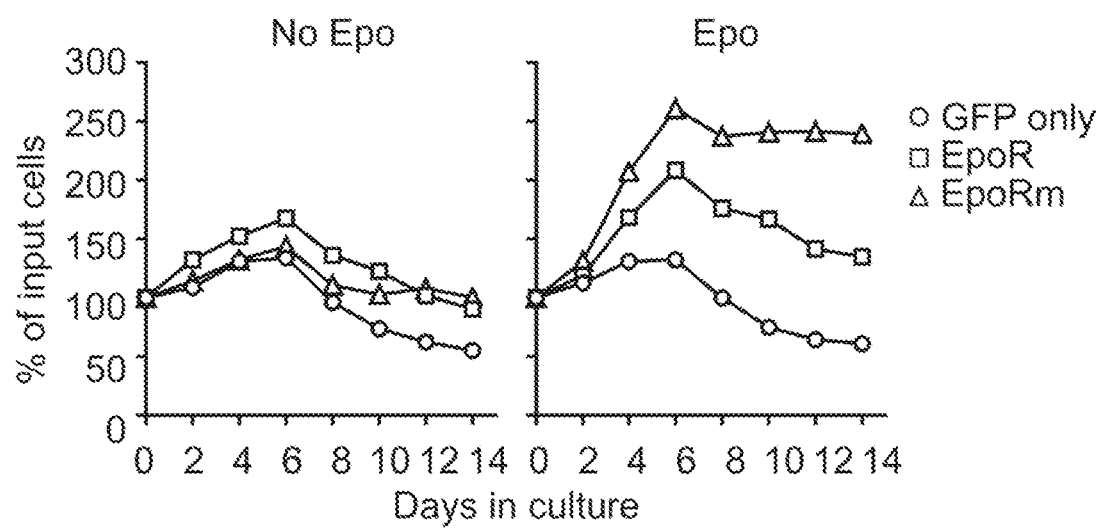

We determined whether Epo stimulation would further improve T cell recovery if cells were cultured in the presence of 100 IU/mL of IL-2. In experiments with cells from 4 donors, recovery of T cells transduced with EpoRm was significantly higher after 7 days of culture when Epo (10 IU/mL) was added to IL-2 (100 IU/mL) (P=0.020); under these conditions, cell recovery was better than with cell transduced with EpoR (P=0.019) (FIG. 4C). In separate cultures prolonged for 14 days, T cells expressing Epo receptors show higher and more durable expansion than those transduced with GFP only; again, EpoRm cells performed better than EpoR cells (FIG. 4D).

Functional Activity of Simultaneously Expressed EpoRm and CAR

Figure 5B:
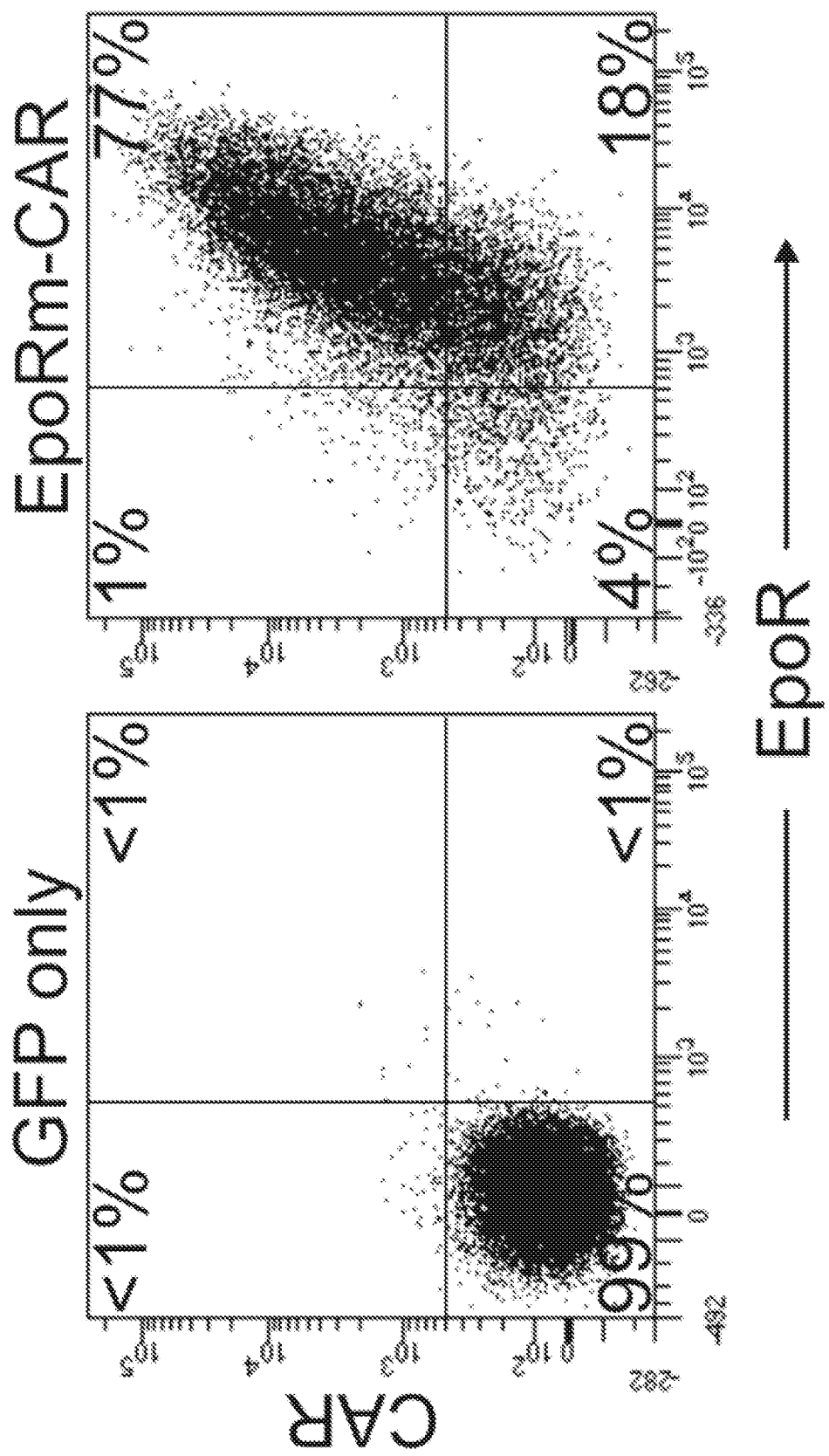
Figure 5C:
Figure 5D:
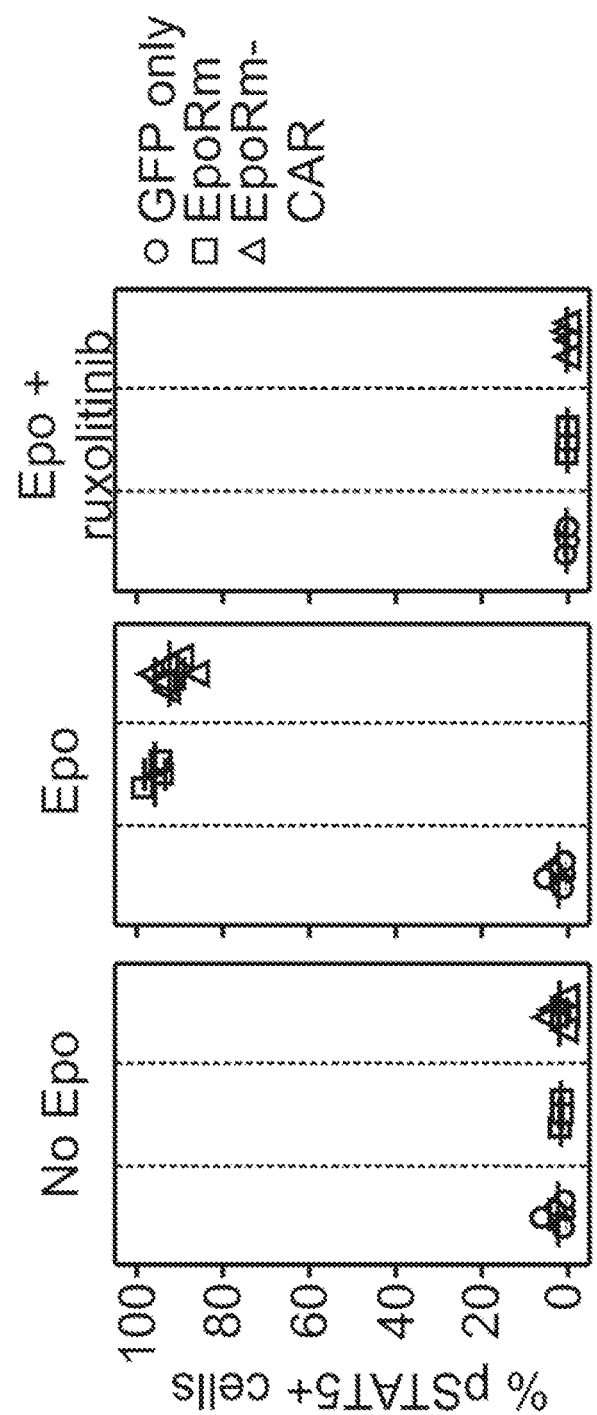

The previous experiments indicated that EpoRm had higher expression, and produced stronger and more durable signals than the wild-type Epo receptor in T cells. Therefore, we incorporated the gene encoding EpoRm in a bicistronic vector also containing the gene encoding an anti-CD19-41BB-CD3ζ CAR developed in our laboratory (FIG. 5A).[21] Transduction of this construct in T lymphocytes resulted in expression of both EpoRm and CAR (FIG. 5B), and either gene was expressed at levels which were similar to those of cells transduced with a single-gene vector (FIG. 5C). The functionality of EpoRm was maintained regardless of whether it was expressed alone or in combination with the CAR (FIG. 5D).

Figure 8A:
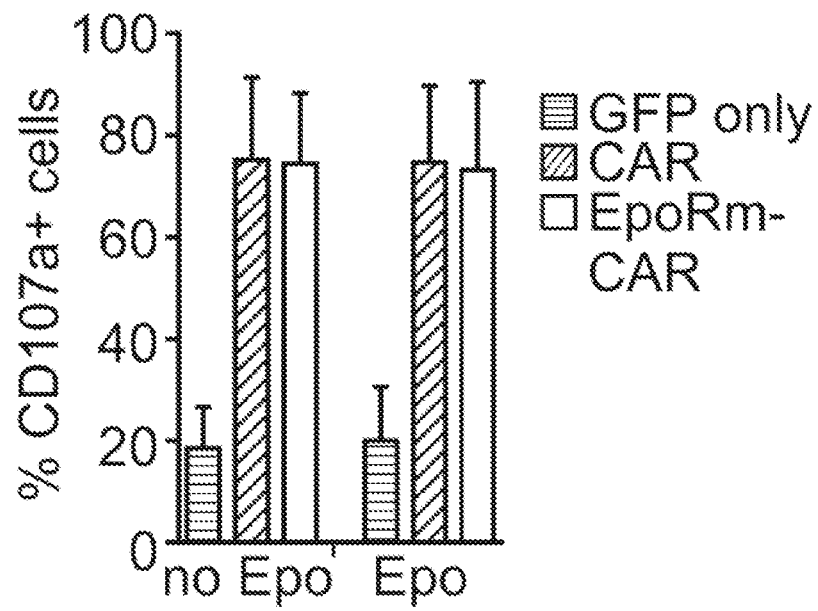
FIGS. 8A-C show degranulation and cytokine release profile of EpoRm-CAR T cells.
Figure 8B:
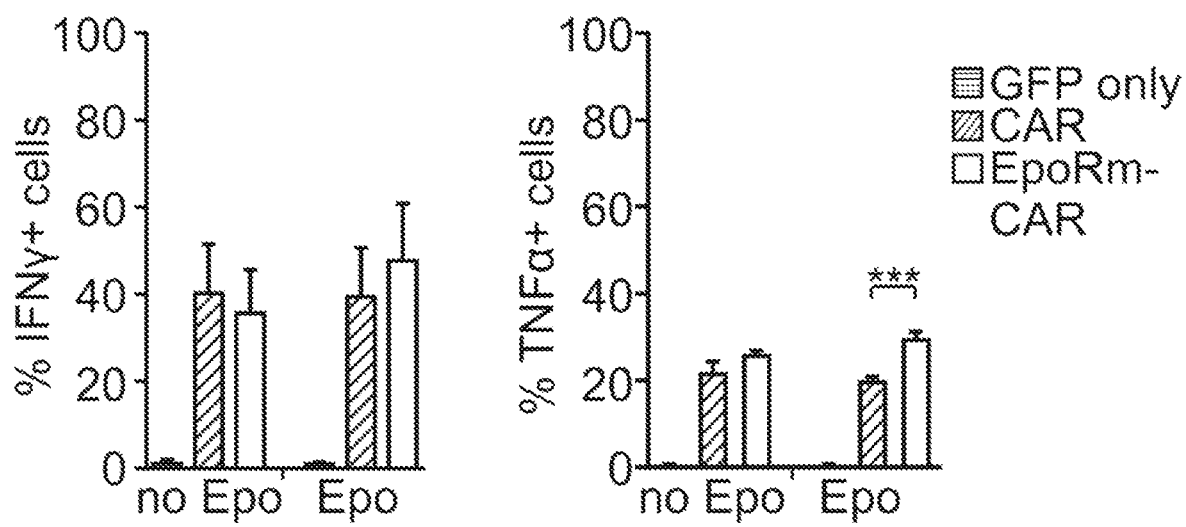
Figure 8C:
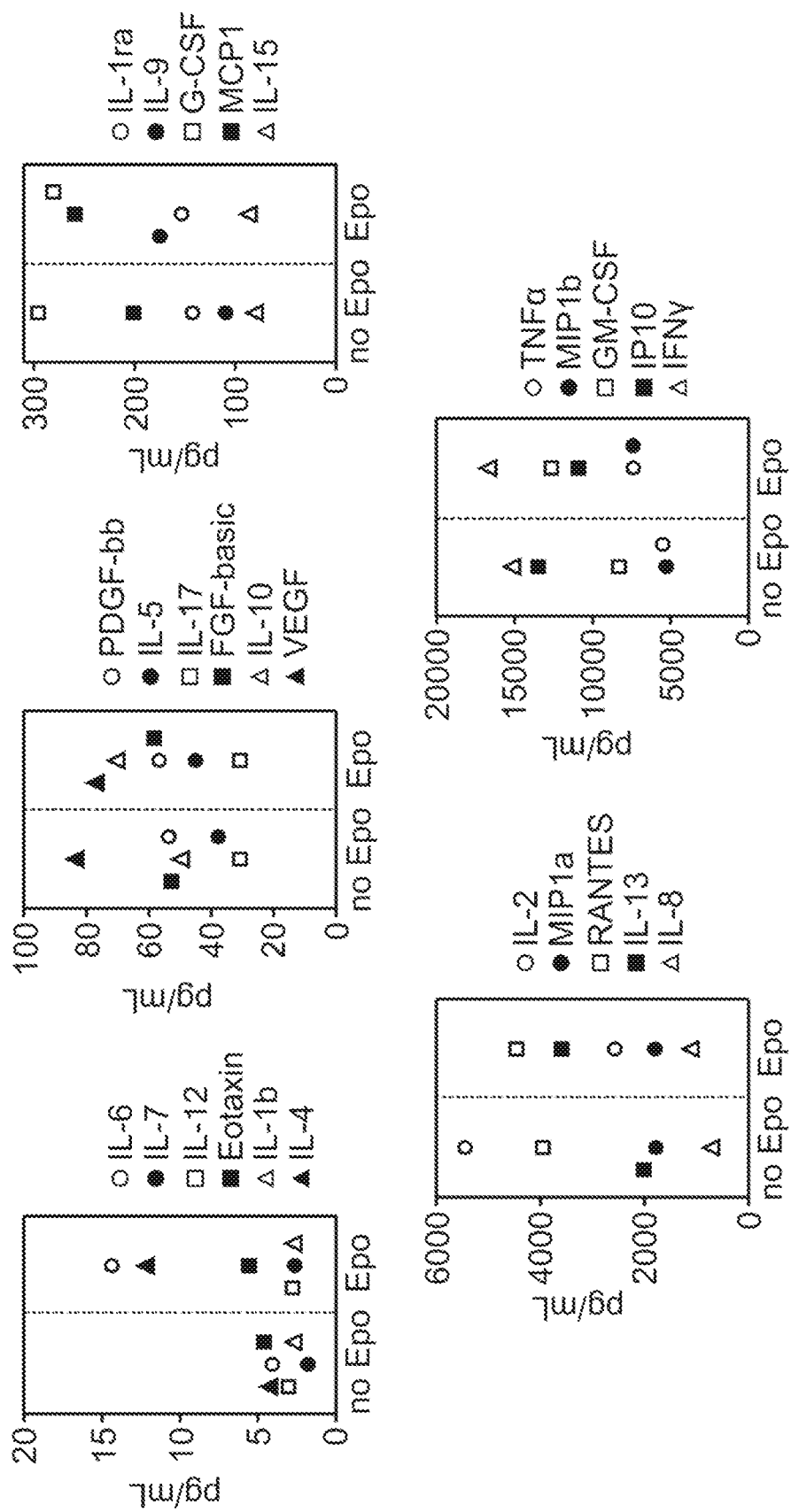

CAR-T cell function was also retained in cells expressing EpoRm. Thus, there were no differences in exocytosis of cytotoxic granules, as measured by CD107a expression after 4 hours of co-culture with the CD19+ ALL cell line OP-1 cells, regardless of whether CAR-T cells expressed EpoRm or whether there was Epo in the cultures (FIG. 8A). Secretion of IFNγ triggered by CAR stimulation under the same culture conditions was also not affected by Epo signaling, but we observed that EpoRm-CAR-T cells secreted more TNFα in the presence of Epo than CAR-T cells lacking EpoRm (P<0.001) (FIG. 8B). The cytokine profile of EpoRm-CAR T cells co-cultured with OP-1 cells with and without Epo, was generally similar, although we noted higher levels of IL-6 and IL-4 and lower levels of IL-2 in cells cultured with Epo (FIG. 8C).

Figure 5E:
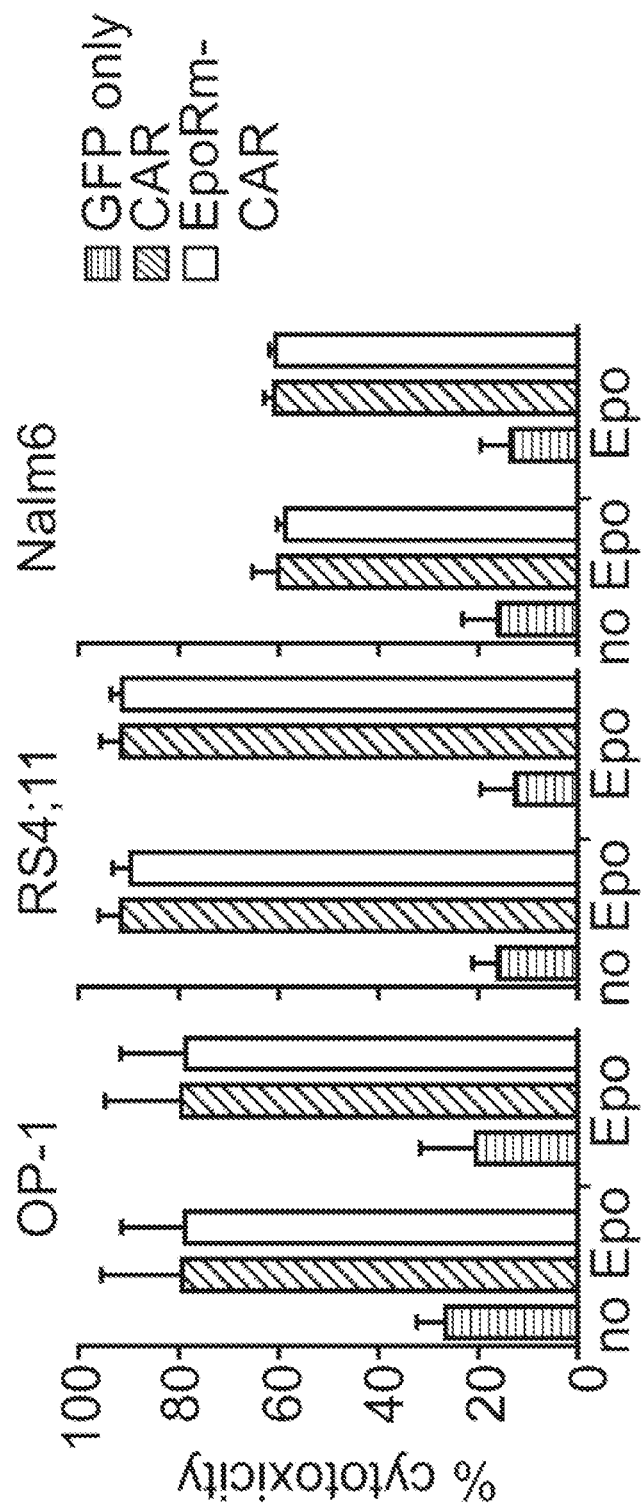
Figure 5F:
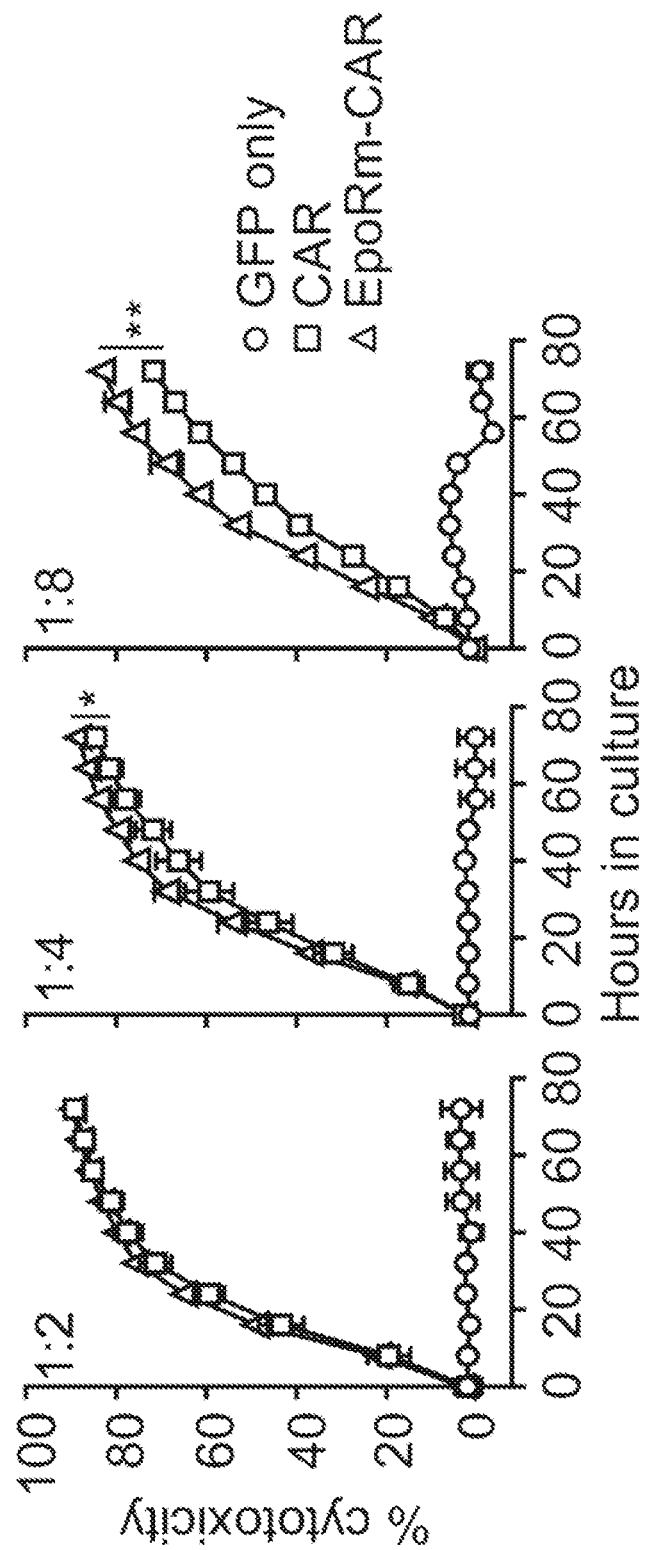

We determined the capacity of EpoRm-CAR T cells to kill CD19+ target cells. In experiments with 3 ALL cell lines (OP-1, RS4; 11 and Nalm6), 4-hours cytotoxicity of these T cells at 1:1 E:T was indistinguishable from that of T cells transduced with CAR alone, regardless of whether Epo (10 IU/mL) was added to the cultures (FIG. 5E). However, when cytotoxicity was tested over 72-hours in the presence of Epo there was a significantly higher killing by EpoRm-CAR T cells over that of CAR-T cells at low (1:4, 1:8) E:T ratios (FIG. 5F).

Proliferative Signals of Epo and IL-2 in EpoRm-CAR T Cells

Figure 6A:
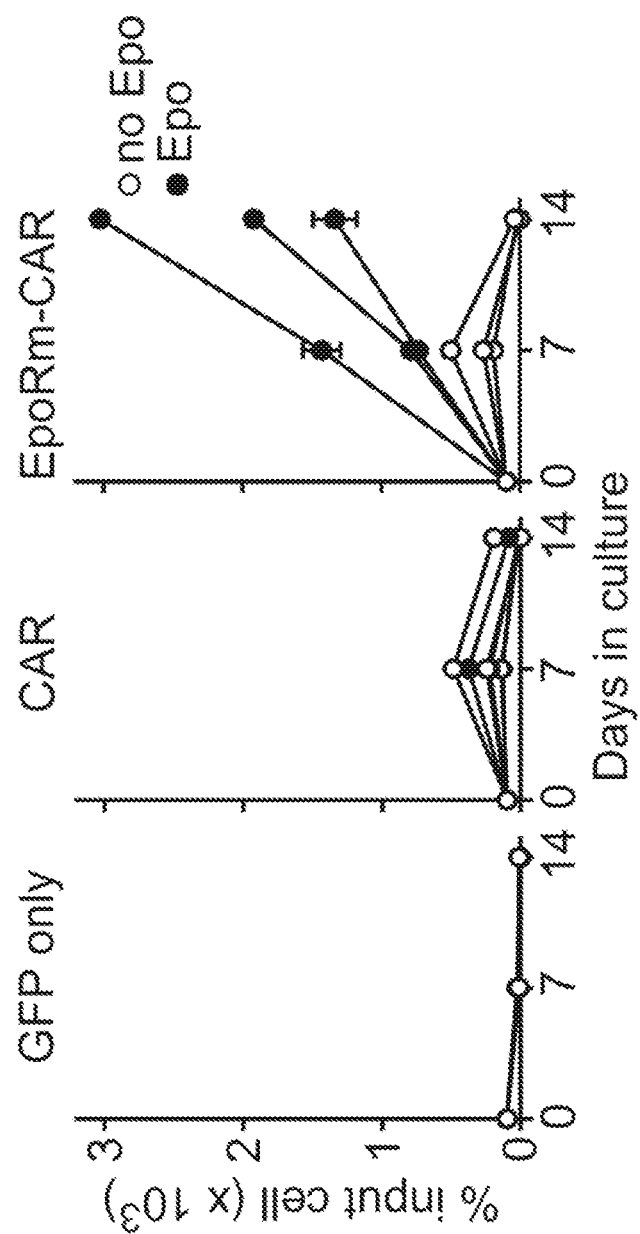
FIGS. 6A-F show that Epo supports the proliferation of EpoRm-CAR T cells.
Figure 6B:
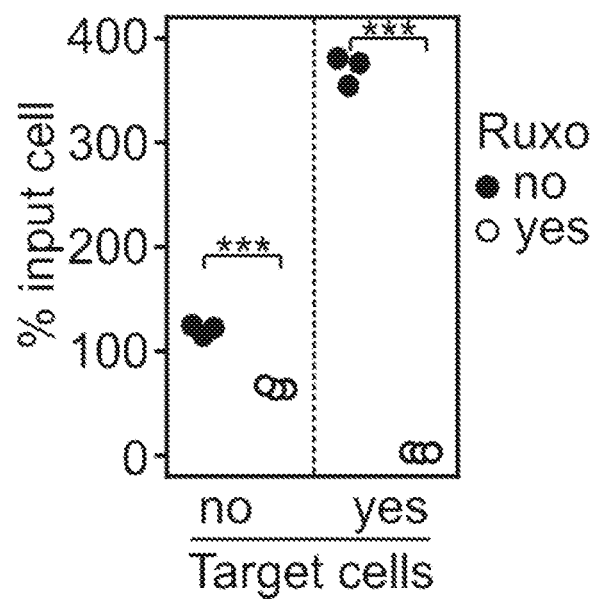
Figure 6C:
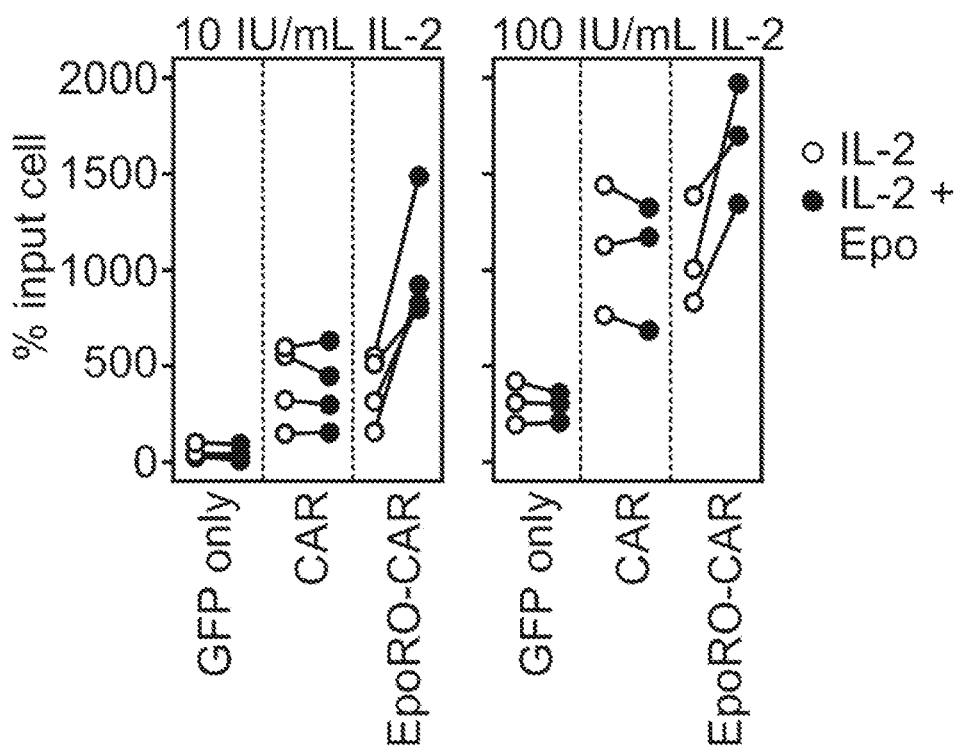

The higher killing exerted by EpoRm-CAR T cells in long-term cultures might be explained by a higher rate of proliferation of these cells, thereby creating a higher E:T ratio. To test this notion, we co-cultured T cells, transduced with EpoRm-CAR, CAR alone or GFP, with Streck-treated or irradiated OP-1 cells, and monitored T cell growth over 2 weeks. We added Epo (10 IU/mL) to the cultures but no exogenous IL-2. As shown in FIG. 6A, the expansion of T cells from 3 donors was higher when CAR-T cells expressed EpoRm, indicating that the CAR-driven cell proliferation is enhanced by EpoRm signaling. EpoRm-CAR T cell proliferation was abrogated by ruxolotinib (1 µM) (FIG. 6B). To determine whether Epo stimulation could add to the stimulation provided by exogenous IL-2, we assessed T cell recovery in co-culture with irradiated OP-1 after 7 days, in the presence of either 10 IU/mL (4 donors) or 100 IU/mL of IL-2 (3 donors). CAR-stimulated EpoRm-CAR T cells cultured with both IL-2 and Epo had considerably higher expansion than those cultured with IL-2 alone (FIG. 6C).

Figure 6D:
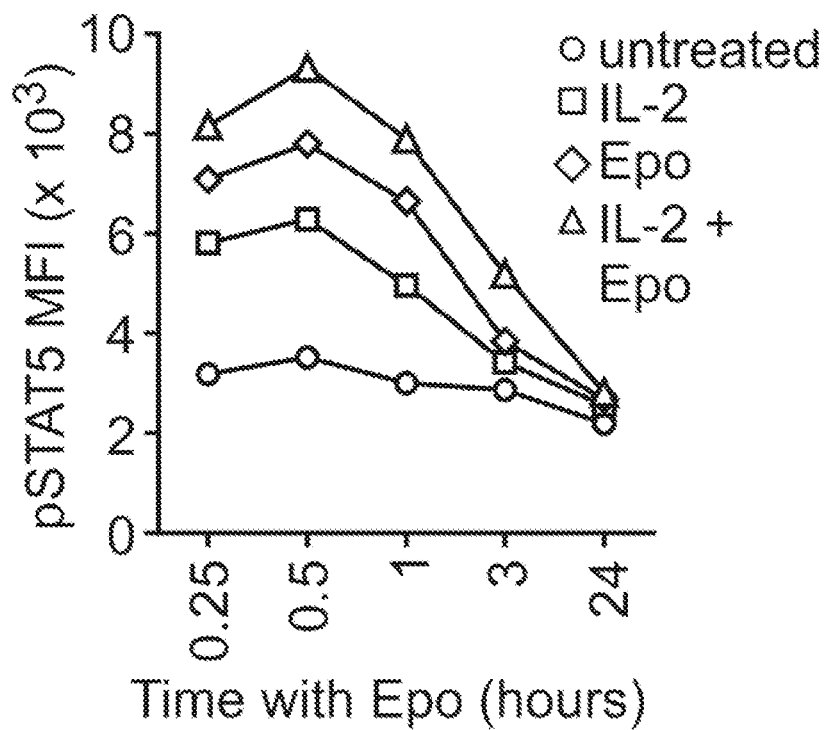
Figure 6E:
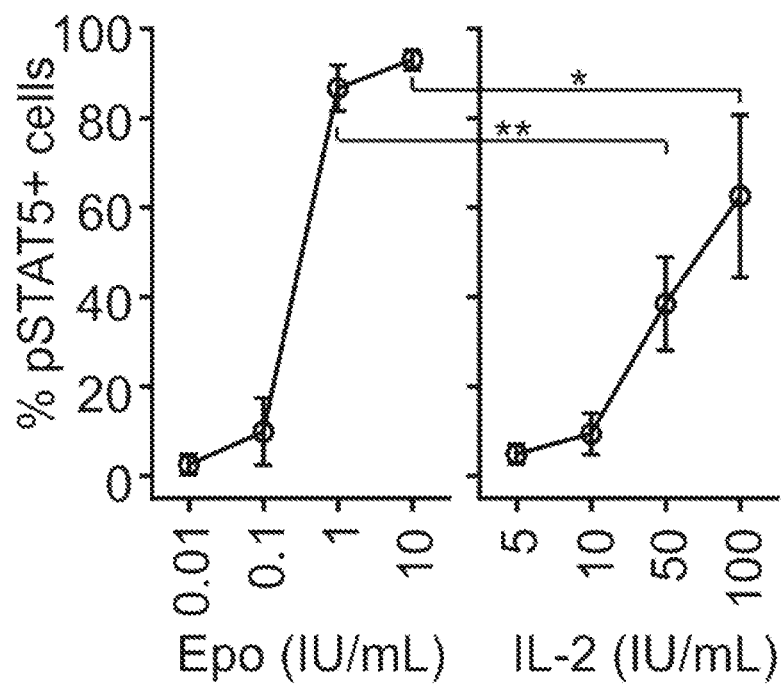
Figure 6F:
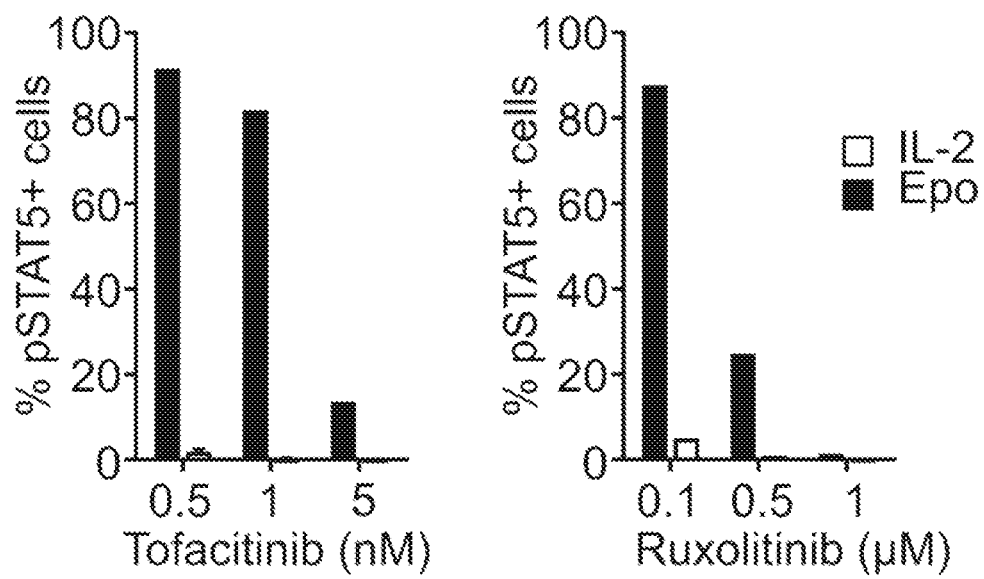

To further determine the relation between IL-2- and Epo-triggered signaling, we measured STAT5 Y647 phosphorylation. As shown in FIG. 6D, cells exposed to Epo and IL-2 had higher pSTAT5 MFI than those exposed to either growth factor. In side-to-side comparisons, the pSTAT5 levels induced by 1 IU/mL of Epo were significantly higher than those induced by 50 IU/mL IL-2 (P=0.0019) and surpassed those induced by 100 IU/mL of IL-2) (FIG. 6E). Finally, we determined the relative sensitivity to JAK inhibitors of EpoRm-CAR T cells exposed to either Epo (10 IU/mL) or IL-2 (100 IU/mL). We used tofacitinib, which predominantly inhibits JAK3, and ruxolitinib, which predominantly inhibits JAK1 and JAK2 signaling.[29,31] At concentration that completely abrogated STAT5 Y647 phosphorylation caused by IL-2, the inhibitors had no effect of Epo signaling (FIG. 6F). Hence, EpoRm signaling in CAR-T cells triggers a signaling cascade that is distinct from that of IL-2, and enhances the proliferative stimulus of IL-2.

Xenograft Models

Figure 7A:
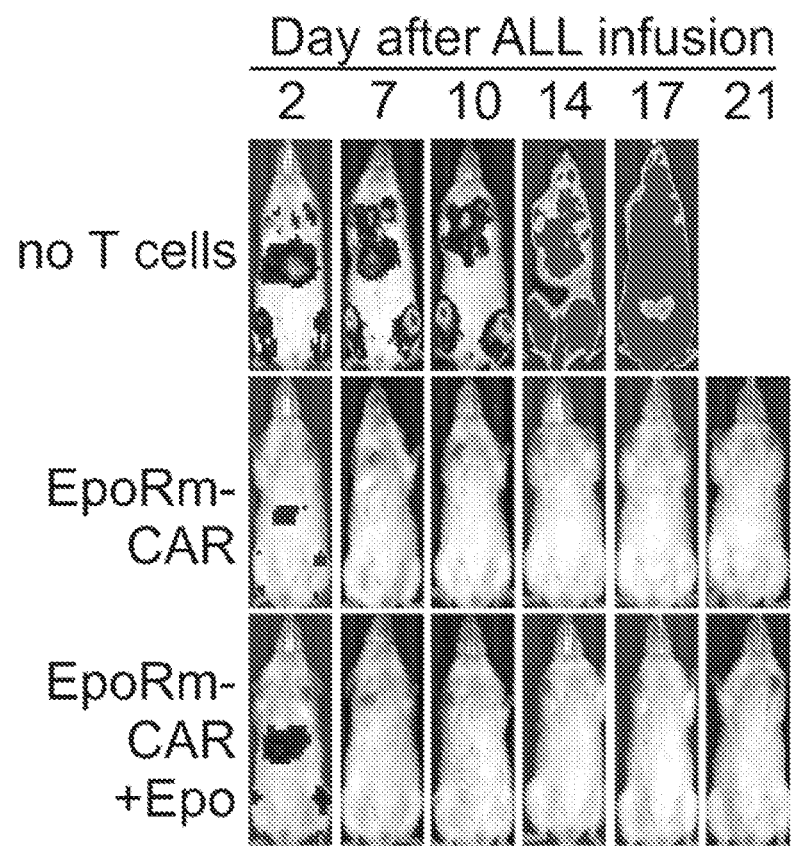
FIGS. 7A-E show in vivo tumor killing and expansion of EpoRm-CAR T cells in immunodeficient mice.
Figure 7B:
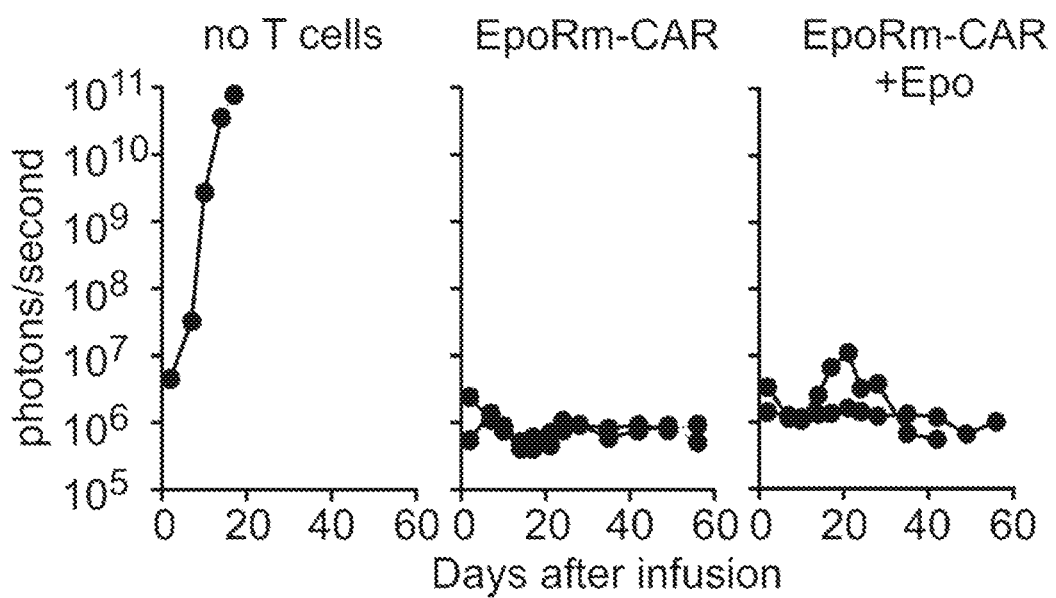

To begin to assess the anti-leukemic activity of EpoRm-CAR-T cells in vivo, we infused 5 NSG mice with luciferase-labelled CD19+ Nalm6 ALL cells i.v. After confirming engraftment 2 days later, 4 mice received EpoRm-CAR-T cells i.v. and 1 was left untreated. As shown in FIGS. 7A and B, ALL cells rapidly expanded in the untreated mice, while the treated mice were in remission 2 months after leukemic cell infusion. Of note, injection of 100 IU Epo i.p. in 2 of these mice 3 times a week for 2 weeks did not affect the anti-leukemic activity of the EpoR-CAR-T cells (FIG. 7A).

Figure 7C:
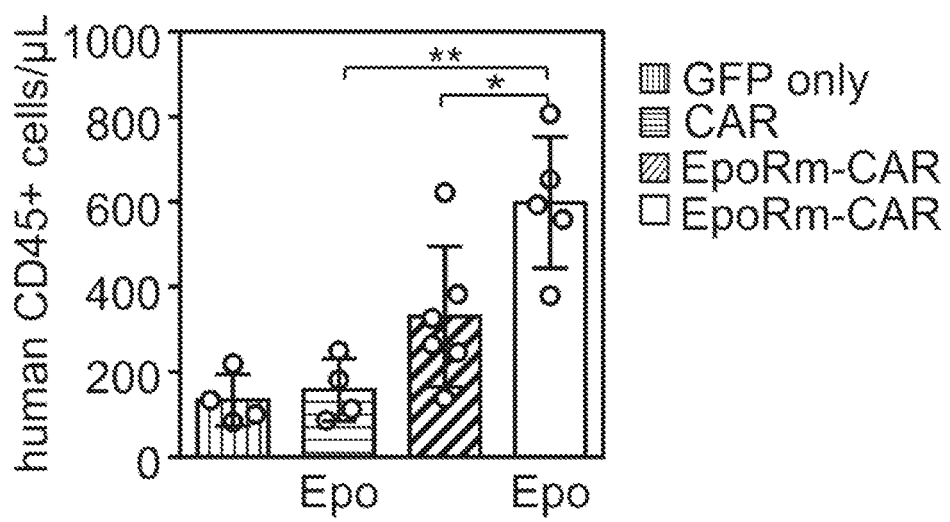
Figure 7D:
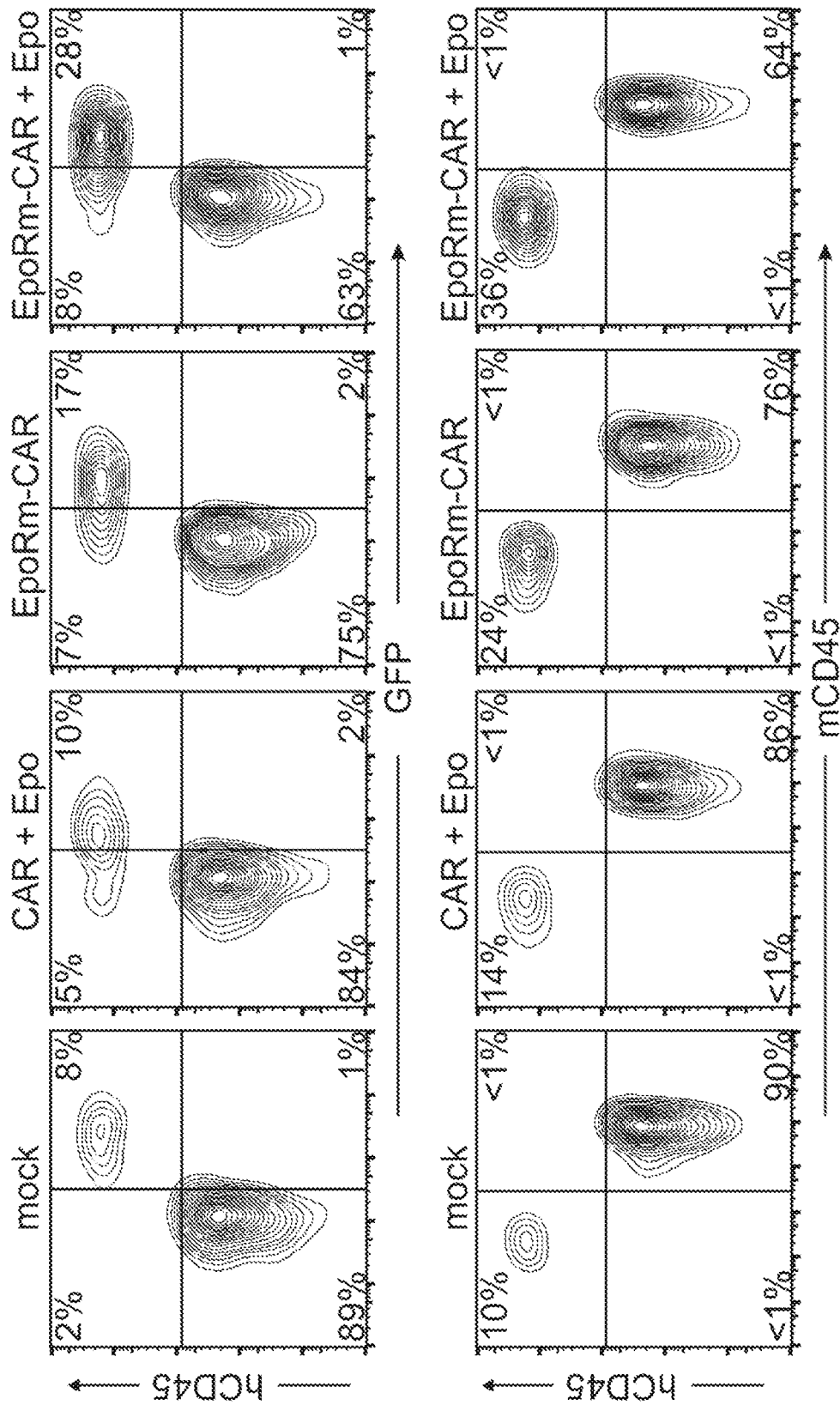
Figure 7E:
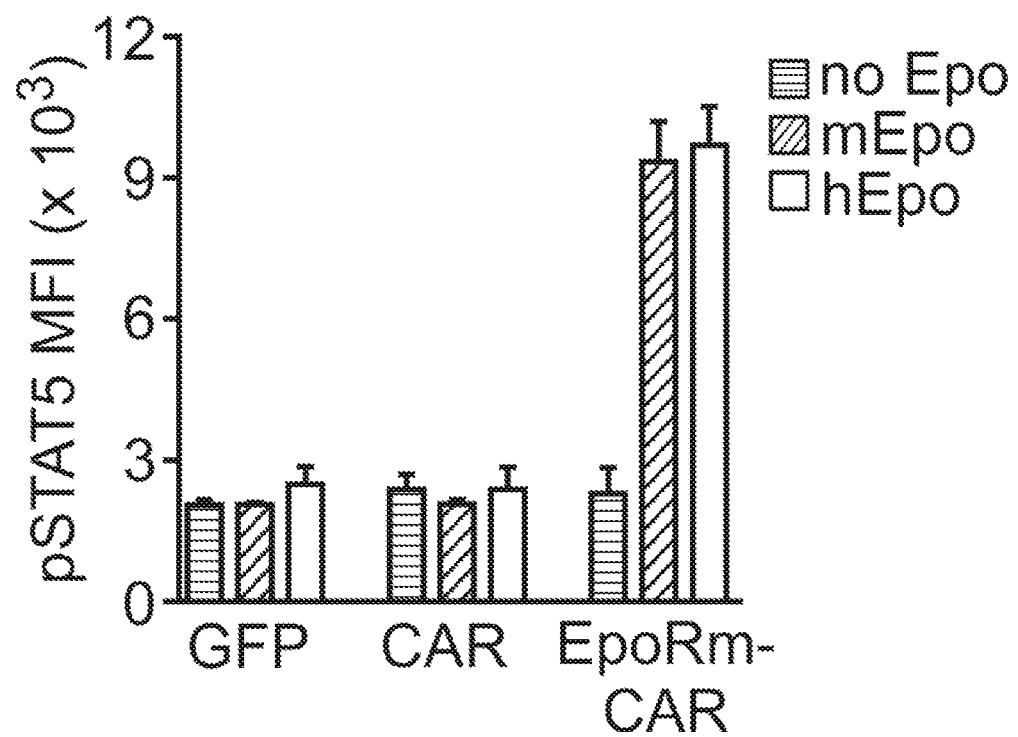

In a second set of experiments, T lymphocytes transduced with CAR, or EpoRm-CAR of GFP alone were injected i.v. into NSG mice. On day 13 after injection, peripheral blood was examined for the presence of cells expressing GFP and human CD45. As shown in FIGS. 7C and D, levels of GFP+/hCD45+ cells in mice injected with EpoRm-CAR-T cells were higher than those measured in mice injected with cells transduced with GFP only, or with CAR lacking EpoRm; injection of 100 IU Epo i.p. 3 times a week for 2 weeks in the latter group did not significantly increase cell numbers. Levels of GFP+/hCD45+ cells were highest in mice injected with EpoRm-CAR-T cells who received Epo i.p. injections. Notably, however, a significant increase in GFP+/hCD45+ cells was evident in those who had not received Epo injections, although levels were lower than with Epo supplementation. This result suggested that endogenous murine Epo might stimulate cells expressing human EpoRm. Indeed, there is considerable homology between murine and human Epo genes.[32] To determine whether murine Epo could induce signals through human EpoRm in T cells, we examined pSTAT5 Y647 following murine and human Epo stimulation. As shown in FIG. 7E, either produced similar increases in pSTAT5, providing an explanation for the relative increase in GFP+/hCD45+ cells observed when EpoRm-CAR-T cells were infused without human Epo supplementation.

Figure 9A:
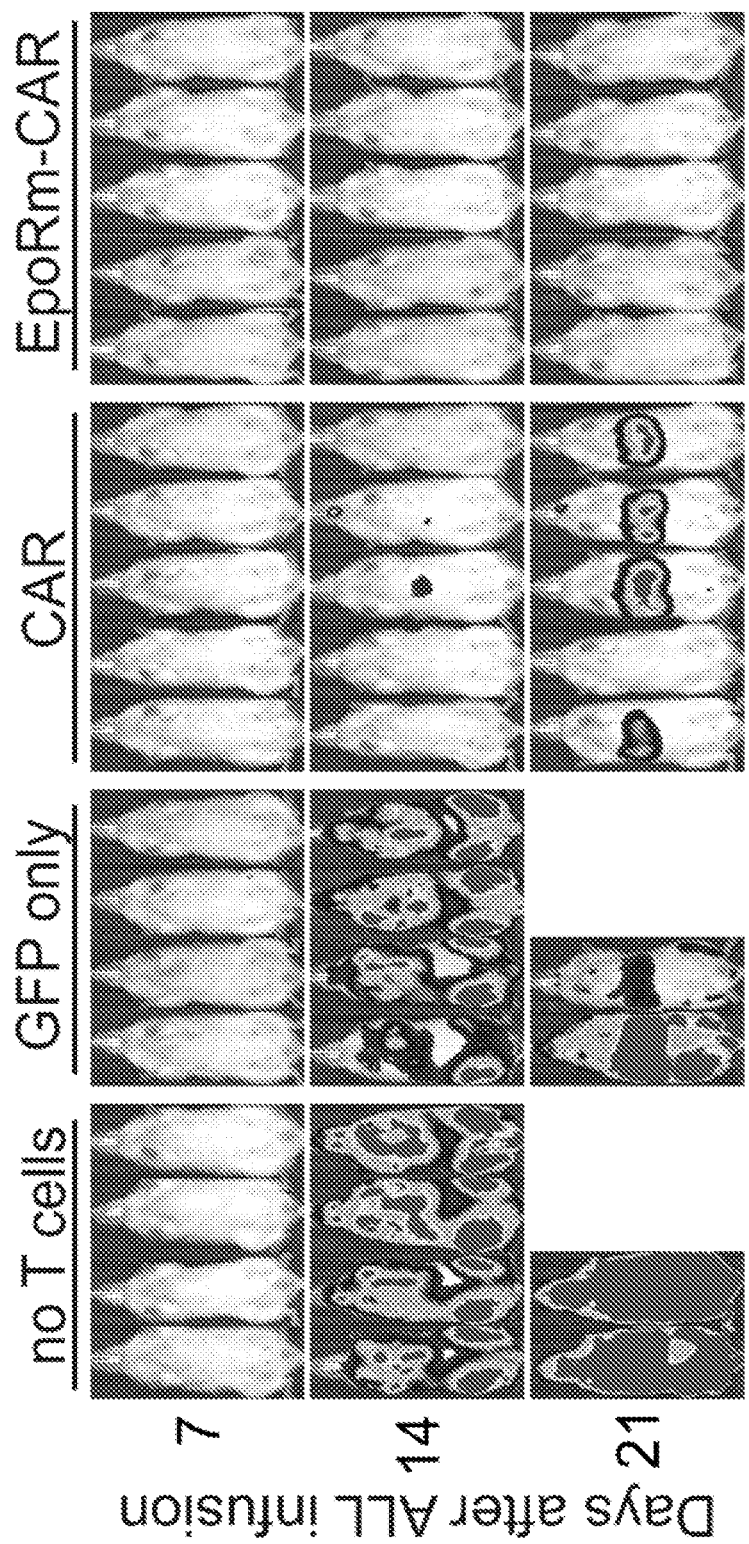
FIGS. 9A-F show anti-leukemic activity of EpoRm-CAR-T cells in xenograft models.
Figure 9B:
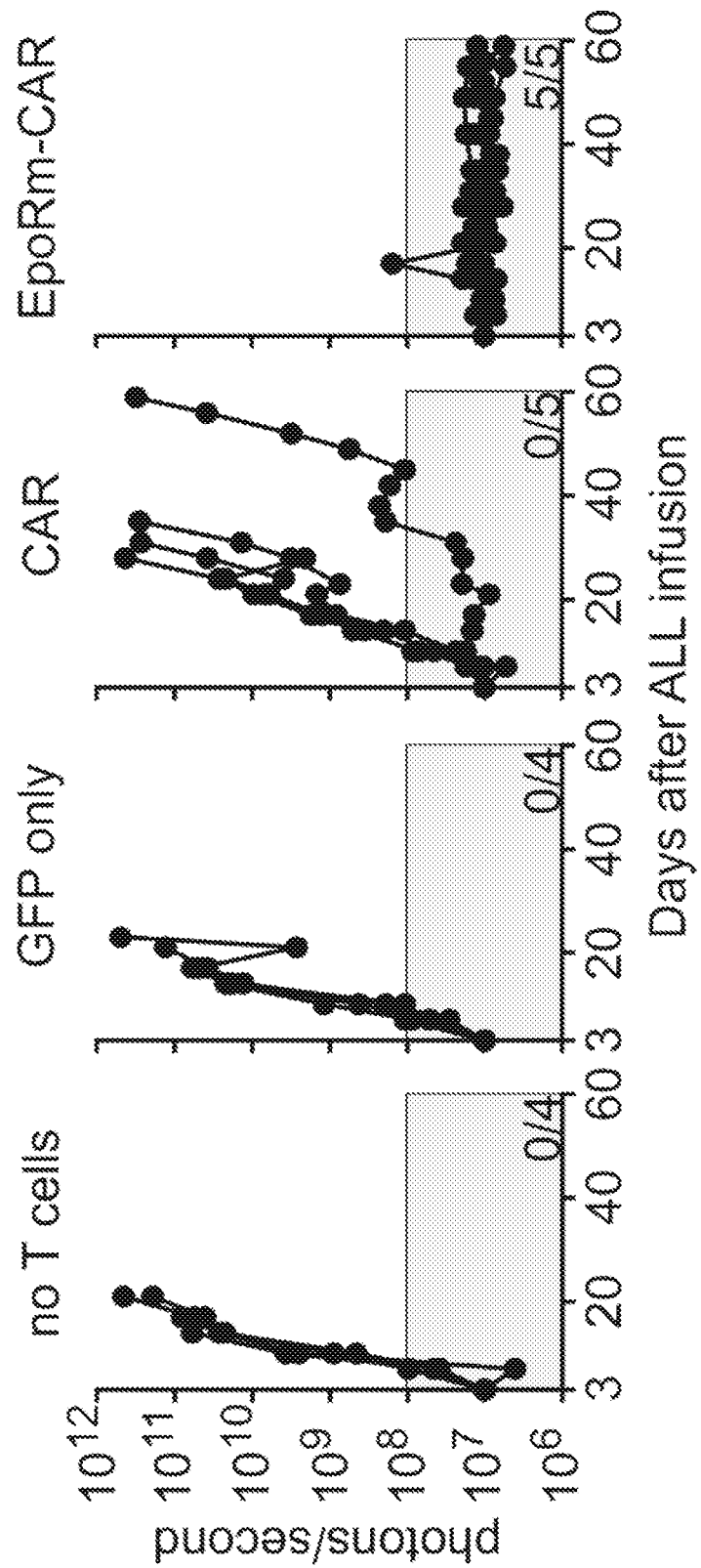
Figure 9C:
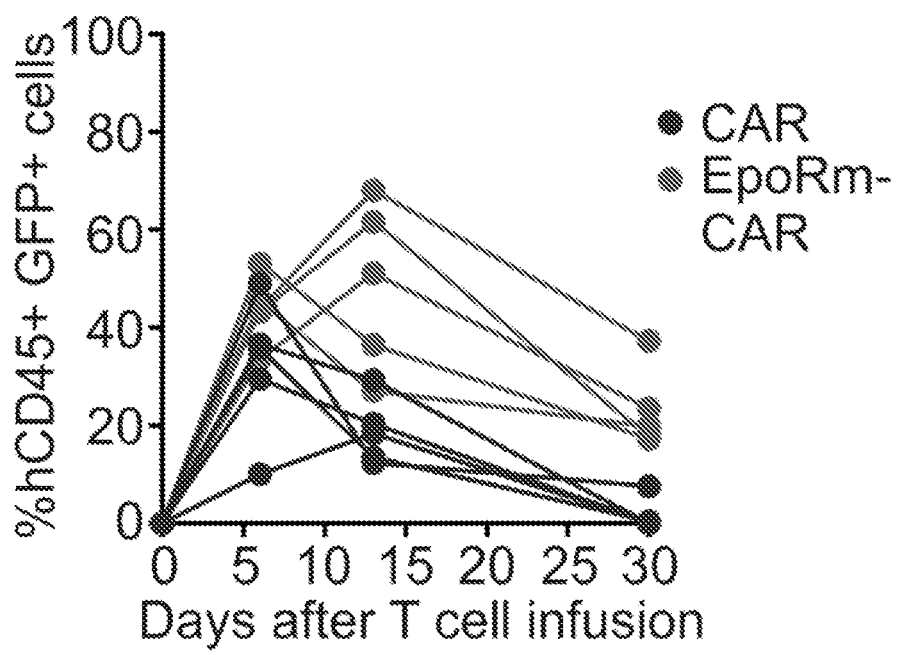

To assess whether increased numbers of EpoRm-CAR-T cells in vivo would provide superior protection against ALL engraftment, we injected T cells i.v. in NOD-scid-IL2RGnull mice followed 14 days later by i.v. injection of Nalm6 cells. Engraftment of ALL cells was only delayed by CAR-T cells but completely abrogated by EpoRm-CAR-T cells (FIGS. 9A and 9B). Two months after ALL cell infusion, there was ALL engraftment in all 5 mice injected with CAR-T cells, while none of the 5 mice injected with EpoRm-CAR-T cells had ALL (P=0.0079 by Fisher's exact test). On day 13, 1 day prior to ALL cell inoculation and with no exogenous Epo, percentage of CAR-T cells among peripheral blood lymphoid cells was 18.8%±6.7% versus 48.9%±17.0% for EpoRm-CAR-T cells (P=0.0062) (FIG. 9C). Levels of EpoRm-CAR-T cells remained higher than those of CAR-T cells at subsequent time points.

Figure 9D:
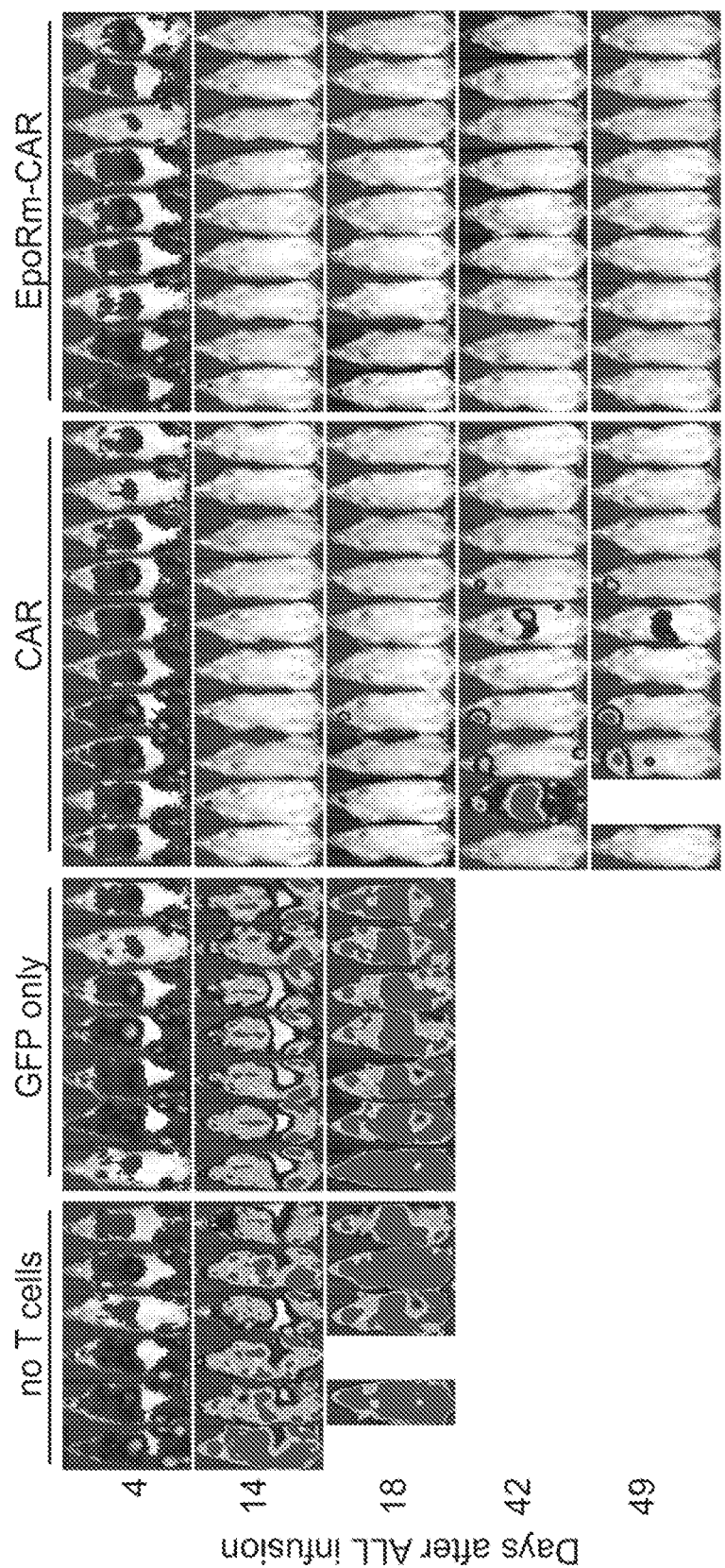
Figure 9E:
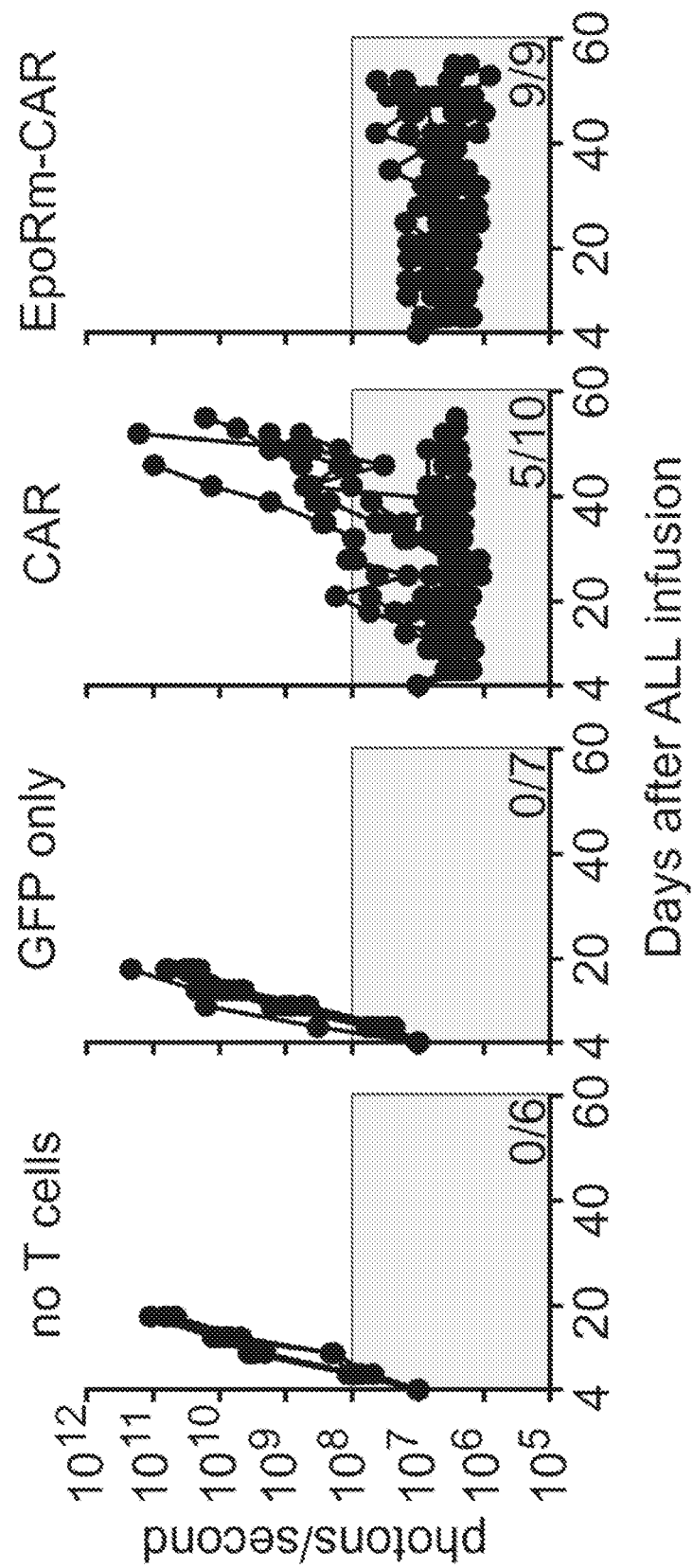
Figure 9F:
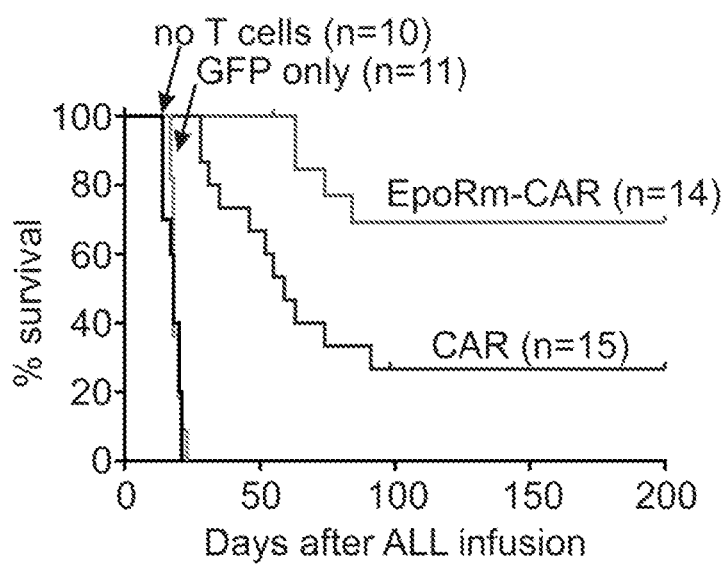

In another model, Nalm6 cells were first engrafted in NOD-scid-IL2RGnull mice by i.v. injection. On day 4, mice were distributed in 4 groups with similar tumor load; three groups received either CAR-T cells, EpoRm-CAR-T cells, or T cells transduced with GFP only by i.v. injection; a 4th group received only tissue culture medium. ALL cells rapidly expanded in the untreated mice, and in mice that received control T cells without CAR. Both CAR- and EpoRm-CAR-T cells markedly reduced leukemic signals (FIGS. 9D and 9E). On day 55 post-infusion, however, 5 of the 10 mice treated with CAR-T cells had relapsed versus none of the 9 who had received EpoRm-CAR-T cells (P=0.0325 by Fisher's exact test). FIG. 9F shows the combined long-term survival of the 2 cohorts; EpoRm-CAR-T cells produced a significantly higher overall anti-leukemic effect than CAR-T cells (P=0.0076 by log rank test).

Jurkat Cell Growth Curves

Figure 10:
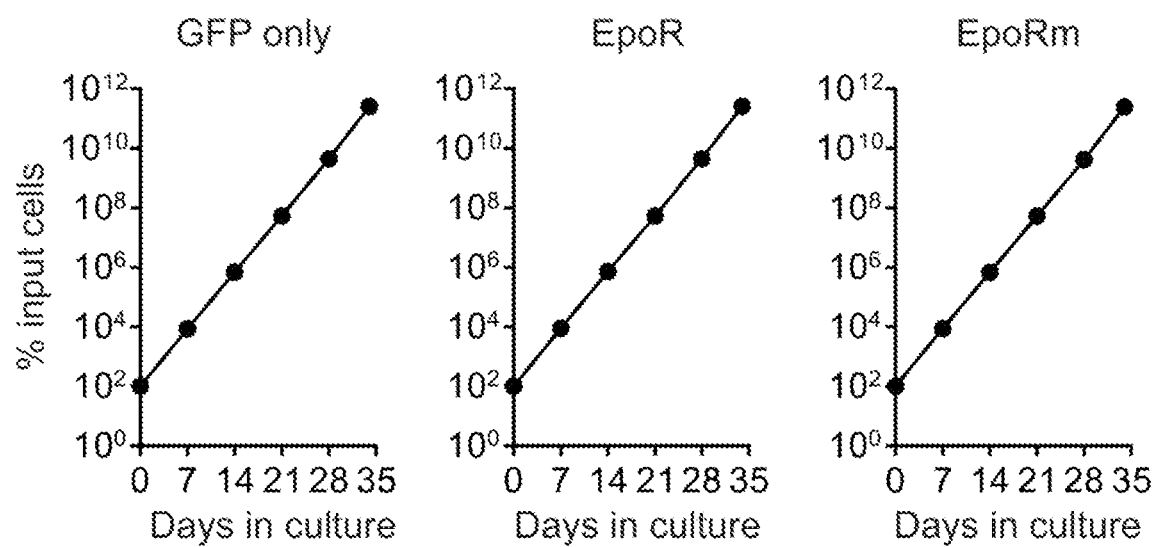
FIG. 10 is charts showing growth curves of Jurkat cells transduced with Epo receptors or GFP only. Each symbol represents the mean of three measurements.

Expression of either EpoR or EpoRm does not adversely affect long-term cell growth of Jurkat cells (FIG. 10).

EMBODIMENTS

Embodiment 1. A vector comprising a nucleic acid encoding: a) an erythropoietin (Epo) receptor; b) a self-cleaving peptide or internal ribosome entry site; and c) a cell surface receptor.

Embodiment 2. The vector of Embodiment 1, wherein the Epo receptor has at least 90% sequence identity to SEQ ID NO: 2.

Embodiment 3. The vector of Embodiment 1, wherein the Epo receptor is a mutant Epo receptor.

Embodiment 4. The vector of Embodiment 3, wherein the nucleic acid has a mutation that encodes a stop codon within exon 8 of the Epo receptor.

Embodiment 5. The vector of Embodiment 3, wherein the Epo receptor has at least 90% sequence identity to SEQ ID NO: 6.

Embodiment 6. The vector of any of Embodiments 1 through 5, wherein the nucleic acid further encodes a Flag tag (DYKDDDDK (SEQ ID NO: 23)) that is C terminal to the Epo receptor.

Embodiment 7. The vector of any of Embodiments 1 through 6, wherein the nucleic acid comprises a self-cleaving peptide.

Embodiment 8. The vector of Embodiment 7, wherein the self-cleaving peptide is a 2A peptide.

Embodiment 9. The vector of Embodiment 8, wherein the 2A peptide is a T2A peptide.

Embodiment 10. The vector of any one of Embodiments 1 through 9, wherein the signal peptide is a CD8α signal peptide.

Embodiment 11. The vector of Embodiment 10, wherein the cell surface receptor comprises an extracellular receptor domain that binds a target cell antigen.

Embodiment 12. The vector of any one of Embodiments 1 through 10, wherein the cell surface receptor is a chimeric antigen receptor comprising: i) a signal peptide; ii) an extracellular receptor domain that binds a target cell antigen; iii) a hinge and transmembrane domain that anchors the extracellular receptor domain on the surface of a cell; and iv) an effector domain.

Embodiment 13. The vector of Embodiment 11 or 12, wherein the extracellular receptor domain comprises a variable immunoglobulin light chain domain and a variable immunoglobulin heavy chain domain joined by a linker domain.

Embodiment 14. The vector of Embodiment 13, wherein the linker domain is $(G4S)_x$ (SEQ ID NO: 24), wherein x is an integer from 1 to 100.

Embodiment 15. The vector of Embodiment 13, wherein the linker domain is $(G4S)_3$ (SEQ ID NO: 25).

Embodiment 16. The vector of Embodiment 12, wherein the extracellular receptor domain is a single-chain variable fragment (scFv).

Embodiment 17. The vector of any one of Embodiments 1 through 10, wherein the cell surface receptor is a T cell receptor.

Embodiment 18. The vector of Embodiment 11, wherein the extracellular receptor domain comprises a monoclonal antibody, a recombinant antibody, a human antibody, a humanized antibody, a Fab, a Fab', a F(ab')2, an Fv, a single-chain variable fragment (scFv), a minibody, a diabody, a single-domain antibody, or a functional derivative or variant or fragment thereof.

Embodiment 19. The vector of Embodiment 11, wherein the extracellular receptor domain comprises an immunoglobulin Fc receptor.

Embodiment 20. The vector of Embodiment 19, wherein the immunoglobulin Fc receptor is CD16, CD32 or CD64.

Embodiment 21. The vector of Embodiment 11, wherein the extracellular receptor domain comprises a cytokine.

Embodiment 22. The vector of Embodiment 21, wherein the cytokine is IL-13, IL-4, IL-7, or IL-3.

Embodiment 23. The vector of Embodiment 11, wherein the cell surface receptor activates immune cells.

Embodiment 24. The vector of Embodiment 23, wherein the cell surface receptor comprises NKG2D, NKG2C, NCR1, NCR2, NCR3, CD137, CD28, or ICOS, or a fragment or a ligand thereof.

Embodiment 25. The vector of Embodiment 11, wherein the cell surface receptor inhibits immune cells.

Embodiment 26. The vector of Embodiment 25, wherein the cell surface receptor comprises NKG2A, PD-1, or CTLA-4, or a fragment or ligand thereof.

Embodiment 27. The vector of Embodiment 11, wherein the cell surface receptor is a receptor for a cytokine.

Embodiment 28. The vector of Embodiment 27, wherein the cell surface receptor is a receptor for IL-6, IL-1, or TNFalpha.

Embodiment 29. The vector of any one of Embodiments 1 through 28, wherein the target cell antigen is a tumor associated antigen or a tumor specific antigen.

Embodiment 30. The vector of any one of Embodiments 1 through 28, wherein the target cell antigen is a viral, bacterial, fungal, or parasite associated antigen or a viral, bacterial, fungal, or parasite specific antigen.

Embodiment 31. The vector of any one of Embodiments 1 through 28, wherein the target cell antigen is CD19, CD20, CD22, CD123, CD33, B-cell maturation antigen (BCMA), mesothelin, human epidermal growth factor receptor 2 (Her2), prostate-specific membrane antigen (PSMA), or disialoganglioside (GD2).

Embodiment 32. The vector of any one of Embodiments 1 through 28, wherein the target cell antigen is CD19.

Embodiment 33. The vector of any one of Embodiments 1 through 32, wherein the extracellular domain is an anti-CD19 single-chain variable fragment (scFv).

Embodiment 34. The vector of any one of Embodiments 1 through 33, wherein the hinge and transmembrane domain is a CD8α hinge and transmembrane domain.

Embodiment 35. The vector of any one of Embodiments 1 through 34, wherein the hinge comprises a plurality of amino acid residues.

Embodiment 36. The vector of any one of Embodiments 1 through 35, wherein the transmembrane domain is a transmembrane domain from CD4, CD8β, CD16, CD28, CD32, CD34, CD64, CD137, FcεRIγ, OX40, CD3ζ, CD3ε, CD3γ, CD3δ, TCRα, VEGFR2, FAS, or FGFR2B.

Embodiment 37. The vector of any one of Embodiments 1 through 36, wherein the effector domain comprises 4-1BB and CD3ζ.

Embodiment 38. The vector of any one of Embodiments 1 through 37, wherein the CAR is anti-CD19-41BB-CD3ζ.

Embodiment 39. A vector comprising a nucleic acid encoding a mutant erythropoietin (Epo) receptor.

Embodiment 40. The vector of Embodiment 39, wherein the nucleic acid has a mutation that encodes a stop codon within exon 8 of the Epo receptor.

Embodiment 41. The vector of Embodiment 39, wherein the mutant Epo receptor has at least 90% sequence identity to SEQ ID NO: 6.

Embodiment 42. The vector of any one of Embodiments 1 through 41, wherein the vector is a retrovirus.

Embodiment 43. The vector of any one of Embodiments 1 through 42, wherein the vector is a murine stem cell virus (MSCV) retroviral vector.

Embodiment 44. The vector of any one of Embodiments 1 through 43, wherein the vector further encodes a fluorescent protein.

Embodiment 45. The vector of any one of Embodiments 1 through 44, wherein the vector encodes an internal ribosomal entry site (IRES).

Embodiment 46. The vector of any one of Embodiments 1 through 45, wherein the vector further encodes at least one regulatory element for expression of the nucleic acid.

Embodiment 47. A method of making a transgenic mammalian host cell, the method comprising introducing into a mammalian host cell the vector of any of Embodiments 1 through 46.

Embodiment 48. The method of Embodiment 47, wherein the mammalian host cell is an immune cell.

Embodiment 49. The method of Embodiment 48, wherein the immune cell is a natural killer (NK) cell, a monocyte/macrophage cell, or a dendritic cell.

Embodiment 50. The method of Embodiment 48, wherein the immune cell is a T cell.

Embodiment 51. The method of Embodiment 50, wherein the T cell is a human peripheral blood T lymphocyte.

Embodiment 52. The method of Embodiment 50, wherein the T cell is a CD4+ T cell.

Embodiment 53. The method of Embodiment 50, wherein the T cell is a CD8+ T cell.

Embodiment 54. The method of Embodiment 50, wherein the T cell further expresses a T-cell receptor (TCR) that binds a tumor antigen or a viral antigen.

Embodiment 55. The method of Embodiment 54, wherein the TCR is endogenous.

Embodiment 56. The method of Embodiment 55, wherein T cell is a tumor-infiltrating lymphocyte (TIL), and wherein the method further comprises extracting the tumor-infiltrating lymphocyte from a tumor and expanding the TIL ex vivo.

Embodiment 57. The method of Embodiment 54, wherein the TCR is exogenous.

Embodiment 58. The method of Embodiment 57, wherein the method further comprises introducing into the T cell a vector that expresses the exogenous TCR.

Embodiment 59. A mammalian immune cell comprising the vector of any one Embodiments 1 through 46.

Embodiment 60. The mammalian immune cell of Embodiment 59, wherein the mammalian immune cell is a natural killer (NK) cell, a monocyte/macrophage cell, or a dendritic cell.

Embodiment 61. The mammalian immune cell of Embodiment 59, wherein the mammalian immune cell is a T cell.

Embodiment 62. The mammalian immune cell of Embodiment 61, wherein the T cell is a human T cell.

Embodiment 63. The mammalian immune cell of Embodiment 61, wherein the T cell is a human peripheral blood T lymphocyte.

Embodiment 64. A method of reducing the number of CD19+ cells in a mammal, the method comprising introducing mammalian T cells into the subject, wherein the mammalian T cells comprise the vector of any of Embodiments 1 through 46.

Embodiment 65. The method of Embodiment 64, wherein the mammal is a human.

Embodiment 66. The method of any of Embodiments 64 through 65, wherein the mammalian T cells are autologous cells isolated from the mammal.

Embodiment 67. The method of any of Embodiments 64 through 65, wherein the mammalian T cells are allogenic cells isolated from a donor.

Embodiment 68. The method of any of Embodiments 64 through 67, further comprising administering Epo to the subject.

Embodiment 69. The method of any of Embodiments 64 through 68, further comprising administering IL-2 to the subject.

Embodiment 70. The method of any of Embodiments 64 through 69, wherein reducing the number of CD19+ cells in the mammal treats acute lymphoblastic leukemia (ALL).

Embodiment 71. Use of the vector according to any one of Embodiments 1 through 46 in the manufacture of a medicament for treating or preventing cancer, a viral infection, a bacterial infection, a fungal infection, or a parasite in a mammal in need thereof.

Embodiment 72. Use of a mammalian immune cell according to any one of Embodiments 59 through 63 for reducing the number of CD19+ cells in a mammal.

Embodiment 73. A vector according to any one of Embodiments 1 through 46 for use in a method for reducing the number of CD19+ cells in a mammal.

Embodiment 74. A mammalian immune cell according to any one of Embodiments 59 through 63 for use in a method for reducing the number of CD19+ cells in a mammal.

Embodiment 75. A method of making a transgenic mammalian host cell, the method comprising introducing into a mammalian host cell the vector of any of Embodiments 39 through 46.

Embodiment 76. The method of Embodiment 75, wherein the mammalian host cell is an immune cell.

Embodiment 77. The method of Embodiment 76, wherein the immune cell is a T cell.

Embodiment 78. The method of Embodiment 77, wherein the T cell is a tumor-infiltrating lymphocyte (TIL).

Embodiment 79. The method of Embodiment 76, wherein the immune cell is a natural killer cell.

Embodiment 80. A mammalian immune cell comprising the vector of any one Embodiments 39 through 46.

Embodiment 81. The mammalian immune cell of Embodiment 80, wherein the mammalian immune cell is a T cell, natural killer (NK) cell, a monocytic/macrophage cell, or a dendritic cell.

REFERENCES

1. Rosenberg S A, Restifo N P. Adoptive cell transfer as personalized immunotherapy for human cancer. *Science.* 2015; 348(6230):62-68.
2. Kochenderfer J N, Wilson W H, Janik J E, et al. Eradication of B-lineage cells and regression of lymphoma in a patient treated with autologous T cells genetically engineered to recognize CD19. *Blood.* 2010; 116(20): 4099-4102.
3. Porter D L, Levine B L, Kalos M, Bagg A, June C H. Chimeric antigen receptor-modified T cells in chronic lymphoid leukemia. *N Engl J Med.* 2011; 365(8):725-733.
4. Maude S L, Frey N, Shaw P A, et al. Chimeric antigen receptor T cells for sustained remissions in leukemia. *N Engl J Med.* 2014; 371(16):1507-1517.
5. Davila M L, Riviere I, Wang X, et al. Efficacy and toxicity management of 19-28z CAR T cell therapy in B cell acute lymphoblastic leukemia. *Sci Transl Med.* 2014; 6(224): 224ra225.
6. Kochenderfer J N, Dudley M E, Kassim S H, et al. Chemotherapy-refractory diffuse large B-cell lymphoma and indolent B-cell malignancies can be effectively treated with autologous T cells expressing an anti-CD19 chimeric antigen receptor. *J Clin Oncol.* 2015; 33(6):540-549.
7. Lee D W, Kochenderfer J N, Stetler-Stevenson M, et al. T cells expressing CD19 chimeric antigen receptors for acute lymphoblastic leukaemia in children and young adults: a phase 1 dose-escalation trial. *Lancet.* 2015; 385(9967):517-528.
8. Turtle C J, Hanafi L A, Berger C, et al. CD19 CAR-T cells of defined CD4+:CD8+ composition in adult B cell ALL patients. *J Clin Invest.* 2016; 126(6):2123-2138.
9. Sadelain M, Riviere I, Riddell S. Therapeutic T cell engineering. *Nature.* 2017; 545(7655):423-431.
10. Maude S L, Laetsch T W, Buechner J, et al. Tisagenlecleucel in children and young adults with B-cell lymphoblastic leukemia. *N Engl J Med.* 2018; 378(5):439-448.
11. Campana D, Schwarz H, Imai C. 4-1B B chimeric antigen receptors. *Cancer J.* 2014; 20(2):134-140.
12. Long A H, Haso W M, Shern J F, et al. 4-1B B costimulation ameliorates T cell exhaustion induced by tonic signaling of chimeric antigen receptors. *Nat Med.* 2015; 21(6):581-590.
13. Zhao Z, Condomines M, van der Stegen S J, et al. Structural design of engineered costimulation determines tumor rejection kinetics and persistence of CAR T cells. *Cancer Cell.* 2015; 28(4):415-428.
14. Besser M J, Shapira-Frommer R, Schachter J. Tumor-infiltrating lymphocytes: clinical experience. *Cancer J.* 2015; 21(6):465-469.
15. Lu Y C, Parker L L, Lu T, et al. Treatment of patients with metastatic cancer using a major histocompatibility complex class I I-restricted T-cell receptor targeting the cancer germline antigen MAGE-A3. *J Clin Oncol.* 2017; 35(29):3322-3329.
16. Atkins M B. Interleukin-2: clinical applications. *Semin Oncol.* 2002; 29(3 Suppl 7):12-17.
17. Li Y, Strick-Marchand H, Lim A I, et al. Regulatory T cells control toxicity in a humanized model of IL-2 therapy. *Nat Commun.* 2017; 8(1):1762.
18. Matsuoka K, Koreth J, Kim H T, et al. Low-dose interleukin-2 therapy restores regulatory T cell homeostasis in patients with chronic graft-versus-host disease. *Sci Transl Med.* 2013; 5(179):179ra143.
19. Manabe A, Coustan-Smith E, Kumagai M, et al. Interleukin-4 induces programmed cell death (apoptosis) in cases of high-risk acute lymphoblastic leukemia. *Blood.* 1994; 83(7):1731-1737.
20. de la Chapelle A, Traskelin A L, Juvonen E. Truncated erythropoietin receptor causes dominantly inherited benign human erythrocytosis. *Proc Natl Acad Sci USA.* 1993; 90(10):4495-4499.
21. Imai C, Mihara K, Andreansky M, Nicholson I C, Pui C H, Campana D. Chimeric receptors with 4-1B B signaling 21. capacity provoke potent cytotoxicity against acute lymphoblastic leukemia. *Leukemia.* 2004; 18:676-684.
22. Szymczak-Workman A L, Vignali K M, Vignali D A. Design and construction of 2A peptide-linked multicistronic vectors. *Cold Spring Harb Protoc.* 2012; 2012(2): 199-204.
23. Png Y T, Vinanica N, Kamiya T, Shimasaki N, Coustan-Smith E, Campana D. Blockade of CD7 expression in T cells for effective chimeric antigen receptor targeting of T-cell malignancies. Blood Advances, 1(25), 2348-2360. *Blood Advances.* 2017; 1(25):2348-2360.
24. Kudo K, Imai C, Lorenzini P, et al. T lymphocytes expressing a CD16 signaling receptor exert antibody-dependent cancer cell killing. *Cancer Res.* 2014; 74(1): 93-103.
25. Chang Y H, Connolly J, Shimasaki N, Mimura K, Kono K, Campana D. A chimeric receptor with NKG2D specificity enhances natural killer cell activation and killing of tumor cells. *Cancer Res.* 2013; 73(6):1777-1786.
26. Gouilleux F, Pallard C, Dusanter-Fourt I, et al. Prolactin, growth hormone, erythropoietin and granulocyte-macrophage colony stimulating factor induce MGF-Stat5 DNA binding activity. *EMBO J.* 1995; 14(9):2005-2013.
27. Wakao H, Harada N, Kitamura T, Mui A L, Miyajima A. Interleukin 2 and erythropoietin activate STAT5/MGF via distinct pathways. *EMBO J.* 1995; 14(11):2527-2535.
28. Witthuhn B A, Quelle F W, Silvennoinen O, et al. JAK2 associates with the erythropoietin receptor and is tyrosine phosphorylated and activated following stimulation with erythropoietin. *Cell.* 1993; 74(2):227-236.
29. Kiladjian J J, Winton E F, Talpaz M, Verstovsek S. Ruxolitinib for the treatment of patients with polycythemia vera. *Expert Rev Hematol.* 2015; 8(4):391-401.
30. Juvonen E, Ikkala E, Fyhrquist F, Ruutu T. Autosomal dominant erythrocytosis caused by increased sensitivity to erythropoietin. *Blood.* 1991; 78(11):3066-3069.
31. Meyer S C, Levine R L. Molecular pathways: molecular basis for sensitivity and resistance to JAK kinase inhibitors. *Clin Cancer Res.* 2014; 20(8):2051-2059.
32. Galson D L, Tan C C, Ratcliffe P J, Bunn H F. Comparison of the hu006Dan and mouse erythropoietin genes shows extensive homology in the flanking regions. *Blood.* 1993; 82(11):3321-3326.

SEQUENCES
SEQ ID NO: 1: Epo receptor (EpoR) cDNA:
CCGGAATTCGCCACCATGGACCACCTCGGGGCGTCCCTCTGGCCCCAGGT

CGGCTCCCTTTGTCTCCTGCTCGCTGGGGCCGCCTGGGCGCCCCCGCCTA

ACCTCCCGGACCCCAAGTTCGAGAGCAAAGCGGCCTTGCTGGCGGCCGG

GGGCCCGAAGAGCTTCTGTGCTTCACCGAGCGGTTGGAGGACTTGGTGTG

TTTCTGGGAGGAAGCGGCGAGCGCTGGGGTGGGCCCGGGCAACTACAGCT

TCTCCTACCAGTTAGAAGATGAGCCATGGAAGCTGTGTCGCCTGCACCAG

GCTCCCACGGCTCGTGGTGCGGTGCGCTTCTGGTGTTCGCTGCCTACAGC

CGACACGTCGAGCTTCGTGCCCCTAGAGTTGCGCGTCACAGCAGCCTCCG

GCGCTCCGCGATATCACCGTGTCATCCACATCAATGAAGTAGTGCTCCTA

GACGCCCCCGTGGGGCTGGTGGCGCGGTTGGCTGACGAGAGCGGCCACGT

AGTGTTGCGCTGGCTCCCGCCGCCTGAGACACCCATGACGTCTCACATCC

GCTACGAGGTGGACGTCTCGGCCGGCAACGGCGCAGGGAGCGTACAGAGG

GTGGAGATCCTGGAGGGCCGCACCGAGTGTGTGCTGAGCAACCTGCGGGG

CCGGACGCGCTACACCTTCGCCGTCCGCGCGCGTATGGCTGAGCCGAGCT

TCGGCGGCTTCTGGAGCGCCTGGTCGGAGCCTGTGTCGCTGCTGACGCCT

AGCGACCTGGACCCCCTCATCCTGACGCTCTCCCTCATCCTCGTGGTCAT

CCTGGTGCTGCTGACCGTGCTCGCGCTGCTCTCCCACCGCCGGGCTCTGA

AGCAGAAGATCTGGCCTGGCATCCCGAGCCCAGAGAGCGAGTTTGAAGGC

CTCTTCACCACCCACAAGGGTAACTTCCAGCTGTGGCTGTACCAGAATGA

TGGCTGCCTGTGGTGGAGCCCCTGCACCCCCTTCACGGAGGACCCACCTG

CTTCCCTGGAAGTCCTCTCAGAGCGCTGCTGGGGGACGATGCAGGCAGTG

GAGCCGGGGACAGATGATGAGGGCCCCCTGCTGGAGCCAGTGGGCAGTGA

GCATGCCCAGGATACCTATCTGGTGCTGGACAAATGGTTGCTGCCCCGGA

ACCCGCCCAGTGAGGACCTCCCAGGGCCTGGTGGCAGTGTGGACATAGTG

GCCATGGATGAAGGCTCAGAAGCATCCTCCTGCTCATCTGCTTTGGCCTC

GAAGCCCAGCCCAGAGGGAGCCTCTGCTGCCAGCTTTGAGTACACTATCC

TGGACCCCAGCTCCCAGCTCTTGCGTCCATGGACACTGTGCCCTGAGCTG

CCCCCTACCCCACCCCACCTAAAGTACCTGTACCTTGTGGTATCTGACTC

TGGCATCTCAACTGACTACAGCTCAGGGGACTCCCAGGGAGCCCAAGGGG

GCTTATCCGATGGCCCCTACTCCAACCCTTATGAGAACAGCCTTATCCCA

GCCGCTGAGCCTCTGCCCCCCAGCTATGTGGCTTGCTCTTAGCTCGAGCG

G

SEQ ID NO: 2: Epo receptor (EpoR) amino acid:
MDHLGASLWPQVGSLCLLLAGAAWAPPPNLPDPKFESKAALLAARGPEEL

LCFTERLEDLVCFWEEAASAGVGPGNYSFSYQLEDEPWKLCRLHQAPTAR

GAVRFWCSLPTADTSSFVPLELRVTAASGAPRYHRVIHINEVVLLDAPVG

LVARLADESGHVVLRWLPPPETPMTSHIRYEVDVSAGNGAGSVQRVEILE

GRTECVLSNLRGRTRYTFAVRARMAEPSFGGFWSAWSEPVSLLTPSDLDP

LILTLSLILVVILVLLTVLALLSHRRALKQKIWPGIPSPESEFEGLFTTH

KGNFQLWLYQNDGCLWWSPCTPFTEDPPASLEVLSERCWGTMQAVEPGTD

DEGPLLEPVGSEHAQDTYLVLDKWLLPRNPPSEDLPGPGGSVDIVAMDEG

SEASSCSSALASKPSPEGASAASFEYTILDPSSQLLRPWTLCPELPPTPP

HLKYLYLVVSDSGISTDYSSGDSQGAQGGLSDGPYSNPYENSLIPAAEPL

PPSYVACS

SEQ ID NO: 3: EpoR with Flag tag cDNA:
ATATATGAATTCGCCACCATGGACCACCTCGGGGCGTCCCTCTGGCCCCA

GGTCGGCTCCCTTTGTCTCCTGCTCGCTGGGGCCGCCTGGGCGCCCCCGC

CTAACCTCCCGGACCCCAAGTTCGAGAGCAAAGCGGCCTTGCTGGCGGCC

CGGGGGCCCGAAGAGCTTCTGTGCTTCACCGAGCGGTTGGAGGACTTGGT

GTGTTTCTGGGAGGAAGCGGCGAGCGCTGGGGTGGGCCCGGGCAACTACA

GCTTCTCCTACCAGTTAGAAGATGAGCCATGGAAGCTGTGTCGCCTGCAC

CAGGCTCCCACGGCTCGTGGTGCGGTGCGCTTCTGGTGTTCGCTGCCTAC

AGCCGACACGTCGAGCTTCGTGCCCCTAGAGTTGCGCGTCACAGCAGCCT

```
CCGGCGCTCCGCGATATCACCGTGTCATCCACATCAATGAAGTAGTGCTC
CTAGACGCCCCCGTGGGGCTGGTGGCGCGGTTGGCTGACGAGAGCGGCCA
CGTAGTGTTGCGCTGGCTCCCGCCGCCTGAGACACCCATGACGTCTCACA
TCCGCTACGAGGTGGACGTCTCGGCCGGCAACGGCGCAGGGAGCGTACAG
AGGGTGGAGATCCTGGAGGGCCGCACCGAGTGTGTGCTGAGCAACCTGCG
GGGCCGGACGCGCTACACCTTCGCCGTCCGCGCGCGTATGGCTGAGCCGA
GCTTCGGCGGCTTCTGGAGCGCCTGGTCGGAGCCTGTGTCGCTGCTGACG
CCTAGCGACCTGGACCCCCTCATCCTGACGCTCTCCCTCATCCTCGTGGT
CATCCTGGTGCTGCTGACCGTGCTCGCGCTGCTCTCCCACCGCCGGGCTC
TGAAGCAGAAGATCTGGCCTGGCATCCCGAGCCCAGAGAGCGAGTTTGAA
GGCCTCTTCACCACCCACAAGGGTAACTTCCAGCTGTGGCTGTACCAGAA
TGATGGCTGCCTGTGGTGGAGCCCTGCACCCCCTTCACGGAGGACCCAC
TGCTTCCCTGGAAGTCCTCTCAGAGCGCTGCTGGGGACGATGCAGGCA
GTGGAGCCGGGACAGATGATGAGGGCCCCCTGCTGGAGCCAGTGGGCAG
TGAGCATGCCCAGGATACCTATCTGGTGCTGGACAAATGGTTGCTGCCCC
GGAACCCGCCCAGTGAGGACCTCCCAGGGCCTGGTGGCAGTGTGGACATA
GTGGCCATGGATGAAGGCTCAGAAGCATCCTCCTGCTCATCTGCTTTGGC
CTCGAAGCCCAGCCCAGAGGGAGCCTCTGCTGCCAGCTTTGAGTACACTA
TCCTGGACCCCAGCTCCCAGCTCTTGCGTCCATGGACACTGTGCCCTGAG
CTGCCCCCTACCCCACCCCACCTAAAGTACCTGTACCTTGTGGTATCTGA
CTCTGGCATCTCAACTGACTACAGCTCAGGGGACTCCCAGGGAGCCCAAG
GGGGCTTATCCGATGGCCCCTACTCCAACCCTTATGAGAACAGCCTTATC
CCAGCCGCTGAGCCTCTGCCCCCCAGCTATGTGGCTTGCTCTGACTACAA
AGACGATGACGACAAGTAGCTCGAGTATATA

SEQ ID NO: 4: EpoR with Flag tag amino acid:
MDHLGASLWPQVGSLCLLLAGAAWAPPPNLPDPKFESKAALLAARGPEEL
LCFTERLEDLVCFWEEAASAGVGPGNYSFSYQLEDEPWKLCRLHQAPTAR
GAVRFWCSLPTADTSSFVPLELRVTAASGAPRYHRVIHINEVVLLDAPVG
LVARLADESGHVVLRWLPPPETPMTSHIRYEVDVSAGNGAGSVQRVEILE
GRTECVLSNLRGRTRYTFAVRARMAEPSFGGFWSAWSEPVSLLTPSDLDP
LILTLSLILVVILVLLTVLALLSHRRALKQKIWPGIPSPESEFEGLFTTH
KGNFQLWLYQNDGCLWWSPCTPFTEDPPASLEVLSERCWGTMQAVEPGTD
DEGPLLEPVGSEHAQDTYLVLDKWLLPRNPPSEDLPGPGGSVDIVAMDEG
SEASSCSSALASKPSPEGASAASFEYTILDPSSQLLRPWTLCPELPPTPP
HLKYLYLVVSDSGISTDYSSGDSQGAQGGLSDGPYSNPYENSLIPAAEPL
PPSYVACSDYKDDDK SEQ ID NO: 5: mutant EpoR (EpoRm) cDNA:
CCGGAATTCGCCACCATGGACCACCTCGGGGCGTCCCTCTGGCCCCAGGT
CGGCTCCCTTTGTCTCCTGCTCGCTGGGGCCGCCTGGGCGCCCCCGCCTA
ACCTCCCGGACCCCAAGTTCGAGAGCAAAGCGGCCTTGCTGGCGGCCCGG
GGGCCCGAAGAGCTTCTGTGCTTCACCGAGCGGTTGGAGGACTTGGTGTG
TTTCTGGGAGGAAGCGGCGAGCGCTGGGGTGGGCCCGGGCAACTACAGCT
TCTCCTACCAGTTAGAAGATGAGCCATGGAAGCTGTGTCGCCTGCACCAG
GCTCCCACGGCTCGTGGTGCGGTGCGCTTCTGGTGTTCGCTGCCTACAGC
CGACACGTCGAGCTTCGTGCCCCTAGAGTTGCGCGTCACAGCAGCCTCCG
GCGCTCCGCGATATCACCGTGTCATCCACATCAATGAAGTAGTGCTCCTA
GACGCCCCGTGGGGCTGGTGGCGCGGTTGGCTGACGAGAGCGGCCACGT
AGTGTTGCGCTGGCTCCCGCCGCCTGAGACACCCATGACGTCTCACATCC
GCTACGAGGTGGACGTCTCGGCCGGCAACGGCGCAGGGAGCGTACAGAGG
GTGGAGATCCTGGAGGGCCGCACCGAGTGTGTGCTGAGCAACCTGCGGGG
CCGGACGCGCTACACCTTCGCCGTCCGCGCGCGTATGGCTGAGCCGAGCT
TCGGCGGCTTCTGGAGCGCCTGGTCGGAGCCTGTGTCGCTGCTGACGCCT
AGCGACCTGGACCCCCTCATCCTGACGCTCTCCCTCATCCTCGTGGTCAT
CCTGGTGCTGCTGACCGTGCTCGCGCTGCTCTCCCACCGCCGGGCTCTGA
AGCAGAAGATCTGGCCTGGCATCCCGAGCCCAGAGAGCGAGTTTGAAGGC
CTCTTCACCACCCACAAGGGTAACTTCCAGCTGTGGCTGTACCAGAATGA
TGGCTGCCTGTGGTGGAGCCCTGCACCCCCTTCACGGAGGACCCACCTG
CTTCCCTGGAAGTCCTCTCAGAGCGCTGCTGGGGACGATGCAGGCAGTG
GAGCCGGGACAGATGATGAGGGCCCCCTGCTGGAGCCAGTGGGCAGTGA
GCATGCCCAGGATACCTATCTGGTGCTGGACAAATGGTTGCTGCCCCGGA
ACCCGCCCAGTGAGGACCTCCCAGGGCCTGGTGGCAGTGTGGACATAGTG
GCCATGGATGAAGGCTCAGAAGCATCCTCCTGCTCATCTGCTTTGGCCTC
GAAGCCCAGCCCAGAGGGAGCCTCTGCTGCCAGCTTTGAGTACACTATCC
TGGACCCCAGCTCCCAGCTCTTGCGTCCATAGACACTGTGCCCTGAGCTG
CCCCCTACCCCACCCCACCTAAAGTACCTGTACCTTGTGGTATCTGACTC
TGGCATCTCAACTGACTACAGCTCAGGGGACTCCCAGGGAGCCCAAGGGG
GCTTATCCGATGGCCCCTACTCCAACCCTTATGAGAACAGCCTTATCCCA
GCCGCTGAGCCTCTGCCCCCCAGCTATGTGGCTTGCTCTTAGCTCGAGCG
G SEQ ID NO: 6: mutant EpoR (EpoRm) amino acid:
MDHLGASLWPQVGSLCLLLAGAAWAPPPNLPDPKFESKAALLAARGPEEL
LCFTERLEDLVCFWEEAASAGVGPGNYSFSYQLEDEPWKLCRLHQAPTAR
GAVRFWCSLPTADTSSFVPLELRVTAASGAPRYHRVIHINEVVLLDAPVG
LVARLADESGHVVLRWLPPPETPMTSHIRYEVDVSAGNGAGSVQRVEILE
GRTECVLSNLRGRTRYTFAVRARMAEPSFGGFWSAWSEPVSLLTPSDLDP
LILTLSLILVVILVLLTVLALLSHRRALKQKIWPGIPSPESEFEGLFTTH
KGNFQLWLYQNDGCLWWSPCTPFTEDPPASLEVLSERCWGTMQAVEPGTD
DEGPLLEPVGSEHAQDTYLVLDKWLLPRNPPSEDLPGPGGSVDIVAMDEG
SEASSCSSALASKPSPEGASAASFEYTILDPSSQLLRP SEQ ID NO: 7: EpoRm with Flag tag cDNA:
ATATATGAATTCGCCACCATGGACCACCTCGGGGCGTCCCTCTGGCCCCA
GGTCGGCTCCCTTTGTCTCCTGCTCGCTGGGGCCGCCTGGGCGCCCCCGC
CTAACCTCCCGGACCCCAAGTTCGAGAGCAAAGCGGCCTTGCTGGCGGCC
```

```
CGGGGGCCCGAAGAGCTTCTGTGCTTCACCGAGCGGTTGGAGGACTTGGT
GTGTTTCTGGGAGGAAGCGGCGAGCGCTGGGGTGGGCCCGGGCAACTACA
GCTTCTCCTACCAGTTAGAAGATGAGCCATGGAAGCTGTGTCGCCTGCAC
CAGGCTCCCACGGCTCGTGGTGCGGTGCGCTTCTGGTGTTCGCTGCCTAC
AGCCGACACGTCGAGCTTCGTGCCCCTAGAGTTGCGCGTCACAGCAGCCT
CCGGCGCTCCGCGATATCACCGTGTCATCCACATCAATGAAGTAGTGCTC
CTAGACGCCCCCGTGGGGCTGGTGGCGCGGTTGGCTGACGAGAGCGGCCA
CGTAGTGTTGCGCTGGCTCCCGCCGCCTGAGACACCCATGACGTCTCACA
TCCGCTACGAGGTGGACGTCTCGGCCGGCAACGGCGCAGGGAGCGTACAG
AGGGTGGAGATCCTGGAGGGCCGCACCGAGTGTGTGCTGAGCAACCTGCG
GGGCCGGACGCGCTACACCTTCGCCGTCCGCGCGCGTATGGCTGAGCCGA
GCTTCGGCGGCTTCTGGAGCGCCTGGTCGGAGCCTGTGTCGCTGCTGACG
CCTAGCGACCTGGACCCCCTCATCCTGACGCTCTCCCTCATCCTCGTGGT
CATCCTGGTGCTGCTGACCGTGCTCGCGCTGCTCTCCCACCGCCGGGCTC
TGAAGCAGAAGATCTGGCCTGGCATCCCGAGCCCAGAGAGCGAGTTTGAA
GGCCTCTTCACCACCCACAAGGGTAACTTCCAGCTGTGGCTGTACCAGAA
TGATGGCTGCCTGTGGTGGAGCCCCTGCACCCCCTTCACGGAGGACCCAC
CTGCTTCCCTGGAAGTCCTCTCAGAGCGCTGCTGGGGGACGATGCAGGCA
GTGGAGCCGGGACAGATGATGAGGGCCCCCTGCTGGAGCCAGTGGGCAG
TGAGCATGCCCAGGATACCTATCTGGTGCTGGACAAATGGTTGCTGCCCC
GGAACCCGCCCAGTGAGGACCTCCCAGGGCCTGGTGGCAGTGTGGACATA
GTGGCCATGGATGAAGGCTCAGAAGCATCCTCCTGCTCATCTGCTTTGGC
CTCGAAGCCCAGCCCAGAGGGAGCCTCTGCTGCCAGCTTTGAGTACACTA
TCCTGGACCCCAGCTCCCAGCTCTTGCGTCCAGACTACAAAGACGATGAC
GACAAGTAGCTCGAGTATATA

SEQ ID NO: 8: EpoRm with Flag tag amino acid:
MDHLGASLWPQVGSLCLLLAGAAWAPPPNLPDPKFESKAALLAARGPEEL
LCFTERLEDLVCFWEEAASAGVGPGNYSFSYQLEDEPWKLCRLHQAPTAR
GAVRFWCSLPTADTSSFVPLELRVTAASGAPRYHRVIHINEVVLLDAPVG
LVARLADESGHVVLRWLPPPETPMTSHIRYEVDVSAGNGAGSVQRVEILE
GRTECVLSNLRGRTRYTFAVRARMAEPSFGGFWSAWSEPVSLLTPSDLDP
LILTLSLILVVILVLLTVLALLSHRRALKQKIWPGIPSPESEFEGLFTTH
KGNFQLWLYQNDGCLWWSPCTPFTEDPPASLEVLSERCWGTMQAVEPGTD
DEGPLLEPVGSEHAQDTYLVLDKWLLPRNPPSEDLPGPGGSVDIVAMDEG
SEASSCSSALASKPSPEGASAASFEYTILDPSSQLLRPDYKDDDDK SEQ ID NO: 9: anti-CD19-41BB-CD3ζ CAR cDNA:
GAATTCGGCTTCCACCATGGCCTTACCAGTGACCGCCTTGCTCCTGCCGC
TGGCCTTGCTGCTCCACGCCGCCAGGCCGGACATCCAGATGACACAGACT
ACATCCTCCCTGTCTGCCTCTCTGGGAGACAGAGTCACCATCAGTTGCAG
GGCAAGTCAGGACATTAGTAAATATTTAAATTGGTATCAGCAGAAACCAG
ATGGAACTGTTAAACTCCTGATCTACCATACATCAAGATTACACTCAGGA
GTCCCATCAAGGTTCAGTGGCAGTGGGTCTGGAACAGATTATTCTCTCAC
CATTAGCAACCTGGAGCAAGAAGATATTGCCACTTACTTTTGCCAACAGG
GTAATACGCTTCCGTACACGTTCGGAGGGGGGACCAAGCTGGAGATCACA
GGTGGCGGTGGCTCGGGCGGTGGTGGGTCGGTGGCGGCGGATCTGAGGT
GAAACTGCAGGAGTCAGGACCTGGCCTGGTGGCGCCCTCACAGAGCCTGT
CCGTCACATGCACTGTCTCAGGGGTCTCATTACCCGACTATGGTGTAAGC
TGGATTCGCCAGCCTCCACGAAAGGGTCTGGAGTGGCTGGGAGTAATATG
GGGTAGTGAAACCACATACTATAATTCAGCTCTCAAATCCAGACTGACCA
TCATCAAGGACAACTCCAAGAGCCAAGTTTTCTTAAAAATGAACAGTCTG
CAAACTGATGACACAGCCATTTACTACTGTGCCAAACATTATTACTACGG
TGGTAGCTATGCTATGGACTACTGGGGCCAAGGAACCTCAGTCACCGTCT
CCTCAACCACGACGCCAGCGCCGCGACCACCAACACCGGCGCCCACCATC
GCGTCGCAGCCCCTGTCCCTGCGCCCAGAGGCGTGCCGGCCAGCGGCGGG
GGGCGCAGTGCACACGAGGGGGCTGGACTTCGCCTGTGATATCTACATCT
GGGCGCCCTTGGCCGGGACTTGTGGGGTCCTTCTCCTGTCACTGGTTATC
ACCCTTTACTGCAAACGGGGCAGAAAGAAACTCCTGTATATATTCAAACA
ACCATTTATGAGACCAGTACAAACTACTCAAGAGGAAGATGGCTGTAGCT
GCCGATTTCCAGAAGAAGAAGAAGGAGGATGTGAACTGAGAGTGAAGTTC
AGCAGGAGCGCAGACGCCCCCGCGTACCAGCAGGGCCAGAACCAGCTCTA
TAACGAGCTCAATCTAGGACGAAGAGAGGAGTACGATGTTTTGGACAAGA
GACGTGGCCGGGACCCTGAGATGGGGGGAAAGCCGAGAAGGAAGAACCCT
CAGGAAGGCCTGTACAATGAACTGCAGAAAGATAAGATGGCGGAGGCCTA
CAGTGAGATTGGGATGAAAGGCGAGCGCCGGAGGGGCAAGGGGCACGATG
GCCTTTACCAGGGTCTCAGTACAGCCACCAAGGACACCTACGACGCCCTT
CACATGCAGGCCCTGCCCCCTCGCTAACAGCCAGGGGATTTCACCACTCA
AAGGCCAGACCTGCAGACGCCCAGATTATGAGACACACTCGAGCC SEQ ID NO: 10: anti-CD19-41BB-CD3ζ CAR
amino acid:
MALPVTALLLPLALLLHAARPDIQMTQTTSSLSASLGDRVTISCRASQDI
SKYLNWYQQKPDGTVKLLIYHTSRLHSGVPSRFSGSGSGTDYSLTISNLE
QEDIATYFCQQGNTLPYTFGGGTKLEITGGGGSGGGGSGGGGSEVKLQES
GPGLVAPSQSLSVTCTVSGVSLPDYGVSWIRQPPRKGLEWLGVIWGSETT
YYNSALKSRLTIIKDNSKSQVFLKMNSLQTDDTAIYYCAKHYYYGGSYAM
DYWGQGTSVTVSSTTTPAPRPPTPAPTIASQPLSLRPEACRPAAGGAVHT
RGLDFACDIYIWAPLAGTCGVLLLSLVITLYCKRGRKKLLYIFKQPFMRP
VQTTQEEDGCSCRFPEEEEGGCELRVKFSRSADAPAYQQGQNQLYNELNL
GRREEYDVLDKRRGRDPEMGGKPRRKNPQEGLYNELQKDKMAEAYSEIGM
KGERRRGKGHDGLYQGLSTATKDTYDALHMQALPPR SEQ ID NO: 11: EpoRm-2A-CAR cDNA:
GCCACCATGGACCACCTCGGGGCGTCCCTCTGGCCCCAGGTCGGCTCCCT
TTGTCTCCTGCTCGCTGGGGCCGCCTGGGCGCCCCCGCCTAACCTCCCGG
ACCCCAAGTTCGAGAGCAAAGCGGCCTTGCTGGCGGCCCGGGGGCCCGAA
GAGCTTCTGTGCTTCACCGAGCGGTTGGAGGACTTGGTGTGTTTCTGGGA
```

-continued
```
GGAAGCGGCGAGCGCTGGGGTGGGCCCGGGCAACTACAGCTTCTCCTACC
AGTTAGAAGATGAGCCATGGAAGCTGTGTCGCCTGCACCAGGCTCCCACG
GCTCGTGGTGCGGTGCGCTTCTGGTGTTCGCTGCCTACAGCCGACACGTC
GAGCTTCGTGCCCCTAGAGTTGCGCGTCACAGCAGCCTCCGCGCTCCGC
GATATCACCGTGTCATCCACATCAATGAAGTAGTGCTCCTAGACGCCCCC
GTGGGGCTGGTGGCGCGGTTGGCTGACGAGAGCGGCCACGTAGTGTTGCG
CTGGCTCCCGCCGCCTGAGACACCCATGACGTCTCACATCCGCTACGAGG
TGGACGTCTCGGCCGGCAACGGCGCAGGGAGCGTACAGAGGGTGGAGATC
CTGGAGGGCCGCACCGAGTGTGTGCTGAGCAACCTGCGGGGCCGGACGCG
CTACACCTTCGCCGTCCGCGCGCGTATGGCTGAGCCGAGCTTCGGCGGCT
TCTGGAGCGCCTGGTCGGAGCCTGTGTCGCTGCTGACGCCTAGCGACCTG
GACCCCCTCATCCTGACGCTCTCCCTCATCCTCGTGGTCATCCTGGTGCT
GCTGACCGTGCTCGCGCTGCTCTCCCACCGCCGGGCTCTGAAGCAGAAGA
TCTGGCCTGGCATCCCGAGCCCAGAGAGCGAGTTTGAAGGCCTCTTCACC
ACCCACAAGGGTAACTTCCAGCTGTGGCTGTACCAGAATGATGGCTGCCT
GTGGTGGAGCCCCTGCACCCCCTTCACGGAGGACCCACCTGCTTCCCTGG
AAGTCCTCTCAGAGCGCTGCTGGGGACGATGCAGGCAGTGGAGCCGGGG
ACAGATGATGAGGGCCCCCTGCTGAGCCAGTGGGCAGTGAGCATGCCCA
GGATACCTATCTGGTGCTGGACAAATGGTTGCTGCCCCGGAACCCGCCCA
GTGAGGACCTCCCAGGGCCTGGTGGCAGTGTGGACATAGTGGCCATGGAT
GAAGGCTCAGAAGCATCCTCCTGCTCATCTGCTTTGGCCTCGAAGCCCAG
CCCAGAGGGAGCCTCTGCTGCCAGCTTTGAGTACACTATCCTGGACCCCA
GCTCCCAGCTCTTGCGTCCAGGATCAGGCGAGGGCAGAGGAAGTCTGCTA
ACATGCGGTGACGTCGAGGAGAATCCTGGCCCAATGGCCTTACCAGTGAC
CGCCTTGCTCCTGCCGCTGGCCTTGCTGCTCCACGCCGCCAGGCCGGACA
TCCAGATGACACAGACTACATCCTCCCTGTCTGCCTCTCTGGGAGACAGA
GTCACCATCAGTTGCAGGGCAAGTCAGGACATTAGTAAATATTTAAATTG
GTATCAGCAGAAACCAGATGGAACTGTTAAACTCCTGATCTACCATACAT
CAAGATTACACTCAGGAGTCCCATCAAGGTTCAGTGGCAGTGGGTCTGGA
ACAGATTATTCTCTCACCATTAGCAACCTGGAGCAAGAAGATATTGCCAC
TTACTTTTGCCAACAGGGTAATACGCTTCCGTACACGTTCGGAGGGGGA
CCAAGCTGGAGATCACAGGTGGCGGTGGCTCGGGCGGTGGTGGGTCGGT
GGCGGCGGATCTGAGGTGAAACTGCAGGAGTCAGGACCTGGCCTGGTGGC
GCCCTCACAGAGCCTGTCCGTCACATGCACTGTCTCAGGGGTCTCATTAC
CCGACTATGGTGTAAGCTGGATTCGCCAGCCTCCACGAAAGGGTCTGGAG
TGGCTGGGAGTAATATGGGGTAGTGAAACCACATACTATAATTCAGCTCT
CAAATCCAGACTGACCATCATCAAGGACAACTCCAAGAGCCAAGTTTTCT
TAAAAATGAACAGTCTGCAAACTGATGACACAGCCATTTACTACTGTGCC
AAACATTATTACTACGGTGGTAGCTATGCTATGGACTACTGGGGCCAAGG
AACCTCAGTCACCGTCTCCTCAACCACGACGCCAGCGCCGCGACCACCAA
CACCGGCGCCCACCATCGCGTCGCAGCCCCTGTCCCTGCGCCCAGAGGCG
TGCCGGCCAGCGGCGGGGGCGCAGTGCACACGAGGGGGCTGGACTTCGC
CTGTGATATCTACATCTGGGCGCCCTTGGCCGGGACTTGTGGGGTCCTTC
TCCTGTCACTGGTTATCACCCTTTACTGCAAACGGGGCAGAAAGAAACTC
CTGTATATATTCAAACAACCATTTATGAGACCAGTACAAACTACTCAAGA
GGAAGATGGCTGTAGCTGCCGATTTCCAGAAGAAGAAGAAGGAGGATGTG
AACTGAGAGTGAAGTTCAGCAGGAGCGCAGACGCCCCCGCGTACCAGCAG
GGCCAGAACCAGCTCTATAACGAGCTCAATCTAGGACGAAGAGAGGAGTA
CGATGTTTTGGACAAGAGACGTGGCCGGGACCCTGAGATGGGGGGAAAGC
CGAGAAGGAAGAACCCTCAGGAAGGCCTGTACAATGAACTGCAGAAAGAT
AAGATGGCGGAGGCCTACAGTGAGATTGGGATGAAAGGCGAGCGCCGGAG
GGGCAAGGGGCACGATGGCCTTTACCAGGGTCTCAGTACAGCCACCAAGG
ACACCTACGACGCCCTCCATATGCAGGCCCTGCCCCCTCGCTAA
```

SEQ ID NO: 12: EpoRm-2A-CAR amino acid:
MDHLGASLWPQVGSLCLLLAGAAWAPPPNLPDPKFESKAALLAARGPEEL
LCFTERLEDLVCFWEEAASAGVGPGNYSFSYQLEDEPWKLCRLHQAPTAR
GAVRFWCSLPTADTSSFVPLELRVTAASGAPRYHRVIHINEVVLLDAPVG
LVARLADESGHVVLRWLPPPETPMTSHIRYEVDVSAGNGAGSVQRVEILE
GRTECVLSNLRGRTRYTFAVRARMAEPSFGGFWSAWSEPVSLLTPSDLDP
LILTLSLILVVILVLLTVLALLSHRRALKQKIWPGIPSPESEFEGLFTTH
KGNFQLWLYQNDGCLWWSPCTPFTEDPPASLEVLSERCWGTMQAVEPGTD
DEGPLLEPVGSEHAQDTYLVLDKWLLPRNPPSEDLPGPGGSVDIVAMDEG
SEASSCSSALASKPSPEGASAASFEYTILDPSSQLLRPGSGEGRGSLLTC
GDVEENPGPMALPVTALLLPLALLLHAARPDIQMTQTTSSLSASLGDRVT
ISCRASQDISKYLNWYQQKPDGTVKLLIYHTSRLHSGVPSRFSGSGSGTD
YSLTISNLEQEDIATYFCQQGNTLPYTFGGGTKLEITGGGGSGGGGSGGG
GSEVKLQESGPGLVAPSQSLSVTCTVSGVSLPDYGVSWIRQPPRKGLEWL
GVIWGSETTYYNSALKSRLTIIKDNSKSQVFLKMNSLQTDDTAIYYCAKH
YYYGGSYAMDYWGQGTSVTVSSTTTPAPRPPTPAPTIASQPLSLRPEACR
PAAGGAVHTRGLDFACDIYIWAPLAGTCGVLLLSLVITLYCKRGRKKLLY
IFKQPFMRPVQTTQEEDGCSCRFPEEEEGGCELRVKFSRSADAPAYQQGQ
NQLYNELNLGRREEYDVLDKRRGRDPEMGGKPRRKNPQEGLYNELQKDKM
AEAYSEIGMKGERRRGKGHDGLYQGLSTATKDTYDALHMQALPPR SEQ ID NO: 13: P2A cDNA:
GGAAGCGGAGCTACTAACTTCAGCCTGCTGAAGCAGGCTGGAGACGTGGA
GGAGAACCCTGGACCT SEQ ID NO: 14: P2A amino acid:
GSGATNFSLLKQAGDVEENPGP SEQ ID NO: 15: T2A cDNA:
GGAAGCGGAGAGGGCAGAGGAAGTCTGCTAACATGCGGTGACGTCGAGGA
GAATCCTGGACCT SEQ ID NO: 16: T2A amino acid:
GSGEGRGSLLTCGDVEENPGP SEQ ID NO: 17: E2A cDNA:
GGAAGCGGACAGTGTACTAATTATGCTCTCTTGAAATTGGCTGGAGATGT

TGAGAGCAACCCTGGACCT

SEQ ID NO: 18: E2A amino acid:
GSGQCTNYALLKLAGDVESNPGP

SEQ ID NO: 19: F2A cDNA:
GGAAGCGGAGTGAAACAGACTTTGAATTTTGACCTTCTCAAGTTGGCGGG

AGACGTGGAGTCCAACCCTGGACCT

SEQ ID NO: 20: F2A amino acid:
GSGVKQTLNFDLLKLAGDVESNPGP

SEQ ID NO: 21: CD8α signal peptide cDNA:
ATGGCCTTACCAGTGACCGCCTTGCTCCTGCCGCTGGCCTTGCTGCTCCA

CGCCGCCAGGCCG

SEQ ID NO: 22: CD8α signal peptide amino acid:
MALPVTALLLPLALLLHAARP

INCORPORATION BY REFERENCE;
EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A mammalian T cell comprising a vector, the vector comprising a nucleic acid encoding:
   a) an erythropoietin (Epo) receptor;
   b) a 2A peptide; and
   c) a chimeric antigen receptor comprising:
      i) a signal peptide;
      ii) an extracellular receptor domain that binds CD19;
      iii) a hinge and transmembrane domain that anchors the extracellular receptor domain on the surface of a cell; and
      iv) an effector domain;
   wherein the Epo receptor is expressed on the mammalian T cell surface, and
   wherein the nucleic acid encodes SEQ ID NO: 12.

2. A method of making a transgenic mammalian T cell, the method comprising introducing a vector into a mammalian T cell, the vector comprising a nucleic acid encoding:
   a) an erythropoietin (Epo) receptor;
   b) a 2A peptide; and
   c) a chimeric antigen receptor comprising:
      i) a signal peptide;
      ii) an extracellular receptor domain that binds CD19;
      iii) a hinge and transmembrane domain that anchors the extracellular receptor domain on the surface of the mammalian T cell; and
      iv) an effector domain;
   wherein the Epo receptor is expressed on the mammalian T cell surface, and
   wherein the nucleic acid encodes SEQ ID NO: 12.

3. The method of claim 2, wherein the mammalian T cell further expresses a T-cell receptor (TCR) that binds a tumor antigen or a viral antigen.

4. The method of claim 3, wherein the TCR is endogenous.

5. The method of claim 4, wherein the mammalian T cell is a tumor-infiltrating lymphocyte (TIL), and wherein the method further comprises extracting the tumor-infiltrating lymphocyte from a tumor and expanding the TIL ex vivo.

6. The mammalian T cell of claim 1, wherein the mammalian T cell is a human T cell.

7. The mammalian T cell of claim 1, wherein the mammalian T cell is a human peripheral blood T lymphocyte.

8. The mammalian T cell of claim 1, wherein the mammalian T cell expresses a T-cell receptor (TCR) that binds a tumor antigen or a viral antigen.

9. The mammalian T cell of claim 8, wherein the TCR is endogenous.

10. The mammalian T cell of claim 9, wherein the mammalian T cell is a tumor-infiltrating lymphocyte (TIL).

11. The mammalian T cell of claim 1, wherein the mammalian T cell is a CD8+ T cell.

12. The method of claim 2, wherein the mammalian T cell is a CD8+ T cell.

* * * * *

SEQUENCE LISTING

<160> NUMBER OF SEQ ID NOS: 28

<210> SEQ ID NO 1
<211> LENGTH: 1551
<212> TYPE: DNA
<213> ORGANISM: Artificial Sequence
<220> FEATURE:
<223> OTHER INFORMATION: Description of Artificial Sequence: Synthetic
      Epo receptor (EpoR) cDNA sequence

<400> SEQUENCE: 1
ccggaattcg ccaccatgga ccacctcggg gcgtccctct ggccccaggt cggctccctt    60
tgtctcctgc tcgctggggc cgcctgggcg ccccgcccta acctcccgga ccccaagttc   120
gagagcaaag cggccttgct ggcggcccgg gggcccgaag agcttctgtg cttcaccgag   180
cggttggagg acttggtgtg tttctgggag gaagcggcga gcgctggggt gggcccgggc   240
aactacagct tctcctacca gttagaagat gagccatgga gctgtgtcg cctgcaccag   300 gctcccacgg ctcgtggtgc ggtgcgcttc tggtgttcgc tgcctacagc cgacacgtcg   360
agcttcgtgc ccctagagtt gcgcgtcaca gcagcctccg gcgctccgcg atatcaccgt   420
gtcatccaca tcaatgaagt agtgctccta gacgcccccg tggggctggt ggcgcggttg   480
gctgacgaga gcggccacgt agtgttgcgc tggctcccgc cgcctgagac acccatgacg   540
tctcacatcc gctacgaggt ggacgtctcg gccggcaacg gcgcagggag cgtacagagg   600
gtggagatcc tggagggccg caccgagtgt gtgctgagca acctgcgggg ccggacgcgc   660
tacaccttcg ccgtccgcgc gcgtatggct gagccgagct cggcggctt ctggagcgcc   720 tggtcggagc ctgtgtcgct gctgacgcct agcgacctgg accccctcat cctgacgctc   780
tccctcatcc tcgtggtcat cctggtgctg ctgaccgtgc tcgcgctgct ctcccaccgc   840
cgggctctga agcagaagat ctggcctggc atcccgagcc agagagcga gtttgaaggc   900 ctcttcacca cccacaaggg taacttccag ctgtggctgt accagaatga tggctgcctg    960
tggtggagcc cctgcacccc cttcacggag gacccacctg cttccctgga agtcctctca   1020
gagcgctgct ggggacgat gcaggcagtg gagcggggga cagatgatga gggcccctg   1080 ctggagccag tgggcagtga gcatgcccag gataccctatc tggtgctgga caaatggttg   1140 ctgcccgga acccgcccag tgaggacctc ccagggcctg gtgcagtgt ggacatagtg   1200 gccatggatg aaggctcaga agcatcctcc tgctcatctg ctttggcctc gaagcccagc   1260

-continued

```
ccagagggag cctctgctgc cagctttgag tacactatcc tggacccag ctcccagctc    1320 ttgcgtccat ggacactgtg ccctgagctg cccctaccc cacccacct aaagtacctg    1380 taccttgtgg tatctgactc tggcatctca actgactaca gctcagggga ctcccaggga    1440
gcccaagggg gcttatccga tggcccctac tccaacccctt atgagaacag ccttatccca    1500
gccgctgagc ctctgccccc cagctatgtg gcttgctctt agctcgagcg g             1551
```

<210> SEQ ID NO 2
<211> LENGTH: 508
<212> TYPE: PRT
<213> ORGANISM: Artificial Sequence
<220> FEATURE:
<223> OTHER INFORMATION: Description of Artificial Sequence: Synthetic
      Epo receptor (EpoR) amino acid sequence

<400> SEQUENCE: 2

```
Met Asp His Leu Gly Ala Ser Leu Trp Pro Gln Val Gly Ser Leu Cys
1               5                   10                  15

Leu Leu Leu Ala Gly Ala Ala Trp Ala Pro Pro Asn Leu Pro Asp
            20                  25                  30

Pro Lys Phe Glu Ser Lys Ala Ala Leu Leu Ala Ala Arg Gly Pro Glu
        35                  40                  45

Glu Leu Leu Cys Phe Thr Glu Arg Leu Glu Asp Leu Val Cys Phe Trp
    50                  55                  60

Glu Glu Ala Ala Ser Ala Gly Val Gly Pro Gly Asn Tyr Ser Phe Ser
65                  70                  75                  80

Tyr Gln Leu Glu Asp Glu Pro Trp Lys Leu Cys Arg Leu His Gln Ala
                85                  90                  95

Pro Thr Ala Arg Gly Ala Val Arg Phe Trp Cys Ser Leu Pro Thr Ala
            100                 105                 110

Asp Thr Ser Ser Phe Val Pro Leu Glu Leu Arg Val Thr Ala Ala Ser
        115                 120                 125

Gly Ala Pro Arg Tyr His Arg Val Ile His Ile Asn Glu Val Val Leu
    130                 135                 140

Leu Asp Ala Pro Val Gly Leu Val Ala Arg Leu Ala Asp Glu Ser Gly
145                 150                 155                 160

His Val Val Leu Arg Trp Leu Pro Pro Pro Glu Thr Pro Met Thr Ser
                165                 170                 175

His Ile Arg Tyr Glu Val Asp Val Ser Ala Gly Asn Gly Ala Gly Ser
            180                 185                 190

Val Gln Arg Val Glu Ile Leu Glu Gly Arg Thr Glu Cys Val Leu Ser
        195                 200                 205

Asn Leu Arg Gly Arg Thr Arg Tyr Thr Phe Ala Val Arg Ala Arg Met
    210                 215                 220

Ala Glu Pro Ser Phe Gly Gly Phe Trp Ser Ala Trp Ser Glu Pro Val
225                 230                 235                 240

Ser Leu Leu Thr Pro Ser Asp Leu Asp Pro Leu Ile Leu Thr Leu Ser
                245                 250                 255

Leu Ile Leu Val Val Ile Leu Val Leu Leu Thr Val Leu Ala Leu Leu
            260                 265                 270

Ser His Arg Arg Ala Leu Lys Gln Lys Ile Trp Pro Gly Ile Pro Ser
        275                 280                 285

Pro Glu Ser Glu Phe Glu Gly Leu Phe Thr Thr His Lys Gly Asn Phe
    290                 295                 300

Gln Leu Trp Leu Tyr Gln Asn Asp Gly Cys Leu Trp Trp Ser Pro Cys
```

```
                305                 310                 315                 320
            Thr Pro Phe Thr Glu Asp Pro Pro Ala Ser Leu Glu Val Leu Ser Glu
                            325                 330                 335

Arg Cys Trp Gly Thr Met Gln Ala Val Glu Pro Gly Thr Asp Asp Glu
                        340                 345                 350

Gly Pro Leu Leu Glu Pro Val Gly Ser Glu His Ala Gln Asp Thr Tyr
                    355                 360                 365

Leu Val Leu Asp Lys Trp Leu Leu Pro Arg Asn Pro Pro Ser Glu Asp
                370                 375                 380

Leu Pro Gly Pro Gly Gly Ser Val Asp Ile Val Ala Met Asp Glu Gly
            385                 390                 395                 400

Ser Glu Ala Ser Ser Cys Ser Ser Ala Leu Ala Ser Lys Pro Ser Pro
                            405                 410                 415

Glu Gly Ala Ser Ala Ala Ser Phe Glu Tyr Thr Ile Leu Asp Pro Ser
                        420                 425                 430

Ser Gln Leu Leu Arg Pro Trp Thr Leu Cys Pro Glu Leu Pro Pro Thr
                    435                 440                 445

Pro Pro His Leu Lys Tyr Leu Tyr Leu Val Val Ser Asp Ser Gly Ile
                450                 455                 460

Ser Thr Asp Tyr Ser Ser Gly Asp Ser Gln Gly Ala Gln Gly Gly Leu
            465                 470                 475                 480

Ser Asp Gly Pro Tyr Ser Asn Pro Tyr Glu Asn Ser Leu Ile Pro Ala
                            485                 490                 495

Ala Glu Pro Leu Pro Pro Ser Tyr Val Ala Cys Ser
                        500                 505

<210> SEQ ID NO 3
<211> LENGTH: 1581
<212> TYPE: DNA
<213> ORGANISM: Artificial Sequence
<220> FEATURE:
<223> OTHER INFORMATION: Description of Artificial Sequence: Synthetic
      EpoR with Flag tag cDNA sequence

<400> SEQUENCE: 3
atatatgaat tcgccaccat ggaccacctc ggggcgtccc tctggcccca ggtcggctcc      60
ctttgtctcc tgctcgctgg ggccgcctgg gcgcccccgc ctaacctccc ggaccccaag     120
ttcgagagca aagcggcctt gctggcggcc gggggcccg aagagcttct gtgcttcacc      180
gagcggttgg aggacttggt gtgtttctgg gaggaagcgg cgagcgctgg ggtgggcccg     240
ggcaactaca gcttctccta ccagttagaa gatgagccat ggaagctgtg tcgcctgcac     300
caggctccca cggctcgtgg tgcggtgcgc ttctggtgtt cgctgcctac agccgacacg     360
tcgagcttcg tgccctaga gttgcgcgtc acagcagcct ccggcgctcc gcgatatcac      420
cgtgtcatcc acatcaatga agtagtgctc ctagacgccc ccgtggggct ggtggcgcgg     480
ttggctgacg agagcggcca cgtagtgttg cgctggctcc gccgcctga dacacccatg      540 acgtctcaca tccgctacga ggtggacgtc tcggccggca acggcgcagg gagcgtacag     600
agggtggaga tcctggaggg ccgcaccgag tgtgtgctga gcaacctgcg gggccggacg     660
cgctacacct tcgccgtccg cgcgcgtatg gctgagccga gcttcggcgg cttctggagc     720
gcctggtcgg agcctgtgtc gctgctgacg cctagcgacc tggacccccc catcctgacg     780
ctctccctca tcctcgtggt catcctggtc ctgctgaccg tgctcgcgct gctctcccac     840
cgccgggctc tgaagcagaa gatctggcct ggcatcccga gcccagagag cgagtttgaa     900
```

```
ggcctcttca ccacccacaa gggtaacttc cagctgtggc tgtaccagaa tgatggctgc    960
ctgtggtgga gccctgcac ccccttcacg gaggacccac ctgcttccct ggaagtcctc   1020
tcagagcgct gctgggggac gatgcaggca gtggagccgg ggacagatga tgagggcccc   1080
ctgctggagc cagtgggcag tgagcatgcc caggatacct atctggtgct ggacaaatgg   1140
ttgctgcccc ggaacccgcc cagtgaggac ctcccagggc ctggtggcag tgtggacata   1200
gtggccatgg atgaaggctc agaagcatcc tcctgctcat ctgctttggc ctcgaagccc   1260
agcccagagg gagcctctgc tgccagcttt gagtacacta tcctggaccc cagctcccag   1320
ctcttgcgtc catggacact gtgccctgag ctgccccta ccccaccca cctaaagtac   1380 ctgtaccttg tggtatctga ctctggcatc tcaactgact acagctcagg ggactcccag   1440
ggagcccaag ggggcttatc cgatggcccc tactccaacc cttatgagaa cagccttatc   1500
ccagccgctg agcctctgcc ccccagctat gtggcttgct ctgactacaa agacgatgac   1560
gacaagtagc tcgagtatat a                                             1581
```

<210> SEQ ID NO 4
<211> LENGTH: 516
<212> TYPE: PRT
<213> ORGANISM: Artificial Sequence
<220> FEATURE:
<223> OTHER INFORMATION: Description of Artificial Sequence: Synthetic
      EpoR with Flag tag amino acid sequence

<400> SEQUENCE: 4

```
Met Asp His Leu Gly Ala Ser Leu Trp Pro Gln Val Gly Ser Leu Cys
1               5                   10                  15

Leu Leu Leu Ala Gly Ala Ala Trp Ala Pro Pro Asn Leu Pro Asp
            20                  25                  30

Pro Lys Phe Glu Ser Lys Ala Ala Leu Leu Ala Ala Arg Gly Pro Glu
        35                  40                  45

Glu Leu Leu Cys Phe Thr Glu Arg Leu Glu Asp Leu Val Cys Phe Trp
    50                  55                  60

Glu Glu Ala Ala Ser Ala Gly Val Gly Pro Gly Asn Tyr Ser Phe Ser
65                  70                  75                  80

Tyr Gln Leu Glu Asp Glu Pro Trp Lys Leu Cys Arg Leu His Gln Ala
                85                  90                  95

Pro Thr Ala Arg Gly Ala Val Arg Phe Trp Cys Ser Leu Pro Thr Ala
            100                 105                 110

Asp Thr Ser Ser Phe Val Pro Leu Glu Leu Arg Val Thr Ala Ala Ser
        115                 120                 125

Gly Ala Pro Arg Tyr His Arg Val Ile His Ile Asn Glu Val Val Leu
    130                 135                 140

Leu Asp Ala Pro Val Gly Leu Val Ala Arg Leu Ala Asp Glu Ser Gly
145                 150                 155                 160

His Val Val Leu Arg Trp Leu Pro Pro Pro Glu Thr Pro Met Thr Ser
                165                 170                 175

His Ile Arg Tyr Glu Val Asp Val Ser Ala Gly Asn Gly Ala Gly Ser
            180                 185                 190

Val Gln Arg Val Glu Ile Leu Glu Gly Arg Thr Glu Cys Val Leu Ser
        195                 200                 205

Asn Leu Arg Gly Arg Thr Arg Tyr Thr Phe Ala Val Arg Ala Arg Met
    210                 215                 220

Ala Glu Pro Ser Phe Gly Gly Phe Trp Ser Ala Trp Ser Glu Pro Val
225                 230                 235                 240
```

```
Ser Leu Leu Thr Pro Ser Asp Leu Asp Pro Leu Ile Leu Thr Leu Ser
            245                 250                 255

Leu Ile Leu Val Val Ile Leu Val Leu Leu Thr Val Leu Ala Leu Leu
            260                 265                 270

Ser His Arg Arg Ala Leu Lys Gln Lys Ile Trp Pro Gly Ile Pro Ser
            275                 280                 285

Pro Glu Ser Glu Phe Glu Gly Leu Phe Thr Thr His Lys Gly Asn Phe
            290                 295                 300

Gln Leu Trp Leu Tyr Gln Asn Asp Gly Cys Leu Trp Trp Ser Pro Cys
305                 310                 315                 320

Thr Pro Phe Thr Glu Asp Pro Pro Ala Ser Leu Glu Val Leu Ser Glu
            325                 330                 335

Arg Cys Trp Gly Thr Met Gln Ala Val Glu Pro Gly Thr Asp Asp Glu
            340                 345                 350

Gly Pro Leu Leu Glu Pro Val Gly Ser Glu His Ala Gln Asp Thr Tyr
            355                 360                 365

Leu Val Leu Asp Lys Trp Leu Leu Pro Arg Asn Pro Pro Ser Glu Asp
            370                 375                 380

Leu Pro Gly Pro Gly Gly Ser Val Asp Ile Val Ala Met Asp Glu Gly
385                 390                 395                 400

Ser Glu Ala Ser Ser Cys Ser Ser Ala Leu Ala Ser Lys Pro Ser Pro
            405                 410                 415

Glu Gly Ala Ser Ala Ala Ser Phe Glu Tyr Thr Ile Leu Asp Pro Ser
            420                 425                 430

Ser Gln Leu Leu Arg Pro Trp Thr Leu Cys Pro Glu Leu Pro Pro Thr
            435                 440                 445

Pro Pro His Leu Lys Tyr Leu Tyr Leu Val Val Ser Asp Ser Gly Ile
            450                 455                 460

Ser Thr Asp Tyr Ser Ser Gly Asp Ser Gln Gly Ala Gln Gly Gly Leu
465                 470                 475                 480

Ser Asp Gly Pro Tyr Ser Asn Pro Tyr Glu Asn Ser Leu Ile Pro Ala
            485                 490                 495

Ala Glu Pro Leu Pro Pro Ser Tyr Val Ala Cys Ser Asp Tyr Lys Asp
            500                 505                 510

Asp Asp Asp Lys
        515

<210> SEQ ID NO 5
<211> LENGTH: 1551
<212> TYPE: DNA
<213> ORGANISM: Artificial Sequence
<220> FEATURE:
<223> OTHER INFORMATION: Description of Artificial Sequence: Synthetic
      mutant EpoR (EpoRm) cDNA sequence

<400> SEQUENCE: 5
ccggaattcg ccaccatgga ccacctcggg gcgtccctct ggccccaggt cggctccctt    60
tgtctcctgc tcgctggggc cgcctgggcg ccccgcccta acctcccgga ccccaagttc    120
gagagcaaag cggccttgct ggcggcccgg gggcccgaag agcttctgtg cttcaccgag    180
cggttggagg acttggtgtg tttctgggag gaagcggcga cgctggggt gggcccgggc    240 aactacagct tctcctacca gttagaagat gagccatgga agctgtgtcg cctgcaccag    300
gctcccacgc tcgtggtgc ggtgcgcttc tggtgttcgc tgcctacagc cgacacgtcg    360
agcttcgtgc ccctagagtt gcgcgtcaca gcagcctccg gcgctccgcg atatcaccgt    420
```

```
gtcatccaca tcaatgaagt agtgctccta gacgccccg tggggctggt ggcgcggttg      480
gctgacgaga gcggccacgt agtgttgcgc tggctcccgc cgcctgagac acccatgacg      540
tctcacatcc gctacgaggt ggacgtctcg gccggcaacg gcgcagggag cgtacagagg      600
gtggagatcc tggagggccg caccgagtgt gtgctgagca acctgcgggg ccggacgcgc      660
tacaccttcg ccgtccgcgc gcgtatggct gagccgagct tcggcggctt ctggagcgcc      720
tggtcggagc ctgtgtcgct gctgacgcct agcgacctgg accccctcat cctgacgctc      780
tccctcatcc tcgtggtcat cctggtgctg ctgaccgtgc tcgcgctgct ctcccaccgc      840
cgggctctga agcagaagat ctggcctggc atcccgagcc agagagcga gtttgaaggc      900 ctcttcacca cccacaaggg taacttccag ctgtggctgt accagaatga tggctgcctg      960
tggtggagcc cctgcacccc cttcacggag acccacctg cttccctgga agtcctctca     1020
gagcgctgct gggggacgat gcaggcagtg gagccgggga cagatgatga gggcccctg     1080 ctggagccag tgggcagtga gcatgccag gataccctatc tggtgctgga caaatggttg     1140
ctgccccgga acccgcccag tgaggacctc ccagggcctg gtggcagtgt ggacatagtg     1200
gccatggatg aaggctcaga agcatcctcc tgctcatctg ctttggcctc gaagcccagc     1260
ccagagggag cctctgctgc cagctttgag tacactatcc tggaccccag ctcccagctc     1320
ttgcgtccat agacactgtg ccctgagctg ccccctaccc cacccaccct aaagtacctg     1380
taccttgtgg tatctgactc tggcatctca actgactaca gctcagggga ctcccaggga     1440
gcccaagggg gcttatccga tggccctac tccaacccctt atgagaacag ccttatccca     1500
gccgctgagc ctctgccccc cagctatgtg gcttgctctt agctcgagcg g              1551

<210> SEQ ID NO 6
<211> LENGTH: 438
<212> TYPE: PRT
<213> ORGANISM: Artificial Sequence
<220> FEATURE:
<223> OTHER INFORMATION: Description of Artificial Sequence: Synthetic
      mutant EpoR (EpoRm) amino acid sequence

<400> SEQUENCE: 6

Met Asp His Leu Gly Ala Ser Leu Trp Pro Gln Val Gly Ser Leu Cys
1               5                   10                  15

Leu Leu Leu Ala Gly Ala Ala Trp Ala Pro Pro Asn Leu Pro Asp
            20                  25                  30

Pro Lys Phe Glu Ser Lys Ala Ala Leu Leu Ala Ala Arg Gly Pro Glu
        35                  40                  45

Glu Leu Leu Cys Phe Thr Glu Arg Leu Glu Asp Leu Val Cys Phe Trp
    50                  55                  60

Glu Glu Ala Ala Ser Ala Gly Val Gly Pro Gly Asn Tyr Ser Phe Ser
65                  70                  75                  80

Tyr Gln Leu Glu Asp Glu Pro Trp Lys Leu Cys Arg Leu His Gln Ala
                85                  90                  95

Pro Thr Ala Arg Gly Ala Val Arg Phe Trp Cys Ser Leu Pro Thr Ala
            100                 105                 110

Asp Thr Ser Ser Phe Val Pro Leu Glu Leu Arg Val Thr Ala Ala Ser
        115                 120                 125

Gly Ala Pro Arg Tyr His Arg Val Ile His Ile Asn Glu Val Val Leu
    130                 135                 140

Leu Asp Ala Pro Val Gly Leu Val Ala Arg Leu Ala Asp Glu Ser Gly
145                 150                 155                 160
```

```
His Val Val Leu Arg Trp Leu Pro Pro Glu Thr Pro Met Thr Ser
            165                 170                 175

His Ile Arg Tyr Glu Val Asp Val Ser Ala Gly Asn Gly Ala Gly Ser
        180                 185                 190

Val Gln Arg Val Glu Ile Leu Glu Gly Arg Thr Glu Cys Val Leu Ser
            195                 200                 205

Asn Leu Arg Gly Arg Thr Arg Tyr Thr Phe Ala Val Arg Ala Arg Met
210                 215                 220

Ala Glu Pro Ser Phe Gly Gly Phe Trp Ser Ala Trp Ser Glu Pro Val
225                 230                 235                 240

Ser Leu Leu Thr Pro Ser Asp Leu Asp Pro Leu Ile Leu Thr Leu Ser
            245                 250                 255

Leu Ile Leu Val Val Ile Leu Val Leu Leu Thr Val Leu Ala Leu Leu
            260                 265                 270

Ser His Arg Arg Ala Leu Lys Gln Lys Ile Trp Pro Gly Ile Pro Ser
            275                 280                 285

Pro Glu Ser Glu Phe Glu Gly Leu Phe Thr Thr His Lys Gly Asn Phe
    290                 295                 300

Gln Leu Trp Leu Tyr Gln Asn Asp Gly Cys Leu Trp Trp Ser Pro Cys
305                 310                 315                 320

Thr Pro Phe Thr Glu Asp Pro Pro Ala Ser Leu Glu Val Leu Ser Glu
                325                 330                 335

Arg Cys Trp Gly Thr Met Gln Ala Val Glu Pro Gly Thr Asp Asp Glu
                340                 345                 350

Gly Pro Leu Leu Glu Pro Val Gly Ser Glu His Ala Gln Asp Thr Tyr
            355                 360                 365

Leu Val Leu Asp Lys Trp Leu Leu Pro Arg Asn Pro Pro Ser Glu Asp
370                 375                 380

Leu Pro Gly Pro Gly Gly Ser Val Asp Ile Val Ala Met Asp Glu Gly
385                 390                 395                 400

Ser Glu Ala Ser Ser Cys Ser Ser Ala Leu Ala Ser Lys Pro Ser Pro
                405                 410                 415

Glu Gly Ala Ser Ala Ala Ser Phe Glu Tyr Thr Ile Leu Asp Pro Ser
            420                 425                 430

Ser Gln Leu Leu Arg Pro
            435

<210> SEQ ID NO 7
<211> LENGTH: 1371
<212> TYPE: DNA
<213> ORGANISM: Artificial Sequence
<220> FEATURE:
<223> OTHER INFORMATION: Description of Artificial Sequence: Synthetic
      EpoRm with Flag tag cDNA sequence

<400> SEQUENCE: 7
atatatgaat cgccaccat ggaccacctc ggggcgtccc tctggcccca ggtcggctcc        60
ctttgtctcc tgctcgctgg ggccgcctgg gcgccccgc ctaacctccc ggaccccaag       120
ttcgagagca aagcggcctt gctggcggcc cgggggcccg aagagcttct gtgcttcacc      180
gagcggttgg aggacttggt gtgtttctgg gaggaagcgg cgagcgctgg ggtgggcccg      240
ggcaactaca gcttctccta ccagttagaa gatgagccat ggaagctgtg tcgcctgcac      300
caggctccca cggtcgtgg tgcggtgcgc ttctggtgtt cgctgcctac agccgacacg      360
tcgagcttcg tgcccctaga gttgcgcgtc acagcagcct ccggcgctcc gcgatatcac      420
```

```
cgtgtcatcc acatcaatga agtagtgctc ctagacgccc ccgtggggct ggtggcgcgg    480
ttggctgacg agagcggcca cgtagtgttg cgctggctcc cgccgcctga cacccatg      540 acgtctcaca tccgctacga ggtggacgtc tcggccggca acggcgcagg gagcgtacag    600
agggtggaga tcctggaggg ccgcaccgag tgtgtgctga gcaacctgcg gggccggacg    660
cgctacacct tcgccgtccg cgcgcgtatg gctgagccga gcttcggcgg cttctggagc    720
gcctggtcgg agcctgtgtc gctgctgacg cctagcgacc tggacccct catcctgacg     780 ctctccctca tcctcgtggt catcctggtg ctgctgaccg tgctcgcgct gctctcccac    840
cgccgggctc tgaagcagaa gatctggcct ggcatcccga gcccagagag cgagtttgaa    900
ggcctcttca ccacccacaa gggtaacttc agctgtggc tgtaccagaa tgatggctgc     960
ctgtggtgga gccccgcac ccccttcacg gaggacccac ctgcttccct ggaagtcctc    1020
tcagagcgct gctgggggac gatgcaggca gtggagccgg ggacagatga tgagggcccc   1080
ctgctggagc cagtgggcag tgagcatgcc caggatacct atctggtgct ggacaaatgg   1140
ttgctgcccc ggaacccgcc cagtgaggac ctcccagggc ctggtggcag tgtggacata   1200
gtggccatgg atgaaggctc agaagcatcc tcctgctcat ctgctttggc ctcgaagccc   1260
agcccagagg gagcctctgc tgccagcttt gagtacacta tcctggaccc cagctcccag   1320
ctcttgcgtc cagactacaa agacgatgac gacaagtagc tcgagtatat a             1371
```

<210> SEQ ID NO 8
<211> LENGTH: 446
<212> TYPE: PRT
<213> ORGANISM: Artificial Sequence
<220> FEATURE:
<223> OTHER INFORMATION: Description of Artificial Sequence: Synthetic
    EpoRm with Flag tag amino acid sequence

<400> SEQUENCE: 8

```
Met Asp His Leu Gly Ala Ser Leu Trp Pro Gln Val Gly Ser Leu Cys
1               5                   10                  15

Leu Leu Leu Ala Gly Ala Ala Trp Ala Pro Pro Asn Leu Pro Asp
            20                  25                  30

Pro Lys Phe Glu Ser Lys Ala Ala Leu Leu Ala Ala Arg Gly Pro Glu
        35                  40                  45

Glu Leu Leu Cys Phe Thr Glu Arg Leu Glu Asp Leu Val Cys Phe Trp
    50                  55                  60

Glu Glu Ala Ala Ser Ala Gly Val Gly Pro Gly Asn Tyr Ser Phe Ser
65                  70                  75                  80

Tyr Gln Leu Glu Asp Glu Pro Trp Lys Leu Cys Arg Leu His Gln Ala
                85                  90                  95

Pro Thr Ala Arg Gly Ala Val Arg Phe Trp Cys Ser Leu Pro Thr Ala
            100                 105                 110

Asp Thr Ser Ser Phe Val Pro Leu Glu Leu Arg Val Thr Ala Ala Ser
        115                 120                 125

Gly Ala Pro Arg Tyr His Arg Val Ile His Ile Asn Glu Val Val Leu
    130                 135                 140

Leu Asp Ala Pro Val Gly Leu Val Ala Arg Leu Ala Asp Glu Ser Gly
145                 150                 155                 160

His Val Val Leu Arg Trp Leu Pro Pro Glu Thr Pro Met Thr Ser
                165                 170                 175

His Ile Arg Tyr Glu Val Asp Val Ser Ala Gly Asn Gly Ala Gly Ser
            180                 185                 190
```

Val Gln Arg Val Glu Ile Leu Glu Gly Arg Thr Glu Cys Val Leu Ser
        195                 200                 205

Asn Leu Arg Gly Arg Thr Arg Tyr Thr Phe Ala Val Arg Ala Arg Met
    210                 215                 220

Ala Glu Pro Ser Phe Gly Gly Phe Trp Ser Ala Trp Ser Glu Pro Val
225                 230                 235                 240

Ser Leu Leu Thr Pro Ser Asp Leu Asp Pro Leu Ile Leu Thr Leu Ser
                245                 250                 255

Leu Ile Leu Val Val Ile Leu Val Leu Leu Thr Val Leu Ala Leu Leu
            260                 265                 270

Ser His Arg Arg Ala Leu Lys Gln Lys Ile Trp Pro Gly Ile Pro Ser
        275                 280                 285

Pro Glu Ser Glu Phe Glu Gly Leu Phe Thr Thr His Lys Gly Asn Phe
    290                 295                 300

Gln Leu Trp Leu Tyr Gln Asn Asp Gly Cys Leu Trp Trp Ser Pro Cys
305                 310                 315                 320

Thr Pro Phe Thr Glu Asp Pro Pro Ala Ser Leu Glu Val Leu Ser Glu
                325                 330                 335

Arg Cys Trp Gly Thr Met Gln Ala Val Glu Pro Gly Thr Asp Asp Glu
            340                 345                 350

Gly Pro Leu Leu Glu Pro Val Gly Ser Glu His Ala Gln Asp Thr Tyr
        355                 360                 365

Leu Val Leu Asp Lys Trp Leu Leu Pro Arg Asn Pro Pro Ser Glu Asp
    370                 375                 380

Leu Pro Gly Pro Gly Gly Ser Val Asp Ile Val Ala Met Asp Glu Gly
385                 390                 395                 400

Ser Glu Ala Ser Ser Cys Ser Ser Ala Leu Ala Ser Lys Pro Ser Pro
                405                 410                 415

Glu Gly Ala Ser Ala Ala Ser Phe Glu Tyr Thr Ile Leu Asp Pro Ser
            420                 425                 430

Ser Gln Leu Leu Arg Pro Asp Tyr Lys Asp Asp Asp Lys
        435                 440                 445

<210> SEQ ID NO 9
<211> LENGTH: 1545
<212> TYPE: DNA
<213> ORGANISM: Artificial Sequence
<220> FEATURE:
<223> OTHER INFORMATION: Description of Artificial Sequence: Synthetic
      anti-CD19-41BB-CD3-zeta CAR cDNA sequence

<400> SEQUENCE: 9
gaattcggct tccaccatgg ccttaccagt gaccgccttg ctcctgccgc tggccttgct     60
gctccacgcc gccaggccgg acatccagat gacacagact catcctcccc tgtctgcctc    120
tctgggagac agagtcacca tcagttgcag ggcaagtcag acattagta aatatttaaa    180 ttggtatcag cagaaaccag atggaactgt taaactcctg atctaccata tcaagatt     240 acactcagga gtcccatcaa ggttcagtgg cagtgggtct ggaacagatt attctctcac    300
cattagcaac ctggagcaag aagatattgc cacttacttt tgccaacagg gtaatacgct    360
tccgtacacg ttcggagggg ggaccaagct ggagatcaca ggtggcggtg gctcgggcgg    420
tggtgggtcg ggtggcggcg gatctgaggt gaaactgcag gagtcaggac ctggcctggt    480
ggcgccctca cagagcctgt ccgtcacatg cactgtctca ggggtctcat tacccgacta    540
tggtgtaagc tggattcgcc agcctccacg aaagggtctg gagtggctgg gagtaatatg    600

```
gggtagtgaa accacatact ataattcagc tctcaaatcc agactgacca tcatcaagga      660
caactccaag agccaagttt tcttaaaaat gaacagtctg caaactgatg acacagccat      720
ttactactgt gccaaacatt attactacgg tggtagctat gctatggact actggggcca      780
aggaacctca gtcaccgtct cctcaaccac gacgccagcg ccgcgaccac caacaccggc      840
gcccaccatc gcgtcgcagc cctgtcccct gcgcccagag gcgtgccggc cagcggcggg      900
gggcgcagtg cacacgaggg ggctggactt cgcctgtgat atctacatct gggcgccctt      960
ggccgggact tgtggggtcc ttctcctgtc actggttatc acccttact gcaaacgggg     1020 cagaaagaaa ctcctgtata tattcaaaca accatttatg agaccagtac aaactactca     1080
agaggaagat ggctgtagct gccgatttcc agaagaagaa gaaggaggat gtgaactgag     1140
agtgaagttc agcaggagcg cagacgcccc cgcgtaccag cagggccaga accagctcta     1200
taacgagctc aatctaggac gaagagagga gtacgatgtt ttggacaaga gacgtggccg     1260
ggaccctgag atgggggaa agccgagaag gaagaaccct caggaaggcc tgtacaatga     1320
actgcagaaa gataagatgg cggaggccta cagtgagatt gggatgaaag cgagcgccg     1380 gaggggcaag gggcacgatg gccttacca gggtctcagt acagccacca aggacaccta     1440
cgacgccctt cacatgcagg ccctgccccc tcgctaacag ccagggggatt tcaccactca     1500 aaggccagac ctgcagacgc ccagattatg agacacactc gagcc                      1545

<210> SEQ ID NO 10
<211> LENGTH: 486
<212> TYPE: PRT
<213> ORGANISM: Artificial Sequence
<220> FEATURE:
<223> OTHER INFORMATION: Description of Artificial Sequence: Synthetic
      anti-CD19-41BB-CD3-zeta CAR amino acid sequence

<400> SEQUENCE: 10

Met Ala Leu Pro Val Thr Ala Leu Leu Leu Pro Leu Ala Leu Leu Leu
1               5                   10                  15

His Ala Ala Arg Pro Asp Ile Gln Met Thr Gln Thr Thr Ser Ser Leu
            20                  25                  30

Ser Ala Ser Leu Gly Asp Arg Val Thr Ile Ser Cys Arg Ala Ser Gln
        35                  40                  45

Asp Ile Ser Lys Tyr Leu Asn Trp Tyr Gln Gln Lys Pro Asp Gly Thr
    50                  55                  60

Val Lys Leu Leu Ile Tyr His Thr Ser Arg Leu His Ser Gly Val Pro
65                  70                  75                  80

Ser Arg Phe Ser Gly Ser Gly Ser Gly Thr Asp Tyr Ser Leu Thr Ile
                85                  90                  95

Ser Asn Leu Glu Gln Glu Asp Ile Ala Thr Tyr Phe Cys Gln Gln Gly
            100                 105                 110

Asn Thr Leu Pro Tyr Thr Phe Gly Gly Gly Thr Lys Leu Glu Ile Thr
        115                 120                 125

Gly Gly Gly Gly Ser Gly Gly Gly Gly Ser Gly Gly Gly Gly Ser Glu
    130                 135                 140

Val Lys Leu Gln Glu Ser Gly Pro Gly Leu Val Ala Pro Ser Gln Ser
145                 150                 155                 160

Leu Ser Val Thr Cys Thr Val Ser Gly Val Ser Leu Pro Asp Tyr Gly
                165                 170                 175

Val Ser Trp Ile Arg Gln Pro Pro Arg Lys Gly Leu Glu Trp Leu Gly
            180                 185                 190
```

Val Ile Trp Gly Ser Glu Thr Thr Tyr Tyr Asn Ser Ala Leu Lys Ser
            195                 200                 205

Arg Leu Thr Ile Ile Lys Asp Asn Ser Lys Ser Gln Val Phe Leu Lys
        210                 215                 220

Met Asn Ser Leu Gln Thr Asp Asp Thr Ala Ile Tyr Tyr Cys Ala Lys
225                 230                 235                 240

His Tyr Tyr Tyr Gly Gly Ser Tyr Ala Met Asp Tyr Trp Gly Gln Gly
                245                 250                 255

Thr Ser Val Thr Val Ser Ser Thr Thr Thr Pro Ala Pro Arg Pro Pro
            260                 265                 270

Thr Pro Ala Pro Thr Ile Ala Ser Gln Pro Leu Ser Leu Arg Pro Glu
        275                 280                 285

Ala Cys Arg Pro Ala Ala Gly Gly Ala Val His Thr Arg Gly Leu Asp
    290                 295                 300

Phe Ala Cys Asp Ile Tyr Ile Trp Ala Pro Leu Ala Gly Thr Cys Gly
305                 310                 315                 320

Val Leu Leu Leu Ser Leu Val Ile Thr Leu Tyr Cys Lys Arg Gly Arg
                325                 330                 335

Lys Lys Leu Leu Tyr Ile Phe Lys Gln Pro Phe Met Arg Pro Val Gln
            340                 345                 350

Thr Thr Gln Glu Glu Asp Gly Cys Ser Cys Arg Phe Pro Glu Glu Glu
        355                 360                 365

Glu Gly Gly Cys Glu Leu Arg Val Lys Phe Ser Arg Ser Ala Asp Ala
    370                 375                 380

Pro Ala Tyr Gln Gln Gly Gln Asn Gln Leu Tyr Asn Glu Leu Asn Leu
385                 390                 395                 400

Gly Arg Arg Glu Glu Tyr Asp Val Leu Asp Lys Arg Arg Gly Arg Asp
                405                 410                 415

Pro Glu Met Gly Gly Lys Pro Arg Arg Lys Asn Pro Gln Glu Gly Leu
            420                 425                 430

Tyr Asn Glu Leu Gln Lys Asp Lys Met Ala Glu Ala Tyr Ser Glu Ile
        435                 440                 445

Gly Met Lys Gly Glu Arg Arg Arg Gly Lys Gly His Asp Gly Leu Tyr
    450                 455                 460

Gln Gly Leu Ser Thr Ala Thr Lys Asp Thr Tyr Asp Ala Leu His Met
465                 470                 475                 480

Gln Ala Leu Pro Pro Arg
                485

<210> SEQ ID NO 11
<211> LENGTH: 2844
<212> TYPE: DNA
<213> ORGANISM: Artificial Sequence
<220> FEATURE:
<223> OTHER INFORMATION: Description of Artificial Sequence: Synthetic
      EpoRm-2A-CAR cDNA sequence

<400> SEQUENCE: 11
gccaccatgg accacctcgg ggcgtccctc tggccccagg tcggctccct ttgtctcctg      60
ctcgctgggg ccgcctgggc gccccgcct aacctcccgg accccaagtt cgagagcaaa     120
gcggccttgc tggcggcccg ggggcccgaa gagcttctgt gcttcaccga gcggttggag     180
gacttggtgt gtttctggga ggaagcggcg agcgctgggg tgggcccggg caactacagc     240
ttctcctacc agttagaaga tgagccatgg aagctgtgtc gcctgcacca ggctcccacg     300

```
gctcgtggtg cggtgcgctt ctggtgttcg ctgcctacag ccgacacgtc gagcttcgtg    360
cccctagagt tgcgcgtcac agcagcctcc ggcgctccgc gatatcaccg tgtcatccac    420
atcaatgaag tagtgctcct agacgccccc gtggggctgg tggcgcggtt ggctgacgag    480
agcggccacg tagtgttgcg ctggctcccg ccgcctgaga cacccatgac gtctcacatc    540
cgctacgagg tggacgtctc ggccggcaac ggcgcaggga gcgtacagag ggtggagatc    600
ctggagggcc gcaccgagtg tgtgctgagc aacctgcggg gccggacgcg ctacaccttc    660
gccgtccgcg cgcgtatggc tgagccgagc ttcggcggct tctggagcgc ctggtcggag    720
cctgtgtcgc tgctgacgcc tagcgacctg gaccccctca tcctgacgct ctccctcatc    780
ctcgtggtca tcctggtgct gctgaccgtg ctcgcgctgc tctcccaccg ccgggctctg    840
aagcagaaga tctggcctgg catcccgagc ccagagagcg agtttgaagg cctcttcacc    900
acccacaagg gtaacttcca gctgtggctg taccagaatg atggctgcct gtggtggagc    960
ccctgcaccc ccttcacgga ggacccacct gcttccctgg aagtcctctc agagcgctgc   1020
tgggggacga tgcaggcagt ggagccgggg acagatgatg agggccccct gctggagcca   1080
gtgggcagtg agcatgccca ggatacctat ctggtgctgg acaaatggtt gctgccccgg   1140
aacccgccca gtgaggacct cccagggcct ggtggcagtg tggacatagt ggccatggat   1200
gaaggctcag aagcatcctc ctgctcatct gctttggcct cgaagcccag cccagaggga   1260
gcctctgctg ccagctttga gtacactatc ctggaccccc agctcccagc cttgcgtcca   1320
ggatcaggcg agggcagagg aagtctgcta acatgcggtg acgtcgagga gaatcctggc   1380
ccaatggcct taccagtgac cgccttgctc ctgccgctgg ccttgctgct ccacgccgcc   1440
aggccggaca tccagatgac acagactaca tcctccctgt ctgcctctct gggagacaga   1500
gtcaccatca gttgcagggc aagtcaggac attagtaaat atttaaattg gtatcagcag   1560
aaaccagatg gaactgttaa actcctgatc taccatacat caagattaca ctcaggagtc   1620
ccatcaaggt tcagtggcag tgggtctgga acagattatt ctctcaccat tagcaacctg   1680
gagcaagaag atattgccac ttacttttgc caacagggta atacgcttcc gtacacgttc   1740 ggaggggggga ccaagctgga gatcacaggt ggcggtggct cgggcggtgg tgggtcgggt   1800
ggcggcggat ctgaggtgaa actgcaggag tcaggacctg gcctggtggc gccctcacag   1860
agcctgtccg tcacatgcac tgtctcaggg gtctcattac ccgactatgg tgtaagctgg   1920
attcgccagc ctccacgaaa gggtctggag tggctgggag taatatgggg tagtgaaacc   1980
acatactata attcagctct caaatccaga ctgaccatca tcaaggacaa ctccaagagc   2040
caagttttct taaaaatgaa cagtctgcaa actgatgaca cagccattta ctactgtgcc   2100
aaacattatt actacggtgg tagctatgct atggactact ggggccaagg aacctcagtc   2160
accgtctcct caaccacgac gccagcgccg cgaccaccaa caccggcgcc caccatcgcg   2220
tcgcagcccc tgtccctgcg cccagaggcg tgccggccag cggcgggggg cgcagtgcac   2280
acgagggggc tggacttcgc ctgtgatatc tacatctggg cgcccttggc cgggacttgt   2340
ggggtccttc tcctgtcact ggttatcacc ctttactgca acggggcag aaagaaactc   2400 ctgtatatat tcaaacaacc atttatgaga ccagtacaaa ctactcaaga ggaagatggc   2460
tgtagctgcc gatttccaga agaagaagaa ggaggatgtg aactgagagt gaagttcagc   2520
aggagcgcag acgcccccgc gtaccagcag ggccagaacc agctctataa cgagctcaat   2580
ctaggacgaa gagaggagta cgatgttttg gacaagagac gtggccggga ccctgagatg   2640 ggggaaagc cgagaaggaa gaaccctcag gaaggcctgt acaatgaact gcagaaagat   2700
```

-continued

```
aagatggcgg aggcctacag tgagattggg atgaaaggcg agcgccggag gggcaagggg    2760
cacgatggcc tttaccaggg tctcagtaca gccaccaagg acacctacga cgcccttcac    2820
atgcaggccc tgccccctcg ctaa                                           2844
```

<210> SEQ ID NO 12
<211> LENGTH: 945
<212> TYPE: PRT
<213> ORGANISM: Artificial Sequence
<220> FEATURE:
<223> OTHER INFORMATION: Description of Artificial Sequence: Synthetic EpoRm-2A-CAR amino acid sequence

<400> SEQUENCE: 12

```
Met Asp His Leu Gly Ala Ser Leu Trp Pro Gln Val Gly Ser Leu Cys
1               5                   10                  15

Leu Leu Leu Ala Gly Ala Ala Trp Ala Pro Pro Asn Leu Pro Asp
            20                  25                  30

Pro Lys Phe Glu Ser Lys Ala Ala Leu Leu Ala Ala Arg Gly Pro Glu
        35                  40                  45

Glu Leu Leu Cys Phe Thr Glu Arg Leu Glu Asp Leu Val Cys Phe Trp
    50                  55                  60

Glu Glu Ala Ala Ser Ala Gly Val Gly Pro Gly Asn Tyr Ser Phe Ser
65                  70                  75                  80

Tyr Gln Leu Glu Asp Glu Pro Trp Lys Leu Cys Arg Leu His Gln Ala
                85                  90                  95

Pro Thr Ala Arg Gly Ala Val Arg Phe Trp Cys Ser Leu Pro Thr Ala
            100                 105                 110

Asp Thr Ser Ser Phe Val Pro Leu Glu Leu Arg Val Thr Ala Ala Ser
        115                 120                 125

Gly Ala Pro Arg Tyr His Arg Val Ile His Ile Asn Glu Val Val Leu
    130                 135                 140

Leu Asp Ala Pro Val Gly Leu Val Ala Arg Leu Ala Asp Glu Ser Gly
145                 150                 155                 160

His Val Val Leu Arg Trp Leu Pro Pro Pro Glu Thr Pro Met Thr Ser
                165                 170                 175

His Ile Arg Tyr Glu Val Asp Val Ser Ala Gly Asn Gly Ala Gly Ser
            180                 185                 190

Val Gln Arg Val Glu Ile Leu Glu Gly Arg Thr Glu Cys Val Leu Ser
        195                 200                 205

Asn Leu Arg Gly Arg Thr Arg Tyr Thr Phe Ala Val Arg Ala Arg Met
    210                 215                 220

Ala Glu Pro Ser Phe Gly Gly Phe Trp Ser Ala Trp Ser Glu Pro Val
225                 230                 235                 240

Ser Leu Leu Thr Pro Ser Asp Leu Asp Pro Leu Ile Leu Thr Leu Ser
                245                 250                 255

Leu Ile Leu Val Val Ile Leu Val Leu Leu Thr Val Leu Ala Leu Leu
            260                 265                 270

Ser His Arg Arg Ala Leu Lys Gln Lys Ile Trp Pro Gly Ile Pro Ser
        275                 280                 285

Pro Glu Ser Glu Phe Glu Gly Leu Phe Thr Thr His Lys Gly Asn Phe
    290                 295                 300

Gln Leu Trp Leu Tyr Gln Asn Asp Gly Cys Leu Trp Trp Ser Pro Cys
305                 310                 315                 320

Thr Pro Phe Thr Glu Asp Pro Pro Ala Ser Leu Glu Val Leu Ser Glu
```

```
              325                 330                 335
Arg Cys Trp Gly Thr Met Gln Ala Val Glu Pro Gly Thr Asp Asp Glu
            340                 345                 350
Gly Pro Leu Leu Glu Pro Val Gly Ser Glu His Ala Gln Asp Thr Tyr
            355                 360                 365
Leu Val Leu Asp Lys Trp Leu Leu Pro Arg Asn Pro Ser Glu Asp
            370                 375                 380
Leu Pro Gly Pro Gly Gly Ser Val Asp Ile Val Ala Met Asp Glu Gly
385                         390                 395                 400
Ser Glu Ala Ser Ser Cys Ser Ser Ala Leu Ala Ser Lys Pro Ser Pro
                        405                 410                 415
Glu Gly Ala Ser Ala Ala Ser Phe Glu Tyr Thr Ile Leu Asp Pro Ser
                420                 425                 430
Ser Gln Leu Leu Arg Pro Gly Ser Gly Glu Gly Arg Gly Ser Leu Leu
                435                 440                 445
Thr Cys Gly Asp Val Glu Glu Asn Pro Gly Pro Met Ala Leu Pro Val
                450                 455                 460
Thr Ala Leu Leu Leu Pro Leu Ala Leu Leu Leu His Ala Ala Arg Pro
465                         470                 475                 480
Asp Ile Gln Met Thr Gln Thr Thr Ser Ser Leu Ser Ala Ser Leu Gly
                        485                 490                 495
Asp Arg Val Thr Ile Ser Cys Arg Ala Ser Gln Asp Ile Ser Lys Tyr
                500                 505                 510
Leu Asn Trp Tyr Gln Gln Lys Pro Asp Gly Thr Val Lys Leu Leu Ile
                515                 520                 525
Tyr His Thr Ser Arg Leu His Ser Gly Val Pro Ser Arg Phe Ser Gly
                530                 535                 540
Ser Gly Ser Gly Thr Asp Tyr Ser Leu Thr Ile Ser Asn Leu Glu Gln
545                         550                 555                 560
Glu Asp Ile Ala Thr Tyr Phe Cys Gln Gln Gly Asn Thr Leu Pro Tyr
                        565                 570                 575
Thr Phe Gly Gly Gly Thr Lys Leu Glu Ile Thr Gly Gly Gly Gly Ser
                580                 585                 590
Gly Gly Gly Gly Ser Gly Gly Gly Gly Ser Glu Val Lys Leu Gln Glu
                595                 600                 605
Ser Gly Pro Gly Leu Val Ala Pro Ser Gln Ser Leu Ser Val Thr Cys
                610                 615                 620
Thr Val Ser Gly Val Ser Leu Pro Asp Tyr Gly Val Ser Trp Ile Arg
625                         630                 635                 640
Gln Pro Pro Arg Lys Gly Leu Glu Trp Leu Gly Val Ile Trp Gly Ser
                        645                 650                 655
Glu Thr Thr Tyr Tyr Asn Ser Ala Leu Lys Ser Arg Leu Thr Ile Ile
                660                 665                 670
Lys Asp Asn Ser Lys Ser Gln Val Phe Leu Lys Met Asn Ser Leu Gln
                675                 680                 685
Thr Asp Asp Thr Ala Ile Tyr Tyr Cys Ala Lys His Tyr Tyr Tyr Gly
                690                 695                 700
Gly Ser Tyr Ala Met Asp Tyr Trp Gly Gln Gly Thr Ser Val Thr Val
705                         710                 715                 720
Ser Ser Thr Thr Thr Pro Ala Pro Arg Pro Pro Thr Pro Ala Pro Thr
                        725                 730                 735
Ile Ala Ser Gln Pro Leu Ser Leu Arg Pro Glu Ala Cys Arg Pro Ala
                740                 745                 750
```

Ala Gly Gly Ala Val His Thr Arg Gly Leu Asp Phe Ala Cys Asp Ile
        755                 760                 765

Tyr Ile Trp Ala Pro Leu Ala Gly Thr Cys Gly Val Leu Leu Leu Ser
    770                 775                 780

Leu Val Ile Thr Leu Tyr Cys Lys Arg Gly Arg Lys Lys Leu Leu Tyr
785                 790                 795                 800

Ile Phe Lys Gln Pro Phe Met Arg Pro Val Gln Thr Thr Gln Glu Glu
                805                 810                 815

Asp Gly Cys Ser Cys Arg Phe Pro Glu Glu Glu Glu Gly Gly Cys Glu
                820                 825                 830

Leu Arg Val Lys Phe Ser Arg Ser Ala Asp Ala Pro Ala Tyr Gln Gln
                835                 840                 845

Gly Gln Asn Gln Leu Tyr Asn Glu Leu Asn Leu Gly Arg Arg Glu Glu
        850                 855                 860

Tyr Asp Val Leu Asp Lys Arg Gly Arg Asp Pro Glu Met Gly Gly
865                 870                 875                 880

Lys Pro Arg Arg Lys Asn Pro Gln Glu Gly Leu Tyr Asn Glu Leu Gln
                885                 890                 895

Lys Asp Lys Met Ala Glu Ala Tyr Ser Glu Ile Gly Met Lys Gly Glu
        900                 905                 910

Arg Arg Arg Gly Lys Gly His Asp Gly Leu Tyr Gln Gly Leu Ser Thr
        915                 920                 925

Ala Thr Lys Asp Thr Tyr Asp Ala Leu His Met Gln Ala Leu Pro Pro
        930                 935                 940

Arg
945

<210> SEQ ID NO 13
<211> LENGTH: 66
<212> TYPE: DNA
<213> ORGANISM: Artificial Sequence
<220> FEATURE:
<223> OTHER INFORMATION: Description of Artificial Sequence: Synthetic
      P2A cDNA sequence

<400> SEQUENCE: 13
ggaagcggag ctactaactt cagcctgctg aagcaggctg agacgtggga ggagaaccct    60
ggacct                                                              66

<210> SEQ ID NO 14
<211> LENGTH: 22
<212> TYPE: PRT
<213> ORGANISM: Artificial Sequence
<220> FEATURE:
<223> OTHER INFORMATION: Description of Artificial Sequence: Synthetic
      P2A amino acid sequence

<400> SEQUENCE: 14

Gly Ser Gly Ala Thr Asn Phe Ser Leu Leu Lys Gln Ala Gly Asp Val
1               5                   10                  15

Glu Glu Asn Pro Gly Pro
            20

<210> SEQ ID NO 15
<211> LENGTH: 63
<212> TYPE: DNA
<213> ORGANISM: Artificial Sequence
<220> FEATURE:
<223> OTHER INFORMATION: Description of Artificial Sequence: Synthetic T2A cDNA sequence

<400> SEQUENCE: 15
ggaagcggag agggcagagg aagtctgcta acatgcggtg acgtcgagga gaatcctgga    60
cct                                                                  63

<210> SEQ ID NO 16
<211> LENGTH: 21
<212> TYPE: PRT
<213> ORGANISM: Artificial Sequence
<220> FEATURE:
<223> OTHER INFORMATION: Description of Artificial Sequence: Synthetic
      T2A amino acid sequence

<400> SEQUENCE: 16

Gly Ser Gly Glu Gly Arg Gly Ser Leu Leu Thr Cys Gly Asp Val Glu
1               5                   10                  15

Glu Asn Pro Gly Pro
            20

<210> SEQ ID NO 17
<211> LENGTH: 69
<212> TYPE: DNA
<213> ORGANISM: Artificial Sequence
<220> FEATURE:
<223> OTHER INFORMATION: Description of Artificial Sequence: Synthetic
      E2A cDNA sequence

<400> SEQUENCE: 17
ggaagcggac agtgtactaa ttatgctctc ttgaaattgg ctggagatgt tgagagcaac    60
cctggacct                                                            69

<210> SEQ ID NO 18
<211> LENGTH: 23
<212> TYPE: PRT
<213> ORGANISM: Artificial Sequence
<220> FEATURE:
<223> OTHER INFORMATION: Description of Artificial Sequence: Synthetic
      E2A amino acid sequence

<400> SEQUENCE: 18

Gly Ser Gly Gln Cys Thr Asn Tyr Ala Leu Leu Lys Leu Ala Gly Asp
1               5                   10                  15

Val Glu Ser Asn Pro Gly Pro
            20

<210> SEQ ID NO 19
<211> LENGTH: 75
<212> TYPE: DNA
<213> ORGANISM: Artificial Sequence
<220> FEATURE:
<223> OTHER INFORMATION: Description of Artificial Sequence: Synthetic
      F2A cDNA sequence

<400> SEQUENCE: 19
ggaagcggag tgaaacagac tttgaatttt gaccttctca gttggcgggg agacgtggag    60
tccaaccctg gacct                                                     75

<210> SEQ ID NO 20
<211> LENGTH: 25
<212> TYPE: PRT
<213> ORGANISM: Artificial Sequence
<220> FEATURE:
<223> OTHER INFORMATION: Description of Artificial Sequence: Synthetic F2A amino acid sequence

<400> SEQUENCE: 20

Gly Ser Gly Val Lys Gln Thr Leu Asn Phe Asp Leu Leu Lys Leu Ala
1               5                   10                  15

Gly Asp Val Glu Ser Asn Pro Gly Pro
            20                  25

<210> SEQ ID NO 21
<211> LENGTH: 63
<212> TYPE: DNA
<213> ORGANISM: Artificial Sequence
<220> FEATURE:
<223> OTHER INFORMATION: Description of Artificial Sequence: Synthetic
      CD8-alpha signal peptide cDNA sequence

<400> SEQUENCE: 21
atggccttac cagtgaccgc cttgctcctg ccgctggcct tgctgctcca cgccgccagg      60
ccg                                                                   63

<210> SEQ ID NO 22
<211> LENGTH: 21
<212> TYPE: PRT
<213> ORGANISM: Artificial Sequence
<220> FEATURE:
<223> OTHER INFORMATION: Description of Artificial Sequence: Synthetic
      CD8-alpha signal peptide amino acid sequence

<400> SEQUENCE: 22

Met Ala Leu Pro Val Thr Ala Leu Leu Leu Pro Leu Ala Leu Leu Leu
1               5                   10                  15

His Ala Ala Arg Pro
            20

<210> SEQ ID NO 23
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Asp Tyr Lys Asp Asp Asp Asp Lys
1               5

<210> SEQ ID NO 24
<211> LENGTH: 500
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (1)..(500)
<223> OTHER INFORMATION: This sequence may encompass 1-100 "Gly Gly Gly
      Gly Ser" repeating units

<400> SEQUENCE: 24

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser Gly Gly
            20                  25                  30

Gly Gly Ser Gly Gly Gly Gly Ser Gly Gly Gly Gly Ser Gly Gly Gly

```
                35                  40                  45
Gly Ser Gly Gly Gly Ser Gly Gly Gly Ser Gly Gly Gly Gly
    50                  55                  60
Ser Gly Gly Gly Gly Ser Gly Gly Gly Gly Ser Gly Gly Gly Ser
65                  70                  75                  80
Gly Gly Gly Gly Ser Gly Gly Gly Gly Ser Gly Gly Gly Ser Gly
                85                  90                  95
Gly Gly Gly Ser Gly Gly Gly Ser Gly Gly Gly Ser Gly Gly
                100                 105                 110
Gly Gly Ser Gly Gly Gly Gly Ser Gly Gly Gly Ser Gly Gly
            115                 120                 125
Gly Ser Gly Gly Gly Ser Gly Gly Gly Ser Gly Gly Gly Gly
        130                 135                 140
Ser Gly Gly Gly Ser Gly Gly Gly Ser Gly Gly Gly Gly Ser
145                 150                 155                 160
Gly Gly Gly Gly Ser Gly Gly Gly Ser Gly Gly Gly Ser Gly
                165                 170                 175
Gly Gly Gly Ser Gly Gly Gly Ser Gly Gly Gly Ser Gly Gly
            180                 185                 190
Gly Gly Ser Gly Gly Gly Ser Gly Gly Gly Ser Gly Gly Gly
        195                 200                 205
Gly Ser Gly Gly Gly Ser Gly Gly Gly Ser Gly Gly Gly Gly
    210                 215                 220
Ser Gly Gly Gly Gly Ser Gly Gly Gly Ser Gly Gly Gly Ser
225                 230                 235                 240
Gly Gly Gly Gly Ser Gly Gly Gly Ser Gly Gly Gly Ser Gly
                245                 250                 255
Gly Gly Gly Ser Gly Gly Gly Ser Gly Gly Gly Ser Gly Gly
            260                 265                 270
Gly Gly Ser Gly Gly Gly Ser Gly Gly Gly Ser Gly Gly Gly
        275                 280                 285
Gly Ser Gly Gly Gly Gly Ser Gly Gly Gly Ser Gly Gly Gly Gly
    290                 295                 300
Ser Gly Gly Gly Gly Ser Gly Gly Gly Ser Gly Gly Gly Gly Ser
305                 310                 315                 320
Gly Gly Gly Gly Ser Gly Gly Gly Gly Ser Gly Gly Gly Ser Gly
                325                 330                 335
Gly Gly Gly Ser Gly Gly Gly Gly Ser Gly Gly Gly Ser Gly
            340                 345                 350
Gly Gly Ser Gly Gly Gly Gly Ser Gly Gly Gly Ser Gly Gly
        355                 360                 365
Gly Ser Gly Gly Gly Gly Ser Gly Gly Gly Ser Gly Gly Gly
    370                 375                 380
Ser Gly Gly Gly Gly Ser Gly Gly Gly Ser Gly Gly Gly Ser
385                 390                 395                 400
Gly Gly Gly Gly Ser Gly Gly Gly Gly Ser Gly Gly Gly Ser Gly
                405                 410                 415
Gly Gly Gly Ser Gly Gly Gly Ser Gly Gly Gly Ser Gly Gly
            420                 425                 430
Gly Gly Ser Gly Gly Gly Gly Ser Gly Gly Gly Ser Gly Gly Gly
        435                 440                 445
Gly Ser Gly Gly Gly Gly Ser Gly Gly Gly Gly Ser Gly Gly Gly Gly
    450                 455                 460
```

```
Ser Gly Gly Gly Gly Ser Gly Gly Gly Ser Gly Gly Gly Ser
        465                 470                 475                 480

Gly Gly Gly Gly Ser Gly Gly Gly Gly Ser Gly Gly Gly Ser Gly
                    485                 490                 495

Gly Gly Gly Ser
            500

<210> SEQ ID NO 25
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 25

Gly Gly Gly Gly Ser Gly Gly Gly Gly Ser Gly Gly Gly Gly Ser
1               5                   10                  15

<210> SEQ ID NO 26
<211> LENGTH: 100
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MISC_FEATURE
<222> LOCATION: (1)..(100)
<223> OTHER INFORMATION: This sequence may encompass 2-100 residues

<400> SEQUENCE: 26

Gly Gly Gly Gly Gly Gly Gly Gly Gly Gly Gly Gly Gly Gly Gly
1               5                   10                  15

Gly Gly Gly Gly Gly Gly Gly Gly Gly Gly Gly Gly Gly Gly Gly
                20                  25                  30

Gly Gly Gly Gly Gly Gly Gly Gly Gly Gly Gly Gly Gly Gly Gly
            35                  40                  45

Gly Gly Gly Gly Gly Gly Gly Gly Gly Gly Gly Gly Gly Gly Gly
        50                  55                  60

Gly Gly Gly Gly Gly Gly Gly Gly Gly Gly Gly Gly Gly Gly Gly
65                  70                  75                  80

Gly Gly Gly Gly Gly Gly Gly Gly Gly Gly Gly Gly Gly Gly Gly
                    85                  90                  95

Gly Gly Gly Gly
            100

<210> SEQ ID NO 27
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 27

Glu Ala Ala Ala Lys Glu Ala Ala Ala Lys Glu Ala Ala Ala Lys
1               5                   10                  15

<210> SEQ ID NO 28
<211> LENGTH: 5
<212> TYPE: PRT
<213> ORGANISM: Artificial Sequence
```

```
<220> FEATURE:
<223> OTHER INFORMATION: Description of Artificial Sequence: Synthetic
      peptide

<400> SEQUENCE: 28

Gly Gly Gly Gly Ser
1               5
```